(12) United States Patent
Jacobs et al.

(10) Patent No.: US 9,948,922 B2
(45) Date of Patent: Apr. 17, 2018

(54) FASTER STATE TRANSITIONING FOR CONTINUOUS ADJUSTABLE 3DEEPS FILTER SPECTACLES USING MULTI-LAYERED VARIABLE TINT MATERIALS

(71) Applicant: VISUAL EFFECT INNOVATIONS, LLC, Plano, TX (US)

(72) Inventors: Kenneth Martin Jacobs, New York, NY (US); Ronald Steven Karpf, Corvallis, OR (US)

(73) Assignee: VISUAL EFFECT INNOVATIONS, LLC, Plano, TX (US)

( * ) Notice: Subject to any disclaimer, the term of this patent is extended or adjusted under 35 U.S.C. 154(b) by 0 days.

(21) Appl. No.: 15/683,623

(22) Filed: Aug. 22, 2017

(65) Prior Publication Data

US 2017/0374357 A1    Dec. 28, 2017

Related U.S. Application Data

(60) Continuation of application No. 15/606,850, filed on May 26, 2017, now Pat. No. 9,781,408, which is a
(Continued)

(51) Int. Cl.
*G02C 1/00*     (2006.01)
*H04N 13/04*    (2006.01)
(Continued)

(52) U.S. Cl.
CPC ....... *H04N 13/0431* (2013.01); *G02B 26/026* (2013.01); *G02B 27/017* (2013.01);
(Continued)

(58) Field of Classification Search
CPC .................. G02C 11/10; G02C 7/00
(Continued)

(56) References Cited

U.S. PATENT DOCUMENTS

| 3,991,266 A | 11/1976 | Baer |
| 4,049,339 A | 9/1977 | Ledan |

(Continued)

FOREIGN PATENT DOCUMENTS

| CA | 2276190 A1 | 7/1998 |
| JP | 7287191 A | 10/1995 |
| JP | 2000284224 A | 10/2000 |

OTHER PUBLICATIONS

"Crystal Eyes 3 User's Guide", StereoGraphics Corporation (2000), 2 pages.
(Continued)

*Primary Examiner* — Hung Dang
(74) *Attorney, Agent, or Firm* — Ascenda Law Group, PC

(57) ABSTRACT

An electrically controlled spectacle includes a spectacle frame and optoelectronic lenses housed in the frame. The lenses include a left lens and a right lens, each of the optoelectrical lenses having a plurality of states, wherein the state of the left lens is independent of the state of the right lens. The electrically controlled spectacle also includes a control unit housed in the frame, the control unit being adapted to control the state of each of the lenses independently.

12 Claims, 54 Drawing Sheets

Related U.S. Application Data continuation-in-part of application No. 15/217,612, filed on Jul. 22, 2016, now Pat. No. 9,699,444, which is a continuation of application No. 14/850,750, filed on Sep. 10, 2015, now Pat. No. 9,426,452, which is a continuation of application No. 14/451,048, filed on Aug. 4, 2014, now Pat. No. 9,167,235, which is a continuation of application No. 14/155,505, filed on Jan. 15, 2014, now Pat. No. 8,864,304, which is a continuation of application No. 13/746,393, filed on Jan. 22, 2013, now Pat. No. 8,657,438, which is a continuation of application No. 12/938,495, filed on Nov. 3, 2010, now abandoned, which is a division of application No. 12/555,545, filed on Sep. 8, 2009, now Pat. No. 7,850,304, which is a continuation-in-part of application No. 12/274,752, filed on Nov. 20, 2008, now Pat. No. 7,604,348, which is a continuation-in-part of application No. 11/928,152, filed on Oct. 30, 2007, now Pat. No. 7,508,485, which is a continuation-in-part of application No. 11/373,702, filed on Mar. 10, 2006, now Pat. No. 7,405,801, which is a continuation-in-part of application No. 10/054,607, filed on Jan. 22, 2002, now Pat. No. 7,030,902, said application No. 11/928,152 is a continuation-in-part of application No. 11/372,723, filed on Mar. 10, 2006, now Pat. No. 7,522,257, which is a continuation-in-part of application No. 10/054,607, filed on Jan. 22, 2002, now Pat. No. 7,030,902, said application No. 15/606,850 is a continuation-in-part of application No. 14/850,629, filed on Sep. 10, 2015, which is a continuation of application No. 14/268,423, filed on May 2, 2014, now Pat. No. 9,167,177, which is a continuation of application No. 13/168,493, filed on Jun. 24, 2011, now Pat. No. 8,750,382, which is a continuation-in-part of application No. 12/938,495, filed on Nov. 3, 2010, now abandoned, which is a division of application No. 12/555,545, filed on Sep. 8, 2009, now Pat. No. 7,850,304, which is a continuation-in-part of application No. 12/274,752, filed on Nov. 20, 2008, now Pat. No. 7,604,348, which is a continuation-in-part of application No. 11/928,152, filed on Oct. 30, 2007, now Pat. No. 7,508,485, which is a continuation-in-part of application No. 11/373,702, filed on Mar. 10, 2006, now Pat. No. 7,405,801, which is a continuation-in-part of application No. 10/054,607, filed on Jan. 22, 2002, now Pat. No. 7,030,902, said application No. 13/168,493 is a continuation-in-part of application No. 12/555,482, filed on Sep. 8, 2009, now Pat. No. 7,976,159, said application No. 15/606,850 is a continuation-in-part of application No. 15/212,114, filed on Jul. 15, 2016, now Pat. No. 9,716,874, which is a division of application No. 14/566,205, filed on Dec. 10, 2014, now Pat. No. 9,426,442, which is a continuation of application No. 14/333,266, filed on Jul. 16, 2014, now Pat. No. 8,941,919, which is a continuation of application No. 14/149,293, filed on Jan. 7, 2014, now Pat. No. 8,913,319, which is a continuation of application No. 13/632,333, filed on Oct. 1, 2012, now Pat. No. 8,657,439, which is a continuation of application No. 13/151,736, filed on Jun. 2, 2011, now Pat. No. 8,303,112, which is a continuation of application No. 12/555,482, filed on Sep. 8, 2009, now Pat. No. 7,976,159, which is a division of application No. 12/274,752, filed on Nov. 20, 2008, now Pat. No. 7,604,348, which is a continuation-in-part of application No. 11/928,152, filed on Oct. 30, 2007, now Pat. No. 7,508,485, which is a continuation-in-part of application No. 11/372,723, filed on Mar. 10, 2006, now Pat. No. 7,522,257, and a continuation-in-part of application No. 11/373,702, filed on Mar. 10, 2006, now Pat. No. 7,405,801, said application No. 11/372,723 is a continuation-in-part of application No. 10/054,607, filed on Jan. 22, 2002, now Pat. No. 7,030,902, said application No. 11/373,702 is a continuation-in-part of application No. 10/054,607, filed on Jan. 22, 2002, now Pat. No. 7,030,902.

(60) Provisional application No. 60/661,847, filed on Mar. 15, 2005, provisional application No. 60/664,369, filed on Mar. 23, 2005, provisional application No. 60/263,498, filed on Jan. 23, 2001, provisional application No. 61/398,981, filed on Jul. 2, 2010.

(51) Int. Cl.

| | | |
|---|---|---|
| *G02B 27/01* | (2006.01) | |
| *G02B 26/02* | (2006.01) | |
| *G02C 11/00* | (2006.01) | |
| *G02B 27/22* | (2018.01) | |
| *G02C 7/00* | (2006.01) | |
| *G02C 7/10* | (2006.01) | |
| *H04N 13/00* | (2018.01) | |
| *H04N 13/02* | (2006.01) | |

(52) U.S. Cl.
CPC ..... *G02B 27/0172* (2013.01); *G02B 27/2207* (2013.01); *G02B 27/2221* (2013.01); *G02B 27/2228* (2013.01); *G02B 27/2264* (2013.01); *G02C 7/00* (2013.01); *G02C 7/101* (2013.01); *G02C 11/10* (2013.01); *H04N 13/0033* (2013.01); *H04N 13/0422* (2013.01); *H04N 13/0425* (2013.01); *H04N 13/0429* (2013.01); *H04N 13/0434* (2013.01); *H04N 13/0438* (2013.01); *H04N 13/0454* (2013.01); *H04N 13/0497* (2013.01); *G02B 2027/014* (2013.01); *H04N 13/026* (2013.01); *H04N 2013/0077* (2013.01); *H04N 2013/0096* (2013.01); *H04N 2213/002* (2013.01); *H04N 2213/008* (2013.01)

(58) Field of Classification Search
USPC ............... 351/158, 159.39, 41, 163, 51, 52; 349/13, 96; 359/465, 490, 63, 83
See application file for complete search history.

(56) References Cited

U.S. PATENT DOCUMENTS

| | | |
|---|---|---|
| 4,429,951 A | 2/1984 | Hirano |
| 4,528,587 A | 7/1985 | Jones, Jr. |
| 4,562,463 A | 12/1985 | Lipton |
| 4,597,634 A | 7/1986 | Steenblik |
| 4,705,371 A | 11/1987 | Beard |
| 4,717,239 A | 1/1988 | Steenblik |
| 4,805,988 A | 2/1989 | Dones |
| 4,893,898 A | 1/1990 | Beard |
| 4,907,860 A | 3/1990 | Noble |
| 4,968,127 A | 11/1990 | Russell et al. |
| 5,002,364 A | 3/1991 | Steenblik |
| 5,015,086 A | 5/1991 | Okaue et al. |
| 5,113,270 A | 5/1992 | Fergason |
| 5,144,344 A | 9/1992 | Takahashi et al. |
| 5,264,877 A | 11/1993 | Hussey |
| 5,353,391 A | 10/1994 | Cohen et al. |

(56) References Cited

U.S. PATENT DOCUMENTS

| | | | |
|---|---|---|---|
| 5,365,278 | A | 11/1994 | Willis |
| 5,510,831 | A | 4/1996 | Mayhew |
| 5,512,965 | A | 4/1996 | Snook |
| 5,552,841 | A | 9/1996 | Gallorini et al. |
| 5,598,231 | A | 1/1997 | Lin |
| 5,619,256 | A | 4/1997 | Haskell et al. |
| 5,649,032 | A | 7/1997 | Burt et al. |
| 5,654,786 | A | 8/1997 | Bylander |
| 5,692,117 | A | 11/1997 | Berend et al. |
| 5,717,412 | A | 2/1998 | Edwards |
| 5,717,415 | A | 2/1998 | Iue et al. |
| 5,721,692 | A | 2/1998 | Nagaya et al. |
| 5,796,373 | A | 8/1998 | Ming-Yen |
| 5,808,588 | A | 9/1998 | Lin |
| 5,821,989 | A | 10/1998 | Lazzaro et al. |
| 5,835,264 | A | 11/1998 | Tandler et al. |
| 5,844,540 | A | 12/1998 | Terasaki |
| 5,907,659 | A | 5/1999 | Yamauchi et al. |
| 5,920,374 | A | 7/1999 | Vaphiades et al. |
| 5,933,150 | A | 8/1999 | Ngo et al. |
| 5,999,195 | A | 12/1999 | Santangeli |
| 6,057,811 | A | 5/2000 | Edwards |
| 6,078,701 | A | 6/2000 | Hsu et al. |
| 6,088,052 | A | 7/2000 | Guralnick |
| 6,115,177 | A | 9/2000 | Vossler |
| 6,163,337 | A | 12/2000 | Azuma et al. |
| 6,166,712 | A | 12/2000 | Hoffman et al. |
| 6,198,524 | B1 | 3/2001 | Osgood |
| 6,220,709 | B1 | 4/2001 | Heger |
| 6,269,122 | B1 | 7/2001 | Prasad et al. |
| 6,278,501 | B1 | 8/2001 | Lin |
| 6,314,211 | B1 | 11/2001 | Kim et al. |
| 6,314,248 | B1 | 11/2001 | Ohmura et al. |
| 6,327,000 | B1 | 12/2001 | Auld et al. |
| 6,333,757 | B1 | 12/2001 | Faris |
| 6,385,245 | B1 | 5/2002 | De Haan et al. |
| 6,392,689 | B1 | 5/2002 | Dolgoff |
| 6,429,881 | B1 | 8/2002 | Olsen, IV |
| 6,449,005 | B1 | 9/2002 | Faris |
| 6,452,582 | B1 | 9/2002 | Rolston |
| 6,456,432 | B1 | 9/2002 | Lazzaro et al. |
| 6,456,745 | B1 | 9/2002 | Bruton et al. |
| 6,496,598 | B1 | 12/2002 | Harman |
| 6,510,002 | B1 | 1/2003 | Tsang |
| 6,529,175 | B2 | 3/2003 | Tserkovnyuk et al. |
| 6,573,882 | B1 | 6/2003 | Takabayashi |
| 6,598,968 | B1 | 7/2003 | Davino |
| 6,678,091 | B2 | 1/2004 | Tropper |
| 6,819,311 | B2 | 11/2004 | Nose et al. |
| 6,882,473 | B2 | 4/2005 | Geier et al. |
| 7,030,902 | B2 | 4/2006 | Jacobs |
| 7,086,735 | B1 | 8/2006 | Provitola |
| 7,218,339 | B2 | 5/2007 | Jacobs |
| 7,405,801 | B2 | 7/2008 | Jacobs |
| 7,436,568 | B1 | 10/2008 | Kuykendall, Jr. |
| 7,508,485 | B2 | 3/2009 | Jacobs et al. |
| 7,522,257 | B2 | 4/2009 | Jacobs et al. |
| 7,922,321 | B2 | 4/2011 | Howell et al. |
| 8,864,304 | B2 | 10/2014 | Jacobs et al. |
| 9,167,235 | B2 | 10/2015 | Jacobs et al. |
| 2003/0112507 | A1 | 6/2003 | Divelbiss et al. |
| 2006/0244907 | A1 | 11/2006 | Simmons |
| 2007/0147671 | A1 | 6/2007 | Di Vincenzo et al. |
| 2010/0157425 | A1 | 6/2010 | Oh |
| 2011/0007132 | A1 | 1/2011 | Redmann et al. |
| 2012/0281961 | A1* | 11/2012 | Forbes ............... H04N 5/77 386/224 |
| 2014/0125890 | A1 | 5/2014 | Xie et al. |

OTHER PUBLICATIONS

"G-Sync High Dynamic Range", Nvidia, Whitepaper (Mar. 2017), 8 pages.

"In Short: The 3D Printing Process", Wicked3D.com (Apr. 28, 2017), downloaded from: http://www.wicked3d.com/, 22 pages.

"Leave the Competition in you Wake with Stereo3D", StereoGraphics Corporation (2000), Crystal Eyes Product Sheet, 2 pages.

"NuVision: About Us", NuVision Technologies, Inc., Stereoscopic Viewing Solutions: Home Page (1998), retrieved from: https://web.archive.org/web/19980613032748/http://www.nuvision3d.com:80/aboutnvt.html, 3 pages.

"NuVision: The Future is Now", NuVision Technologies, Inc., Stereoscopic Viewing Solutions: Home Page (1997), retrieved from: https://web.archive.org/web/19980206083804/http://nuvision3d.com:80/, 2 pages.

"StereoGraphics Developers' Handbook", StereoGraphics Corporation (1997), 66 pages.

"StereoGraphics E-2 Emitter for Workstations with VESA 3-pin mini-DIN stereo connector", StereoGraphics Corporation (1997), Setup and Installation Guide (0420071-001 Rev. A), 5 pages.

"Unofficial H3D/Wicked3D Eyewear Page", Stereo3D.com (last updated Dec. 28, 1998), retrieved from: https://web-beta.archive.org/web/20001204080700/http://www.stereo3d.com80/h3d.htm, 14 pages.

"Wicked3D eyeSCREAM Steroscopic Eyewear System", Metabyte, Inc., Quickstart Guide (ESQS Ver 1.0, Jan. 25, 1999), 11 pages.

"Wicked3D eyeSCREAM Steroscopic Eyewear System", Metabyte, Inc., User Guide (ES Nov. 10, 1998), 32 pages.

Bradford, "StereoGraphics Products and Modern Displays", StereoGraphics Corporation (2000), White Papers, retrieved from: https://web.archive.org/web/20010212015732fw_/http://www.stereographics.com:80/html/lcd-paper.htm, 1 page.

Fisher, "Viewpoint Dependent Imaging: An Interactive Stereoscopic Display", Massachusetts Institute of Technology, Thesis paper (Oct. 8, 1981), 29 pages.

Kunz; et al., "Modified shutter glasses for projection and picture acquisition in virtual environments", IEEE Computer Society, Proceedings of the Virtual Reality 2001 Conference (VR'01), 3 pages.

MacNaughton, "NuVision: 60GX Stereoscopic Wireless LCD Glasses", MacNaughton, Inc., NuVision 60GX Data Sheet (1997), 2 pages.

May, "Perceptual Principles and Computer Graphics", Computer Graphics forum (2000), 19(4):271-279.

Rambler, "How They Put the Motion in Motion Pictures", The Washington Post (Sep. 10, 1997), retrieved from: https://www.washingtonpost.com/archive/1997/09/10/how-they-put-t...es/abae7c0e-dc66-4889-a52d-f25e363657b4/?utm_term=.99b5977ccd83, 7 pages.

Smeltzer, et al., "Design Model Image Presentation", In Experiences with CAAD in Education and Practice: eCAADe Conference Proceedings (1991), Munich, Germany, pp. 195-210.

Sueoka; et al., "Improving the Moving-Image Quality of TFT-LCDs", Conference Record of the 17th International Display Research Conference (1997), ISSN 1083-1312, pp. 203-206.

Wisnieff; et al., "Electronic displays for information technology", IBM J. Res. Develop (May 2000), 44(3):409-22.

"Nvidia Corporation's Invalidity Contentions and P.R. 3-4 Document Production Accompanying Invalidity Contentions", May 8, 2017, *Visual Effect Innovations, LLC v. Nvidia Corporation*, Case No. 2:16-cv-1345-JRG, 37 pages.

"Nvidia Corporation's Invalidity Contentions and Patent L.R. 3-4 Document Production Accompanying Invalidity Contentions", Oct. 6, 2017, *Visual Effect Innovations, LLC v. Nvidia Corporation*, Case No. 3:17-cv-03187-VC, 57 pages.

"Exhibit A1—Japanese Patent Application No. JP2000284224 (A) to Kuma ("Kuma")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 122 pages.

"Exhibit A2—U.S. Pat. No. 5,717,412 to Edwards ("Edwards '412")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 138 pages.

(56) References Cited

OTHER PUBLICATIONS

"Exhibit A3—U.S. Pat. No. 5,796,373 to Lin ("Lin '373")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 87 pages.

"Exhibit A4—U.S. Pat. No. 5,808,588 to Lin ("Lin '588")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 45 pages.

"Exhibit A5—U.S. Pat. No. 5,821,989 to Lazzaro ("Lazzaro")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 125 pages.

"Exhibit A6—U.S. Pat. No. 6,057,811 to Edwards ("Edwards '811")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 176 pages.

"Exhibit A7—U.S. Pat. No. 6,088,052 to Guralnick ("Guralnick")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 64 pages.

"Exhibit A8—U.S. Pat. No. 6,278,501 to Lin ("Lin '501")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 74 pages.

"Exhibit A9—U.S. Pat. No. 6,314,248 to Ohmura ("Ohmura")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 59 pages.

"Exhibit A10—U.S. Pat. No. 6,529,175 to Tserkovnyuk ("Tserkovnyuk")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 74 pages.

"Exhibit A11—Metabyte's Wicked3D Eyewear", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 35 pages.

"Exhibit A12—Stereographics CrystalEyes", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 34 pages.

"Exhibit A13—NuVision 60GX", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 38 pages.

"Exhibit B1—Japanese Patent Application No. JP2000284224 (A) to Kuma ("Kuma")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 69 pages.

"Exhibit B2—U.S. Pat. No. 5,717,412 to Edwards ("Edwards '412")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 75 pages.

"Exhibit B3—U.S. Pat. No. 5,796,373 to Lin 373 ("Lin '373")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 50 pages.

"Exhibit B4—U.S. Pat. No. 5,808,588 to Lin ("Lin '588")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 28 pages.

"Exhibit B5—U.S. Pat. No. 5,821,989 to Lazzaro ("Lazzaro")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 73 pages.

"Exhibit B6—U.S. Pat. No. 6,057,811 to Edwards ("Edwards '811")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 97 pages.

"Exhibit B7—U.S. Pat. No. 6,088,052 to Guralnick ("Guralnick")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 42 pages.

"Exhibit B8—U.S. Pat. No. 6,278,501 to Lin ("Lin '501")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 47 pages.

"Exhibit B9—U.S. Pat. No. 6,314,248 to Ohmura ("Ohmura")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 35 pages.

"Exhibit B10—U.S. Pat. No. 6,529,175 to Tserkovnyuk ("Tserkovnyuk")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 43 pages.

"Exhibit B11—Metabyte's Wicked3D Eyewear", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 23 pages.

"Exhibit B12—Stereographics CrystalEyes", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 21 pages.

"Exhibit B13—NuVision 60GX", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 23 pages.

"Exhibit C1—U.S. Pat. No. 5,353,391 to Cohen ("Cohen")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 30 pages.

"Exhibit C2—U.S. Pat. No. 6,327,000 to Auld ("Auld")", Claim Chart from Nvidia Corporation's Invalidity Contentions and Patent L.R. 3-4 Document Production Accompanying Invalidity Contentions (Oct. 6, 2017), *Visual Effect Innovations, LLC v. Nvidia Corporation*, Case No. 3:17-cv-03187-VC, 38 pages.

"Moving Picture Experts Group", Wikipedia, The Free Encyclopedia, last modified on May 5, 2011, retrieved from: http://en.wikipedia.org/wiki/Moving_Picture_Experts_Group on Jun. 22, 2011, 10 pages.

"MPEG-1", Wikipedia, The Free Encyclopedia, last modified on Apr. 22, 2011, retrieved from: http://en.wikipedia.org/wiki/MPEG-1 on Jun. 22, 2011, 22 pages.

(56) References Cited

OTHER PUBLICATIONS

"Video compression", Wikipedia, The Free Encyclopedia, last modified on May 22, 2011, retrieved from: http://en.wikipedia.org/wiki/Video_compression on Jun. 22, 2011, 4 pages.
Dipert, B., "Video improvements obviate big bit streams", EDN: Information, News & Business Strategy for Electronics Design Engineers (Mar. 15, 2001), pp. 83-102.
Dipert, B., "Video quality: a hands-on view", EDN: Information, News, & Business Strategy for Electronics Design Engineers (Jun. 7, 2001), pp. 83-96.
Koenen, "Overview of the MPEG-4 Standard," International Organisation for Standardisation Organisation Internationale De Normalisation ISO/IEC JTC1/SC29/WG11 Coding of Moving Pictures and Audio, Mar. 2002, retrieved from: http://mpeg.chiariglione.org/standards/mpeg-4/mpeg-4.htm on Jun. 22, 2011, 74 pages.
Lit, A., "The magnitude of the pulfrich stereo-phenomenon as a function of target velocity", Journal of Experimental Psychology (1960), 59(3):165-175.
Lit et al., "Simple reaction lime as a function of luminance for various wavelengths", Perception & Psychophysics (1971), 10(6):1-7.
Philips semiconductors MELZONIC chip—Technology backgrounder, Press Release by NXP, Mar. 3, 1997, pp. 1-5.
Photonics. com: Optics, Lasers, Imaging & Fiber Information Resource. Web. Jan. 12, 2012, retrieved from Wayback Machine May 22, 2017, https://web.archive.org/web/20120112083259/http://www.photonics.com/, pp. 1-5.
"Exhibit C3—U.S. Pat. No. 5,907,659 to Yamauchi ("Yamauchi")", Claim Chart from NVIDIA Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 43 pages.
"Exhibit C4—U.S. Pat. No. 4,528,587 to Jones Jr. ("Jones Jr.")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 24 pages.
"Exhibit C5—U.S. Pat. No. 5,365,278 to Willis ("Willis")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 37 pages.
"Exhibit C6—U.S. Pat. No. 6,456,745 to Bruton ("Bruton")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 28 pages.
"Exhibit C7—U.S. Pat. No. 6,429,881 to Olsen ("Olsen")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 46 pages.
"Exhibit C8—Canadian Application No. 2,276,190 to Davidson ("Davidson")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 62 pages.
"Exhibit D1—U.S. Pat. No. 6,166,712 to Hoffman ("Hoffman")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 48 pages.
"Exhibit D2—U.S. Pat. No. 6,269,122 to Prasad ("Prasad")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 37 pages.
"Exhibit D3—U.S. Pat. No. 5,999,195 to Santangeli ("Santangeli")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 59 pages.
"Exhibit D4—Improving the Moving-Image Quality of TFT-LCDs ("Sueoka")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 47 pages.
"Exhibit D5—U.S. Pat. No. 5,933,150 to Ngo ("Ngo")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 37 pages.
"Exhibit D6—U.S. Pat. No. 5,692,117 to Berend ("Berend")", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 27 pages.
"Exhibit E1—"Bridge Frame" References", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 62 pages.
"Exhibit F1—"Bridge Frame" References", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 159 pages.
"Exhibit F2—"Stereoscopic Display" References", Claim Chart from Nvidia Corporation'S Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 102 pages.
"Exhibit G1—"Bridge Frame" References", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 62 pages.
"Exhibit H1—"Bridge Frame" References", Claim Chart from Nvidia Corporation's Invalidity Contentions and Patent L.R. 3-4 Document Production Accompanying Invalidity Contentions (Oct. 6, 2017), *Visual Effect Innovations, LLC* v. *Nvidia Corporation*, Case No. 3:17-cv-03187-VC, 33 pages.

\* cited by examiner

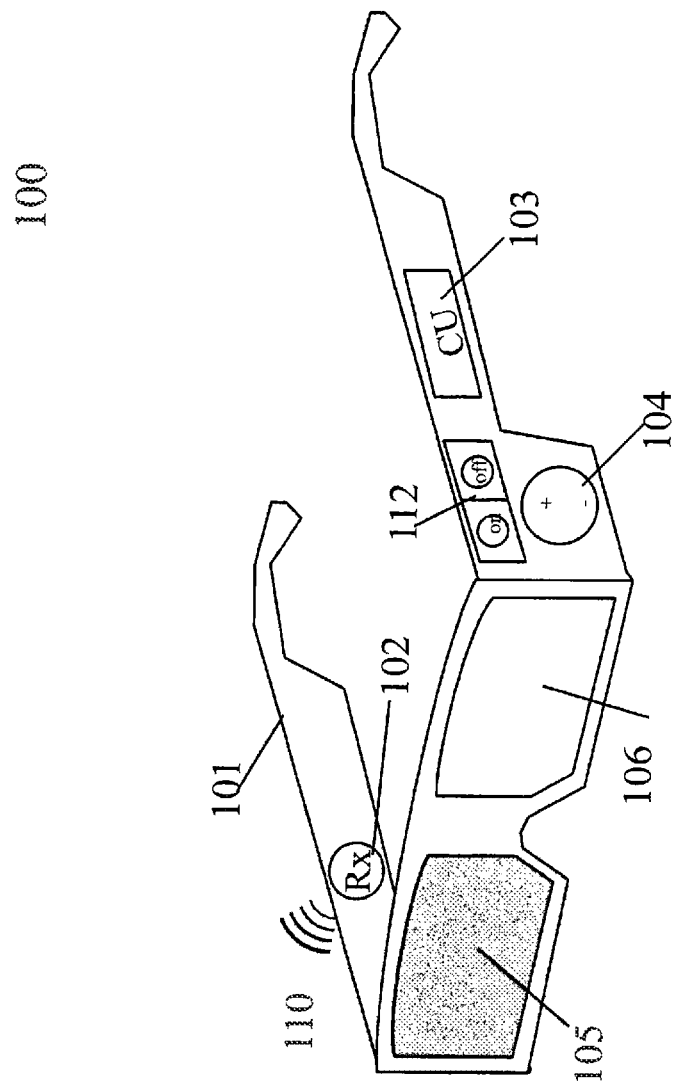

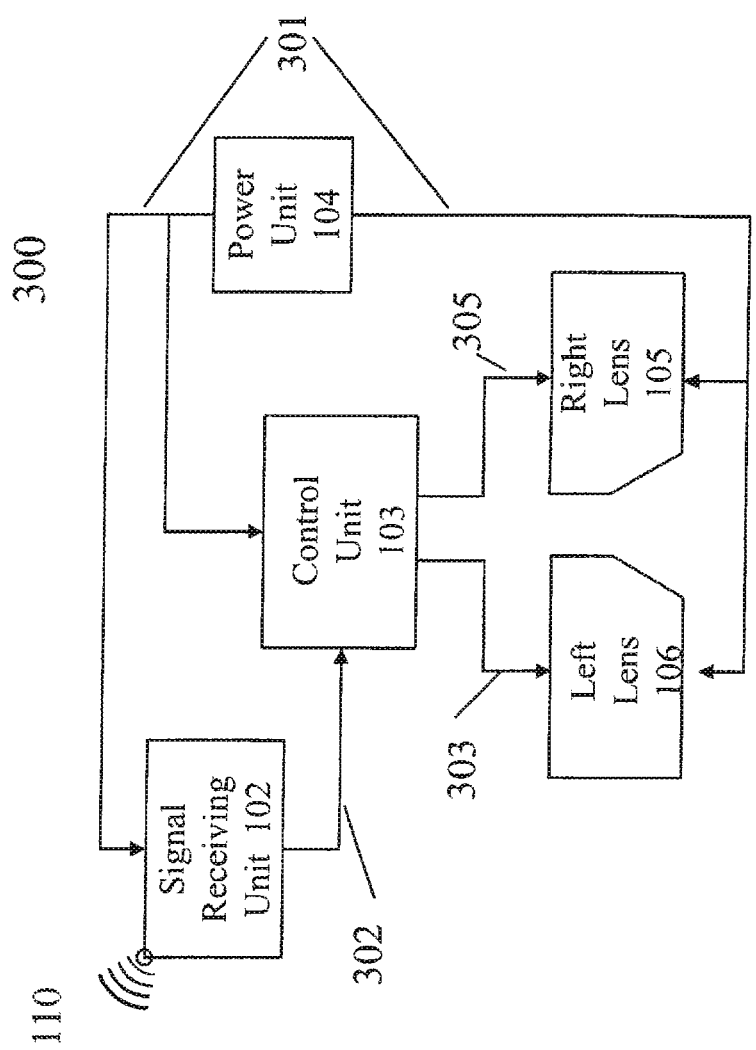

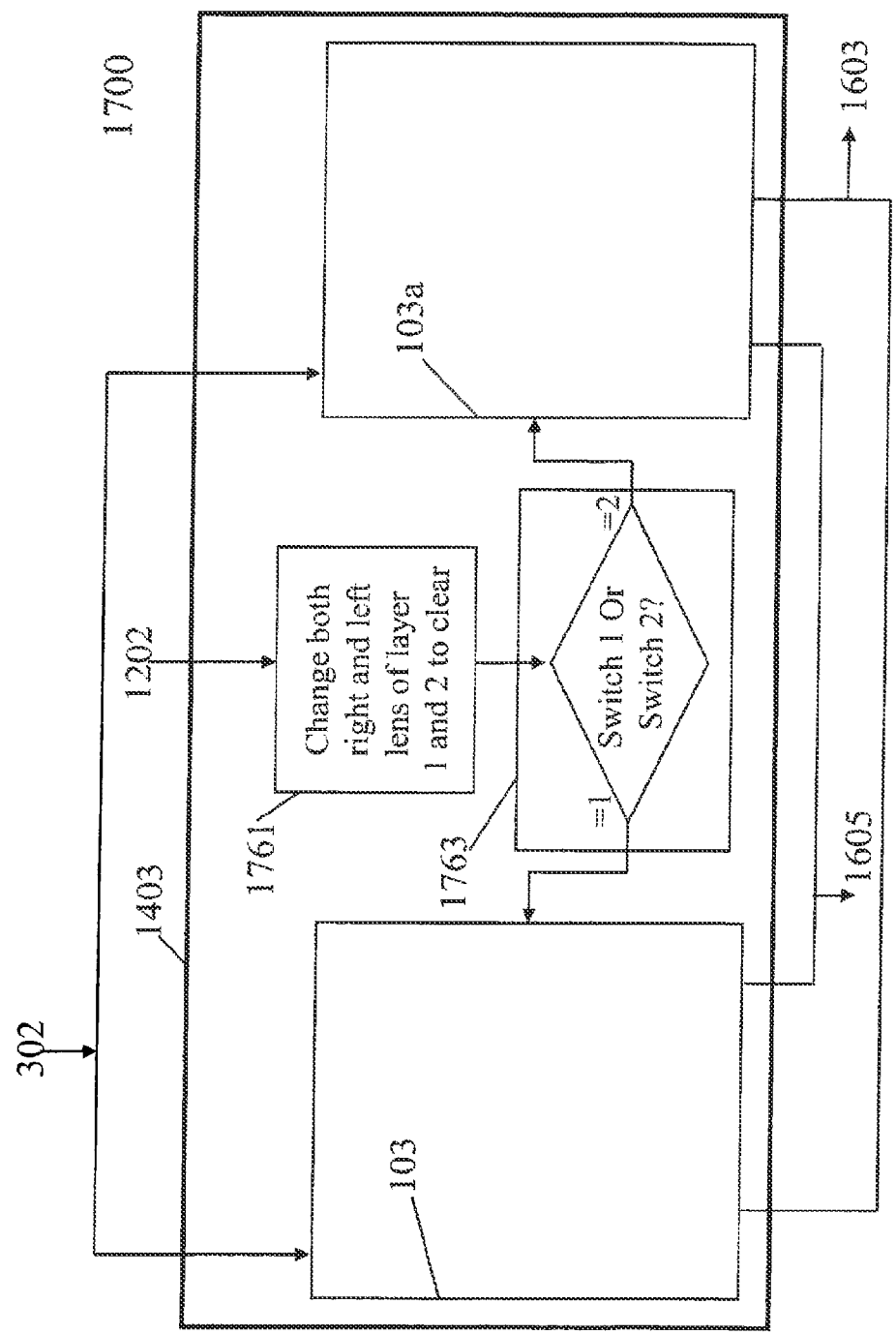

INDIVDUAL

D        E

SERIES

D     F     C

REPEATING SERIES

C   D   E    C    D    E   C

INDIVDUAL
G     Fig. 27A     H
SERIES
G           H           C
Fig. 27B
REPEATING SERIES
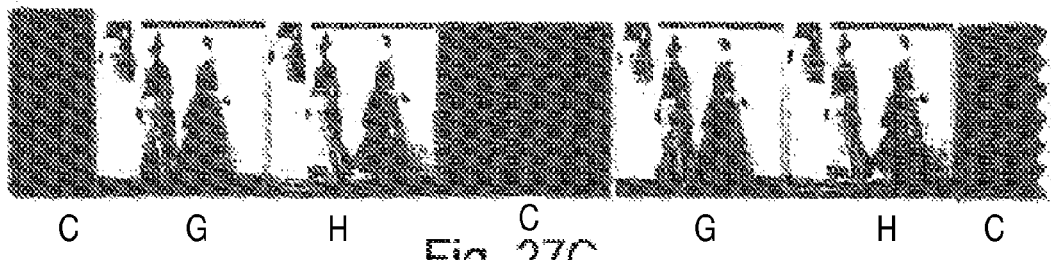
C    G    H      C      G    H    C
Fig. 27C

Fig. 33
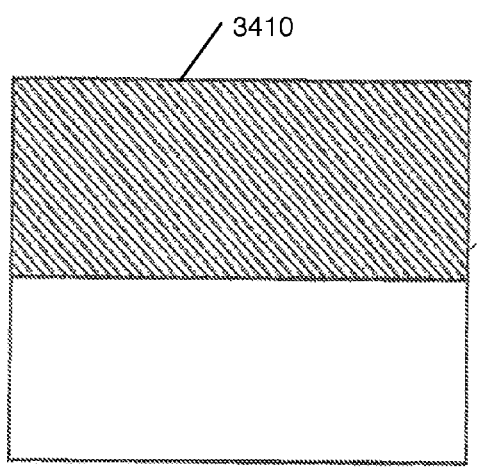 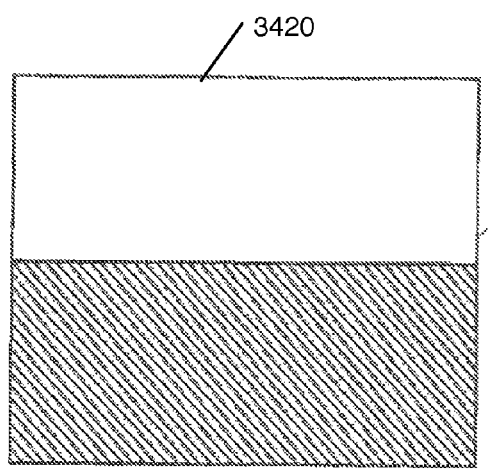
Fig. 34A            Fig. 34B

| Algorithm to Calculate Optimal Optical Density of Neutral Density Lens ||
|---|---|
| Step | Operation |
| 1 | (i) As a surrogate for background motion take the horizontal component of the most prominent motion vector in an upper portion of the frame and set to $LatScrMotion_{Top}$ 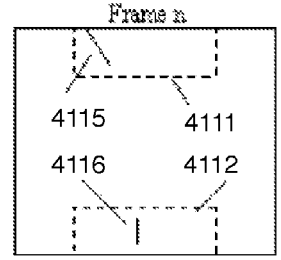 (ii) As a surrogate for foreground motion take the horizontal component of the most prominent motion vector in a bottom portion of the frame and set to $LatScrMotion_{Bot}$ Left to right motion has a negative sign and right to left motion has a positive sign |
| 2 | $LatScrMotion = LatScrMotion_{Bot} - LatScrMotion_{Top}$ |
| 3 | Luminance = Avg brightness of Pixels in Frame n |
| 4 | Calculate $f_{P_{ND lens}}$(luminance, LatScrMotion) |
| 5 | If -10dpi < LatScrMotion < 10dpi then    set RightLens to ClearStateOD and set LeftLens to ClearStateOD Else if LatScrMotion <= -10dpi then    set LeftLens to $f_{P_{ND lens}}$(luminance, LatScrMotion) and RightLens to ClearStateOD Else if LatScrMotion >= 10dpi then    set RightLens to $f_{P_{ND lens}}$(luminance, LatScrMotion) and LeftLens to ClearStateOD End if |

FASTER STATE TRANSITIONING FOR CONTINUOUS ADJUSTABLE 3DEEPS FILTER SPECTACLES USING MULTI-LAYERED VARIABLE TINT MATERIALS

CROSS REFERENCE TO RELATED APPLICATIONS

This application is a Continuation of U.S. patent application Ser. No. 15/606,850, filed May 26, 2017, now U.S. Pat. No. 9,781,408, which is (I) a Continuation-In-Part application of U.S. patent application Ser. No. 15/217,612, filed Jul. 22, 2016, now U.S. Pat. No. 9,699,444, which is a Continuation of U.S. patent application Ser. No. 14/850,750, filed Sep. 10, 2015, now U.S. Pat. No. 9,426,452, which is a Continuation of U.S. patent application Ser. No. 14/451,048, filed Aug. 4, 2014, now U.S. Pat. No. 9,167,235, which is a Continuation of U.S. patent application Ser. No. 14/155,505, filed Jan. 15, 2014, now U.S. Pat. No. 8,864,304, which is a Continuation of U.S. patent application Ser. No. 13/746,393, filed Jan. 22, 2013, now U.S. Pat. No. 8,657,438, which is a Continuation of U.S. patent application Ser. No. 12/938,495, filed Nov. 3, 2010, which is a Divisional of U.S. patent application Ser. No. 12/555,545, filed Sep. 8, 2009, now U.S. Pat. No. 7,850,304, which is a Continuation-In-Part application of U.S. patent application Ser. No. 12/274,752, filed Nov. 20, 2008, now U.S. Pat. No. 7,604,348, which is a Continuation-In-Part application of U.S. patent application Ser. No. 11/928,152, filed Oct. 30, 2007, now U.S. Pat. No. 7,508,485, which is (a) a Continuation-In-Part of U.S. patent application Ser. No. 11/373,702, filed Mar. 10, 2006, now U.S. Pat. No. 7,405,801, which (1) is a nonprovisional of and claims priority to U.S. Provisional Application No. 60/661,847 filed Mar. 15, 2005, and (2) is a Continuation-In-Part application of U.S. application Ser. No. 10/054,607, filed Jan. 22, 2002, now U.S. Pat. No. 7,030,902, which is a nonprovisional of and claims priority to U.S. Provisional Application No. 60/263,498 filed Jan. 23, 2001; and (b) a Continuation-In-Part of U.S. patent application Ser. No. 11/372,723, filed Mar. 10, 2006, now U.S. Pat. No. 7,522,257, which (1) is a nonprovisional of and claims priority to U.S. Provisional Application No. 60/664,369, filed Mar. 23, 2005, and (2) is a Continuation-In-Part application of U.S. application Ser. No. 10/054,607, filed Jan. 22, 2002, now U.S. Pat. No. 7,030,902, which is a nonprovisional of and claims priority to U.S. Provisional Application No. 60/263,498 filed Jan. 23, 2001; (II) a Continuation-In-Part application of U.S. patent application Ser. No. 14/850,629, filed Sep. 10, 2015, which is a Continuation of U.S. patent application Ser. No. 14/268,423, filed May 2, 2014, now U.S. Pat. No. 9,167,177, which is a Continuation of U.S. patent application Ser. No. 13/168,493, filed Jun. 24, 2011, now U.S. Pat. No. 8,750,382, which is (a) a Continuation-In-Part application of U.S. patent application Ser. No. 12/938,495, filed Nov. 3, 2010, the priority information for which is recited above, (b) a Continuation-In-Part application of U.S. patent application Ser. No. 12/555,482, filed Sep. 8, 2009, now U.S. Pat. No. 7,976,159, which is a Divisional of U.S. patent application Ser. No. 12/274,752, filed Nov. 20, 2008, now U.S. Pat. No. 7,604,348, the priority information for which is recited above, and (c) a nonprovisional of and claims priority to U.S. Provisional Application No. 61/398,981, filed Jul. 2, 2010; and (III) a Continuation-In-Part application of U.S. patent application Ser. No. 15/212,114, filed Jul. 15, 2016, now U.S. Pat. No. 9,716,874, which is a Divisional of U.S. patent application Ser. No. 14/566,205, filed Dec. 10, 2014, now U.S. Pat. No. 9,426,442, which is a Continuation of U.S. patent application Ser. No. 14/333,266, filed Jul. 16, 2014, now U.S. Pat. No. 8,941,919, which is a Continuation of U.S. patent application Ser. No. 14/149,293, filed Jan. 7, 2014, now U.S. Pat. No. 8,913,319, which is a Continuation of U.S. patent application Ser. No. 13/632,333, filed Oct. 1, 2012, now U.S. Pat. No. 8,657,439, which is a Continuation of U.S. patent application Ser. No. 13/151,736, filed Jun. 2, 2011, now U.S. Pat. No. 8,303,112, which is a Continuation of U.S. patent application Ser. No. 12/555,482, filed Sep. 8, 2009, now U.S. Pat. No. 7,976,159, the priority information for which is recited above, the entire contents of each of which are herein incorporated by reference for all purposes.

FIELD OF THE INVENTION

This invention relates to the field of motion pictures and to a system called 3Deeps that will allow almost any motion picture filmed in 2D (single image) to be viewed with the visual effect of 3-dimensions when viewed through 3Deeps Filter Spectacles. More specifically, the invention relates to (i) the presentation of motion pictures and to the use of multiple layers of electronically controlled variable tint materials to fabricate the right and left lenses of the 3Deeps Filter Spectacle to achieve faster transition times than may be achieved by the use of only a single layer, (ii) various means by which a motion vector and/or luminance measure that are associated with frames of the movie can be used to select an optimal optical density for the neutral density lens of the 3Deeps Filter Spectacles, and (iii) visual art and, more particularly, to systems, apparatus, and methods for producing an appearance of continuous movement using a finite number of images, i.e., as few as two images.

BACKGROUND

This invention is, in part, directed to Continuous Adjustable 3Deeps Filter spectacles for viewing 2D movies as 3D movies. 3Deeps Filter Spectacles provide a system by which ordinary 2-dimensional motion pictures can be viewed in part as a 3-dimensional motion pictures. They however were a sub-optimal solution. In the presence of screen motion, they only developed 3D from a 2D movie by a difference in optical density between the right and left lens, but did not describe any objective optimal target for those optical densities. Neither did the previous version or 3Deeps Filter spectacles address optimization of the spectacles to account for the materials from which the lenses are fabricated.

3Deeps Filter Spectacles that incorporate such double optimization are called Continuous Adjustable 3Deeps Filter Spectacles. Previously, related patent applications for Continuous Adjustable 3Deeps Filter spectacles have been disclosed that use electronically controlled variable tint materials for fabrication of the right and left lenses of the viewing spectacles. Generally, electronically controlled variable tint materials change the light transmission properties of the material in response to voltage applied across the material, and include but are not limited to electrochromic devices, suspended particle devices, and polymer dispersed liquid crystal devices. Such material provides precise electronic control over the amount of light transmission.

3Deeps spectacles adjust the optical properties so that the left and right lenses of the 3Deeps spectacles take on one of 3 states in synchronization to lateral motion occurring within the movie; a clear-clear state (clear left lens and clear right lens) when there is no lateral motion in successive frames of the motion picture; a clear-darkened state when there is left-to-right lateral motion in successive frame of the motion picture; and, a darkened-clear state when there is right-to-left lateral motion in successive frames of the motion picture.

We note that clear is a relative term and even clear glass will block a small percentage of light transmission. A clear lens is then one that transmits almost all light through the material.

Continuous Adjustable 3Deeps Filter spectacles are improved 3Deeps spectacles in that the darkened state continuously changes to take an optical density to provide the maximum Pulfrich stereoscopic 3D illusion optimized for (a) the speed and direction of lateral motion, and (b) the transition time of the electrochromic material from which the lenses are fabricated. Thus, Continuous Adjustable 3Deeps Filter Spectacles doubly optimize 3Deeps Filter Spectacles to maximize the target optical densities of the lenses, and to account for the lens material. Double optimization of the 3Deeps Filter Spectacles has substantial benefits and Continuous Adjustable 3Deeps Filter Spectacles solves substantial problems that 3Deeps Filter Spectacles could not address.

One problem addressed by this invention is that of slow transition time when transitioning between different optical densities of the lenses of the Continuous Adjustable 3Deeps Filter spectacles. Optimal control of Continuous Adjustable 3Deeps Filter spectacles is achieved by adjusting the right- and left-lenses to the optimal optical density synchronized to maximize the 3D effect of the Pulfrich illusion between frames of the motion picture with respect to the transition time properties of the electrochromic material. As an example, a movie that is shown on a 100 Hz digital TV may require as many as 100 different optical density controlled lens transitions per second to optimally synchronize to the speed and direction of lateral motion in the motion picture. Most often the transitions in synchronization to the movie are small minor adjustments to the optical density of the lens that can be accomplished in the allotted time. A problem arises when 3Deeps Filter spectacles are fabricated from electronically controlled variable tint materials that are incapable of the fast transition times that are sometimes required as for instance between scene changes. While electronically controlled variable tint materials may be able to achieve fast transitions from one optical density state to another optical density state that are near or close to each other, it may be incapable of transition between optical density states that are far apart. However, faster transition times using any electronically controlled variable tint material can be achieved by the simple expedient of using 2 or more layers—or multi-layers—of such material. Using multiple layers of material does result in a darker clear state, but the difference is minimal and barely perceptible, so the tradeoff between a slightly darker clear state and faster transition time is considered and warranted.

Another problem relates to the cycle life (number of clear-dark cycles before failure) of some optoelectronic materials that may be limited. The cycle life may be increased by using multiple layers of optoelectronic materials since the electric potential applied to the material to achieve a target optical density will be for a shorter period of time.

Another problem addressed by an alternate embodiment of this invention is that different methods of 3D require distinct viewing spectacles. However, with electronically controlled viewing spectacles, a single viewing spectacle can be switch selectable for different optical effects. For instance, to view a 3D movie that uses the anaglyph method to achieve 3D stereoscopy requires use of a different pair of spectacles (red-blue lenses) than that used for 3Deeps viewing. Other preferred embodiments of the invention relate to multi-use of the spectacles. The use of multi-layers of electronically controlled variable tint materials where different layers relate to different viewing methods, allow a single spectacle to be selectable to achieve different optical effects. For instance, while one or more layers of electronically controlled variable tint materials may be used for Continuous Adjustable 3Deeps Filter spectacles, another layer of materials may be used for anaglyph 3D spectacles. This would extend the use of a single pair spectacles so it can be selectively used for either Continuous Adjustable 3Deeps Filter spectacles viewing of 2D filmed movies or for anaglyph viewing of 3D filmed movies. It would also allow switching within any motion picture between 2D and 3D for a specific method, and/or switching within any motion picture between different methods of 3D. Till now a 3D motion picture may have been filmed in its entirety as anaglyph. With this invention the motion picture could have been filmed in part 2D with the multi-layer specs then set by signalization to a clear-clear state, and another part of the motion picture could have been filmed in 3D anaglyph with the multi-layer spectacles then set by signalization to a red-blue state. In another embodiment the picture may be filmed in part in 2D and 3D anaglyph, and shown to viewers in 2D, 3D using 3Deeps spectacle, and 3D anaglyph with the spectacles set accordingly.

Movies are generally made from a series of single, non-repetitive pictures which are viewed at a speed that provides the viewer with the appearance of continuous movement. These series of single pictures are positioned in adjacent picture frames, in sequential order, wherein adjacent pictures are substantially similar to each other and vary only slightly from each other. Usually, movies are created using movie cameras, which capture the actual movement of the object; with animated movies, a series of individual pictures or cells are created, usually by hand or computer, and assembled in sequential order where adjacent pictures of a scene are substantially similar to each other and vary only slightly. Standard film projection is 24 frames per second, American video standard NTSC is 30 f.p.s.

The appearance of continuous movement, using only two substantially similar pictures, has been accomplished in live performance by simultaneous projection of both images onto a screen, wherein one picture may be slightly off-set from the other picture as they appear on the screen, and by rotating a two-bladed propeller, wherein the propeller blades are set off from one another by 180 degrees, in front of and between the two projectors such that the two images are made to both alternate and overlap in their appearances, with both images in turn alternating with an interval of complete darkness onscreen when both projections are blocked by the spinning propeller. A viewer, using no special spectacles or visual aids, perceives a scene of limited action (with a degree of illusionary depth) that can be sustained indefinitely in any chosen direction: an evolving yet limited action appears to be happening continually without visible return-and-start-over repetition. Thus the viewer sees a visual illusion of an event impossible in actual life. Similarly, the manner in which things appear in depth are likely to be at odds, often extremely so, with the spatial character of the original photographed scene. Further, the character of movement and of depth has been made malleable in the hands of the projectionist during performance (so much so that such film-performance has been likened to a form of puppetry);

the physical shifting of one of the two projections changes the visual relationship between them and thereby the character of the screen event produced. Similarly, small changes during performance in speed, placement and direction of propeller spin will cause radical changes in the visual event produced onscreen.

Other visual arts which relate to the present invention are the Pulfrich filter. For one program, titled Bitemporal Vision: The Sea, viewers were invited to place a Pulfrich light-reducing filter before one eye to both enhance and transform the already apparent depth character of the presentation.

Limited to presentation in live performance, such unique visual phenomena as described has been transient theater. Attempts to capture the phenomena by way of video-camera recording of the screen-image have been disappointingly compromised, so that—in over 25 years of such presentation (of so-called Nervous System Film Performances) no attempt has been made to commercialize such recordings.

In addition, a number of products and methods have been developed for producing 3-D images from two-dimensional images. Steenblik in U.S. Pat. Nos. 4,597,634, 4,717,239, and 5,002,364 teaches the use of diffractive optical elements with double prisms, one prism being made of a low-dispersion prism and the second prism being made of a high-dispersion prism. Takahaski, et al in U.S. Pat. No. 5,144,344 teaches the use of spectacles based on the Pulfrich effect with light filtering lens of different optical densities. Beard in U.S. Pat. No. 4,705,371 teaches the use of gradients of optical densities going from the center to the periphery of a lens.

Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

Davino, U.S. Pat. No. 6,598,968, 3-Dimensional Movie and Television Viewer, teaches an opaque frame that can be placed in front of a user's eyes like a pair of glasses for 3-D viewing to take advantage of the Pulfrich effect. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

Dones, U.S. Pat. No. 4,805,988, Personal Viewing Video Device, teaches a personal video viewing device which allows the simultaneous viewing of a stereoscopic external image as well as a monoscopic electronic image. This is accomplished using two optical systems which share particular components. The relative intensity of both images may be adjusted using a three-iris system where each iris may be a mechanical diaphragm, an electronically controlled liquid crystal device, or a pair of polarized discs whose relative rotational orientation controls the transmissivity of the disc pair.

Beard in U.S. Pat. No. 4,893,898 teaches a method for creating a 3-D television effect in which a scene is recorded with a relative lateral movement between the scene and the recording mechanism. The recording is played back and viewed through a pair of viewer glasses in which one of the lenses is darker and has a spectral transmission characterized by a reduced transmissivity in at least one, and preferably all three, of the television's peak radiant energy wavebands. The lighter lens, on the other hand, has a spectral transmission characterized by a reduced transmissivity at wavelengths removed from the television energy peaks. The result is a substantially greater effective optical density differential between the two lenses when viewing television than in normal ambient light. This produces a very noticeable 3-D effect for television scenes with the proper movement, while avoiding the prior "dead eye" effect associated with too great a density differential in ordinary light. Further enhancement is achieved by providing the darker lens with a higher transmissivity in the blue and red regions than in the yellow or green regions.

Other patents deal with image processing to measure motion in a moving picture and include Iue U.S. Pat. No. 5,717,415, Nagaya U.S. Pat. No. 5,721,692 and Gerard De Haan U.S. Pat. No. 6,385,245.

Iue in U.S. Pat. No. 5,717,415 teaches a method of converting two-dimensional images into three-dimensional images. A right eye image signal and a left eye image signal between which there is relatively a time difference or a luminance difference are produced from a two-dimensional image signal, thereby to convert two-dimensional images into three-dimensional images.

In U.S. Pat. No. 5,721,692, Nagaya et al present a "Moving Object Detection Apparatus". In that disclosed invention, a moving object is detected from a movie that has a complicated background. In order to detect the moving object, there is provided a unit for inputting the movie, a display unit for outputting a processed result, a unit for judging an interval which is predicted to belong to the background as part of a pixel region in the movie, a unit for extracting the moving object and a unit for calculating the moving direction and velocity of the moving object. Even with a complicated background in which not only a change in illumination condition, but also a change in structure occurs, the presence of the structure change of the background can be determined so as to detect and/or extract the moving object in real time. Additionally, the moving direction and velocity of the moving object can be determined.

De Haan U.S. Pat. No. 6,385,245 teaches a method of estimating motion in which at least two motion parameter sets are generated from input video data. A motion parameter set is a set of parameters describing motion in an image, and by means of which motion can be calculated.

Visual effects are important in motion pictures and have the potential to expand the viewing enjoyment of moviegoers. For example, the movement effect "Bullet Time" utilized in the movie "The Matrix" was critical to the appeal of the movie.

Visual effects for 3-dimensional motion pictures include such motion pictures as "Charge at Feather River", starring Guy Madison. The Vincent Price movie "House of Wax" was originally released as a 3-D thriller. The 3-D movie fad of the early to mid-1950s however soon faded due to complexity of the technologies and potential for improper synchronization, and misalignment of left and right eye images as delivered to the viewer.

TV 3-D motion pictures have been attempted from time-to-time. Theatric Support produced the first TV Pulfrich event in 1989 for Fox Television—"The Rose Parade in 3D Live." In order to sustain the illusion of realistic depth these 3-D Pulfrich effect TV shows require all foreground screen action to move in one consistent direction, matched to the fixed light-diminishing lens of special spectacles provided to viewers for each broadcast. This enormous constraint (for all screen action to proceed in one direction) placed on the producers of the motion picture is due to the realistic expectation that viewers were not going to invert their spectacles so as to switch the light-diminishing filter from one eye to another for each change in screen-action direction. For the great majority of viewers the limitation of spectacles with a fixed filter, either left or right, meant the 3D effect would be available only with movies produced specifically for that viewing spectacles design.

With the exception of Sony I-max 3-D presentations, which require special theater/screening facilities unique to the requirements of I-Max technology, 3-dimensional motion pictures remain a novelty. Despite the wide appeal to viewers, the difficulties and burden on motion picture producers, distributors, TV networks, motion picture theaters, and on the viewers has been a barrier to their wide scale acceptance. Among the problems and constraints involving the production, projection, and viewing of 3-dimensional motion pictures are:

Production: The commonly used anaglyph 3-dimensional movie systems require special cameras that have dual lenses, and capture 2-images on each frame. To have a version of the motion picture that can be viewed without special glasses requires that a separate version of the motion picture be shot with a regular camera so there is only one image per video frame and not simply the selection of one or the other perspective. Similarly, IMAX and shutter glass systems require special cameras and processing with separate versions of the motion picture for 2D and 3D viewing. Filming movies in 3D add as much as $10 million dollars to production costs, it has been reported.

Projection: Some 3-dimensional systems require the synchronization and projection by more than 2 cameras in order to achieve the effect. "Hitachi, Ltd has developed a 3D display called Transpost 3D which can be viewed from any direction without wearing special glasses, and utilize twelve cameras and rotating display that allow Transpost 3D motion pictures that can be seen to appear as floating in the display. The principle of the device is that 2D images of an object taken from 24 different directions are projected to a special rotating screen. On a large scale this is commercially unfeasible, as special effects in a motion picture must be able to be projected with standard projection equipment in a movie theater, TV or other broadcast equipment.

Viewing: As a commercial requirement, any special effect in a motion picture must allow viewing on a movie screen, and other viewing venues such as TV, DVD, VCR, PC computer screen, plasma and LCD displays. From the viewer's vantage, 3-dimensional glasses, whether anaglyph glasses or Pulfrich glasses, which are used in the majority of 3-dimensional efforts, if poorly made or worn incorrectly are uncomfortable and may cause undue eyestrain or headaches. Experiencing such headache motivates people to shy away from 3-D motion pictures.

Because of these and other problems, 3-dimensional motion pictures have never been more than a novelty. The inconvenience and cost factors for producers, special equipment projection requirements, and viewer discomfort raise a sufficiently high barrier to 3-dimensional motion pictures that they are rarely produced. One object of this invention is to overcome these problems and constraints.

The Human Eye and Depth Perception

The human eye can sense and interpret electromagnetic radiation in the wavelengths of about 400 to 700 nanometers—visual light to the human eye. Many electronic instruments, such as camcorders, cell phone cameras, etc., are also able to sense and record electromagnetic radiation in the band of wavelengths 400-700 nanometer.

To facilitate vision, the human eye does considerable image processing before the brain gets the image.

When light ceases to stimulate the eyes photoreceptors, the photoreceptors continue to send signals, or fire for a fraction of a second afterwards. This is called "persistence of vision", and is key to the invention of motion pictures that allows humans to perceive rapidly changing and flickering individual images as a continuous moving image.

The photoreceptors of the human eye do not "fire" instantaneously. Low light conditions can take a few thousands of a second longer to transmit signals than under higher light conditions. Causing less light to be received in one eye than another eye, thus causing the photoreceptors of the right and left eyes to transmit their "pictures" at slightly different times, explains in part the Pulfrich 3-D illusion, which is utilized in the invention of the 3Deeps system. This is also cause of what is commonly referred to as "night vision".

Once signals are sent to the eyes, the brain processes the dual images together (images received from the left and right eye) presenting the world to the mind in 3-dimensions or with "Depth Perception". This is accomplished by several means that have been long understood.

Stereopsis is the primary means of depth perception and requires sight from both eyes. The brain processes the dual images, and triangulates the two images received from the left and right eye, sensing how far inward the eyes are pointing to focus the object.

Perspective uses information that if two objects are the same size, but one object is closer to the viewer than the other object, then the closer object will appear larger. The brain processes this information to provide clues that are interpreted as perceived depth.

Motion parallax is the effect that the further objects are away from us, the slower they move across our field of vision. The brain processes motion parallax information to provide clues that are interpreted as perceived depth.

Shadows provide another clue to the human brain, which can be perceived as depth. Shading objects, to create the illusions of shadows and thus depth, is widely used in illustration to imply depth without actually penetrating (perceptually) the 2-D screen surface.

SUMMARY OF THE INVENTION

A method has now been discovered for originating visual illusions of figures and spaces in continuous movement in any chosen direction using a finite number of pictures (as few as two pictures) that can be permanently stored and copied and displayed on motion picture film or electronic media. The method of the present invention entails repetitive presentation to the viewer of at least two substantially similar image pictures alternating with a third visual interval or bridging picture that is substantially dissimilar to the other substantially similar pictures in order to create the appearance of continuous, seamless and sustained directional movement.

Specifically, two or more image pictures are repetitively presented together with a bridging interval (a bridging picture) which is preferably a solid black or other solid-colored picture, but may also be a strongly contrasting image-picture readily distinguished from the two or more pictures that are substantially similar. In electronic media, the bridge-picture may simply be a timed unlit-screen pause between serial re-appearances of the two or more similar image pictures. The rolling movements of pictorial forms thus created (figures that uncannily stay in place while maintaining directional movement, and do not move into a further phase of movement until replaced by a new set of rotating units) is referred to as Eternalisms, and the process of composing such visual events is referred to as Eternalizing.

The three film or video picture-units are arranged to strike the eyes sequentially. For example, where A and B are the image pictures and C is the bridging picture, the picture units are arranged (A, B, C). This arrangement is then repeated any number of times, as a continuing loop. The view of this continuing loop allows for the perception of a perceptual combining and sustained movement of image pictures (A, B). Naturally, if this loop is placed on a film strip, then it is arranged and repeated in a linear manner (A, B, C, A, B, C, A, B, C, A, B, C, etc.). The repetition of the sequence provides an illusion of continuous movement of the image pictures (A, B); with bridging picture (C), preferably in the form of a neutral or black frame, not consciously noticed by the viewer at all, except perhaps as a subtle flicker.

A more fluid or natural illusion of continuous movement from a finite number of image pictures is provided by using two of each of the three pictures and repeating the cycle of the pairs sequentially, or by blending adjacent pictures together on an additional picture-frame and placing the blended picture between the pictures in sequential order. The two image pictures (A, B) are now blended with each other to produce (A/B); the two image pictures are also blended with the bridging picture to produce (C/A and B/C), and then all pictures repeat in a series starting with the bridging picture (C, C/A, A, A/B, B, B/C) each blended picture being represented by the two letters with a slash therebetween). This series is repeated a plurality of times to sustain the illusion as long as desired. Repeating the sequence with additional blended frames provides more fluid illusion of continuous movement of the (optically combined) two image pictures (A, B).

Additionally, various arrangements of the pictures and the blends can be employed in the present invention and need not be the same each time. By varying the order of pictures in the sequence, the beat or rhythm of the pictures is changed. For example, A, B, C can be followed by A, A/B, B, B/C, C which in turn is followed by A, A, A/B, B, B, B, B/C, C, C, C, C, i.e. A, B, C, A, A/B, B, B/C, C, A, A, A/B, B, B, B, B/C, B/C, C, C, C, C, A, B, C, A, etc.

With A and B frames being similar images (such as a pair of normal two-eye perspective views of a three-dimensional scene from life), and frame C a contrasting frame (preferably a solid-color picture instead of an image-picture) relative to A,B, frame C acts as essentially a bridge-interval placed between recurrences of A,B. Any color can be used for the contrasting frame C: for example, blue, white, green; however, black is usually preferred. The contrasting frame can also be chosen from one of the colors in one of the two image pictures. For example, if one of the image pictures has a large patch of dark blue, then the color of the contrasting frame, bridging picture, may be dark blue.

Blending of the pictures is accomplished in any manner which allows for both pictures to be merged in the same picture frame. Thus, the term blending as used in the specification and claims can also be called superimposing, since one picture is merged with the other picture. Blending is done in a conventional manner using conventional equipment, suitably, photographic means, a computer, an optical printer, or a rear screen projection device. For animated art, the blending can be done by hand as in hand drawing or hand painting. Preferably, a computer is used. Suitable software programs include Adobe Photoshop, Media 100 and Adobe After Affects. Good results have been obtained with Media 100 from Multimedia Group Data Translations, Inc. of Marlborough, Mass., USA.

When using Media 100, suitable techniques include additive dissolving, cross-dissolving, and dissolving-fast fix and dither dissolving.

In blending the pictures, it is preferred to use 50% of one and 50% of the other. However, the blending can be done on a sliding scale, for example with three blended pictures, a sliding scale of quarters, i.e. 75% A/25% B, 50% A/50% B, 25% A/75% B. Good results have been obtained with a 50%/50% mix, i.e. a blend of 50% A/50% B.

The two image pictures, A and B, which are visually similar to each other, are preferably taken from side-by-side frame exposures from a motion picture film of an object or image or that is moving such that when one is overlaid with the other, only a slight difference is noted between the two images.

Alternatively, the two image pictures are identical except that one is off-center from the other. The direction of the off-center, e.g. up, down, right, or left, will determine which direction the series provides the appearance of movement, e.g. if image picture B is off-center from image picture A to the right of A, the series of C, C/A, A, A/B, B, B/C will have the appearance of moving from left to right. Likewise, if you reverse the order of appearance then the appearance of movement will be to the left.

More than two image pictures can be used in the invention. Likewise, more than one bridging picture can be used in the present invention. For example, four image pictures can be used along with one bridging picture. In this case, the series for the four image pictures, designated A, B, D and E, would be: C, A, B, D, E; or a 50/50 blend C, C/A, A, A/B, B, B/D, D, D/E, E, E/C; or side-by-side pairs, C, C, A, A, B, B, D, D, E, E.

The image picture need not fill the picture frame. Furthermore, more than one image picture can be employed per frame. Thus, the picture frame can contain a cluster of images and the image or images need not necessarily filling up the entire frame. Also, only portions of image pictures can be used to form the image used in the present invention.

Also, image pictures and portions of the image picture can be combined such that the combination is used as the second image picture. The portion of the image picture is offset from the first image picture when they are combined such that there is an appearance of movement. For example, a window from image picture A can be moved slightly while the background remains the same, the picture with the moved window is designated image picture B and the two combined to create the appearance of the window moving and/or enlarging or shrinking in size. In this case, both picture A and picture B are identical except for the placement of the window in the image picture. The same can also be done by using an identical background in both image pictures and superimposing on both pictures an image which is positioned slightly different in each picture. The image could be a window, as before, of a man walking, for example.

The number of series which are put together can be finite if it is made on a length of film or infinite if it is set on a continuous cycle or loop wherein it repeats itself.

In accordance with an embodiment, an electrically controlled spectacle for viewing a video is provided. The electrically controlled spectacle includes a spectacle frame and optoelectronic lenses housed in the frame. The lenses comprise a left lens and a right lens, each of the optoelectrical lenses having a plurality of states, wherein the state of the left lens is independent of the state of the right lens. The electrically controlled spectacle also includes a control unit housed in the frame, the control unit being adapted to control the state of each of the lenses independently.

In one embodiment, each of the lenses has a dark state and a light state.

In another embodiment, when viewing a video the control unit places both the left lens and the right lens to a dark state.

In another embodiment, a method for viewing a video is provided. A user wears the electrically controlled spectacle described above, and the wearer is shown a video having dissimilar bridge frames and similar image frames.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A first bridge image frame different from the selected image frame and different from the first, second, and third modified image frames is determined. A second bridge image frame different from the selected image frame, different from the first, second, and third modified image frames, and different from the first bridge image frame is determined. The first bridge image frame is blended with the first modified image frame, generating a first blended image frame. The first bridge image frame is blended with the second modified image frame, generating a second blended image frame. The first bridge image frame is blended with the third modified image frame, generating a third blended image frame. The first blended image frame, the second blended image frame, and the third blended image frame are overlaid to generate an overlayed image frame. The overlayed image frame and the second bridge image frame are displayed.

In one embodiment, the first bridge image frame comprises a non-solid color.

In another embodiment, each of the optoelectronic lenses comprises a plurality of layers of optoelectronic material.

In accordance with another embodiment, a first modified image frame is determined by removing a first portion of a selected image frame. A second modified image frame different from the first modified image frame is determined by removing a second portion of the selected image frame. A third modified image frame is determined by removing a third portion of the first modified image frame. A fourth modified image frame different from the third modified image frame is determined by removing a fourth portion of the first modified image frame. A fifth modified image frame different from the third and fourth modified image frames is determined by removing a fifth portion of the first modified image frame. A sixth modified image frame is determined by removing a sixth portion of the second modified image frame. A seventh modified image frame different from the sixth modified image frame is determined by removing a seventh portion of the second modified image frame. An eighth modified image frame different from the sixth and seventh modified image frames is determined by removing an eighth portion of the second modified image frame. A first bridge image frame different from the first and second modified image frames is determined. A second bridge image frame different from the first and second modified image frames, and different from the first bridge image frame is determined. A third bridge image frame different from the first and second modified image frames, and different from the first and second bridge image frames is determined. A fourth bridge image frame different from the first and second modified image frames, and different from the first, second and third bridge image frames is determined. A first blended image frame is generated by blending the third modified image frame with the first bridge image frame. A second blended image frame is generated by blending the fourth modified image frame with the second bridge image frame. A third blended image frame is generated by blending the fifth modified image frame with the third bridge image frame. The first blended image frame, the second blended image frame, the third blended image frame, and the fourth bridge image frame are displayed. A fourth blended image frame is generated by blending the sixth modified image frame with the first bridge image frame. A fifth blended image frame is generated by blending the seventh modified image frame with the second bridge image frame. A sixth blended image frame is generated by blending the eighth modified image frame with the third bridge image frame. The fourth blended image frame, the fifth blended image frame, the sixth blended image frame, and the fourth bridge image frame are displayed.

In one embodiment, the fourth bridge image frame is solid white, and the spectacle frame comprises a sensor adapted to receive synchronization signals embedded in the video and provide the synchronization signals to the control unit.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A bridge image frame different from the selected image frame and different from the first, second, and third modified image frames is determined. The first modified image frame, the second modified image frame, and the third modified image frame are overlaid, to generate an overlayed image frame. The overlayed image frame and the bridge image frame are displayed.

In accordance with another embodiment, a bridge image frame that is different from a first image frame and different from a second image frame is determined, the first and second image frames being consecutive image frames in a video. A first modified image frame is determined by removing a first portion of the first image frame. A second modified image frame different from the first modified image frame is determined by removing a second portion of the first image frame. A third modified image frame different from the first and second modified image frames is determined by removing a third portion of the first image frame. The first, second, and third modified image frames are overlaid to generate a first overlayed image frame. The first overlayed image frame and the bridge image frame are displayed. A fourth modified image frame is determined by removing a fourth portion of the second image frame. A fifth modified image frame different from the fourth modified image frame is determined by removing a fifth portion of the second image frame. A sixth modified image frame different from the fourth and fifth modified image frames is determined by removing a sixth portion of the second image frame. The fourth, fifth, and sixth modified image frames are overlaid to generate a second overlayed image frame. The second overlayed image frame and the bridge image frame are displayed.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A first bridge image frame different from the first, second, and third modified image frames is determined. A second bridge image frame different from the first, second, and third modified image frames, and different from the first bridge image frame is determined. A third bridge image frame different from the first, second, and third modified image frames, and different from the first and second bridge image frames is determined. A fourth bridge image frame different from the first, second, and third modified image frames, and different from the first, second and third bridge image frames is determined. The first modified image frame is blended with the first bridge image frame to generate a first blended image frame. The second modified image frame is blended with the second bridge image frame to generate a second blended image frame. The third modified image frame is blended with the third bridge image frame to generate a third blended image frame. The first blended image frame, the second blended image frame, and the third blended image frame are overlaid to generate an overlayed image frame. The overlayed image frame and the fourth bridge image frame are displayed.

In one embodiment, the fourth bridge image frame is solid white, and the spectacle frame comprises a sensor adapted to receive synchronization signals embedded in the video and provide the synchronization signals to the control unit.

In accordance with another embodiment, a first modified image frame is determined by removing a first portion of a selected image frame. A second modified image frame different from the first modified image frame is determined by removing a second portion of the selected image frame. A third modified image frame is determined by removing a third portion of the first modified image frame. A fourth modified image frame different from the third modified image frame is determined by removing a fourth portion of the first modified image frame. A fifth modified image frame different from the third and fourth modified image frames is determined by removing a fifth portion of the first modified image frame. A sixth modified image frame is determined by removing a sixth portion of the second modified image frame. A seventh modified image frame different from the sixth modified image frame is determined by removing a seventh portion of the second modified image frame. An eighth modified image frame different from the sixth and seventh modified image frames is determined by removing an eighth portion of the second modified image frame. A first bridge image frame different from the first, second, third, fourth, fifth, sixth, seventh, and eight modified image frames is determined. A second bridge image frame different from the first bridge image frame and different from the first, second, third, fourth, fifth, sixth, seventh, and eight modified image frames is determined. The first bridge image frame is blended with the third modified image frame to generate a first blended image frame. The first bridge image frame is blended with the fourth modified image frame to generate a second blended image frame. The first bridge image frame is blended with the fifth modified image frame to generate a third blended image frame. The first blended image frame, the second blended image frame, and the third blended image frame are overlaid to generate a first overlayed image frame. The first overlayed image frame and the second bridge image frame are displayed. The first bridge image frame is blended with the sixth modified image frame to generate a fourth blended image frame. The first bridge image frame is blended with the seventh modified image frame to generate a fifth blended image frame. The first bridge image frame is blended with the eighth modified image frame to generate a sixth blended image frame. The fourth blended image frame, the fifth blended image frame, and the sixth blended image frame are overlaid to generate a second overlayed image frame. The second overlayed image frame and the second bridge image frame are displayed.

In one embodiment, the first bridge image frame comprises a non-solid color.

In accordance with another embodiment, one or more of the following actions may be performed in performing one or more of the methods described above: generating a blended image frame by blending a plurality of image frames, generating a combined image frame by combining a plurality of image frames, generating a combined image sequence by combining a plurality of image sequences, generating one or more doubled image frames by doubling one or more image frames, generating an overlayed image frame by overlaying a plurality of image frames, generating a modified image frame by removing a portion of an image frame, repeating one of an image frame or a series of image frames, generating a sequence of image frames, generating a collage based on one or more portions of one or more image frames, stitching together one or more portions of one or more image frames, superimposing a first image frame on a second image frame, determining a transitional frame, inserting and/or lifting a portion of a first image frame into a second image frame, reshaping a portion of an image frame, and relocating a portion of an image frame.

In accordance with an embodiment, an apparatus includes a storage adapted to store one or more image frames, and a processor. The processor is adapted to determine a first modified image frame by removing a first portion of a selected image frame, determine a second modified image frame different from the first modified image frame by removing a second portion of the selected image frame, determine a third modified image frame different from the first and second modified image frames by removing a third portion of the selected image frame, determine a first bridge image frame different from the selected image frame and different from the first, second, and third modified image frames, determine a second bridge image frame different from the selected image frame, different from the first, second, and third modified image frames, and different from the first bridge image frame, blend the first bridge image frame with the first modified image frame, generating a first blended image frame, blend the first bridge image frame with the second modified image frame, generating a second blended image frame, blend the first bridge image frame with the third modified image frame, generating a third blended image frame, overlay the first blended image frame, the second blended image frame, and the third blended image frame to generate an overlayed image frame, display the overlayed image frame, and display the second bridge image frame.

In one embodiment, the apparatus also includes an electrically controlled spectacle to be worn by a viewer. The electrically controlled spectacle includes a spectacle frame, optoelectronic lenses housed in the frame, the lenses comprising a left lens and a right lens, each of the optoelectrical lenses having a plurality of states, wherein the state of the left lens is independent of the state of the right lens, and a control unit housed in the frame, the control unit being adapted to control the state of each of the lenses independently. Each of the lenses has a dark state and a light state, and when viewing a video the control unit places both the left lens and the right lens to a dark state.

In another embodiment, the first bridge image frame comprises a non-solid color.

In accordance with another embodiment, an apparatus includes a storage adapted to store one or more image frames, and a processor. The processor is adapted to determine a first modified image frame by removing a first portion of a selected image frame, determine a second modified image frame different from the first modified image frame by removing a second portion of the selected image frame, determine a third modified image frame by removing a third portion of the first modified image frame, determine a fourth modified image frame different from the third modified image frame by removing a fourth portion of the first modified image frame, determine a fifth modified image frame different from the third and fourth modified image frames by removing a fifth portion of the first modified image frame, determine a sixth modified image frame by removing a sixth portion of the second modified image frame, determine an seventh modified image frame different from the sixth modified image frame by removing a seventh portion of the second modified image frame, determine an eighth modified image frame different from the sixth and seventh modified image frames by removing an eighth portion of the second modified image frame, determine a first bridge image frame different from the first, second, third, fourth, fifth, sixth, seventh, and eight modified image frames, determine a second bridge image frame different from the first bridge image frame and different from the first, second, third, fourth, fifth, sixth, seventh, and eight modified image frames, blend the first bridge image frame with the third modified image frame to generate a first blended image frame, blend the first bridge image frame with the fourth modified image frame to generate a second blended image frame, blend the first bridge image frame with the fifth modified image frame to generate a third blended image frame, overlay the first blended image frame, the second blended image frame, and the third blended image frame to generate a first overlayed image frame, display the first overlayed image frame and the second bridge image frame, blend the first bridge image frame with the sixth modified image frame to generate a fourth blended image frame, blend the first bridge image frame with the seventh modified image frame to generate a fifth blended image frame, blend the first bridge image frame with the eighth modified image frame to generate a sixth blended image frame, overlay the fourth blended image frame, the fifth blended image frame, and the sixth blended image frame to generate a second overlayed image frame, and display the second overlayed image frame and the second bridge image frame.

In one embodiment, the apparatus also includes an electrically controlled spectacle to be worn by a viewer.

In another embodiment, the first bridge image frame comprises a non-solid color.

In accordance with another embodiment, a system for presenting a video is provided. The system includes an apparatus comprising a storage adapted to store one or more image frames associated with a video, and a processor. The processor is adapted to reshape a portion of at least one of the one or more image frames. The system also includes an electrically controlled spectacle which includes a spectacle frame, optoelectronic lenses housed in the frame, the lenses comprising a left lens and a right lens, each of the optoelectrical lenses having a plurality of states, wherein the state of the left lens is independent of the state of the right lens, and a control unit housed in the frame, the control unit being adapted to control the state of each of the lenses independently. Each of the lenses has a dark state and a light state. When viewing the video the control unit places both the left lens and the right lens to a dark state.

In accordance with another embodiment, an apparatus includes a storage adapted to store one or more image frames, and a processor. The processor is adapted to obtain a first image from a first video stream, obtain a second image from a second video stream, wherein the first image is different from the second image, stitching together the first image and the second image to generate a stitched image frame, generating a first modified image frame by removing a first portion of the stitched image frame, generating a second modified image frame by removing a second portion of the stitched image frame, generating a third modified image frame by removing a third portion of the stitched image frame, wherein the first modified image frame, the second modified image frame, and the third modified image frame are different from each other, identify a bridge frame, blend the first modified image frame with the bridge frame to generate a first blended frame, blend the first modified image frame with the bridge frame to generate a first blended frame, blend the first modified image frame with the bridge frame to generate a first blended frame, overlay the first blended frame, the second blended frame, and the third blended frame to generate a combined frame, and display the combined frame.

In one embodiment, the apparatus also includes spectacles adapted to be worn by a viewer of a video.

In another embodiment, the bridge frame includes a non-solid color.

In accordance with yet another embodiment, a method of displaying one or more frames of a video is provided. Data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the plurality of blended frames are displayed.

In one embodiment, the image frame is decompressed based on the temporal redundancy information.

In another embodiment, the data comprises a compressed video file associated with a compression format that uses temporal redundancy to achieve compression of video data. For example, the data may comprise an MPEG compressed video file.

In another embodiment, each bridge frame comprises a solid black picture, a solid colored picture, or a timed unlit-screen pause.

In another embodiment, the plurality of blended frames are displayed in accordance with a predetermined pattern.

In another embodiment, the plurality of blended frames are displayed in accordance with a predetermined pattern that includes a first pattern comprising the plurality of blended frames, and a second pattern that comprises repetition of the first pattern.

In accordance with another embodiment, an apparatus includes a storage configured to store a compressed image frame and temporal redundancy information, and a processor configured to receive the compressed image frame and the temporal redundancy information, decompress the image frame, and generate a plurality of bridge frames that are visually dissimilar to the image frame. The plurality of bridge frames includes a first bridge frame having a first width, the first bridge frame comprising a first white rectangle in an upper portion of the first bridge frame, the first white rectangle having the first width, and a second bridge frame having a second width, the second bridge frame comprising a second dark rectangle in an upper portion of the second bridge frame, the second dark rectangle having the second width. The processor is further configured to blend the image frame and the plurality of bridge frames, generating a plurality of blended frames, wherein the plurality of blended frames include a first blended frame that includes the first portion of the image frame in an upper portion of the first blended frame, and a second blended frame that includes the second dark rectangle in an upper portion of the second blended frame. The processor is also configured to display the plurality of blended frames consecutively within a video.

In another embodiment, the processor is further configured to decompress the image frame based on the temporal redundancy information.

In another embodiment, the data comprises a compressed video file associated with a compression format that uses temporal redundancy to achieve compression of video data.

In another embodiment, each bridge frame comprises a timed unlit-screen pause.

In another embodiment, the processor is further configured to display the plurality of blended frames in accordance with a predetermined pattern.

In another embodiment, the processor is further configured to display the blended frames in accordance with a predetermined pattern that includes a first pattern comprising the plurality of blended frames, and a second pattern that comprises repetition of the first pattern.

In another embodiment, the plurality of bridge frames comprise a first bridge frame having a first pattern and a second bridge frame having a second pattern that is complementary to the first pattern.

In accordance with still a further embodiment of the invention, a method for generating modified video is provided. A source video comprising a sequence of 2D image frames is acquired, and an image frame that includes two or more motion vectors that describe motion in the image frame is obtained from the source video, wherein each of the motion vectors is associated with a region of the image frame. A respective parameter is calculated for each of the following: (a) a lateral speed of the image frame, using the two or more motion vectors, and (b) a direction of motion of the image frame, using the two or more motion vectors. A deformation value is generated by applying an algorithm that uses both of the parameters, and the deformation value is applied to the image frame to identify a modified image frame. The modified image frame is blended with a bridge frame that is a non-solid color and is different from the modified image frame, to generate a blended frame. The direction of motion and velocity of motion parameters in the calculating step are calculated only from the motion vectors input along with the image frame.

In one embodiment, a viewer views the modified video through spectacles. The spectacles have a left and right lens, and each of the left lens and right lens has a darkened state. Each of the left and right lenses has a darkened state and a light state, the state of the left lens being independent of the state of the right lens.

In another embodiment, the spectacles also include a battery, a control unit and a signal receiving unit. The control unit may be adapted to control the state of the each of the lenses independently. In another embodiment, the left and right lenses comprise one or more electro-optical materials. In another embodiment, the blended frame is displayed to a viewer.

In accordance with another embodiment, a method for generating modified video is provided. A source video including a sequence of 2D image frames is acquired, and a modified image frame is obtained based on a selected one of the image frames of the source video. The modified image frame is blended with a bridge frame that is a non-solid color and is different from the modified image frame, to generate a blended frame.

In one embodiment, the selected image frame comprises two or more motion vectors that describe motion in the selected image frame, wherein each of the motion vectors is associated with a region of the selected image frame. A respective parameter is calculated for each of the following: (a) a lateral speed of the selected image frame, using the two or more motion vectors, and (b) a direction of motion of the selected image frame, using the two or more motion vectors. A deformation value is generated by applying an algorithm that uses both of the parameters, and the deformation value is applied to the image frame to identify a modified image frame. In one embodiment, the direction of motion and velocity of motion parameters in the calculation step are calculated only from the motion vectors.

In accordance with another embodiment, a method for generating modified video is provided. A source video comprising a sequence of 2D image frames is acquired, a first image frame and a second image frame in the source video are identified, the first image frame and the second image frame are combined to generate a modified image frame, and the modified image frame is blended with a bridge frame that is a non-solid color, different from the modified image frame, different from the first image frame, and different from the second image frame, to generate a blended frame. In one embodiment, the first image frame and the second image frame are similar.

Many advantages, features, and applications of the invention will be apparent from the following detailed description of the invention that is provided in connection with the accompanying drawings.

BRIEF DESCRIPTION OF THE DRAWINGS

FIG. 1 is a perspective view of the preferred embodiment of the Continuous Adjustable 3Deeps Filter Spectacles.

FIG. 3 is a block diagram of the operation of the Continuous Adjustable 3Deeps Filter Spectacles.

FIG. 17 is a flow chart showing the operation of the Control Unit of the Multi-Use Electrically Controlled Continuous Adjustable 3Deeps Filter Spectacles with multi-layered lenses.

FIGS. 27 a-27 c illustrates the two women with a smaller frame depicting a portion of one woman repeated and overlayed in the upper left-hand corner of the frame to create a separate depth-configuration within the larger frame.

FIG. 33 shows an image frame in accordance with an embodiment;

FIGS. 34A-34B show respective bridge frames in accordance with an embodiment.

FIG. 41 shows an algorithm that can be used to calculate the optimal optical density for the neutral density filter of the preferred embodiment of the Continuous Adjustable 3Deeps Filter Spectacles.

DETAILED DESCRIPTION

Figure 2B:
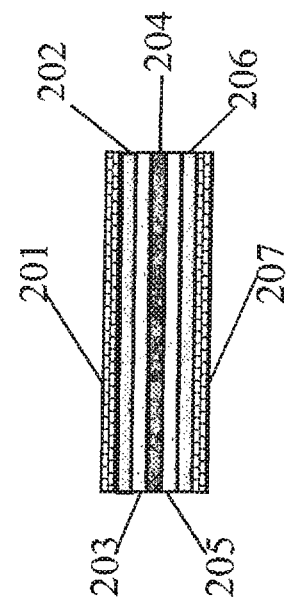
FIG. 2b shows details of an electrochromic device for fabricating the electronically controlled variable tint material of the right and left lenses of the Continuous Adjustable 3Deeps Filter Spectacles.

References will now be made in detail to the preferred embodiments of the invention, examples of which are illustrated in the accompanying drawings. Wherever possible, the same reference numbers will be used throughout the drawings to refer to the same or like parts.

To help understand the invention the following summary of inventive work from the previous related patent disclosures is provided. The purpose of this section then is to explain the ground that has been covered in previous related patents and then identify the problems that this current patent application addresses and solves.

The Pulfrich Illusion

There is a well-studied stereoscopic illusion called the Pulfrich illusion in which the illusion of 3D is invoked by differentially shading the left and right eye. Anyone watching TV through special viewing glasses can see the illusion. One way to construct the special Pulfrich viewing glasses is to take sunglasses and remove the left lens, so that the left eye views the TV screen unobstructed and the right eye views the TV screen through the darkened sunglass lens. With such Pulfrich viewing spectacles all screen motion from left-to-right will be in 3D. The illusion is based on basic eye mechanics—the shaded lens causes the eye to send the image to the brain later than unshaded eye. If the time difference is 1/10 second than on a 100 Hz digital TV the difference is 10 screen images, which is enough to produce a vivid illusion of 3D in the presence of moderate lateral motion. The image processing part of the brain puts the two disparate images together as depth. This is a pure optical illusion that has nothing to do with how a motion picture is filmed.

The Pulfrich illusion has been used for more than 50 years to produce 3D movies, using cardboard viewing spectacles with a clear left lens and dark transparent right lens. Pulfrich 3D motion pictures have been produced including such offerings as the 1971 feature length movie I, Monster Starring Christopher Lee as well as selected scenes from the 1997 second season finale of the network TV sitcom Third Rock From The Sun. However there is a problem in that the special Pulfrich viewing glasses impose severe constraints on both the movie and viewing venue.

More specifically, the problem then is that for any special viewing spectacles with lenses of a fixed optical density, the lighting, and speed and direction of screen motion have to be in exactly proper alignment to get an optimal 3D effect that is comparable to other 3D methods such as anaglyph (blue-red viewing spectacles). That conjunction of light and motion rarely happens so Pulfrich is not considered a viable approach to 3D movies or TV. Movies made for viewing using the Pulfrich illusion are best viewed in darkened venues, and if the same movie is viewed in a brightly lit venue the illusion is diminished or may even totally disappear.

These problems could be addressed if dynamic Pulfrich viewing spectacles could be constructed that self-configured themselves to the light and motion instant in a motion picture. However, such dynamic viewing spectacles still must be totally passive to the viewer.

3Deeps Systems Proposed in the Earliest Related Patent Applications

Early solutions provided dynamic Pulfrich viewing spectacles (called 3Deeps viewing spectacles) that could be synchronized to the movies. These solutions utilized neutral optoelectronic lenses (transmissivity of visible light) that are controllable by an electric potential. The lenses could take any of three states; clear left lens and clear right lens (clear-clear) when there is no screen motion; clear left lens and dark right lens (clear-dark) when screen motion is from left to right; and, dark left lens and clear right lens (dark-clear) when the screen motion is from right to left. Wired or wireless signals (Infrared, radio, or sound) synchronized the 3Deeps viewing spectacles to the movies. These early solutions also addressed how to calculate the lateral motion between frames of a motion picture and the synchronization controllers that calculated and transmitted the motion vector information to the 3Deeps viewing spectacles. The proposed solution had significant benefits and advantages including:

Every movie ever made—without additional alteration or processing—could be viewed in 3D when wearing 3Deeps spectacles A movie could be viewed simultaneously by viewers with or without 3Deeps spectacles, and No changes are required to any broadcast standards, cinema formatting, viewing venue, or viewing monitors It should be understood, that the natural view of the world that viewer's expect of cinema is 3-dimensional, and to any movie viewer with binocular vision, it is the screen flatness of 2D that is strange and unnatural. From the earliest days of motion pictures cinematographers have used light and lateral movement as cues to help the viewer translate 2D screen flatness into their binocular vision expectations. But light and lateral motion are precisely the factors that elicit the Pulfrich illusion, so when movies are produced, cinematographers and lighting specialists stress precisely the features that the 3Deeps systems can translate into the natural sense of depth that the viewer is expecting. That is to say, since the advent of moving pictures, filmmakers have been unknowingly preparing their movies for advantageous 3D viewing using 3Deeps spectacles.

However, the early 3Deeps spectacles did not address how to calculate an optical density for the lenses of the 3Deeps spectacles that would maximize the Pulfrich stereoscopic illusion.

A Second Solution—Continuous Adjustable 3Deeps Filter Spectacles

The most recent related 3Deeps patent applications disclose how to construct better 3Deeps viewing spectacles that maximize the Pulfrich stereoscopic illusion and are referred to as Continuous Adjustable 3Deeps Filter Spectacles. To construct these improved 3Deeps viewing spectacles we utilize the body of existing knowledge about (1) the human eye retinal reaction time, and (2) the operating characteristics of the optoelectronic material of the 3Deeps lens.

Retinal Reaction Time

While each eye is stimulated by light continuously, there is a time delay called the retinal reaction time until the information is triggered and transmitted to the brain. Retinal reaction time is primarily dependent on the amount of light (brightness) that falls on the eye. For instance, in the presence of the bright light of a "Clear Sky at noon" the retinal reaction time is about 100 milliseconds (1/10-th of a second) and the eye will trigger about every 100 milliseconds and send the image from the eye to the brain. In the presence of light from a "Clear Sky" the retinal reaction time is slower—about 200 milliseconds. And in the presence of light that approximates a "Night sky with a full moon" the retinal reaction time is slower still—almost 400 milliseconds. The darker is the illumination, the retinal reaction time become increasingly slower.

While the retinal reaction mechanisms are independent for each eye, in normal viewing both eyes are unobstructed and the luminance value is the same and the eyes trigger at about the same time. However, if one eye is shaded so the eyes have unequal retinal illuminance, then the two eyes will trigger at different speeds and different times. Using lens filters with different optical density shading causes this to happen and results in a difference in retinal reaction time for each eye. The difference in retinal reaction time between the two eyes is one factor in the commonly accepted explanation for the Pulfrich illusion.

The second factor is simultaneity. The brain will take two eye images and put them together in a simultaneous fashion to generate the image that we perceive. Thus in normal viewing, if both eyes see the same 2D image without any filtered obstruction, the brain gets two identical images and there is no information by which the brain may infer depth. However, if one eye is differently shaded, than the eyes send two different images to the brain, and the mind places them together and interprets the two different images as depth. These two factors, retinal reaction time, and simultaneity are the two factors that explain Pulfrich illusion.

If the scene being viewed is static with no moving object, then the "instant" image of the unshaded eye and the "lagging image" of the shaded eye will still see the same image and the retinal reaction delay and simultaneity factors will not provide any depth information. Thus, the Pulfrich illusion does not work in the absence of motion. But if the scene being viewed has horizontal motion (also called lateral motion) then the shaded eye will see an image that is "lagging" the instant image. In this case the "lagging image" caused by retinal reaction delay of the shaded eye, when juxtaposed with the "instant image" perceived by the unshaded eye will, through the mechanism of simultaneity, be reconciled by the brain as a perception of depth. This is the Pulfrich illusion.

Well-researched retinal reaction curves describing this phenomenon are available and are used by the Continuous Adjustable 3Deeps Filter Spectacles to select the optical density of the lens to maximize the Pulfrich illusion. This is done in the following exemplary manner. First we measure the ambient light optical density and use that with the retinal reaction curve to get the retinal delay for the eye viewing through the "clear" lens. We then use the direction of lateral motion to determine which of the right and left lenses is clear (with the other lens the dark lens.) If the lateral motion is from the left-to-right direction on the screen then the "clear" lens of the Continuous Adjustable 3Deeps Filter Spectacles will be the left lens, and if the lateral motion is in the opposite direction then the "clear" lens will be the right lens.

To set the optical density of the dark lens we now utilize the magnitude of the motion. As an example, if lateral motion of the major object in the frame is measured as moving at 0.25 inches per frame then it will take 10 frames to move 2.5 inches—the average inter-ocular distance. In this case the Continuous Adjustable 3Deeps Filter Spectacles use the retinal reaction curve to determine an optical density setting for the darkened lens so the motion-direction eye will see a lagging image that is 10 frames behind that of the unshielded eye. If the TV screen has a refresh rate of 100 Hz then 10 frames is precisely 100 milliseconds, so if the ambient light is that of a "Clear Sky at noon" with a retinal reaction time of 100 milliseconds, then we would set the dark lens to have an optical density of a "Clear Sky" which corresponds to a retinal reaction time of 200 milliseconds. Depending upon the ambient illumination, the optical density of the dark lens can always be calculated and precisely determined from the retinal reaction curve and the objective function that maximizes the Pulfrich illusion.

Once the optimal optical density values are known for the lenses of the Continuous Adjustable 3Deeps Filter Spectacles, the Operating Characteristic curve of the optoelectronic material of the lenses can be utilized to apply the correct potential to the lenses so the lenses of the viewing spectacles have the optical density so the movie is viewed with a maximal Pulfrich stereoscopic illusion.

In previous patent applications, retinal reaction time is used to calculate the optimal optical density value (a first optimization) and the operating characteristic curve is used for control over the lenses of the Continuous Adjustable 3Deeps Filter Spectacles (a second optimization). However, other problems are not address and are the subject of this pending patent application.

There is a problem that many optoelectronic materials often do not change state instantaneously. While frame-to-frame display of a motion picture may be 100 Hz (100 frames a second or 10 milliseconds per frame) a typical optoelectronic material made from electrochromic material may have a "slow" response time and take several seconds to change from a clear state to a much darker state. A second problem may relate to a limited "cycle life" (number of clear-dark cycles) of some optoelectronic materials that may be limited. Both of these problems can be addressed by using multiple layers of optoelectronic material in fabricating the lenses of the Continuous Adjustable 3Deeps Filter Spectacles, and this patent discloses how to implement such a solution. Both problems relate to the viewing spectacle side of the solution that implements the already independently calculated optical density that maximizes the 3D Pulfrich stereoscopic illusion.

Variable Tint and Optoelectronic Devices

Optoelectronic devices (or materials) that control the transmission of light through the device may be referred to as a variable tint device or variable tint material. Neutral variable tint devices reduce the transmission of light approximately equally along the entire spectrum of visible light and thus do not noticeably distort color. Other variable tint devices may allow transmission of light in a restricted spectrum of visible light and block light outside the restricted range, such as blue variable tint devices that allows the passage of light in the blue spectrum ($\lambda$~490-450 nm). Devices that control properties of light other than the transmission of light through the medium will be referred to simply as optoelectronic devices.

Methods of Producing 3-D Illusion in Moving Pictures

Motion pictures are images in 2-dimensions. However, several methods have been developed for providing the illusion of depth in motion pictures. These include the Anaglyph, Intru3D (also called ColorCode 3D), IMAX (Polaroid), shutter glasses and Pulfrich 3-dimensional illusions.

Anaglyph 3-Dimensional Illusion

"Anaglyph" refers to the red/blue (red/cyan or red/green) glasses that are used in comic books and in cereal packets etc. The glasses consist of nothing more than one piece of transparent blue plastic and one piece of transparent red plastic. These glasses are easy to manufacture and have been around since the 1920s.

An anaglyph stereo picture starts as a normal stereo pair of images, two images of the same scene, shot from slightly different positions. One image is then made all green/blue and the other is made all red, the two are then seen together.

When the image is viewed through the glasses the red parts are seen by one eye and the other sees the green/blue parts. The visual cortex of the brain fuses this into perception of a three-dimensional scene or composition. This effect is fairly simple to do with photography, and extremely easy to do on a PC, and it can even be hand-drawn. The main limitation of this technique is that because the color is used in this way, the true color content of the image is usually lost and the resulting images are usually in black and white. As the colors compete for dominance they may appear unstable and monochromatic. A few images can retain a resemblance to their original color content, but the photographer has to be very selective with color and picture content.

Intru3D-Intel

Intel's Intru3D uses the ColorCode 3D method that is an update to the more familiar Anaglyph method of 3D stereoscopy. It is similar to the Anaglyph method of stereoscopy but rather than make one image green/blue and the other image red, Intru3D records the two images as amber and blue. This provides generally truer color than typical Red/Blue anaglyphs, particularly where Red image components are concerned.

IMAX (Polaroid) 3-Dimensional Illusion

IMAX creates the illusion of 3-dimensional depth by recording the motion pictures on two separate rolls of film with two camera lenses to represent the left and right eyes. These lenses are separated by an interocular distance of about 2.5 in., the average distance between a human's eyes. By recording on two separate rolls of film for the left and right eyes, and then projecting them simultaneously, IMAX can create a 3-Dimensional illusion for viewers.

IMAX uses either of two different methods to create the 3D illusion in the theatre. The first method relies on polarization. During projection, the left eye image is polarized in one direction and the right eye image polarized perpendicular to the left eye image as they are projected on the IMAX screen. By wearing special viewing glasses with lenses polarized in their respective directions to match the projection, the left eye image can be viewed only by the left eye since the polarization of the left lens will cancel out that of the right eye projection, and the right eye image can be viewed only by the right eye since the polarization of the right lens will cancel out that of the left eye projection.

IMAX also uses another method—shutter glasses—for 3D viewing. This method of 3D projection involves the use of LCD shutter glasses that use similarly polarized lenses for both eyes. The left and right eye images are projected on the viewing screen in alternate frames. These LCD shutter glasses are synchronized to the projector. The projector displays the left and right images that are momentarily viewed by the appropriate eye by allowing that LCD lens to become transparent while the other remains opaque. That is when the left eye frame is projected on the screen, the left lens of the shutter glasses becomes transparent and the right lens of the shutter glasses becomes opaque. When the next frame is projected on the screen—a frame for the right eye—the left lens becomes opaque and the right lens becomes transparent.

In both the IMAX 3D systems only the correct eye is allowed to view the correct image while the other eye is "blinded". The "transparent" state is actually quite dark, and occludes about 35% of the projected light to the viewing eye while the non-viewing eye is supposed to view no image at all.

Shutter Glasses

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. Crystal-Eyes shutter glasses, weight only 3.3 ounces, use two 3V lithium/manganese dioxide batteries, and have a battery life of 250 hours. This demonstrates the robustness and potential of any viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

However, shutter systems have not been overwhelmingly commercially successful. Motion pictures that use such stereo shutter systems require two frames for each frame of regular film. Motion pictures would then have to be produced in at least 2 versions. Also, except on high refresh rate systems, such as expensive PC monitors, the viewer sees too much flicker causing distraction and annoyance. An additional requirement and burden is the wired or wireless signaling to control the state of the lens. LCD screens that are used on laptops generally do not have high enough refresh rates for stereoscopic shutter 3D systems. Shutter systems generally do not work well with LCD or movie projectors.

Electronically Controlled Variable Tint Materials

Numerous materials have been identified that have the property that the transmission of light through the material can be controlled by the application of an electronic voltage or potential across the material. These include the classes of materials typically named electrochromic, suspended particle and polymer dispersed liquid crystal devices. Within each class of electronically controlled variable tint material there are numerous formularies. Other classes of materials may be found in the future. Any material for which the transmission of light or other optical property of light can be controlled by an electronic potential may be utilized in the invention.

Electrochromic Devices (EDs)

Electrochromic devices change light transmission properties in response to voltage and thus allow control of the amount of light passing through the material. A burst of electricity is required for changing the tint of the material, but once the change has been occurred, no electricity is needed for maintaining the particular shade that has been reached. Electrochromic materials provide visibility even in the darkened state, and thus preserves visible contact with the outside environment. It has been used in small-scale applications such as rearview mirrors. Electrochromic technology also finds use in indoor applications, for example, for protection of objects under the glass of museum display cases and picture frame glass from the damaging effects of the UV and visible wavelengths of artificial light. Recent advances in electrochromic materials pertaining to transition-metal hydride electrochromics have led to the development of reflective hydrides, which become reflective rather than absorbing, and thus switch states between transparent and mirror-like.

Suspended Particle Devices (SPDs)

In suspended particle devices (SPDs), a thin film laminate of rod-like particles suspended in a fluid is placed between two glass or plastic layers, or attached to one layer. When no voltage is applied, the suspended particles are arranged in random orientations and tend to absorb light, so that the glass panel looks dark (or opaque), blue or, in more recent developments, gray or black color. When voltage is applied, the suspended particles align and let light pass. SPDs can be dimmed, and allow instant control of the amount of light and heat passing through. A small but constant electrical current is required for keeping the SPD in its transparent stage.

Polymer Dispersed Liquid Crystal Devices (PDLCs)

In polymer dispersed liquid crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the variable tint material. Typically, the liquid mix of polymer and liquid crystals is placed between two layers of glass or plastic that include a thin layer of a transparent, conductive material followed by curing of the polymer, thereby forming the basic sandwich structure of the smart window. This structure is in effect a capacitor. Electrodes from a power supply are attached to the transparent electrodes. With no applied voltage, the liquid crystals are randomly arranged in the droplets, resulting in scattering of light as it passes through the smart window assembly. This results in the translucent, "milky white" appearance. When a voltage is applied to the electrodes, the electric field formed between the two transparent electrodes on the glass cause the liquid crystals to align, thereby allowing light to pass through the droplets with very little scattering, resulting in a transparent state. The degree of transparency can be controlled by the applied voltage. This is possible because at lower voltages, only a few of the liquid crystals are able to be aligned completely in the electric field, so only a small portion of the light passes through while most of the light is scattered. As the voltage is increased, fewer liquid crystals remain out of alignment thus resulting in less light being scattered. It is also possible to control the amount of light and heat passing through when tints and special inner layers are used. Most of the devices offered today operate in on or off states only, even though the technology to provide for variable levels of transparency is easily applied. This technology has been used in interior and exterior settings for privacy control (for example conference rooms, intensive-care areas, bathroom/shower doors) and as a temporary projection screen. A new generation of switchable film and glass called 3G Switchable Film is available from Scienstry, using a non-linear technology to increase transparency, lower the required driving voltage and extend the lifetime.

A First Preferred Embodiment of the Invention

FIG. 1 is a perspective view 100 of the preferred embodiment of the Continuous Adjustable 3Deeps Filter Spectacles. It is comprised of a frame 101 that is used as the housing for the lenses and control circuitry. Such frames are a well-known means by which lenses can be fixed before a person's eyes for viewing. On the frame 101 is battery device 104 to power all circuitry of the Continuous Adjustable 3Deeps Filter Spectacles. Also, on the frame 101 is a receiver 102 labeled "Rx" that is powered by the battery 104. The receiver 102 has apparatus to receive radio-frequency (RF) 110 waves with synchronization and control information used to control the Continuous Adjustable 3Deeps Filter Spectacles. Such receivers are well known in the art of electronics. Also on the frame 101 is a control unit 103 powered by the battery 104 that transforms the continuing optical density signals into the electronic potentials used to control the optical density of each individual lens. Also on the frame 101 is an on/off switch 112 that controls whether the electronic circuits of the 3Deeps spectacles 101 receive power (on position) from the battery or not (power off). Other embodiments may replace RF communications with other communications means, including but not limited to infrared, or audio sound.

Two lenses are fixed in the frames—a right lens (from the movie viewer's vantage point) 105 and a left lens 106. In the preferred embodiment, each lens is made of an electrochromic material for which the optical density can be reliably and precisely controlled by the application of an electronic potential across the material. The lens has circuitry so that the control unit 103 can independently control the transmissivity of each lens. Other embodiment may use optoelectronic materials other than electrochromics. A second preferred embodiment of Continuous Adjustable 3Deeps Filter Spectacles using multi-layered lenses is disclosed starting in FIG. 5. A third preferred embodiment of Continuous Adjustable 3Deeps spectacles using single-layered lenses for a multi-use application is disclosed starting in FIG. 11. A fourth preferred embodiment of Continuous Adjustable 3Deeps Filter Spectacles using multi-layered lenses for a multi-use application is disclosed starting in FIG. 14.

For exemplary purposes, FIG. 1 shows the Continuous Adjustable 3Deeps Filter Spectacles in just one of the three states that the lenses can take. FIG. 1 shows the right lens 105 darkened and the left lens 106 as clear with the clear lens allowing more light transmission than the darkened lens. This is the configuration to view a motion picture with a 3-dimensional effect in which the lateral motion in the motion picture is moving from left-to-right on the viewing screen. Other embodiments of the invention may have Continuous Adjustable 3Deeps Filter Spectacles that fit over regular prescription glasses in a manner similar to that in which snap-on or clip-on sunglasses are configured. In still another embodiment the lenses of the Continuous Adjustable 3Deeps Filter Spectacles may also be prescription lenses customized for the viewer vision impairments.

Also, while the preferred embodiment of the invention uses Continuous Adjustable 3Deeps Filter Spectacles that are wireless, other embodiments may use wired connections. What is required is that the Continuous Adjustable 3Deeps Filter Spectacles can receive and respond to synchronization signals from the controller, and whether that is by wired or wireless means is immaterial to the invention.

Earlier versions of 3Deeps Filter Spectacles (also called Pulfrich Filter Spectacles) have been previously described in co-pending patent applications and patents U.S. patent application Ser. Nos. 12/274,752, 11/928,152, 11/372,723, 11/372,702, and U.S. Pat. Nos. 7,030,902 and 7,218,339.

There are 3 lens settings used by the Continuous Adjustable 3Deeps Filter Spectacles. One setting is that both the right 105 and left lens 106 are clear. Neither lens is darkened. This is the lens state that is used in the preferred embodiment when there is no significant lateral motion in the motion picture. The second setting is the left lens 106 clear and the right lens 105 darkened. This is the lens state that is used in the preferred embodiment when foreground lateral motion in the motion picture is moving from the left to the right direction, as seen from the viewer's perspective. The third setting is the left lens 106 darkened and the right lens 105 clear. This is the lens state that is used in the preferred embodiment when the foreground lateral motion in the motion picture is moving from the right to the left direction, as seen from the viewer's perspective.

The lens state consisting of both left and the right lens darkened is not used by any of the 3Deeps spectacles. However, this lens state can be achieved by the Continuous Adjustable 3Deeps Filter Spectacles, and may have uses in other embodiments of the invention. In the third preferred embodiment of the invention, this lens state is used to provide an alternate use for 3Deeps viewing spectacle—sunglasses. In that embodiment, "multi-use" 3Deeps spectacles are switch selectable as either (Use 1) 3Deeps viewing spectacles using the 3 lens settings described in the preceding paragraph for 3Deeps viewing, or (Use 2) sunglasses using the left and right lens darkening to a pre-set optical density.

In Continuous Adjustable 3Deeps Filter Spectacles, the right and left lenses of the viewing glasses may independently take a multiplicity of different levels of darkness to achieve different effects, resulting in many different lens states. In particular, the darkening of the non-clear lens can be optimized according to the speed of lateral motion and/or luminance, so as to optimize the degree of 3-dimensional effect (a first optimization). Also, the Control Unit 103 can control the electrochromic lenses so that they reach their target state in an optimal manner (a second optimization).

Various consumer-based control units may be utilized with the Continuous Adjustable 3Deeps Filter Spectacles that can both display the audio/video of the associated motion picture, as well as perform the Continuous Adjustable 3Deeps Filter Spectacles synchronization to identify 3Deeps synchronization events and issue control signals to the Continuous Adjustable 3Deeps Filter Spectacles. This includes, but is not limited to; DVD-based control units; Digital Movie Projector control units; Television-based control units; hand-held and operated control units; spectacle-based control units; software-based processing that parses compressed digital video file and uses its motion estimation information (e.g. MPEG); and, cell-phone based control units.

Figure 2A:
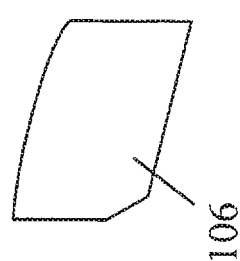
FIG. 2a shows a left lens of Continuous Adjustable 3Deeps Filter Spectacles fabricated from a single layer of electrochromic material.

FIG. 2*a* 200 shows a left lens 106 of Continuous Adjustable 3Deeps Filter Spectacles fabricated from a single layer of electrochromic material. Its fabrication using electrochromic material is shown in adjoining FIG. 2*b*.

FIG. 2*b* 225 shows the cross-sectional detail of the electrochromic device of FIG. 2*a* used for fabricating the electronically controlled variable tint material of the right and left lenses of the Continuous Adjustable 3Deeps Filter Spectacles. The Figure shows a typical dual-polymer electrochromic device consisting of seven layers of material. In the preferred embodiment of the invention, the right lens 105 and left lens 106 of the Continuous Adjustable 3Deeps Filter Spectacles 100 are fabricated from such material. The first layer 201 of the electrochromic material 225 is a glass, plastic (or other clear insulating material.) The second layer 202 is a conducting layer, followed by a third layer 203 of polymer. The fourth layer 204 is an electrolytic layer that depending upon the electrochromic material may be a liquid or gel. This layer provides the ion transport whose direction is determined by the application of potential across the conducting layers. The fifth layer 205 is the complementary polymer layer, followed by a sixth layer 206 of conducting material. The last layer 207 of the electrochromic is another insulting layer of glass, plastic or other clear insulating material.

While FIG. 2*b* 225 show a typical dual-polymer electrochromic device, as previously indicated, there are numerous such electrochromic devices, and any electrochromic may be favorably utilized in the invention. Some electrochromic devices may not have seven layers as shown in FIG. 2*b*. For instance, some variable tint materials may be in the form of a flexible film or laminate that can be applied to a single layer of clear glass or plastic.

Also, any electronically controlled variable tint material may be used in the invention rather than the displayed electrochromic device. Any material whose optical property of transmissivity of light may be controlled by the application of an electric potential may be favorably use to fabricate the lenses of the Continuous Adjustable 3Deeps Filter Spectacles 100.

FIG. 3 is a block diagram 300 of the operation of the Continuous Adjustable 3Deeps Filter Spectacles of FIG. 1. All circuits on the Continuous Adjustable 3Deeps Filter Spectacles 101 are powered 301 by the Power Unit 104 (if the power on/off switch 112 is in the on position), including the Control Unit 103, Signal Receiving Unit 102, the Left Lens 106, and the Right Lens 105. The control information 110 is received by the Signal Receiving Unit 102 and sent 302 to the Control Unit 103. The control unit 103 implements an algorithm that is specific for the lens materials used in the fabrication of the Right Lens 105 and the Left lens 106 of the Continuous Adjustable 3Deeps Filter Spectacles, and controls the Left Lens 106 over a control circuit 303, and the Right Lens over a control circuit 305.

Figure 4:
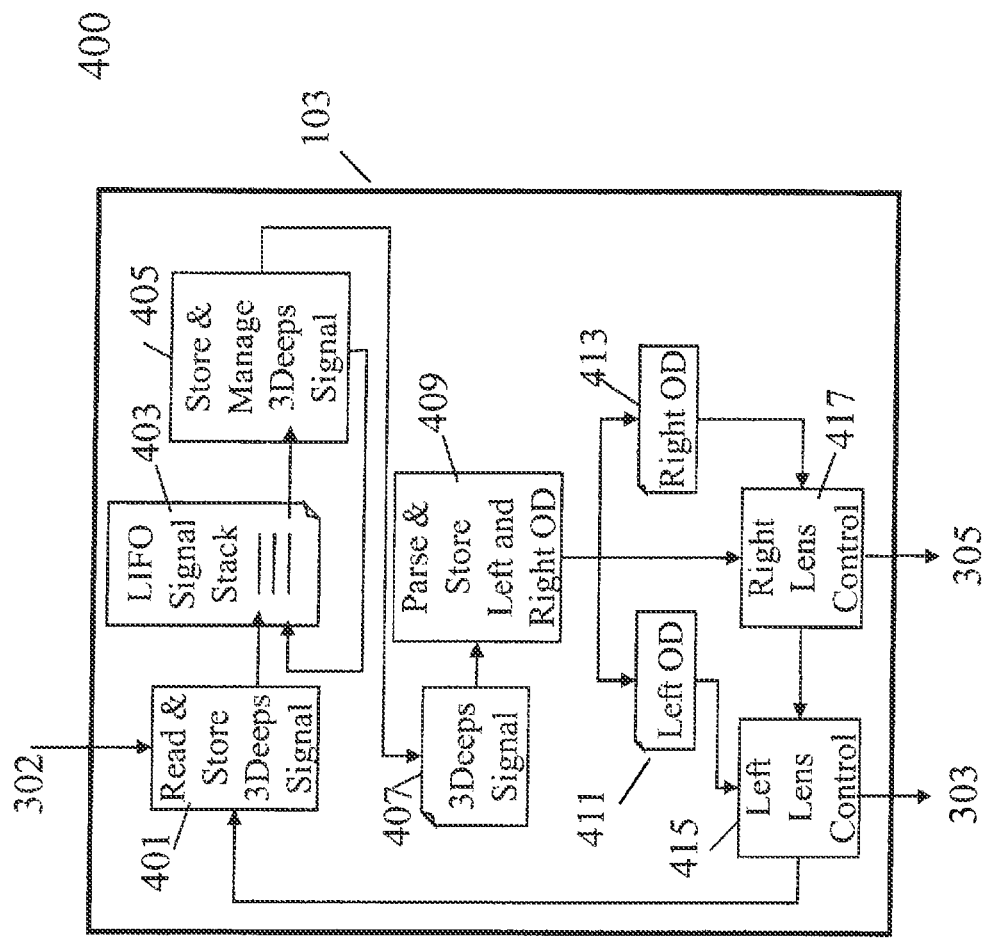
FIG. 4 is a flow chart showing the operation of the Control Unit of the Continuous Adjustable 3Deeps Filter Spectacles.

FIG. 4 is a flow chart 400 showing the operation of the Control Unit 103 of the Continuous Adjustable 3Deeps Filter Spectacles of the first preferred embodiment. The input to the Control Unit 103 is the synchronization signal 302. The output is the control signal sent to the left lens 106 over the control left lens control circuit 303, and the control signal sent to the right lens 105 over the right lens control circuit 305. The synchronization signals 302 are received and stored by the Read and Store 3Deeps Signal block 401 of the Control Unit 103 and stored in a LIFO (Last In First Out) memory stack 403. Control then passes to Store and Manage Signal processing 405 that "pops" the top of the stack (read the value and eliminates it from storage) and processes the synchronization signal by storing it in a 3Deeps Signal memory storage 407. Processing control then passes to Parse and Store Left and Right OD in which the 3Deeps signal memory storage 407 is parsed and stored in the Left OD value 411, and the Right OD value 413. Processing then continues with the Right Lens Control 417 in which the right lens value 413 is converted to an electronic signal 305 that controls the optical density of the right lens. Processing then continues with the Left Lens Control 415 in which the left lens value 411 is converted to an electronic signal 303 that controls the optical density of the left lens. Processing in the Control Unit 103 then is passed back to the Read and Store 3Deeps Signal.

It should be understood that different control circuits might be utilized by other embodiments. For instance other embodiments may have no need for LIFO signal store and management since control of the 3Deeps spectacles is in real-time and there is no need to switch the lenses to past setting. Also, better emphasize the logical operation of the control unit some functions have not been shown. For instance, the control unit may cycle at a much faster rate then the received synchronization signals resulting in an empty stack. The handling of such an empty stack state is not shown in the flow diagram but would be handled as well-known in the art by detecting that the stack is empty and passing control in the Control Unit 103 back to the Read and Store 3Deeps Signal state 401 rather than passing control as shown in the flow diagram 400.

Continuous Adjustable 3Deeps Filter Spectacles have great advantages. The control information 110 is spectacle-agnostic; i.e. all spectacles receive the same transmitted control information. The control unit 103 on the spectacles performs a final view-spectacle-specific optimization, translating the control information into control signals specific to the lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles.

A Second Preferred Embodiment of the Invention

Figure 5:
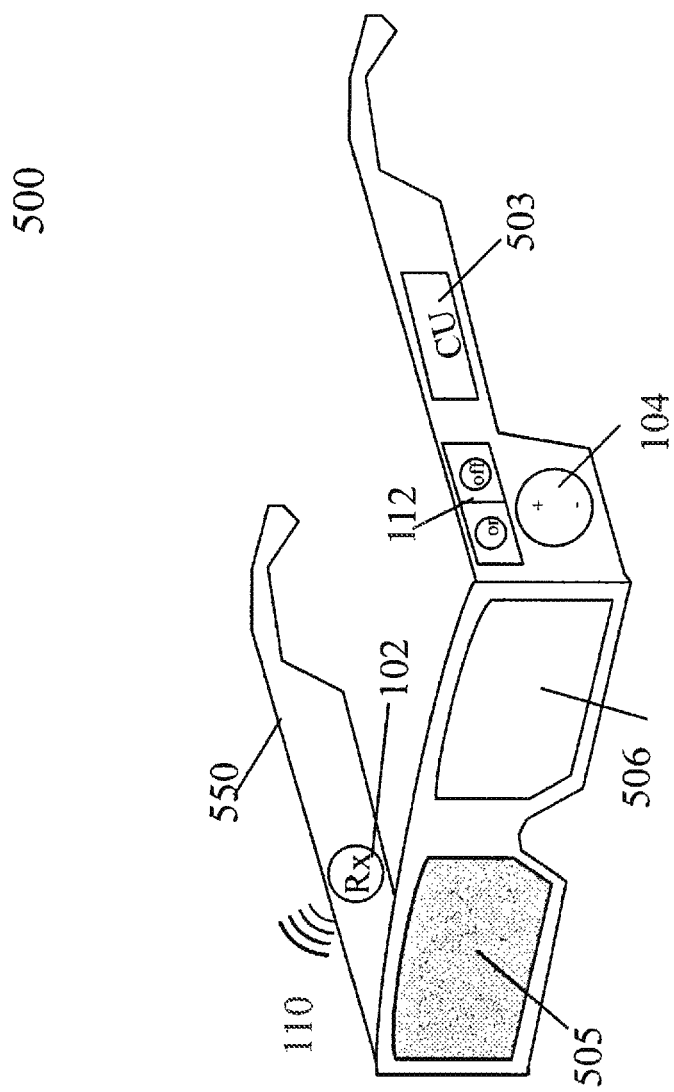
FIG. 5 is a perspective view of the second preferred embodiment of the Continuous Adjustable 3Deeps Filter Spectacles fabricated from multiple layers of electrochromic material.
Figure 6:
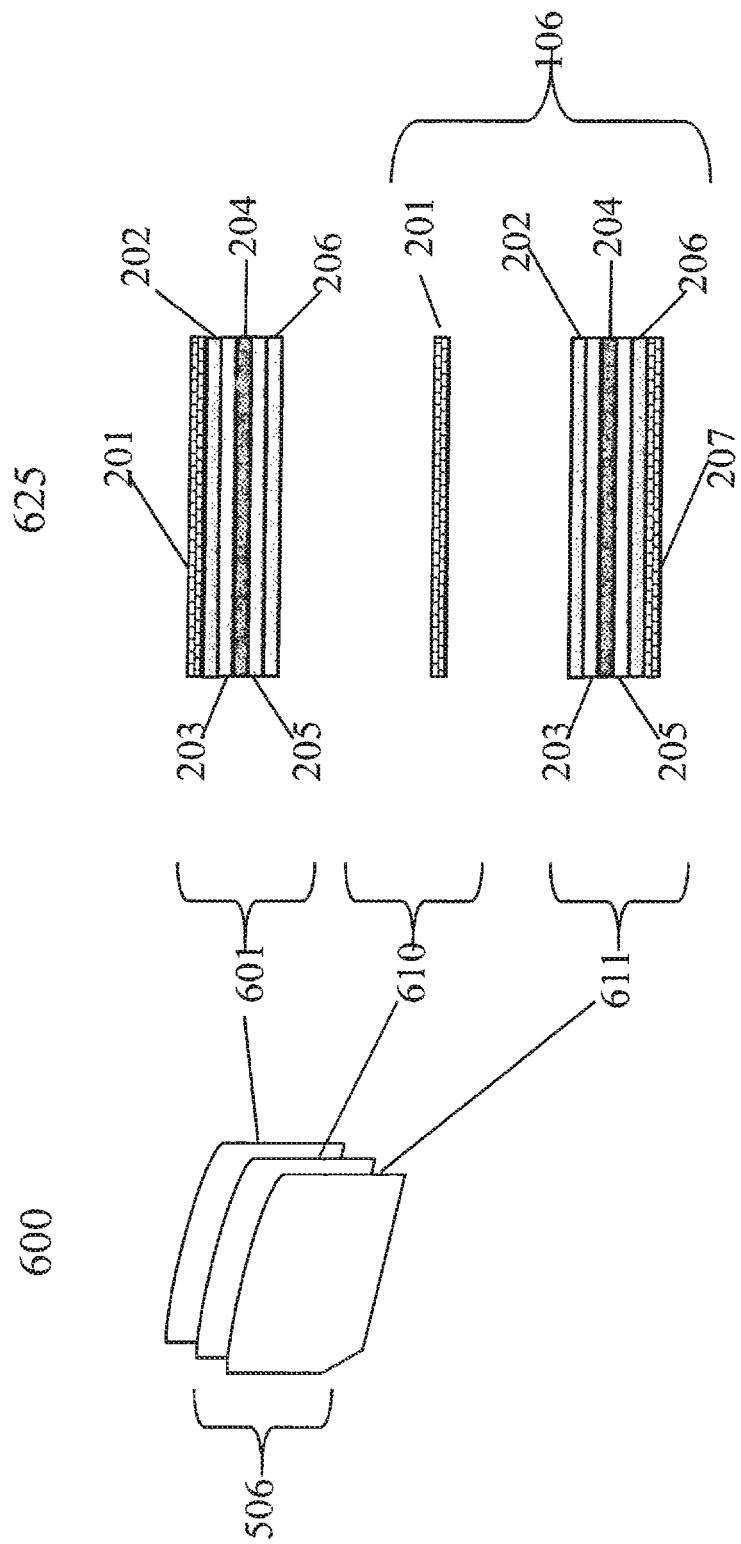
FIG. 6a shows a left lens of Continuous Adjustable 3Deeps Filter Spectacles fabricated from multiple layers of electrochromic material.
FIG. 6b shows details of a multiple layered electrochromic device for fabricating the electronically controlled variable tint material of the right and left lenses of the Continuous Adjustable 3Deeps Filter Spectacles.

FIG. 5 is a perspective view 500 of the second preferred embodiment of the Continuous Adjustable 3Deeps Filter Spectacles 550 with multi-layered lenses. The difference between FIG. 5 (multi-layered lens) and FIG. 1 (single layer lens) is in their respective right lens (505 of FIG. 5), left lens (506 of FIG. 5), and control unit (503 of FIG. 5). Like numbered items in FIG. 5 and FIG. 1 have the same function and definition. The lenses for the second preferred embodiment (505 and 506) are described in greater detail in FIGS. 6a and 6b, and the control unit for the second preferred embodiment is described in greater detail in FIG. 8.

FIG. 6a 600 shows a left lens 506 of Continuous Adjustable 3Deeps Filter Spectacles fabricated from multiple layers of electrochromic material. Its fabrication using electrochromic material is shown in adjoining FIG. 6b. Since only a single layer of insulating glass material will be required between the different layers of the multi-layered electrochromic lens, the drawing of the top layer is slightly different than that of FIG. 2a to emphasize that only one layer of such insulating material is necessary. FIG. 6a therefore shows the lens 106 as two layers where the first active layer 611 is separated by the second active layer 601 by an insulating layer 610. The first active layer 611 and the insulating layer 610 comprise the single layer lens 106 of FIG. 2a.

Figure 9:
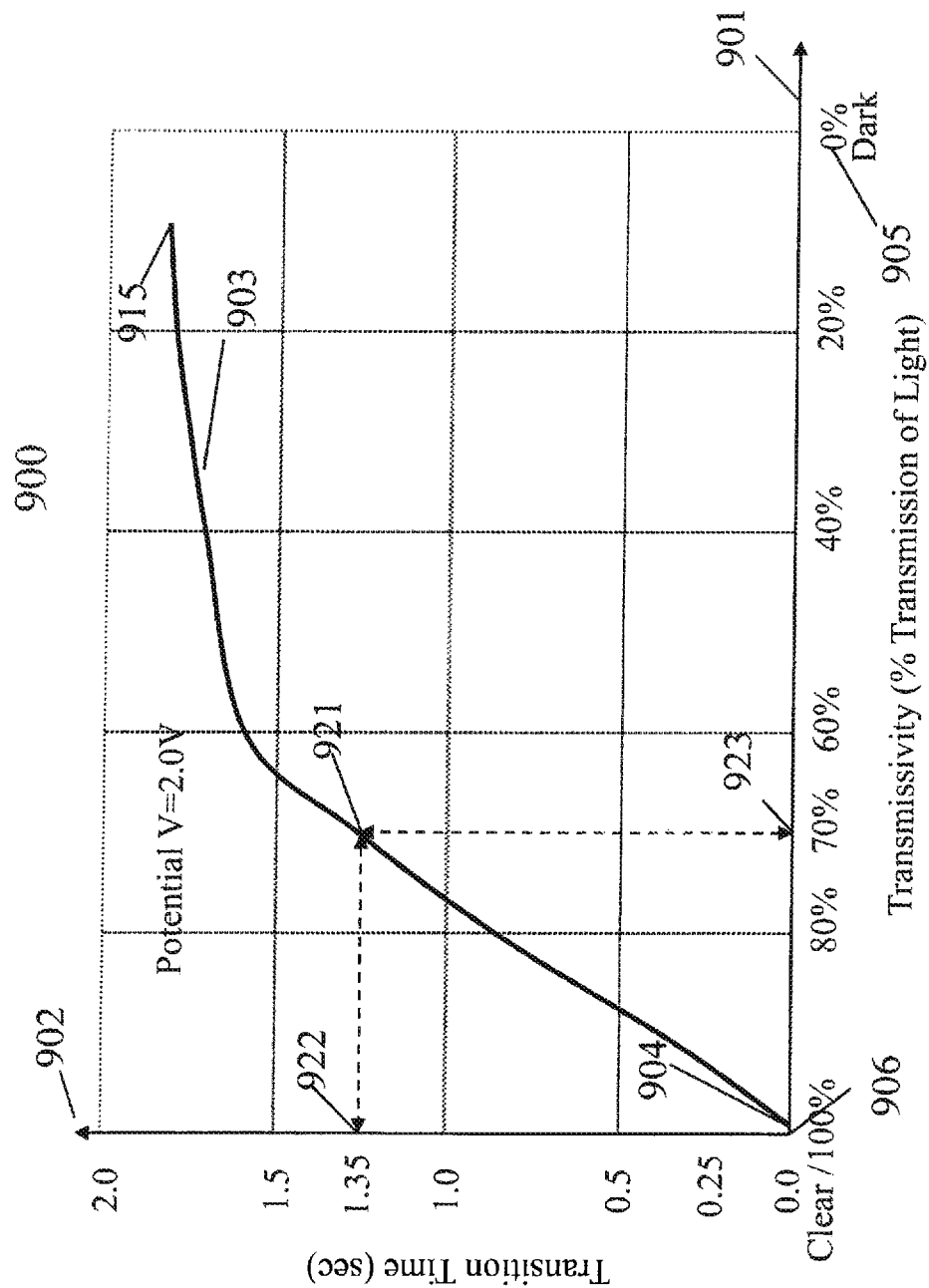
FIG. 9 is a transition time curve for a single layer of electrochromic material with transition time as a function of transmissivity.

FIG. 6b 625 shows the cross-sectional details of the multiple layered electrochromic device of FIG. 6a that is used for fabricating the electronically controlled variable tint material of the right and left lenses of the Continuous Adjustable 3Deeps Filter Spectacles. The 7 layers of the electrochromic left lens 106 of FIG. 2b are shown in FIG. 6b as the 6 active layers 611, and the (seventh) insulating layer 201. Each layer is identical to their like numbered description accompanying FIG. 2b. A second active layer 601 is included in the multi-layered electrochromic lens. In the second preferred embodiment of the invention, the second layer 601 of the lens is fabricated from identical electrochromic material as used to fabricate the first layer 611 of the left lens 506 so that each layer has the same Operating Characteristic curve 900 as shown in FIG. 9. The six layers of electrochromic material for the second layer are identical to their like numbered description accompanying FIG. 2b. Other embodiments may use electrochromic material with different material so that the two layers have different Operating Characteristic curves. Also, other embodiments may have more than 2 layers.

Figure 7:
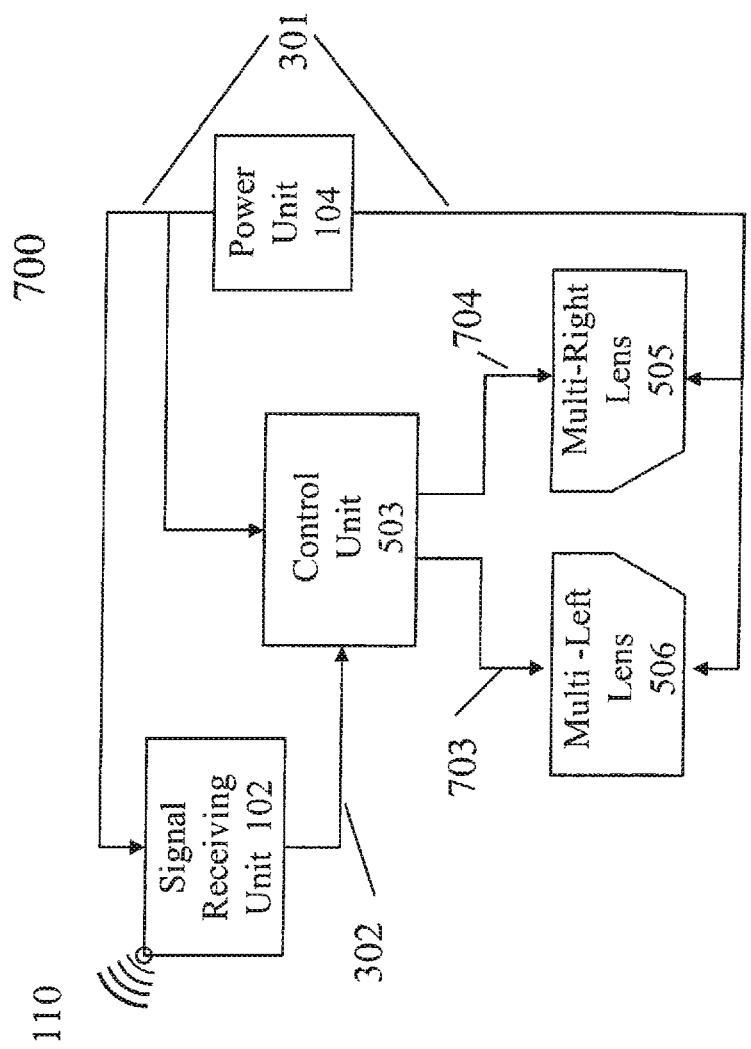
FIG. 7 is a block diagram of the operation of the Continuous Adjustable 3Deeps Filter Spectacles using a multiple layered electrochromic device for fabricating the electronically controlled variable tint material of the right and left lenses.

FIG. 7 is a block diagram 700 of the operation of the Continuous Adjustable 3Deeps Filter Spectacles of FIG. 5 using a multiple layered electrochromic device for fabricating the electronically controlled variable tint material of the right 505 and left lenses 506. All circuits on the Continuous Adjustable 3Deeps Filter Spectacles 550 are powered 301 by the battery 104, including the Control Unit 503, Signal Receiving Unit 102, the Left Lens 506, and the Right Lens 505. The control information 110 is received by the Signal Receiving Unit 102 and sent 302 to the Control Unit 503. The control unit 503 implements an algorithm that is specific for the multi-layered lens materials used in the fabrication of the Right Lens 505 and the Left lens 506 of the multi-layered Continuous Adjustable 3Deeps Filter Spectacles, and controls the Left Lens 506 with a control circuit 703, and the Right Lens 505 with a control circuit 704.

The difference between FIG. 7 (multi-layered lens) and FIG. 3 (single layer lens) is in their respective right and left lenses, control units, and control circuits. For the right lens 505 and left lens 506, the lenses are fabricated from multiple layers of electrochromic material. In the second preferred embodiment of the invention these are the same as the lens fabrication shown in FIG. 6. The control unit for the multi-layered lens 503 must control multiple layers while the control unit for the single-layered lens 103 only need control a single layer electrochromic lens. In this second preferred embodiment of the invention, both layers of the multi-layered electrochromic lens are made of the same material with the same Operating Characteristic curve and both lenses have applied to them identical voltage across each layer. However, since there are multi-layers of material, it will be shown using the Operating Characteristic curve of FIGS. 9 and 10, that to achieve a target optical density for each lens, the control unit 503 will only need apply voltage to the multi-layers for less time than for the single layer. For the control circuits, the multi-lens control circuits need to apply voltage across multiple layered assemblies, not just a single lens assembly.

Figure 8:
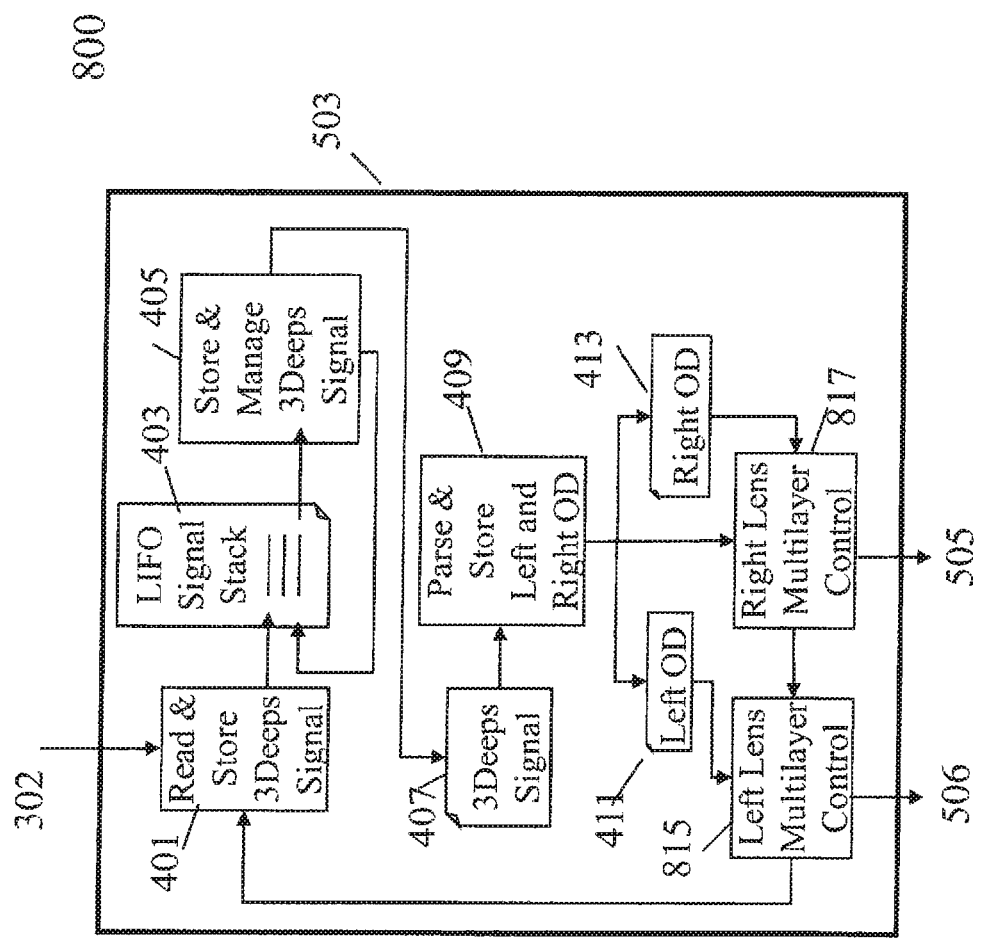
FIG. 8 is a flow chart showing the operation of the Control Unit of the Continuous Adjustable 3Deeps Filter Spectacles using a multiple layered electrochromic device for fabricating the electronically controlled variable tint material of the right and left lenses.

FIG. 8 is a flow chart 800 showing the operation of the Control Unit 503 of the Continuous Adjustable 3Deeps Filter Spectacles 550 using a multiple layered electrochromic device for fabricating the electronically controlled variable tint material of the right lens 505 and left lens 506. This flow chart 800 is very similar to the flow chart of the control unit for the Continuous Adjustable 3Deeps Filter Spectacles using a single layered electrochromic device of FIG. 4. The memory storage LIFO Signal Stack 403, 3Deeps Signal 407, Left OD 411, and Right OD 413 are the same as previously described for FIG. 4. The processing modules Read & Store 3Deeps Signal 401, Store and Manage 3Deeps Signal 405, and Parse and Store Left and Right OD 409 are the same as previously described for FIG. 4. The difference between FIG. 4 and FIG. 8 is in the Left Lens Multilayer circuitry 815 and the left lens 506 that the circuit controls, and in the Right Lens Multilayer Control circuitry 817 and the right lens 505 that the circuit controls. In this multi-layer embodiment of the invention, the Left Lens Multilayer circuitry 815 must control two layers of the electrochromic left lens 506, and the Right Lens Multilayer circuitry 817 must control two layers of the electrochromic right lens 505. It will be shown later in FIGS. 9 and 10 that the target optical densities for the left lens 411 and the right lens 409 can be achieved more rapidly.

This approach has the same advantages as for single-layer Continuous Adjustable 3Deeps Filter Spectacles. The control information 110 is spectacle-agnostic; i.e. all spectacles receive the same transmitted control information. The control unit 503 on the spectacles performs a final view-spectacle-specific optimization, translating the control information into control signals specific to the multi-layered lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles. It also has the additional advantage that since a multi-layer lens is used, the transition time between optical density states will be faster than the corresponding transition time for a single-layer lens.

The second preferred embodiment of the Optical Density Continuing Adjustable 3Deeps Filter Spectacles use electrochromic lenses. Additional detail about Electrochromism is now provided.

Electrochromism is the phenomenon displayed by some chemicals of reversibly changing color when an electric potential is applied. Electrochromism has a history dating back to the nineteenth century and there are thousands of chemical systems that have already been identified electrochromic. A narrow definition limits electrochromic devices to chemical processes for which there is a redox reaction that undergo an electron uptake reduction or electron release when potential is applied and the reverse or oxidation with a reverse potential. Most redox processes are electrochromic and are candidate electrochromes and potential 3Deeps lenses. While the preferred embodiments of this invention use such narrowly defined electrochromic devices, any device for which the transmission of light may be controlled by an electronic potential may be utilized in the invention. For instance, Liquid Crystal Device (LCD) lenses may be used in the invention since they may be controlled by an electronic potential, even though they use a totally different mechanism to control the optical properties of the material. LCDs rely on an interference effect (block the transmission of light), while the narrow definition of electrochromic device is limited to materials that rely on a redox reaction to change the color of the material. Either redox or LCD material, or any material for which the transmission of light may be controlled by an electronic potential can be advantageously utilized in the invention.

There are many different families of chemicals that exhibit such properties—both organic and inorganic. These include but are not limited to polyaniline, viologens, polyoxotungstates's and tungsten oxide. Oxides of many transition metals are electrochromic including cerium, chromium, cobalt, copper, iridium, iron, manganese, molybdenum, nickel, niobium, palladium, rhodium, ruthenium, tantalum, titanium, tungsten, and vanadium. Within each family, different mixtures of chemicals produce different properties that affect the color, transmissivity, and transition time. Some electrochromics may only affect ultraviolet light—not visible light—appearing clear to an observer since they do not affect visible light. Electrochromics have been the object of intense study for over 40 years, and have found their chief commercial success for use in "smart windows" where they can reliably control the amount of light and heat allowed to pass through windows, and has also been used in the automobile industry to automatically tint rear-view mirrors in various lighting conditions.

Other embodiments of the inventions may advantageously use multiple-color electrochromic devices or materials that exhibit electropolychromism. Some electrochromic devices may take a whole series of different colors, each colored state generated at a characteristic applied potential. One example is methyl viologen, which has electron potential states that are correspondingly colorless, blue, and red-brown. Electrochromic viologens have been synthesized with as many as six different colors.

The operating characteristics of each formulation of any of the thousands of different electrochromic material will be different. Some of the operating characteristics that should be considered when selecting materials for 3Deeps lenses include; Response time (the time required to change from its clear to darkened state or vice versa); Power consumption; Memory effect (when power is off between write cycles there is no redox process and the electrochromic material retains its optical properties); Coloration efficiency (the amount of electrochromic darkening formed by the charge); Cycle life (The number of write-erase cycles that can be performed before any noticeable degradation has occurred); and, write-erase efficiency (the fraction of the originally formed darkening that can be subsequently electro-cleared. For 3Deeps viewing spectacles this should be 100%).

The operating characteristics of each formulation of any of the 1000s of different electrochromic material will be different. FIG. 9 shows a typical Operating Characteristic curve relating transmissivity (% transmission of light) to transmission time when a potential of 2 volts is applied across the electrochromic device. Some electrochromic materials may take several seconds to change state from one optical density to another—others may be near instantaneous. For many electrochromic materials the color change is persistent and electric potential need only be applied to effect a change. For such persistent optoelectronic materials, only an electronic on-off pulse is needed, while non-persistent materials require the application of a continuing electronic potential. Other materials may attain state under the presence of electric potential, but then slowly leak and change back. These materials may require a maintenance potential to maintain state but one that is different from that to attain the optical density state.

The second preferred embodiment of the Continuing Adjustable 3Deeps Filter Spectacles is fabricated from a persistent electrochromic material (material that has a so-called memory effect) that takes up to 1.85 seconds to change state from its lightest to darkest optical density, and up to 1.85 seconds to change state from its lightest to darkest optical density. In moving between states the preferred embodiment will always seek to optimize transition time.

While electrochromic material is used in the second preferred embodiment of the optical density Continuous Adjustable 3Deeps Filter Spectacles, any optoelectronic materials that change optical density in response to an applied potential may be used. This includes but is not limited to PDLCs (Polymer Dispersed Liquid Crystal devices) or SPDs (Suspended Particle Devices.) In the future, new optoelectronic materials will be discovered and may be advantageously used in the practice of this invention.

FIG. 9 is a transition time curve 900 for a single layer of electrochromic material with transition time as a function of transmissivity when a potential of 2.0V is applied to the electrochromic material. It is for a slow electrochromic material with transition time 902 as a function of transmissivity 901 (or percent transmission of light). This transition time curve 900 has a lightest state 906 with a transmissivity of 100% density (clear) and its darkest state 905 is 0% in which all light is blocked from passing through the electrochromic material. The electrochromic material cannot however attain either of the extreme values (0% or 100%) of transmissivity. The Operating Characteristic curve 903 shows a material that can attain about 99% transmissivity 904 (almost clear) and 10% transmissivity 915 (almost dark). The material can then take any optical density in between the blocking only 1% of the light (99% transmissivity) and blocking 90% of light (10% transmissivity) by the application of 2V for the proper length of time. If the material is in its clearest state 904, and, and a 2V potential is applied to the material, it will take about 1.8 seconds to change state and achieve its darkest state 915 or 10% transmissivity. This is shown on the transition time curve 903 of the Operating Characteristic of the material in FIG. 9.

As another example, if the material is in its clearest state 904, and the control signal 110 received on the frames receiving unit 102 indicates that the subject lens should change to an optical density associated with transmissivity of 70% 923, then the transition time curve 903 would be implemented by the control unit 103 to apply 2V potential to the lens for 1.35 seconds. A value of 70% 923 transmissivity intercepts the Operating Characteristic curve 903 at a point on the curve 921 that corresponds to a transition time 922 of 1.35 seconds. Once a potential of 2V has been applied for 1.35 seconds, no potential need further be applied since the electrochromic lens will latch in the new state.

This is an example of how an algorithm implemented in the Control Unit 103 of the Continuous Adjustable 3Deeps Filter Spectacles with a single layer of lens material (FIG. 1-4) would use the transition time curve 903 to control the right lens 105 and the left lens 106. To transition a lens from and optical density associated with a clear state 904 to the optical density associated with a transmissivity of 70% the Control Unit 103 would apply 2V potential to the lens for 1.35 seconds.

This is a simplified example for illustrative and teaching purposes. Other electrochromic materials may have other operating characteristics that have characteristic exponential, negative exponential, or logistic (s-shaped) relationships. In this example, 2V potential is used to move between states. It is used under the assumptions that (a) for this electrochromic formulation the higher the electronic potential the more rapid will be the change from a lighter to a darker optical density, and (b) change of state from a lighter to a darker optical density is to be optimized. Other materials may require different potentials to be applied to move from between states. In any of these cases, the principle of operation is identical and the Control Unit 103 on the frames of the lenses uses the operating characteristics of the material used in the right 105 and left 106 lenses to determine the potential and the length of time the potential is to be applied to transition between lens control states.

Figure 10:
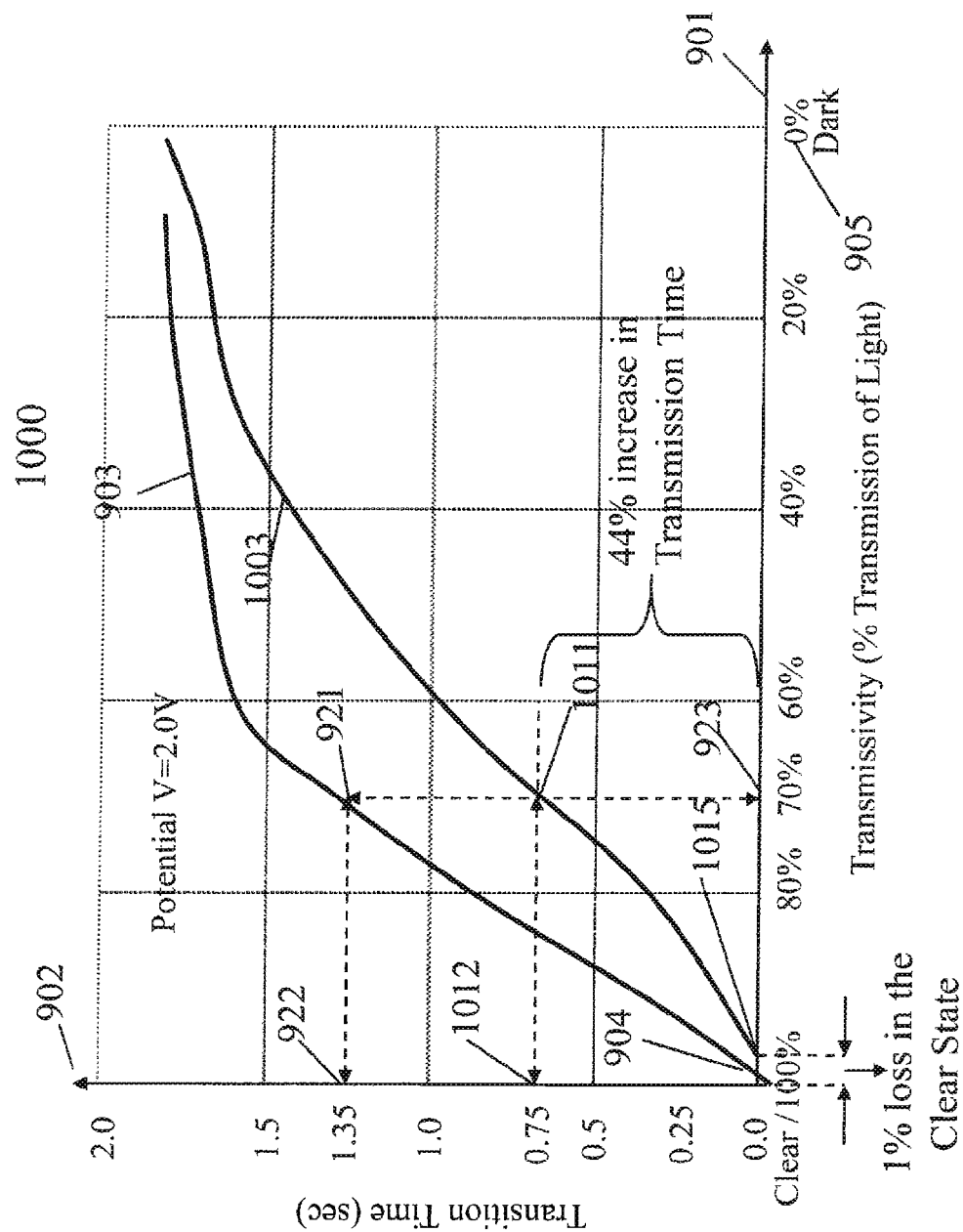
FIG. 10 is a transition time curve for a double layer (multi-layer) of electrochromic material with transition time as a function of transmissivity.

FIG. 10 is a transition time curve 1000 for a double layer (multi-layer) of electrochromic material with transition time as a function of transmissivity. FIG. 10 is similar to FIG. 9 with the addition of a second Operating Characteristic curve 1003. The numbered elements of FIG. 10 have the same description as their like numbered elements of FIG. 9. The Operating Characteristic curve for the double layer 1003 (multi-layer) lenses of the preferred embodiment are shown along with the Operating Characteristic curve of the single layer 903 to better emphasize the transition time Benefit and Loss of using the double layer of electrochromic material. The example shows that doubling the lens material results in a 44% decrease in Transmission Time (Benefit) when moving from a clear to a 70% transmissivity state for only a 1% loss in the Clear State (Loss).

As an example, if the multi-layer material is in its clearest state 1015, and the control signal 110 received on the frames receiving unit 102 indicates that the subject lens should change to an optical density associated with transmissivity of 70% 923, then the transition time curve 1003 would be implemented by the control unit 503 to apply 2V potential to the lens for 0.75 seconds. A value of 70% 923 transmissivity intercepts the Operating Characteristic curve 1003 at a point on the curve 1011 that corresponds to a transition time 1012 of 0.75 seconds. Once a potential of 2V has been applied for 0.75 seconds, no potential need further be applied since the electrochromic lens will latch in the new state.

In summary, for a single layer lens then, to move from a clear state to a 70% transmissivity state 2V potential is applied for 1.35 seconds to a single layer material. For the double layer lens of the preferred embodiment to move from a clear state to a 70% transmissivity state 2V potential is applied for 0.75 seconds. Using two layers of electrochromic material results in a beneficial 44% decrease in transmission time for only a 1% loss in the clear state.

A Third Preferred Embodiment of the Invention

It has previously been observed in this disclosure that the lens state consisting of both left and the right lens darkened is not used by any of the 3Deeps spectacles. The third preferred embodiment of the invention uses this lens state that is not used by any of various 3Deeps spectacles previously described, and extends the first preferred embodiment (single layer Continuous Adjustable 3Deeps Filter Spectacles) so they may also be switch selectable to function as sunglasses.

In particular, a switch 1101 is added to the Continuous Adjustable 3Deeps Filter Spectacles described in FIG. 1. In a first switch position the spectacles operate precisely as described in the first preferred embodiment. In a second switch position the spectacles operate as sunglasses. Toggling the switch changes the spectacles to operate with the switched characteristics. The lenses of the third preferred embodiment are single-layer, and are precisely the same as described in FIG. 2a and FIG. 2b. The control unit 103 of the first preferred embodiment is modified and presented as a new Control Unit 1103. This control unit takes as an additional input the position of the selection Switch 1101. If the Switch is positioned so the spectacles operate as Continuous Adjustable 3Deeps Filter Spectacles then the Control Unit controls the lenses of the spectacles in precisely the same fashion as previous described in FIG. 4. If the Switch is positioned so that the spectacles operate as sunglasses, then the Control Unit controls the lenses so that they both take the same pre-specified dark optical density and operate as ordinary sunglasses.

Figure 11:
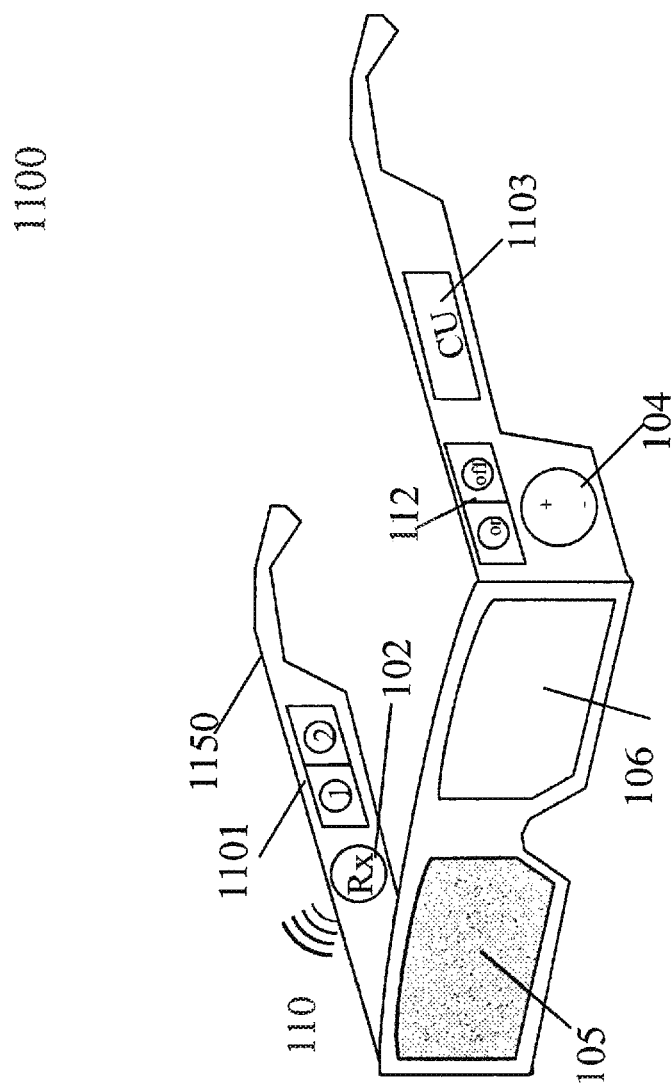
FIG. 11 is a perspective view of the third preferred embodiment of the multi-use Continuous Adjustable 3Deeps Filter Spectacles with single-layered lenses.

FIG. 11 is a perspective view 1100 of the third preferred embodiment of the Continuous Adjustable 3Deeps Filter Spectacles 1150 with single-layered lenses. The difference between the single-layered lenses of FIG. 1 and FIG. 11 is that in the third preferred embodiment a selection Switch 1101 has been added to the spectacles, and the control unit 1103 has been expanded to include control of the sunglasses. All like numbered items in FIG. 11 and FIG. 1 have the same function and definition. The selection switch 1101 may take either of two positions. In the first position, the spectacles will operate as Continuous Adjustable 3Deeps Filter Spectacles precisely as described in the first preferred embodiment. In the second position, the spectacles will operate as sunglasses.

The third preferred embodiment uses lenses identical to the lenses used in the first preferred embodiment and described in FIG. 2a and FIG. 2b.

Figure 12:
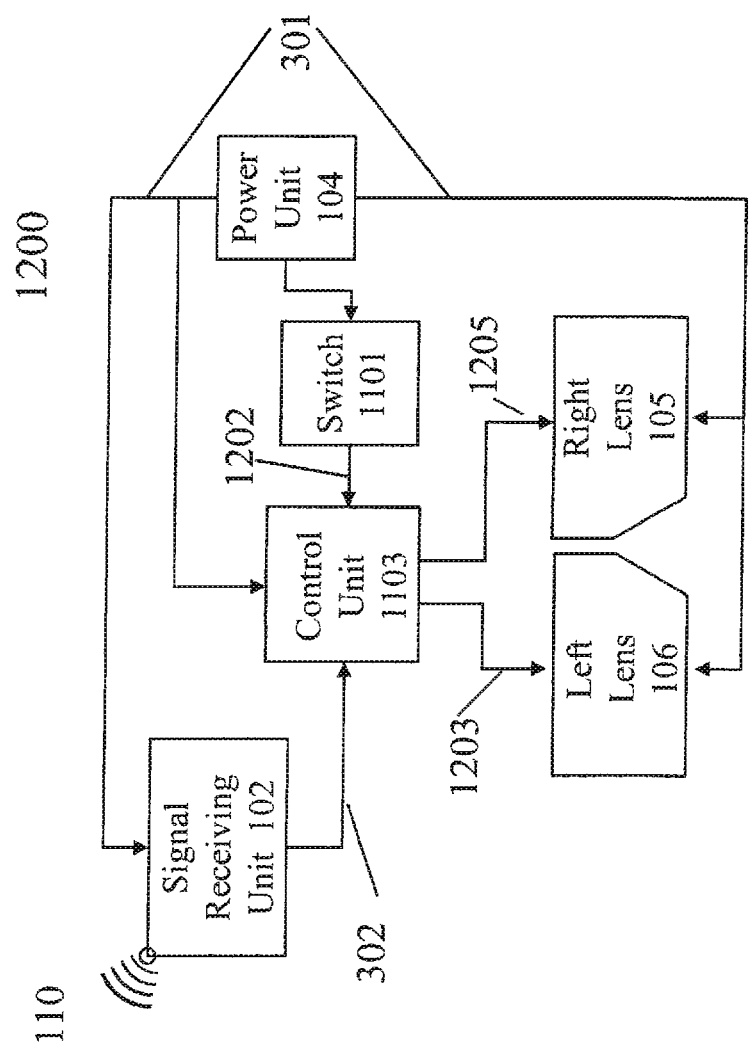
FIG. 12 is a block diagram of the operation of the multi-use Continuous Adjustable 3Deeps Filter Spectacles with single-layered lenses.

FIG. 12 is a block diagram 1200 of the operation of the Continuous Adjustable 3Deeps Filter Spectacles 1150 of FIG. 11 using a single layered electrochromic device for fabricating the electronically controlled variable tint material of the right 105 and left lenses 106. All circuits on the Continuous Adjustable 3Deeps Filter Spectacles 1150 are powered 301 by the battery 104, including the Control Unit 1103, Signal Receiving Unit 102, the Left Lens 106, and the Right Lens 105. The control information 110 is received by the Signal Receiving Unit 102 and sent 302 to the Control Unit 1103. The switch 1101 position is also powered 301 by the battery 104, and its position is output to the Control Unit 1103. The Control Unit 1103 implements an algorithm that is specific for the multi-use (Use 1: 3Deeps spectacles or Use 2: sunglasses) single-layered Continuous Adjustable 3Deeps Filter Spectacles, and controls the Left Lens 106 with a control circuit 1203, and the Right Lens 105 with a control circuit 1205.

Figure 13:
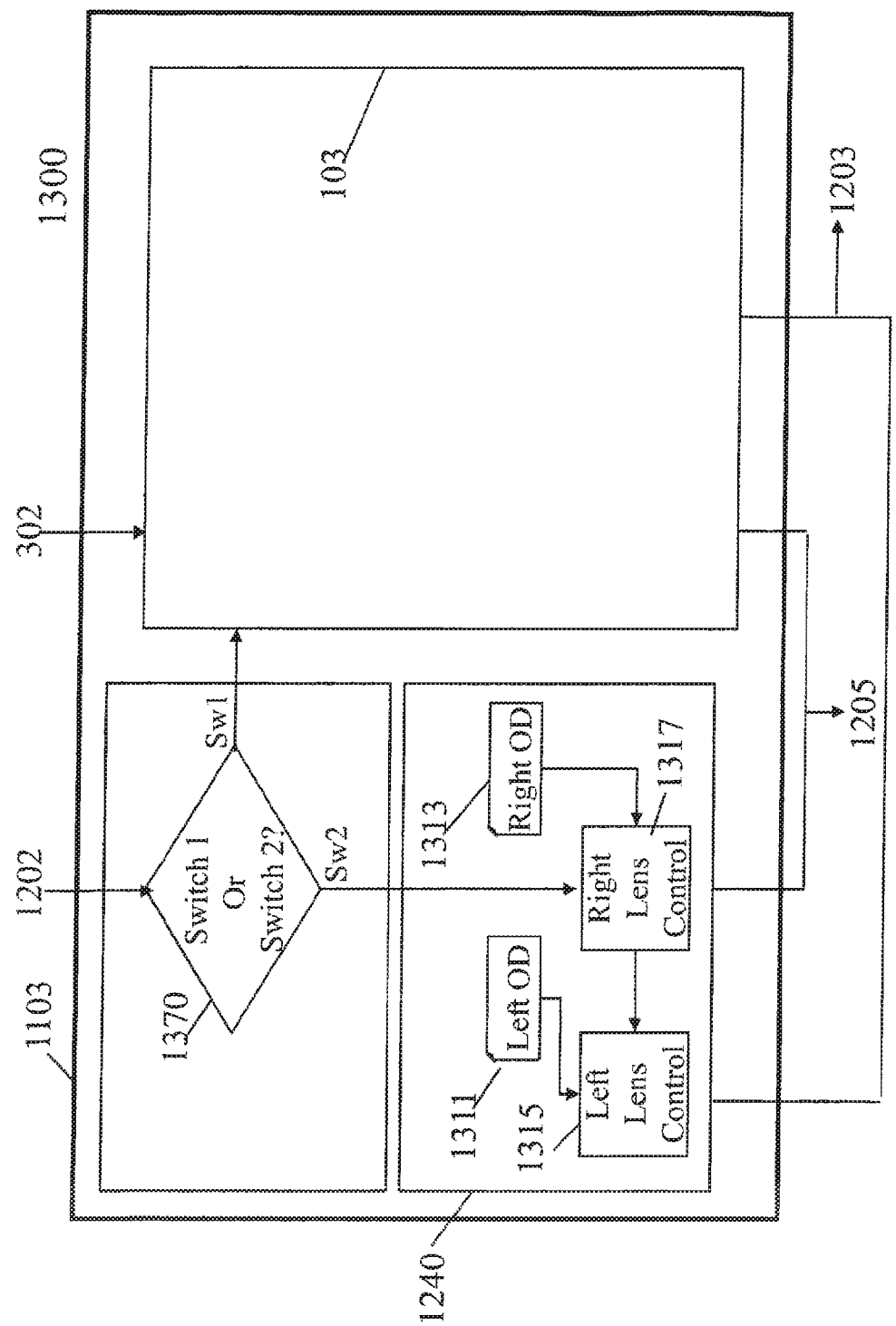
FIG. 13 is a flow chart showing the operation of the Control Unit of the multi-use Continuous Adjustable 3Deeps Filter Spectacles with single-layered lenses.

FIG. 13 is a flow chart 1300 showing the operation of the Control Unit 1103 of the multi-use Continuous Adjustable 3Deeps Filter Spectacles 1150 with single-layered lenses. The switch position 1202 is input to the Control Unit 1103 and processing commences with Switch 1 or Switch 2 1370 that can parse the switch position and determine which position the Switch 1101 is in. If the Switch position is in the first position then the control processing 103 is used. This is the same as the control processing for the First Preferred Embodiment and is described in FIG. 4. Only the input and output to the control processing 103 is shown in FIG. 13—not the details of the processing that is the same as shown in FIG. 4. If the Switch position is in the second position then the control processing 1240 for sunglasses is used. Pre-selected Optical densities for the left lens 106 and right lens 105 are stored in the controller as the Left OD 1311 and the Right OD 1313. First the Right OD 1313 is read by the Right Lens Control processing 1317 and an electronic signal is issued on circuit 1205 to change the Right Lens 105 to that associated Optical Density. Processing then passes to the Left Lens Control 1315 that reads the pre-stored value Left OD 1311 and an electronic signal is issued on circuit 1203 to change the Left Len 106 to that associated value.

This exemplary Control Unit 1103 has been purposely simplified for clarity and to show the principles of the control operation. It shows two separate control circuits—the first 103 for control of Continuous Adjustable 3Deeps Filter Spectacles, and the second 1240 for control of sunglasses. The Control Unit 1103 has two separate memory storages for the Left and Right optical densities. It should be understood that good engineering design would reuse as much circuitry as possible for two controlling functions of the Control Unit 1103. So for instance, another implementation of the Control Unit 1103 may only have a single memory storage for the Left and Right optical densities that are used by both the circuitry controlling the 3Deeps Filter Spectacles and the circuitry controlling the sunglasses.

A Fourth Preferred Embodiment of the Invention

In the second preferred embodiment of the invention the right and left lenses of the 3Deeps spectacles are fabricated from multiple layers of the same electrochromic material. In a fourth preferred embodiment of the invention, the lenses are fabricated from two layers with electrochromic devices that have different optical characteristics. In this fourth preferred embodiment of the invention the first layer of electrochromic uses the same material to fabricate the lenses as has previously been described—a neutral density filters that block the transmission of light approximately equally along the entire visible spectrum. The second layer uses electrochromic material that can be electronically controlled so the left lens is clear or can be set to allow transmission of light in the visible red spectrum and the right lens is clear or can be set to allow the transmission of light in the visible blue spectrum. The two layers of material are switch selectable so that either of the layers may be activated, but not both layers at the same time. These Multi-Use Electrically Controlled Continuous Adjustable 3Deeps Filter Spectacles thus are switch selectable so they can be used to watch 2D (single image viewed by right and left eyes) movies in 3D using the 3Deeps methodology or alternatively to watch specially made 3D movies (separate left and right images) formatted for anaglyph 3D viewing.

Figure 14:
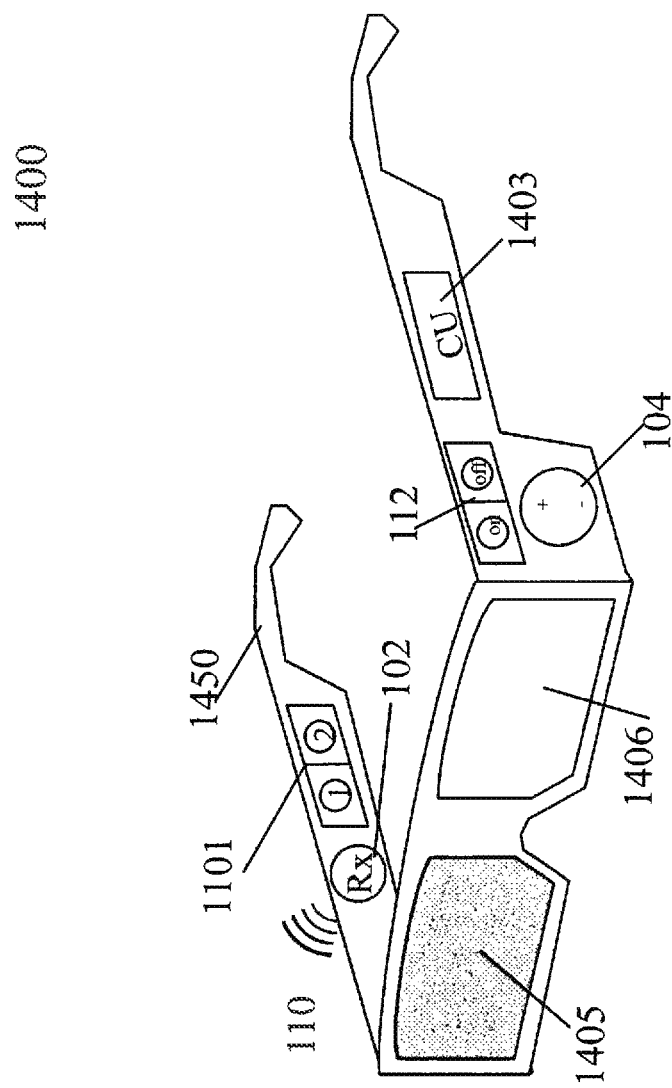
FIG. 14 is a perspective view of the fourth preferred embodiment of the multi-use Continuous Adjustable 3Deeps Filter Spectacles with multi-layered lenses.

FIG. 14 is a perspective view 1400 of the fourth preferred embodiment of the Multi-Use Electrically Controlled Continuous Adjustable 3Deeps Filter Spectacles 1450. Like numbered items in FIG. 5 and FIG. 1 have the same function and definition. The primary difference between this embodiment and previous embodiments is in the use of different electrochromic devices for the layers of the lenses (described further in FIG. 15a and FIG. 15b), and in the Control Unit 1403 that controls the operation of the spectacles based on the position of the Switch 1101. The toggle switch 1101 allows either the first layer 411 of the multi-use 3Deeps spectacles 1450 to be activated (3Deeps method of viewing 3D) or it allows the second layer 1501 of the multi-use 3Deeps spectacles to be activated (anaglyph 3D viewing.) In this fourth preferred embodiment of the invention, only one layer may be activated at a time. Other embodiments may allow more than one layer of material to be active at one time. The control unit 1403 has all the functionality of control unit 103 when the first layer is active. When the first layer is active both lenses of the second layer are set to their clear state. When the second layer of is activated the control unit 1403 will run a control program specific to the control of anaglyph 3D viewing. In particular when the second layer is activated for anaglyph viewing, both lenses of the first layer of material are set to their clear state, and the left lens 1406 of the second layer is set to a red and the right lens 1405 of the second layer is set to blue. This state is maintained throughout the viewing of the anaglyph 3D movie and no additional switch of state is required of the control program as is the case with 3Deeps viewing. In this way the left lens is red and the right lens is blue as required for anaglyph 3D movies.

Figure 15:
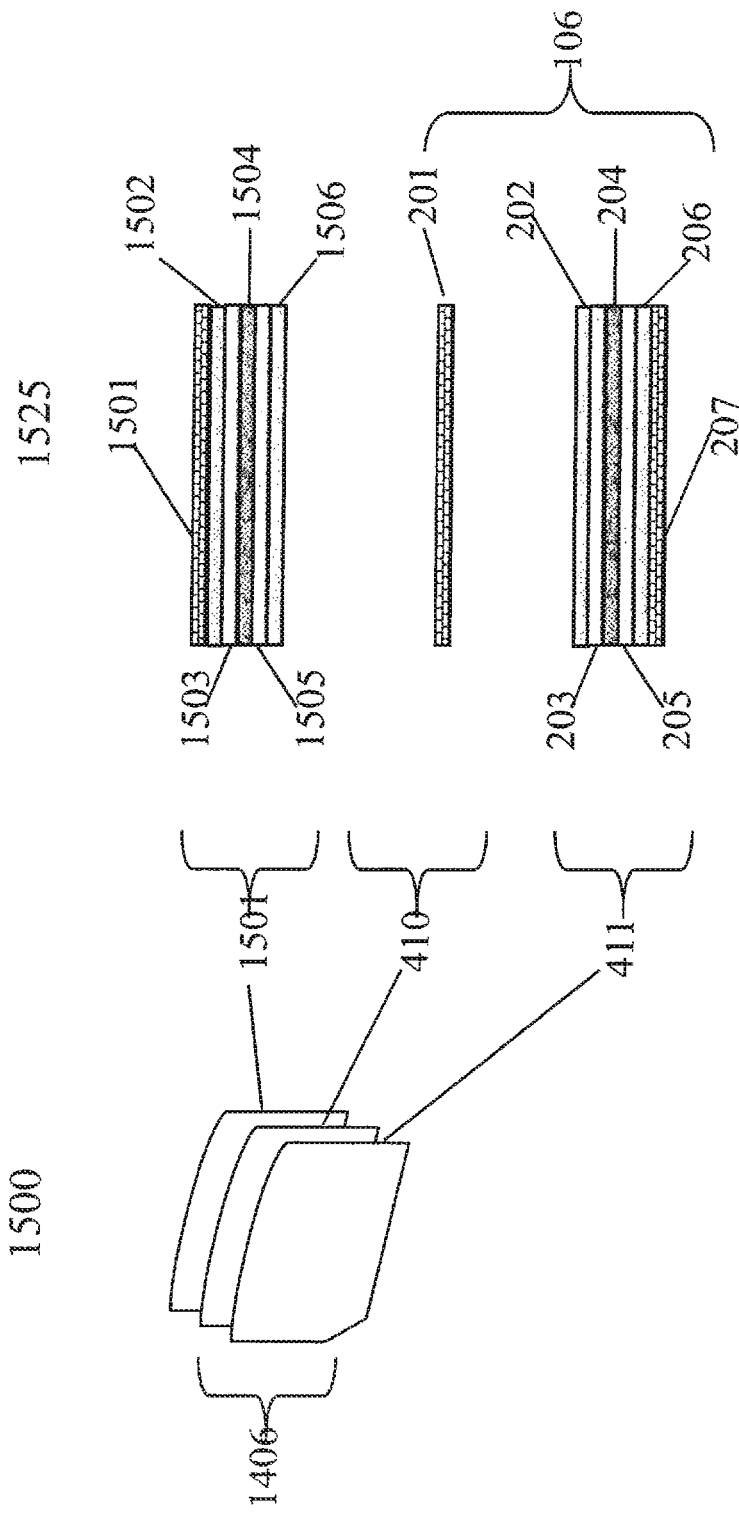
FIG. 15a shows a left lens of Multi-Use Electrically Controlled Continuous Adjustable 3Deeps Filter Spectacles fabricated from multiple layers of electrochromic materials.
FIG. 15b shows details of a Multi-Use electrochromic device for fabricating the electronically controlled variable tint material of the right and left lenses of the Multi-Use Electrically Controlled 3Deeps Continuous Adjustable 3Deeps Filter Spectacles using multi-layered lenses.

FIG. 15a 1500 shows a left lens 1006 of Multi-Use Electrically Controlled Continuous Adjustable 3Deeps Filter Spectacles fabricated from multiple layers of electrochromic material. Its fabrication using electrochromic material is shown in adjoining FIG. 15b. Since only a single layer of insulating glass material will be required between the different layers of the multi-layered electrochromic lens, the drawing of the top layer is slightly different than that of FIG. 2a to emphasize that only one layer of such insulating material is necessary. FIG. 15a therefore shows the lens 1006 as two layers where the first active layer 411 is separated by the second active layer 1501 by an insulating layer 410. The first active layer 411 and the insulating layer 410 comprise the single layer lens 106 of FIG. 2a.

FIG. 15b 1525 shows the cross-sectional details of the Multi-use electrochromic device of FIG. 15a for fabricating the electronically controlled variable tint material of the right and left lenses of the Continuous Adjustable 3Deeps Filter Spectacles using multiple layers of electrochromic material. The 7 layers of the electrochromic left lens 106 of FIG. 2a are shown in FIG. 15b as the 6 active layers 411, and the (seventh) insulating layer 201. Each layer is identical to their like numbered description accompanying FIG. 2b. A second active layer 1501 is included in the multi-layered electrochromic lens. In this fourth preferred embodiment of the invention, the second layer 1501 of the lens is fabricated from electrochromic material that is totally different from the neutral density electrochromic material of the first layer. This second layer of electrochromic material will have its own Operating Characteristic curve and electronically control properties of light differently from that of the first layer.

In particular, FIG. 15b shows the left lens 1406 of the Multi-Use Electrically Controlled Continuous Adjustable 3Deeps Filter Spectacles with a second layer of electrochromic material. The second layer is fabricated from electrochromic material that can be electronically controlled to allow the transmission of light in the clear or visible red spectrum. (A right lens that is not shown would be fabricated from electrochromic material that can be electronically controlled to allow the transmission of light in the clear or visible blue spectrum.) The second multi-layer of electrochromics of the multi-use lens is made from 6 layers of material. The top layer 1501 is made from an insulting layer of glass, plastic or other clear insulating material. This is followed by layer 1502 of a conducting layer, followed by a third layer 1603 of polymer. A fourth layer 1504 provides the ion transport whose direction is determined by the application of potential across the conducting layers. The fifth layer 1505 is the complementary polymer layer, and is then followed by another conducting layer 1506. The polymer layers 1503 and complimentary polymer layer 1505 provide the electronically controllable tinting of the lens as either clear or red. The right lens—not shown—would have polymer and complimentary polymer layers to provide electronically controllable tinting for the right lens as either clear or blue.

TABLE 1 shows the different types of Optoelectronic materials that may be used in the fabrication of Multi-Use Electrically Controlled Continuous Adjustable 3Deeps Filter Spectacles. The first column of the TABLE 1 is a numbering of the methods—but no preference is to attributed to the ordering. The Method Number is used for reference in the disclosure. The second column of TABLE 1 labeled Viewing Method and is the type of viewing that may be attained through the use of the associated optoelectronic device that is described in the third column of TABLE 1. The third column of TABLE 1 labeled OptoElectronic Device is a brief description of the controllable optical characteristic necessary to achieve the associated viewing method.

TABLE 1

| Method No. | Viewing Method | OptoElectronic Device |
|---|---|---|
| 1 | 3Deeps movies (2D images viewed as 3D) | Single or multi-layers variable tint device |
| 2 | Anaglyph 3D movies | Right Lens Blue; Left Len Red device |
| 3 | Intru3D 3D movies | Right Lens Blue; Left Lens Amber device |
| 4 | Optimum emissive colors of TV phosphors (for Methods 1, 2, 3) | Optimized to emissive colors of TV |
| 5 | Polarized Lenses 3D movies | Right and left lenses at 90% polarization device |

TABLE 1-continued

| Method No. | Viewing Method | OptoElectronic Device |
|---|---|---|
| 6 | Vision correction | Near- or far-sightedness correction device |
| 7 | Shutter glasses | Rapid shuttering between clear and totally dark device |
| 8 | Sunglasses | Single layer variable tint device |
| 9 | Optical property of light | Electro Optical control of a property (or properties) of light |

With respect to the Method No. 1 of the table, the use of an electrochromic optoelectronic device for viewing 3Deeps movies with a single-layer of variable tint lenses has been previously described in the first preferred embodiment of the invention, and the use of an electrochromic optoelectronic device for viewing 3Deeps movies with multi-layers of variable tint lenses has been previously described in the second preferred embodiment of the invention. With respect to Method No. 2 of the table, the use of an electrochromic optoelectronic device for viewing anaglyph 3D movies (left lens red and right lens blue) with Multi-Use Electrically Controlled 3Deeps Continuous Adjustable 3Deeps Filter Spectacles has been previously described in the third preferred embodiment of the invention.

The Multi-Use Electrically Controlled 3Deeps Continuous Adjustable 3Deeps Filter Spectacles described may also replace the layers of materials described or add additional layers of materials (with corresponding changes to the manual switches of the spectacles and the control program) to achieve other methods of electronically assisted viewing spectacles. Such methods may include; Intru3D 3D movies (Method No. 3) with left lens amber and right lens blue; optoelectronic devices (Method No. 4) that are tuned to the optimum emissive colors of a TV phosphor; optoelectronic devices (Method No. 5) that allow viewing of 3D movies using polarized lenses in which the right and left lenses have polarizations that are perpendicular to each other; optoelectronic devices that provide prescription glasses that correct vision such as near- or far-sightedness (Method No. 6); optoelectronic devices that allow viewing of 3D movies by the shutter glass method (Method No. 7) in which there is rapid shuttering between a clear and totally dark state for one eye, while the other eye has corresponding states of totally dark and clear in synchronization with right and left images of the displayed motion picture. The spectacles have a layer (Method No. 8) that when activated provides sunglasses. Any other optical property of light that can be beneficially controlled by an optoelectronic device (Method No. 9) can be used as a layer of the Multi-Use Electrically Controlled 3Deeps Continuous Adjustable 3Deeps Filter Spectacles. In some embodiments of the invention several methods may be operable at the same time as when Vision correction optoelectronics (Method No. 6) is active at the same time as any of the methods for viewing 3D movies.

Figure 16:
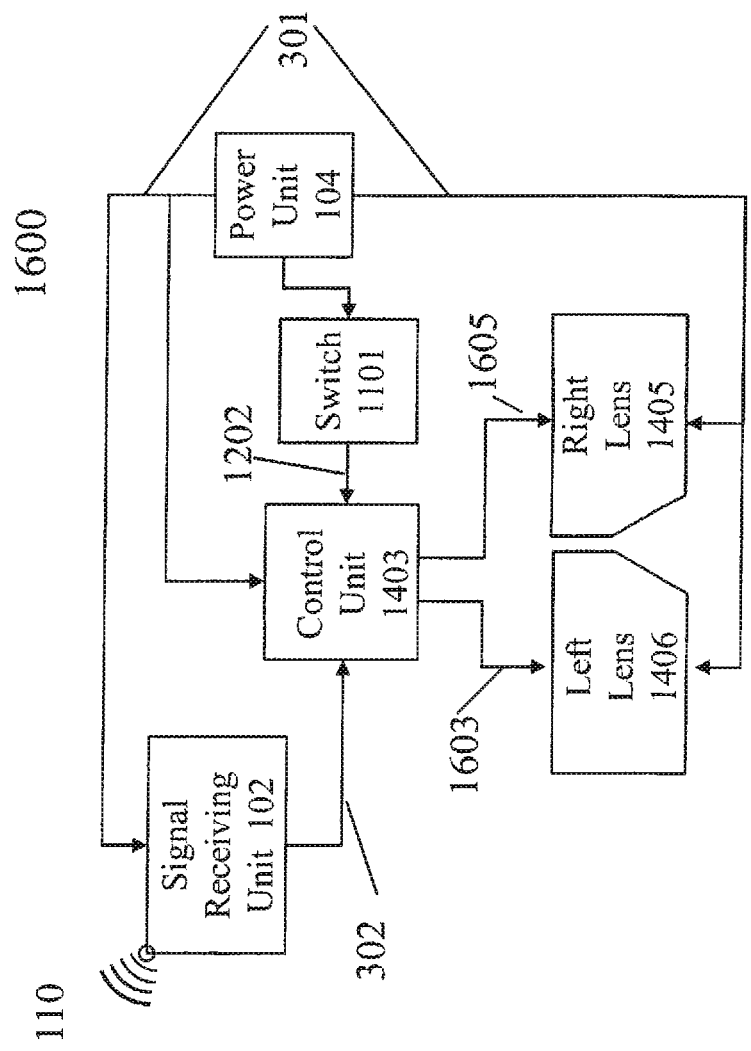
FIG. 16 is a block diagram of the operation of the multi-use Continuous Adjustable 3Deeps Filter Spectacles with multi-layered lenses.

FIG. 16 is a block diagram 1600 of the operation of the multi-use Continuous Adjustable 3Deeps Filter Spectacles 1450 with multi-layered lenses. All circuits on the multi-use Continuous Adjustable 3Deeps Filter Spectacles 1450 are powered 301 by the battery 104, including the Control Unit 1403, Signal Receiving Unit 102, the Left Lens 1406, and the Right Lens 1405. The control information 110 is received by the Signal Receiving Unit 102 and sent 302 to the Control Unit 1403. The switch 1101 position is also powered 301 by the battery 104, and its position is output 1202 to the Control Unit 1403. The Control Unit 1403 implements an algorithm that is specific for the multi-use (Use 1: 3Deeps spectacles or Use 2: Anaglyph 3D viewing) multi-layered Continuous Adjustable 3Deeps Filter Spectacles, and controls the Left Lens 1406 with a control circuit 1603, and the Right Lens 1405 with a control circuit 1605.

FIG. 17 is a flow chart 1700 showing the operation of the Control Unit 1403 of the Multi-Use Electrically Controlled Continuous Adjustable 3Deeps Filter Spectacles 1450 with multi-layered electrochromic lenses. The switch position 1202 is input to the Control Unit 1403. Processing commences with Change both right and left lens of layer 1and 2 to clear 1761 by switching both the right lens 1505 and left lens 1506 of the first electrochromic layer 411 and the second electrochromic layer 1501 to clear. Processing is then transferred to a control circuit Switch 1 or Switch 2 1763 that can parse the switch position and determine which position the Switch 1101 is in. If the Switch position is in the first position (3Deeps viewing) then a first control processing unit 103 is used to control the first layer 411 of the lenses of the Multi-Use Electrically Controlled Continuous Adjustable 3Deeps Filter Spectacles 1450. If the Switch position is in the second position (anaglyph viewing) then a second control processing unit 103a that is similar to the control processing unit 103 shown in FIG. 4) is used to control the second layer 1501 of the lenses of the Multi-Use Electrically Controlled Continuous Adjustable 3Deeps Filter Spectacles 1450.

The two control processing units 103 and 103a of the Control Unit 1403 are the same as the control processing unit for the First Preferred Embodiment and is described in FIG. 4. The first control processing unit controls the spectacles for 3Deeps viewing and the second control processing unit control the spectacles for anaglyph 3D viewing. Only the input and output to the control processing 103 is shown in FIG. 17—not the details of the processing that is the same as shown in FIG. 4.

If the Switch position is in the first position then the control processing unit electronically synchronizes to the movie using 3Deeps technology by controlling the left 1406 and right lenses 1405 of the first layer 411 of the multi-use Continuous Adjustable 3Deeps Filter Spectacles 1450 over the control circuits for the left lens 1603 and control circuit for the right lens 1605. In this case the second layer 1501 has been set so both right and left lenses of the second layer are clear. If the Switch position is in the second position then the control processing unit electronically controls the 3Deeps spectacles for anaglyph 3D viewing by switching the left lens 1406 to red and right lens 1405 to blue of the second layer 1501 of the multi-use Continuous Adjustable 3Deeps Filter Spectacles 1450 over the control circuits for the left lens 1603 and control circuit for the right lens 1605. In this case the first layer 411 has been set so both right and left lenses of the first layer are clear.

This exemplary Control Unit 1403 has been purposely simplified for clarity and to show the principles of the control operation. It shows two separate control circuits 103 and 103*a*—the first 103 control circuit for control of Continuous Adjustable 3Deeps Filter Spectacles (first layer 411), and the second 103*a* control circuit for anaglyph 3D viewing (second layer 1501). FIG. 17 shows each circuit 103 and 103*a* with its own circuits for control of the left lens 1406 and control of the right lens 1405. It should be understood that good engineering design would reuse as much circuitry as possible for two controlling functions of the Control Unit 1403.

TABLE 2 shows control information for Multi-Use Electrically Controlled Continuous Adjustable 3Deeps Filter Spectacles. Such control information is necessary when the Multi-Use Electrically Controlled Continuous Adjustable 3Deeps Filter Spectacles are under remote control rather than a manually control 1101 as shown in FIG. 14.

TABLE 2

| Method No. | Viewing Method | Control Code | Control Information |
|---|---|---|---|
| 1 | 3Deeps movies (2D images viewed as 3D) | Ctrl-1 | Optical Density for left and right lens |
| 2 | Anaglyph 3D movies | Ctrl-2 | None |
| 3 | Intru3D 3D movies | Ctrl-3 | None |
| 4 | Optimum emissive colors of TV phosphors (for Methods 1, 2, 3) | Ctrl-4 | Real-time setting of optical density of right and left lens |
| 5 | Polarized Lenses 3D movies | Ctrl-5 | None |
| 6 | Vision correction | Ctrl-6 | Real-time optical property of density of right and left lens |
| 7 | Shutter glasses | Ctrl-7 | Shutter synchronization |
| 8 | Sunglasses | Ctrl-8 | Real-time setting of sunglass color of right and left lens |
| 9 | Optical property of light | Ctrl-9 | Optical property of right and left lens |

Control information for Continuous Adjustable 3Deeps Filter Spectacles has been previously shown in the related patent application Ser. No. 12/274,752. In that related disclosure no multi-layer or multi-use information was required of the spectacle control protocol since the Continuous Adjustable 3Deeps Filter Spectacles had only a single-layer and a single-use. With Multi-Use Electrically Controlled Continuous Adjustable 3Deeps Filter Spectacles that are under remote control, a control code sequence may be transmitted to signal the Control Unit 1403—which layer of the multi-layered spectacles the controlling information references.

The first column of the TABLE 2 is a numbering of the methods—but no preference is to attributed to the ordering. The Method Number is used for reference in the disclosure. The second column of TABLE 2 labeled Viewing Method identifies the viewing method. Columns 1 and 2 of TABLE 2 are the same as in the like labeled column of TABLE 1. The third column of TABLE 2 labeled Control Code has the control code in the RF sequence that is utilized by the Control Unit 1403 to switch control to the associated lens. For instance, when the Multi-Use Electrically Controlled Continuous Adjustable 3Deeps Filter Spectacles of FIG. 10, receive a Ctrl-2 sequence it switch to control of the associated method—in this can Anaglyph 3D movies. Once the Multi-Use Electrically Controlled Continuous Adjustable 3Deeps Filter Spectacles have received a Control Code sequence, all the control information that then follows will be interpreted to control the associated method. In the current example where a Ctrl-2 sequence is received switching the spectacles into Anaglyph 3D mode, all follow-on control information received by the spectacles would be interpreted to as controlling the Anaglyph 3D spectacle method and lens layer. Such follow-on control information references the switched method until another control-code is received.

A description of the contents of the Follow-on control information associated with each of the viewing methods is indicated in column 4 of the table, labeled Control Information. When the Control Unit 1403 of the spectacles receive a Ctrl-2 sequence indicating it is to switch to anaglyph mode, the control unit 1403 changes the left lens 1406 to a red and the right lens 1405 to a blue color. The spectacles stay in this mode until another CTRL-code is received switching the spectacles to another method. Since the Anaglyph method, activated by Control Code, CTRL-2 requires no further or follow-on controlling information, the entry for Anaglyph in the Control Information column is None indicating that no further control information is required for the Anaglyph mode. Similarly, no additional control information is required for Intru3D 3D movies; and, Polarized lenses. Control Information is required for methods 3Deeps Movies; Optimum emissive colors of TV; Vision correction; shutter glasses; sunglasses; and, Optical Property of Light.

The control information that is received wirelessly 102 by the Multi-Use Electrically Controlled Continuous Adjustable 3Deeps Filter Spectacles of FIG. 14 may be transmitted by any of the means disclosed in the related patent applications including but not limited to; DVD-based control units; Digital Movie Projector control units; Television-based control units, hand-held and operated control units; spectacle-based control units, and cell-phone based control units.

Other Embodiments

While the preferred embodiments have been described using electrochromic materials, other electro-optical (opto-electronics) materials may be utilized. Any material for which the optical properties can be controlled by the application of a potential across the material may be advantageously used in the invention.

While the preferred embodiment uses 2 layers of electrochromic materials, even faster switching time can be achieved by using 3 or more layers.

While the preferred embodiment uses the same voltage applied to each of the multi-layers of the lenses, other embodiments may achieve control over the switching time to the optical optimal density by the application of different voltage across each layer of the multi-layered lenses of the Continuous Adjustable 3Deeps Filter spectacles.

In some embodiments of the invention, several different layers of multi-use-electronic materials may be switch selectable and active at the same time to achieve different optical effects. For instance electronically controllable vision correction may be combined with Continuous Adjustable 3Deeps Filtering to provide a single pair of viewing spectacles that both correct vision while at the same time providing optimal 3Deeps viewing of 2D motion pictures as 3D motion pictures.

In yet another embodiment of the invention, rather than use electrochromic materials that have the same optical properties (transmission OC curve), materials with different optical properties may be beneficially utilized.

As lenses get older their OC curve may change. In another embodiment the control program may tune the control OC curve based on age or time of use so that the spectacles do not appear to degrade in performance as they get older.

The switch selection for the Multi-Use Electrically Controlled Continuous Adjustable 3Deeps Filter Spectacles was shown on the spectacles. Alternatively, the switch selection can be activated by the viewing media by broadcasting a Rx signal that is picked up by the receiving unit of the 3Deeps spectacles 102, passed to the control unit of the spectacles, and which are read and acted upon by the control program that controls the operation of the spectacles. For instance, a control code at the beginning of an anaglyph motion picture may allow the spectacles to respond by taking the proper configuration for viewing of anaglyph 3D encoded motion pictures without any manual intervention by the viewer.

In other embodiment of the invention the multi-layered or multi-use lenses may be in the form of clip-on lenses that readily fit over normal prescription lenses.

In still another embodiment of the invention, multi-use 3Deeps viewing spectacles are fabricated from a single layer of an electropolychromism device.

Previous related patent applications (such as U.S. Pat. No. 7,508,485) have disclosed systems and methods by which a motion estimation value that characterizes movement in a frame of a 2D motion picture may be extracted from successive frames of the motion picture. The motion estimation value and a luminance value are used to calculate an optical density for the lens of the Pulfrich Filter spectacles and are transmitted to the Pulfrich Filter spectacles. The transmitted values are used to control the optical density of the lenses of the Pulfrich Filter spectacles. In still another embodiments of the invention, the motion estimation value is calculated from the motion estimation values that are part of the MPEG digital video compression standards.

In another embodiment of the invention, the 3Deeps electrochromic sunglasses have additional variable brightness controls. In one case, the sunglasses have means by which the user can set the darkness level of the sunglasses. That is, rather than a have Pre-selected optical densities value for the left lens and right lens stored in the control unit (as in FIG. 13, the optical density value of the lenses of the sunglasses is under the control of the user. A rotary or slide switch could be utilized to select any optical density between the low and high values of the switch. In another embodiment a multi-pole switch is used so that user can select one of a set of pre-selected optical densities for the lenses of the sunglasses.

In another embodiment of the invention the 3Deeps electrochromic sunglasses, the variable brightness of the lenses of the sunglasses operate similarly as an electrochromic version of photochromatic lenses. That is, the optical density of the 3Deeps sunglasses is set in accordance with a continuum of the ambient surrounding light. In low light (dark) there would be a minimum of little or not darkening of the lenses, while in intense sunlight such as at noon on a cloudless sunny day the lenses would take an extreme dark value. Lighting situations in-between would result in the optical density values for the lenses in-between the minimum and maximum values. This could be achieved for instance by incorporating a photodiode on the 3Deeps spectacles that measures the ambient light at the spectacle frames, and inputs that value to the control unit on the spectacles.

In another embodiment of the invention, the Continuous Adjustable 3Deeps Filter Spectacles may not respond to every synchronization signal. While some electrochromic materials may have been reported that have a cycle life of up to 50 million changes—and even higher values can be obtained—if the Continuous Adjustable 3Deeps Filter Spectacles are made from a material with a shortened cycle life it may be necessary to also additionally consider and optimize for the operation of the spectacles for the cycle life. While the synchronization signals would still be broadcast for every frame, the Continuous Adjustable 3Deeps Filter Spectacles may be set to only process and respond to some of those changes so as efficiently use cycle life. This make sense, as scenes that exhibit movement may be on the order of 10-30 seconds long, or longer, and the same optical density setting will provide a near-optimal setting for the Continuous Adjustable 3Deeps Filter Spectacles. To address cycle time then, the Continuous Adjustable 3Deeps Filter Spectacles may use a combination of ad-hoc rules such as (a) responding only to every nth synchronization event; (b) responding to only synchronization events with changes to the optical density of more than a pre-set percent; (c) responding to synchronization events in which there is a change to direction of motion; (d) responding to synchronization events in which there is a change in presence or absence of motion; (e) scene change, or (f) some other motion picture frame event.

As noted above, in accordance with certain embodiments, a method is provided for originating visual illusions of figures and spaces in continuous movement in any chosen direction using a finite number of pictures (as few as two pictures) that can be permanently stored and copied and displayed on motion picture film or electronic media. The method of the present invention entails repetitive presentation to the viewer of at least two substantially similar image pictures alternating with a third visual interval or bridging picture that is substantially dissimilar to the other substantially similar pictures in order to create the appearance of continuous, seamless and sustained directional movement.

Specifically, two or more image pictures are repetitively presented together with a bridging interval (a bridging picture) which is preferably a solid black or other solid-colored picture, but may also be a strongly contrasting image-picture readily distinguished from the two or more pictures that are substantially similar. In electronic media, the bridge-picture may simply be a timed unlit-screen pause between serial re-appearances of the two or more similar image pictures. The rolling movements of pictorial forms thus created (figures that uncannily stay in place while maintaining directional movement, and do not move into a further phase of movement until replaced by a new set of rotating units) is referred to as Eternalisms, and the process of composing such visual events is referred to as Eternalizing.

The three film or video picture-units are arranged to strike the eyes sequentially. For example, where A and B are the image pictures and C is the bridging picture, the picture units are arranged (A, B, C). This arrangement is then repeated any number of times, as a continuing "loop". The view of this continuing loop allows for the perception of a perceptual combining and sustained movement of image pictures (A, B). Naturally, if this loop is placed on a film strip, then it is arranged and repeated in a linear manner (A, B, C, A, B, C, A, B, C, A, B, C, etc.). The repetition of the sequence provides an illusion of continuous movement of the image pictures (A, B); with bridging picture (C), preferably in the form of a neutral or black frame, not consciously noticed by the viewer at all, except perhaps as a subtle flicker.

A more fluid or natural illusion of continuous movement from a finite number of image pictures is provided by using two of each of the three pictures and repeating the cycle of the pairs sequentially, or by blending adjacent pictures together on an additional picture-frame and placing the blended picture between the pictures in sequential order. The two image pictures (A, B) are now blended with each other to produce (A/B); the two image pictures are also blended with the bridging picture to produce (C/A and B/C), and then all pictures repeat in a series starting with the bridging picture (C, C/A, A, A/B, B, B/C) each blended picture being represented by the two letters with a slash therebetween). This series is repeated a plurality of times to sustain the illusion as long as desired. Repeating the sequence with additional blended frames provides more fluid illusion of continuous movement of the (optically combined) two image pictures (A, B).

Additionally, various arrangements of the pictures and the blends can be employed in the present invention and need not be the same each time. By varying the order of pictures in the sequence, the beat or rhythm of the pictures is changed. For example, A, B, C can be followed by A, A/B, B, B/C, C which in turn is followed by A, A, A/B, B, B, B, B/C, C, C, C, C, i.e. A, B, C, A, A/B, B, B/C, C, A, A, A/B, B, B, B, B/C, B/C, C, C, C, C, A, B, C, A, etc.

With A and B frames being similar images (such as a pair of normal two-eye perspective views of a three-dimensional scene from life), and frame C a contrasting frame (preferably a solid-color picture instead of an image-picture) relative to A,B, frame C acts as essentially a "bridge-interval" placed between recurrences of A,B. Any color can be used for the contrasting frame C: for example, blue, white, green; however, black is usually preferred. The contrasting frame can also be chosen from one of the colors in one of the two image pictures. For example, if one of the image pictures has a large patch of dark blue, then the color of the contrasting frame, bridging picture, may be dark blue.

Blending of the pictures is accomplished in any manner which allows for both pictures to be merged in the same picture frame. Thus, the term "blending" as used in the specification and claims can also be called superimposing, since one picture is merged with the other picture. Blending is done in a conventional manner using conventional equipment, suitably, photographic means, a computer, an optical printer, or a rear screen projection device. For animated art, the blending can be done by hand as in hand drawing or hand painting. Preferably, a computer is used. Suitable software programs include Adobe Photoshop, Media 100 and Adobe After Affects. Good results have been obtained with Media 100 from Multimedia Group Data Translations, Inc. of Marlborough, Mass., USA.

When using Media 100, suitable techniques include additive dissolving, cross-dissolving, and dissolving-fast fix and dither dissolving.

In blending the pictures, it is preferred to use 50% of one and 50% of the other. However, the blending can be done on a sliding scale, for example with three blended pictures, a sliding scale of quarters, i.e. 75% A/25% B, 50% A/50% B, 25% A/75% B. Good results have been obtained with a 50%/50% mix, i.e. a blend of 50% A/50% B.

The two image pictures, A and B, which are visually similar to each other, are preferably taken from side-by-side frame exposures from a motion picture film of an object or image or that is moving such that when one is overlaid with the other, only a slight difference is noted between the two images.

Alternatively, the two image pictures are identical except that one is off-center from the other. The direction of the off-center, e.g. up, down, right, or left, will determine which direction the series provides the appearance of movement, e.g. if image picture B is off-center from image picture A to the right of A, the series of C, C/A, A, A/B, B, B/C will have the appearance of moving from left to right. Likewise, if you reverse the order of appearance then the appearance of movement will be to the left.

More than two image pictures can be used in the invention. Likewise, more than one bridging picture can be used in the present invention. For example, four image pictures can be used along with one bridging picture. In this case, the series for the four image pictures, designated A, B, D and E, would be: C, A, B, D, E; or a 50/50 blend C, C/A, A, A/B, B, B/D, D, D/E, E, E/C; or side-by-side pairs, C, C, A, A, B, B, D, D, E, E.

The image picture need not fill the picture frame. Furthermore, more than one image picture can be employed per frame. Thus, the picture frame can contain a cluster of images and the image or images need not necessarily filling up the entire frame. Also, only portions of image pictures can be used to form the image used in the present invention.

Also, image pictures and portions of the image picture can be combined such that the combination is used as the second image picture. The portion of the image picture is offset from the first image picture when they are combined such that there is an appearance of movement. For example, a window from image picture A can be moved slightly while the background remains the same, the picture with the moved window is designated image picture B and the two combined to create the appearance of the window moving and/or enlarging or shrinking in size. In this case, both picture A and picture B are identical except for the placement of the window in the image picture. The same can also be done by using an identical background in both image pictures and superimposing on both pictures an image which is positioned slightly different in each picture. The image could be a window, as before, of a man walking, for example.

The number of series which are put together can be finite if it is made on a length of film or infinite if it is set on a continuous cycle or loop wherein it repeats itself.

Broadly, an embodiment of the invention is a method for creating an appearance of continuous movement with a plurality of picture frames using three or more pictures, said method comprising:
 a) selecting at least two image pictures, a first image picture and a second image picture, which are visually similar;
 b) selecting a bridging picture which is dissimilar to said image pictures;
 c) arranging said pictures in a sequential order to create a first series of pictures, said sequential order being one or more first image pictures, one or more second image pictures, one or more bridging pictures;
 d) placing said first series of pictures on a plurality of picture frames wherein each picture of said first series is placed on a single frame; and e) repeating the first series of pictures a plurality of times to create a continuous plurality of picture frames having said first series thereon, such that when said plurality of picture frames are viewed, an appearance of continuous movement is perceived by a viewer.

Preferably, step (c) is replaced with the steps comprising:

(c1) blending said first image picture with said bridging picture to obtain one or more blended first-bridging picture;

(c2) blending said first image picture with said second image picture to obtain one or more blended first-second picture;

(c3) blending said second image picture with said bridging picture to obtain one or more blended second-bridging picture;

(c4) arranging said pictures in a sequential order of one or more bridging pictures, one or more of said blended first-bridging picture, one or more of said first image picture, one or more of said blended first-second pictures, one or more of said second image picture, one or more of said blended second-bridging picture to create a first series of pictures.

An artificial 3-D image can be achieved by the present invention, as will be described in more detail below. Another way to obtain an artificial 3-D image is by a method of electronic switching of Pulfrich light-filtering before right or left eye, synchronized with screen action.

The start or end of the sequences doesn't matter since the sequence is placed in a continuous loop, however, the order of the pictures in the loop is critical in the practice of the present invention.

Figure 18A:
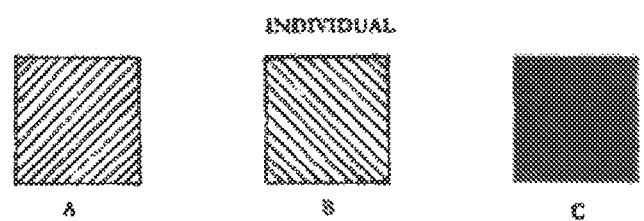
FIGS. 18 a-18 c illustrates the present invention with three pictures.

FIG. 18a illustrates three pictures that are employed in a method in accordance with an embodiment of the invention. Picture A, illustrated with lines slanting upward left to right, and Picture B, illustrated with lines slanting downward from left to right. Both pictures A and B are single frame photographs such as two side-by-side frames taken from a movie film showing movement of an object, for example, a woman walking down a street or a man walking his dog. Such side-by-side frames would be similar to each other but not identical. Picture C is a solid black picture.

Figure 18B:
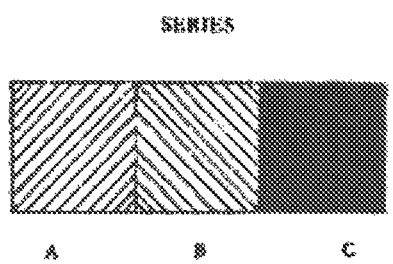
Figure 18C:
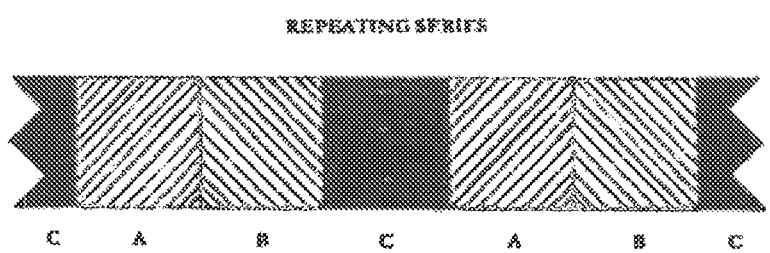

In FIG. 18b pictures A, B and C are arranged in sequential order, and placed on picture frames to form a series. In FIG. 18c this series is then repeated to produce the appearance of movement by pictures A and B.

Figure 19A:
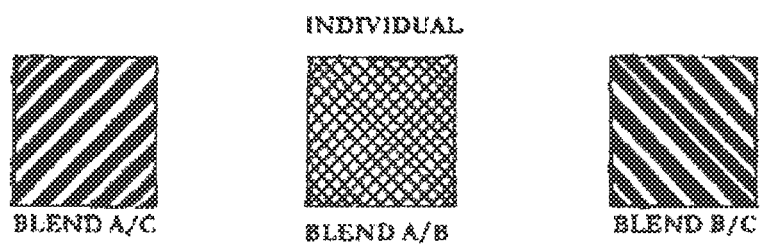
FIGS. 19 a-19 c illustrates the present invention using three pictures along with blended pictures.

Turning to FIG. 19a and the use of blended pictures, the three pictures are combined to produce a blend of C/A, blend of A/B and a blend of B/C by using Adobe Photoshop or another program to make a 50/50 blend of the three pictures.

Figure 19B:
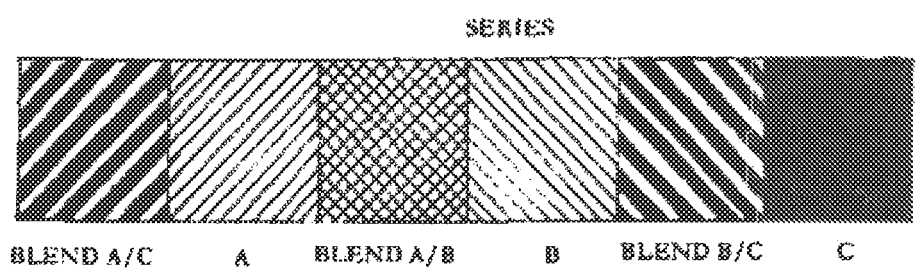
Figure 19C:
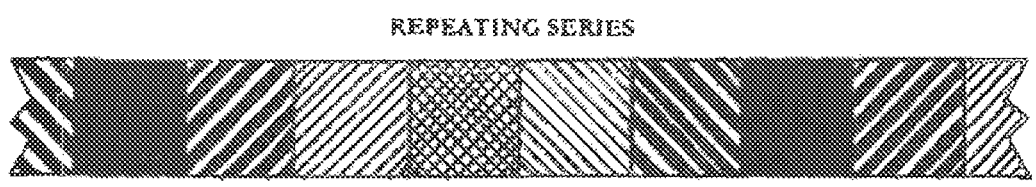

In FIG. 19b, all six pictures are placed side-by-side to create a series and the series is copied to create a continuous or semi-continuous film video or computer sequence where the series is repeated a plurality of times as shown in FIG. 19c.

Figure 20A:
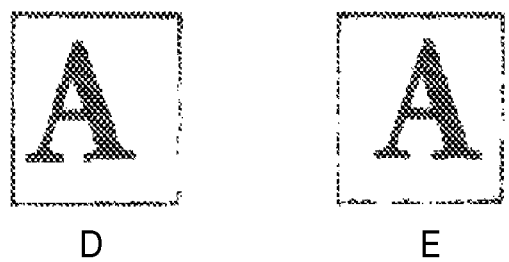
FIGS. 20 a-20 c illustrates the present invention using the same picture wherein one is offset from the other.
Figure 20B:
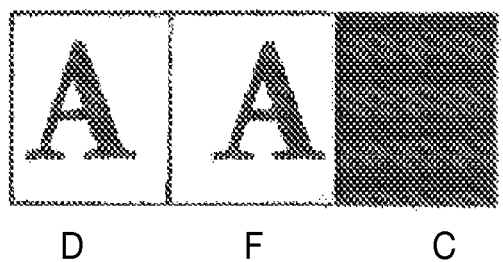
Figure 20C:
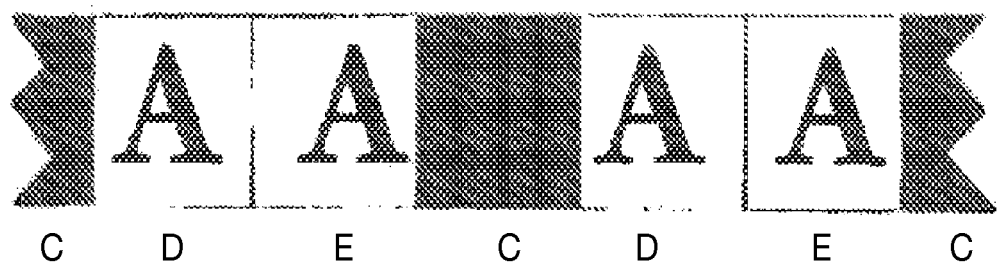

FIGS. 20a-20c illustrates an alternative three pictures that are employed in the method of this invention. Picture D and Picture E both illustrate a capital A, however, in Picture D, the capital A is aligned with the center of the frame while in Picture E the A is off-set to the right of the center of the frame (exaggerated here to be visible; in actual practice the displacement of figures might be so subtle as to not be discernable as illustrated here). Picture C is identical to Picture C in FIG. 18a.

The capital A is chosen for FIGS. 20a-20c for illustration purposes and could be a single photograph of anything.

The three pictures are placed side-by-side to form a series. Finally, the series is copied a plurality of times to form a repeating series. The repeating series in FIG. 20c creates the optical illusion that the letter A is moving from left to right and, if one letter A were to be slightly different in size from the other, the letter would appear to be moving in depth, i.e. given a third dimension.

In FIGS. 20a-20c the background of Picture E is identical to the background of Picture D except that the image A is off-set slightly to the right.

Figure 21A:
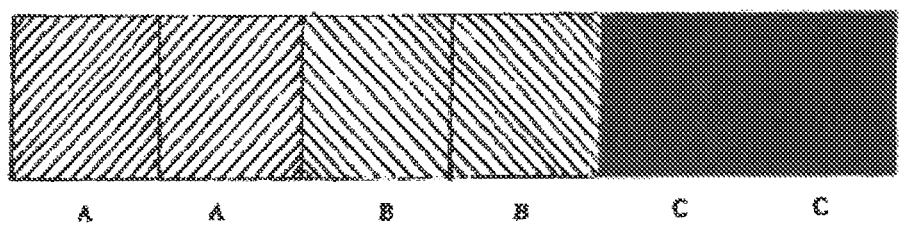
FIGS. 21 a-21 b illustrates the present invention with side-by-side pairs of pictures.
Figure 21B:
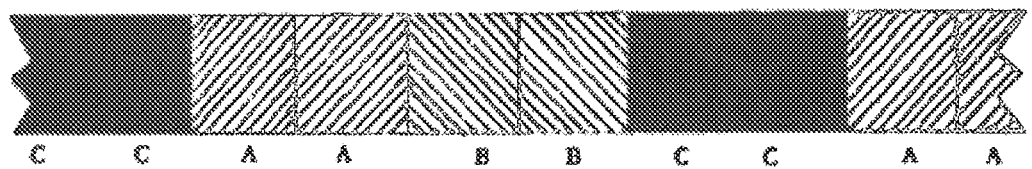

FIGS. 21a-21b illustrates the present invention where the series is two of each picture placed in side-by-side frames. It has been found that two pictures side-by-side are visually equivalent to a blend. In other words, a series of A, A, B, B, C, C is visually equivalent to a series of C/A, A, A/B, B, B/C, C.

Additionally, a series made in accordance with the present invention need not be uniform in that the pictures can be arranged to provide a different rhythm or beat to the film. For example, the series could be: C/A, C/A, A, A/B, A/B, B, B, B, B/C, C, C, C. Different arrangements provide different visual perceptions.

Furthermore, a plurality of different series can be combined together, i.e. C/A, A, B, B, C with C/A, C/A, A, B, B, C, C to form C/A, A, B, B, C, C/A, C/A, A, B, B, C, C.

Figure 22A:
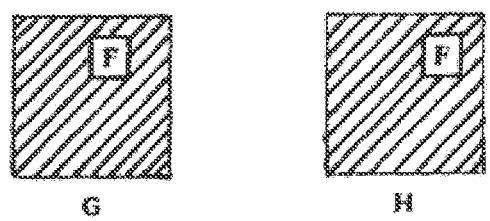
FIGS. 22 a-22 c illustrates the present invention wherein pictures G and H are identical but image F has been imposed in a slightly different location.
Figure 22B:
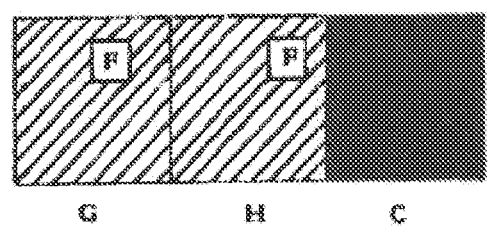
Figure 22C:
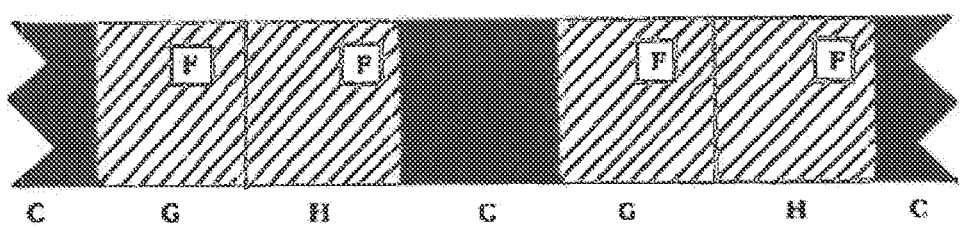

FIGS. 22a-22c illustrates the invention where both pictures are identical except for the position of a superimposed image F on the pictures. Image F could be taken from the original picture G or could be taken from another picture, which is separate and distinct from pictures G and H. For example, pictures G and H could have the common background of a country side road while image F is a man walking his dog. In picture G, the man and his dog is placed at one location while on picture H the man and his dog is placed at a different location on the country road. By viewing the repeating of a series of G, H, C, a viewer is given with the impression that the man is walking his dog down the road, from top of the frame towards the bottom of the frame, appearing to be continually moving in the same direction without changing his actual position.

Furthermore, image pictures can be identical except that when they are arranged in the frame, one is oriented slightly tilted relative to the other. The repeating series provides the visual perception that the picture is spinning.

Also, the size of or the orientation of image F in FIGS. 22a-22c can be varied while maintaining the location of image F. Varying the size gives the viewer the impression that the man is walking forward or backward, depending on the order in which pictures are arranged. Changing the orientation or tilting of image F leaves the viewer with the impression that the man is spinning.

The repeating series can be viewed in any media, it could be digitalized or placed on conventional film for viewing.

The movement created by the invention is seamless movement, sustained fluid entirely on-going movement.

Continuous movement means the illusion of a progressive action that can sustain as such into infinite time. For instance, a door beginning to open, it keeps beginning to open without ever progressing to the stage of actually opening. A door, in reality, in order to repeat this very limited movement, would have to move back and forth, recovering territory in order to go forward again, but in this visual illusion the door only moves forward. A normal film or video might approach this effect by multiple printing of the picture frames depicting only the forward motion, so that a return motion would be hidden from audience eyes, but the effect would be of a visual stutter; the action would be repeating, and not continuous. The stutter could be made less obvious and percussive by dissolving head frames of the shot into tail frames, but only with some subject matter (i.e., a waterfall) might the repeat character of the motion not be apparent.

The appearance of transfixed continuous motion (a going without going anywhere) is created in this invention from a specific employment of flicker, the contrast created by viewing the slight shifting of a pictured form or forms between the image pictures in opposition to the bridging picture. Movies have always been dependent for their illusion of continuity on flicker-rates; silent movies filmed at 16 frames per second required 3-bladed shutters not only to block projection light during the successive replacing of frames but also to twice interrupt the display of each frame so as to achieve a flicker rate that the viewer would mistakenly see as uninterrupted light. Slow cranking of the film through the projector gave rise to "the flickers" as a pejorative. Video and computer image-continuity depends likewise on rapid on-off display. The present invention purposely makes flicker apparent, utilizing the effects of emphatic flicker on the human optical/nervous system to create uncanny time and space illusions.

Simple alternation of a single image picture with intervals of blackness (or any other interrupting color/s) is enough to create subtle illusions of continual sliding movement across the screen. Alternations of two image pictures with an interrupting interval of a solid colored picture provides any number of continuous motions, including motion into illusionistic depth. While such screening-illusions of movement and depth resemble movements and depths as seen in actuality; this is a creative artistic method and not intended as a reliable way of reporting the actuality that may have existed in front of a camera.

As noted above, no special viewing devices are required to view the present invention, although certain effects can be enhanced or put through interesting changes when viewed with a filter intercepting and reducing light to one eye; the Pulfrich Effect.

Remarkably, with the present invention, depth illusions can be experienced even by the single-eyed person. Normally our perception of depth, stereopsis, depends on properly functioning binocular vision, two eyes working in tandem with each other; one of the benefits of this invention is to offer visual depth experience to those deprived of such experiences by physical defect. Because contrasting perspectival information is available to both or either eye, a single eye becomes sufficient to deliver the information to the brain when employing the present invention.

The present invention is best created on the computer, to be viewed on the computer or transferred to film or any video format. It can also be created directly onto film or video but the precision control possible with the computer is lacking.

The present invention can employ very small shifts in the placement of objects as seen in one picture in relationship to another similar picture. Such small object-placement shifts are also to be found in the simultaneously exposed pairs of frames made with a stereo still-camera, its two lenses placed horizontally apart approximately the distance between human eyes. The stereo still-camera offers object-placement differences derived, as with our two eyes, from a fixed interval of space: the twin perspectives recorded by lenses 2½ inches apart. The degree of inter-ocular distance, as it is called, enormously affects the character of depth to be seen when the stereo-pair is properly viewed one picture to each eye; depth would seem very distorted, either too shallow or too extended (with other depth aberrations) if the distance between our eyes was not being matched by the two-lens stereo-camera.

In contrast to stereo-camera photography, with the single-lens motion picture camera (film or video), exploitable difference between like images arises from the interval of time between picture-exposures, during which the objects filmed shift in spatial relationship to each other; or/and the camera itself moves, capturing the 3-dimensional scene from another perspective, and thus shifting two-dimensional placement of pictured objects (which may not have moved in actuality) as recorded exposure to exposure. Because distance or direction traversed by the camera between exposures is not constant, nor movement by subjects recorded under photographer control, the visual equation of two-dimensional similarities and differences from which 3-dimensional movements will be constructed cannot produce scenes as reliably life-like as can simultaneous stereo-exposures with a fixed horizontal distance of 2½ inches between a pair of lenses. Eternalism 3-D movements made from sequential exposures are not intended to offer scientific data pertaining to reality but instead to provide odd and expressive impossible-in-reality impressions.

The stereo still-camera provides a pair of mentally combinable left and right eye flat image pictures; viewed one picture to each eye, similarities and differences are automatically assessed and a semblance of familiar depth is seen. We gaze from plane to plane into a seeming depth, the angling of our two eyes crossing for close objects and spreading to parallel alignment for very distant ones (Yet we remain focused on the same plane in depth, the actual plane of the picture surface; in life, we constantly refocus as well as angle for different distances.) We are not conscious, either in actual life or when looking into such artificial depths, of the doubling of forms (as they fall back into 2-dimensionality) at distances that we are not at the moment angling for. This automatic angling operation of the eyes cannot happen when looking with both eyes at the same territory of flat picture surface. The coinciding of opposing 2-dimensional perspectival viewings of an object (by which volume can be conceived by the mind) must be done for the viewer, a task greatly enabled by the computer.

The present invention revolves each set of picture-units in place, but if a figure from one perspective is not placed in a correspondingly similar position in its frame (and in matching horizontal alignment) with its representation as recorded from another perspective, there is only a 2-dimensional jiggering with no volume illusion or continuous direction of movement created. With the computer, one can slide and place one picture, or an area of that picture, into exact relationship with a matching picture or area so as to achieve the precise effect desired. (A recorded object becomes an area within a flat picture-image.) The slightest advance in a particular direction of the contour of one area in relation to its match-up area determines movement in that direction. Slight shrinking or enlargement of one area compared to the other creates a zooming in or out effect. A problem in overlaying one entire picture over another in order to match up one area usually means other areas will not coincide, not synchronize; but the computer allows for each area to be matched separately and inlaid into the scene according to one's depth-movement intentions for each area. The crazy-quilt artificiality of a scene can be hidden or obvious, its parts drawn from a single-pair source of related images or from as many sources as desired. Photo-images can be mixed with or replaced by drawn and painted imagery. The scene can imitate real life one moment and veer off into impossibility the next.

Again, although only two image pictures are usually cycled, more than two can be worked into a cycle to create a particular effect. Following and inventing variants on the directions above, and the formula as described below for sequencing frames, will create the impression of solid entities moving in a charmed dimension where normally transient physical gestures can endure forever. In fact, computer interactivity can mean the viewer deciding how long the effects of each series continues. Further interactivity will give the viewer the option to place picture of his/her own choice into this unique cycling system.

Figure 23A:
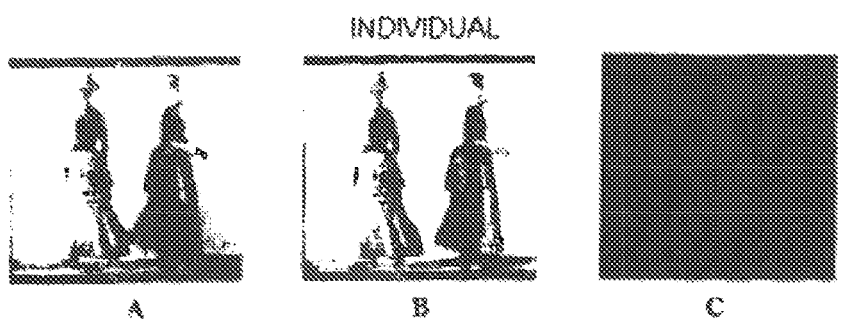
FIGS. 23 a-23 c illustrates pictures of two women in Eternalism with two pictures.
Figure 23B:
Figure 23C:
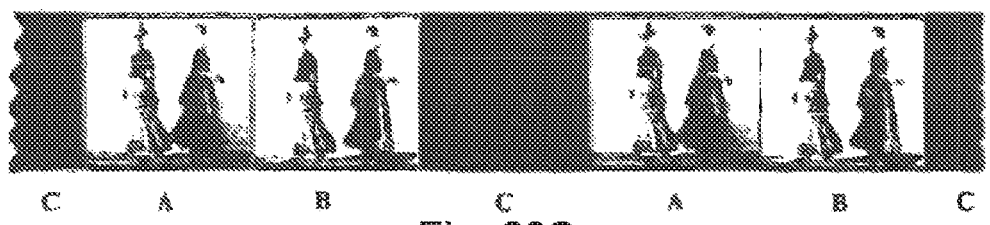

FIGS. 23a-23c shows two phases of an action, A & B, plus black bridge-frame C. We see the pictures separately in FIG. 23a; made sequentially adjacent to each other in FIG. 23b and presented as a repeating series of pictures, as a loop or cycle, in FIG. 23c.

Figure 24A:
FIGS. 24 a-24 c illustrates the women of FIG. 6 with a 50-50 blend between the women and the women and the bridging frame.
Figure 24B:
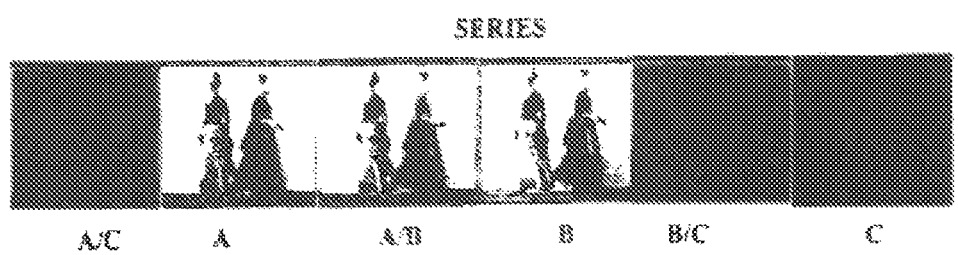
Figure 24C:
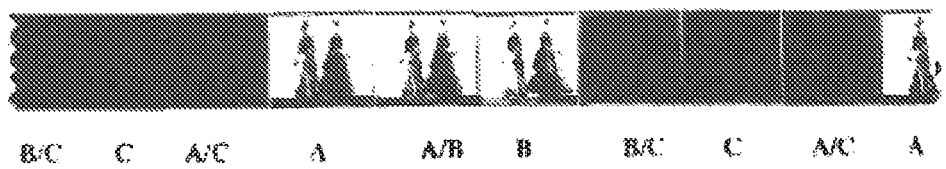

FIG. 24a demonstrates the creation of intermediary or blended frames between A, B and C, which are 50-50% blends producing A/C, AB & B/C. FIG. 24b shows them in sequence and FIG. 24c shows them repeating as an ongoing loop.

Figure 25A:
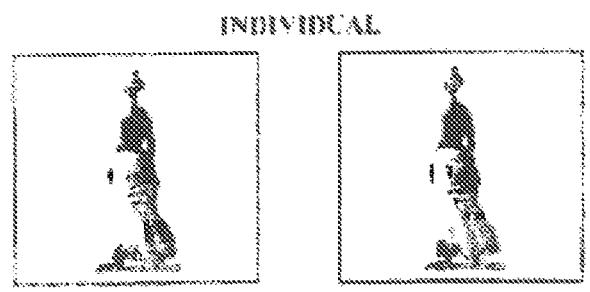
FIGS. 25 a-25 c illustrates the same women in two different perspectives (not apparent to normal viewing as pictured here), joined to create an Eternalism.
Figure 25B:
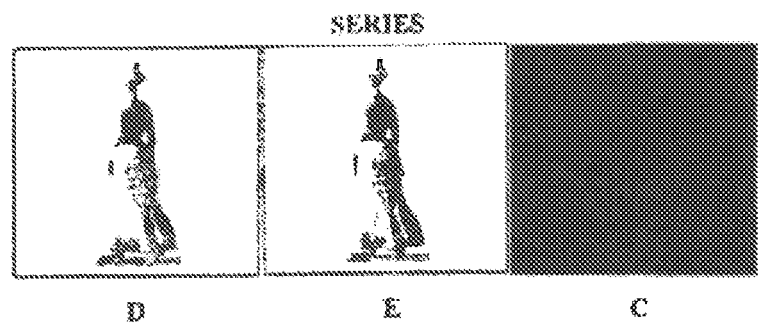
Figure 25C:
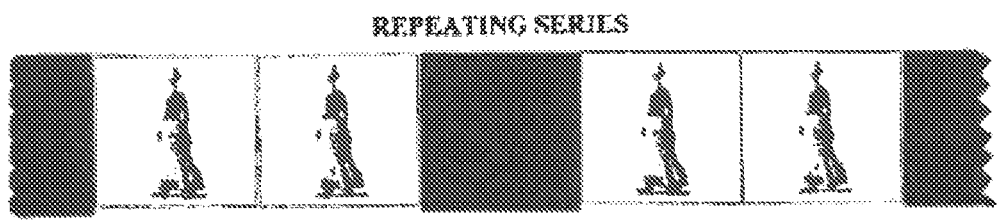

FIG. 25a shows one figure in isolation, removed from the previous scene. Pictures D & E may appear identical but are actually two different perspectives which together make possible a 3-dimensional figure. While the recording camera remained in a fixed position the figure moved before it, frame after frame, making two perspectives possible. Because the figure moved to different positions in the two film frames, it was necessary to move one figure in one frame so that both figures would occupy the same location in both frames. It is now possible to see them as a single 3-dimensional figure when the frames cycle in quick succession together with the bridge frame as shown in FIGS. 25b and 25c.

Figure 26A:
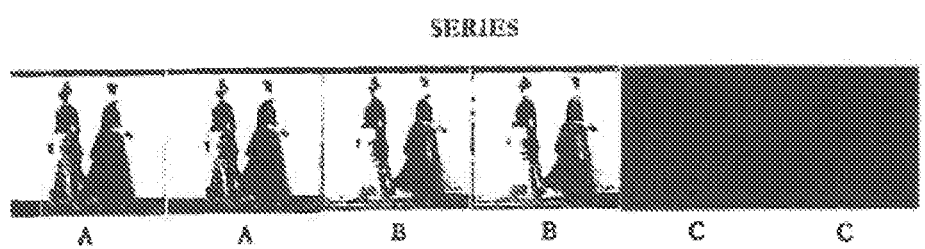
FIGS. 26 a-26 b illustrates the doubling of the frames from FIG. 6.
Figure 26B:
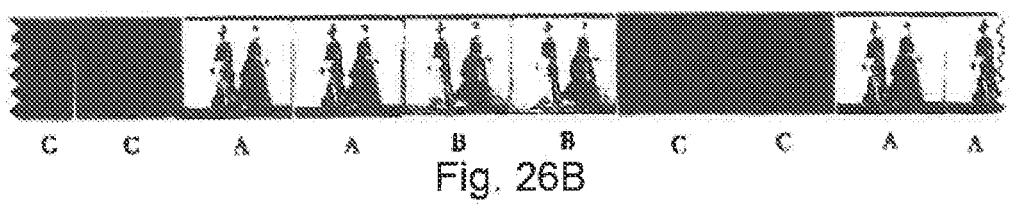

FIGS. 26a and 26b represents the doubling of each frame in an A, B, C series.

FIGS. 27a-27c shows a section of picture G & H is repeated in the upper left corner. When observed in quick succession this series will show the two center figures in one configuration of depth and the inset series as an opposing configuration of depth. Left eye/right eye views as placed in G & H are reversed in the inset figure, so that parts of the figure that (3-dimensionally) approach the viewer in the larger picture are seen to retreat away from the viewer in the smaller picture, and vice versa.

Figure 28:
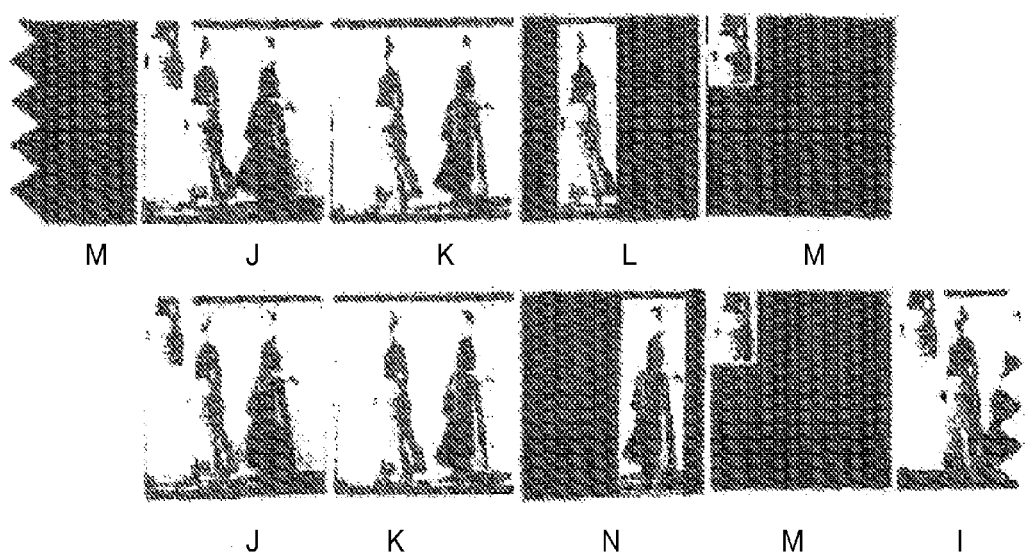
FIG. 28 illustrates a combination of the two women with a portion of the one woman both in the bridging frame as well as in one of the frames that contain both women.

FIG. 28 illustrates two sets of four; with both similarities (J, K, M) and differences (L, N) between the sets, including in the upper left corner an action that straddles bridging frame (M) and picture frame (J). Note the bridging frame is not completely blank or colored. Frame J has a smaller frame in the upper left corner of a larger frame and is an example of a combined frame that may be generated by stitching a first frame and a second frame together.

Figure 29:
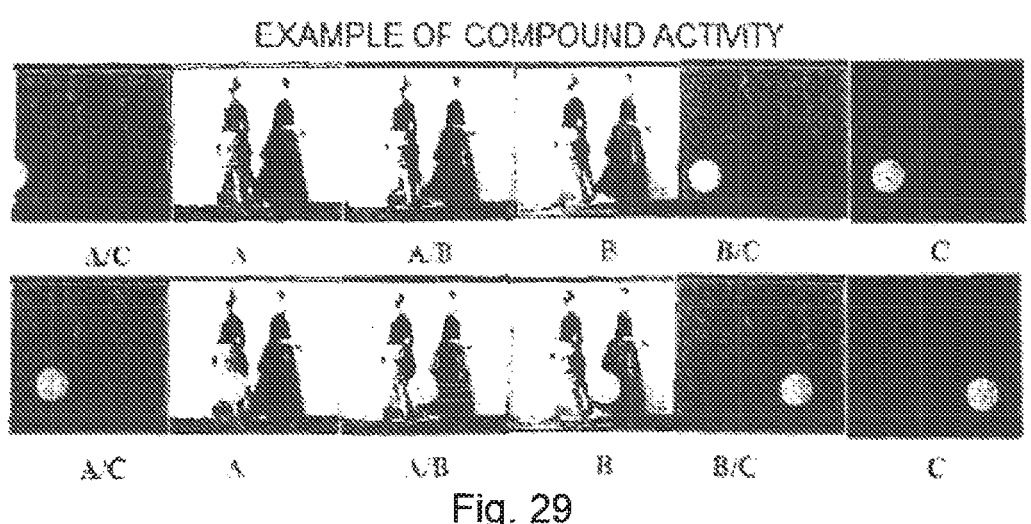
FIG. 29 illustrates Eternalism with two women and a circle moving through the frames.

FIG. 29 illustrates an example of an Eternalism effect coexisting with more normal screen action, and of an Eternalism repetition taking place but with no two frames exactly alike: a visual element (the circle) proceeds frame to frame throughout as it would in a normal movie, unaffected by Eternalism looping. Again, note that the bridging frame is not completely blank.

Figure 30:
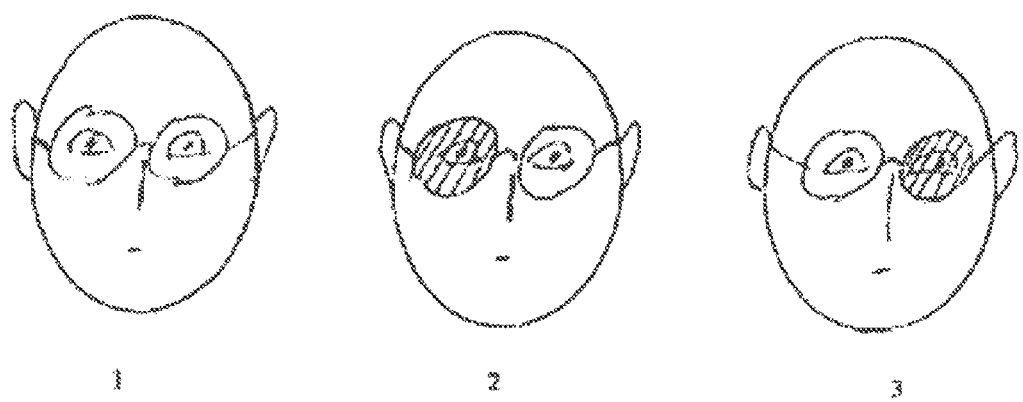
FIG. 30 illustrates the Pulfrich filter.

FIG. 30 is an illustration of Pulfrich filter spectacles: (1) clear; (2) activated to partly block light reaching figure's right eye; (3) activated to partly bock light reaching figure's left eye. Liquid crystal reaction is one method of achieving the blocking effect.

Certain embodiments may be described as follows:

In the Pulfrich filter effect, interference by the light-reducing filter has the effect of retarding the light that does pass through it to the eye. As long as forms and objects are changing position relative to each other as pictured frame to frame, a delayed picture seen in combination with a present-moment picture offers two slightly different pictures simultaneously to the mind. Thus an artificial three-dimensional image can be produced by the mind utilizing the same mechanisms that allow it, in viewing actuality, to produce a three-dimensional mental image from the pair of two-dimensional perspective-images received from horizontally adjacent eyes. The artificial 3-D image can be said to depend on a variable report of actuality. A Pulfrich filter used to view actual three-dimensional space will distort that space (assuming the scene is in motion). Similarly, depth in a screen image can be distorted, and in manifold ways, including reversal of near and far and direction of motion flow. Such distortions can have expressive artistic value.

The Pulfrich Effect, triggered (as described above) to accord with pictured directional motion on-screen, would have applications beyond use with Eternalized movies. Video games and other video movies featuring extended screen movements to left or right could, in many instances, be enhanced for viewers by Pulfrich projection into three-dimensional depth. For many such screen events for instance, a scene filmed or videotaped from a moving vehicle, especially perpendicularly, with the camera aimed at or close to a 90 degree angle from the side of the vehicle, convincingly realistic deep space would result. A stipulation of realistic deep space, as made available by the Pulfrich Effect, is that the partial light-absorbing filter be before the eye on the side to which the pictured foreground objects are seen to move. If filming or videotaping was to be done with the camera aimed perpendicular to a vehicle's path of movement, and the camera was on the driver's side, motion onscreen would flow screen-left, and the Pulfrich filtering would therefore have to take place before the left eye; thus the need to switch dark-filter placement from eye to eye in accordance with direction of screen movement. The filter works best when there is essentially horizontal movement; when viewing an unmoving or inappropriate image, both left and right eye filters should clear. Presented as electronic media, such images would benefit from timed application of appropriate Pulfrich filtering. This aspect of the invention would allow 3-dimensional movies to be created and presented (less spectacles) with the same cinema technology used for making and presenting ordinary 2-dimensional movies.

Description of the Eternalism Optical Phenomena

The idea of an interval of action running in place without apparent beginning, middle and end, forever swelling or turning or rising or opening, forever seeming to evolve without ever actually doing so (until given a determined release into a further phase of development), can be literally unimaginable, so alien is it to our experience. Neither in life or on film or in electronic imagery has it been possible to create the optical illusion of a door forever cracking open or a muscle rippling or head turning or any other limited gesture continuing as such into potentially unlimited time—until advent of this invention. We have termed this phenomenon Eternalism, and we speak of pictured forms or objects, scenes or gesture being Eternalized into Eternalisms. A further benefit of this invention is enhanced 3-Dimensionality of Eternalized images, a 3-D that can be reasonably life-like or radically at odds with depth as we know it.

Consider, for example, the action of a door opening. And select from that entire action only the fraction of time that it would take for the door to just begin to open, as it cracks open a narrow space alongside the doorframe, with the outer edge of the door swinging over little more than an inch of flooring. Designating this very limited time-space interval as a movie shot. The most minimal movie shot possible, it consists of only two running frames of film or video.

In reality, there would be no way to sustain into unlimited time the very limited action of the door cracking open; to keep opening and only opening yet never moving past that very limited phase of just cracking open. This motion is not repeated but sustained. The reality, of course, is that to remain in motion, and in forward motion only, one would have to move the door to a further phase of motion: the door would have to open wider. And the designated space-time interval would be left behind.

This is similar to someone walking against the direction of a conveyer belt walkway (as at an airport) and at exactly the same speed of the conveyer belt, continually walking forward yet getting nowhere. The Eternalism technique is a sort of cinematic conveyer belt moving in an opposing direction to any moving image placed on it.

It is a conveyer belt with a beat, a flicker, a visual beat capable of supple changes. In the history of cinema, flicker—referring to visible intervals of darkness between flashes of successive film-frames, intrusive reminders of the mechanical basis of the cinematic illusion—has been a pejorative term. To commercially entertain, the technology needed to quickly outgrow flicker. Yet in doing so some other illusionistic potentials of the art, very curious departures from life-like representation, were never discovered, their expressive potential left untapped, until now.

Method

Visible flicker is essential to Eternalism technique, which investigates and utilizes different intensities of emphasis, frame choices and frame-counts of flicker in order to create entirely new illusions to augment cinema's repertoire of visual effects. Today's audiences are entirely receptive to non-realistic representation, the textures of visual technologies are no longer unwelcome onscreen. Visible flicker does sometimes appear in movies in purposeful ways, usually representing lightning or machine-gun bursts, and even as rhythmic hits of light-energy, but not with the methodology and results of Eternalisms.

No less than three basic units, two pictures and a bridge-interval (A, B, C), are necessary to create an Eternalism, even when picture B might be only a slight modification, a shifting or size reduction or expansion or tilting, etc. of picture A. On the simplest level, the series of units would proceed: A, B, C, A, B, C, A and so on. Each unit interval may be of any effective time duration, an effective smooth-working duration for computer assembling is two frames per unit, shown here as A,A, B,B, C,C, A,A, B,B, C,C, A,A and so on. It is sometimes desired to insert transitional frames, usually 50/50% (percentage mixture may vary) superimposed frames of adjacent units, shown here as: A, A/B, B, B/C, C, C/A, A and so on.

Additionally, all re-appearances of the basic cycling units comprising an Eternalism needn't be exactly the same. Strict mechanical repetition can give way to flexible variation within the limits imposed by what is necessary to sustain the motion/depth illusion (unless one chooses to abandon the illusion entirely for a period of time; it is expected that for commercial movie use of the method, that the effect would be used intermittently, for selected scenes). Any number of factors comprising a unit-sequence may be altered from appearance to appearance as it cycles, including colors, shapes, placement of shapes, objects pictures, unit duration, etc., so that the same Eternalism would seem to remain in play while going through subtle or even vibrant internal changes, before being replaced by a successive phase of motion or a distinctly other selection of picture/interval units. Change in the order of units, such as A, B, C, A, B, C, A being replaced by B, A, C, B, A, C, B would initiate an immediate reversal in direction of pictured movement. Varying durations of units within an Eternalism or traveling from Eternalism to Eternalism may not only make for desired beat and rhythm changes but also affect the apparent character of motion and/or depth in interesting ways. A composer of a series may even choose to play against its smooth continuity by momentary unit-replacement or interjection by other picture units, as for instance: A,A, B,B, C,C, A,D, B,B, C,E,C, A,A. The entire screen may Eternalize with the same sequential rhythm (usually the case) or different parts may sequence with different rhythms to different pictorial effect.

Many techniques commonly in use in computer and hand-crafted movie animation can be adapted to Eternalism use. For instance, similar to screen combinations of photographed reality with animation cartooning, only a section or sections of the screen image may be Eternalized while normal movie motion proceeds in other sections. Or a figure in normal motion may move through an Eternalized scene. Or, among other combination possibilities, a smaller Eternalism (which can be an object or shape or a separately framed scene) may be imbedded within a larger Eternalism, or may float before it, or move—substantial yet ghostlike—through it.

Stereo Vision and Special Requirements of Eternalism Composition

Eternalism images may be so composed as to create an impression of 3-dimensional volume, designed to appear more or less realistic, but never with the degree of realism as to fool anyone that they are other than images. No one will ever attempt to sink a hand into one to grab at passing fish as children do at Sony I-MAX. Eternalism depth is readily apparent and yet more problematic, as is its character of movement. Depth isn't simple there to be taken for granted, but seems constantly caught in the act of being generated out of flat elements. Eternalism is an illusion of depth. Our minds are given the task of entertaining together two conflicting impressions: of things simultaneously appearing both flat and deep. However, the degree of 3-dimensionality that is there can be seen without need of special viewing devices of any sort, and in fact can be seen by many persons normally deprived of any 3-dimensional vision (those missing sight in one eye, for instance).

Depth as well as ongoing movement must be artificially composed in the making of Eternalisms. Calculated placement of areas to be brought into working correspondence within a picture A and picture B is of paramount importance.

It does happen that images are recorded on film or in electronic media that work effectively enough when sequentially overlayed with each other as-is, so as to need little or no cut-and-paste rearrangement. But more often there are areas not adequately corresponding in sequential location and therefore, when alternated quickly, will merely bounce back and forth from place (in A-frame) to place (in B-frame). In normal stereo-vision ones two eyes angle in and out from parallel alignment as they match corresponding areas on their two retinal images. Each retinal image is in fact 2-dimensional; 3-dimension vision is a result of this muscular matching, this pulling-into-alignment activity performed by muscles surrounding the eyes (as dictated to by viewers focus of interest) activity by the eyes and the mental comparing and processing of like and unlike information sent by each eye to the brain. Only within a very limited interval of actual depth, up to about twenty five feet distance for most humans, can we effectively shift and overlay forms so as to discriminate depth accurately (eyes work in parallel beyond that distance, with greatly reduced depth distinction). The closer to the eyes the target of focus, the more the eyes have to cross, and the different degrees or angles of crossing demanded as things approach or recede means that while one layer of depth will be properly shifted to overlay figures, others will not be. Selective focusing and shift in real-life visual experience, selectively attending to the 3-D figures creates in the mind, while ignoring—helped by a "dominant eye"—the remaining non-overlayed and doubled flat figures remaining in the twin fields of vision, peripheral to the focus of attention.

Ignoring such peripheral mismatchings in Eternalisms does not come so naturally. Because the image pictures alternate in appearance, they don't quietly superimpose (with one image largely discarded from mind due to our having a "dominant eye"): non-overlayed areas will tend to jiggle and bounce, usually a distraction. Unless that is the effect wanted in a particular instance, the procedures of artificially overlaying A and B picture-areas for the viewer will be carried out throughout an Eternalism composition, into all peripheral areas of the picture. Again, this can be done employing computer graphics cut-and-paste techniques, with the filling of areas left emptied (by removal or shifting of a form) usually accomplished by the extending of adjacent colors.

Picture-frames A and B may be near-identical or have only some elements with close visual correspondence. Similarity of shape and location within the frame are important factors determining the effect. This is true to the point that entirely different pictured objects but of similar shape and on-screen location will give better results than two images of the same object recorded from perspectives too far apart or placed too far apart within consecutive frames, in which case the images will be seen to vibrate or bounce back and forth without visually combining into a single moving form. While matching image elements in pictures A and B must occupy almost the exact screen-space in order to combine properly, it will be the differences between them (within close tolerances) that will produce and determine the character of movement and dimensionality. Computer graphics cut-and-paste techniques can be used to select and place, shrink and expand and otherwise manipulate matching elements (from any source) into effective screen-locations relative to each other. One or both pictures may be collaged or stitched together from multiple sources, parts may be removed or inserted, lifted and reshaped or/and relocated. Even when the image is photographed from life and appears life-like, the process of composition can be as exacting and labor-intensive and involved with techniques of artifice as cartoon animation.

Embodiments

In practice, the implementation of this technique opens up a new world of visual effects. Its uncanniness may be emphasized to create unsettling time-space aberrations for comic or dramatic effect in movies. Or, aiming for more realistic appearance, the method could be used to provide more lively snapshots of familiar things and events. For instance, people could carry, programmed into a Palm Pilot-type electronic wallet, a great many (low memory demanding) moving replicas of loved ones in characteristic living gestures, with heightened 3-dimensional presence. Even very limited movement, limited 3-dimensionality, can enormously augment and reinforce visual information: i.e., a child's face breaks into a smile. Again, the very low demand of electronic memory by an Eternalism (cycling as few as two picture-frames with an interval of darkness), makes possible extensively illustrated electronic catalogues or even encyclopedias, supporting hundreds and eventually thousands of Eternalized illustrations. A reader-viewer might observe a home appliance in operation. Or study a visual sampling of an ocean wave breaking in its sweep to shore, study it as has never been possible before, forever breaking from peak ascendancy. One may study a springing cat, sheath of muscles sliding over ribs continually, available for sustained observation; or follow a clear demonstration of the direction a screwdriver must turn to further imbed a screw. Any number of instances where stereo-dimensional action (often audio-accompanied, as audio also demands little computer-memory) would communicate so much more than a still and flat image, or even a moving but flat image.

In accordance with another embodiment, a method of displaying one or more frames of a video is provided. Data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the plurality of blended frames are displayed.

The basic idea of video compression is to remove spatial area redundancy within a video frame (e.g. as done with Fax transmissions) and temporal redundancy between video frames. Since the successive frames in a video stream usually do not change much within small time intervals, the temporal redundancies can be used to encode and compress a video frame based on other video frames temporally (successively or previously) close to it.

As an example, MPEG compressed video files record a 16×16 pixel area (referred to as a macro block) of a frame of a motion picture, and then for successive frames only record a motion vector describing the motion of the macro block. In MPEG compression the motion vector has a horizontal and vertical part, each part ranging from −64 to +63 with a positive value indicating that the macro block moves to the right or downward respectively. Any macro block can move up to 64 pixels laterally and vertically between frames. (MPEG compression tracks not just rigid rotation but also macro block rotation.) High compression rates are achievable for moving pictures in part because the next successive frame of a motion video consists in the main of identical information. For instance, if the camera is fixed, the background information for a scene will be mostly identical between the frames of the scene. Most macro blocks will have an associated numerical motion vector indicating the macro block has not moved. In those cases where the macro block exhibits motion between frames, the macro block will have an associated numerical motion vector quantifying where the macro block has moved. In either case, only the motion vector needs to be recorded in the compressed file, not the redundant macro block. Software-based (e.g. Microsoft Media Player) and hardware-based (e.g., DVD) video players can read a compressed file and decompress it back to a video stream for display on a monitor device for viewing.

This has great advantages over previously described methods since it relies on motion vector descriptors that are pre-calculated and stored in the compressed video file, and does not require real-time image processing.

The discussion herein refers to MPEG compressed video files as two examples of video file formats that could be used by this invention. While the preferred embodiment of the invention will demonstrate the principle using just the MPEG format, it should be clearly understood that the principles disclosed in the invention could be used by any video compression technique that relies on temporal redundancies. Other formats, such as QuickTime, may be used.

Video File Data Compression

Video compression refers to reducing the quantity of data used to represent digital video images, and is a combination of spatial image compression and temporal motion compensation. Compressed video can effectively reduce the bandwidth required to transmit video via terrestrial broadcast, via cable TV, or via satellite TV services.

Most video compression is lossy—it operates on the premise that much of the data present before compression is not necessary for achieving good perceptual quality. For example, DVDs use a video coding standard that can compress around two hours of video data by 15 to 30 times, while still producing a picture quality that is generally considered high-quality for standard-definition video. Video compression is a tradeoff between disk space, video quality, and the cost of hardware required to decompress the video in a reasonable time. However, if the video is over-compressed in a lossy manner, visible (and sometimes distracting) artifacts can appear.

Video compression typically operates on square-shaped groups of neighboring pixels, usually called macro-blocks. These pixel groups or blocks of pixels are compared from one frame to the next and the video compression records only the differences within those blocks. This works extremely well if the video has no motion. A still frame of text, for example, can be repeated with very little transmitted data. In areas of video with more motion, more pixels change from one frame to the next. When more pixels change, the video compression scheme must send more data to keep up with the larger number of pixels that are changing. If the video content includes an explosion, flames, a flock of thousands of birds, or any other image with a great deal of high-frequency detail, the quality will decrease, or the variable bitrate must be increased to render this added information with the same level of detail.

Video data contains spatial and temporal redundancy. Similarities can thus be encoded by merely registering differences within a frame (spatial), and/or between frames (temporal). Spatial encoding is performed by taking advantage of the fact that the human eye is unable to distinguish small differences in color as easily as it can perceive changes in brightness, so that very similar areas of color can be "averaged out" in a similar way to jpeg images. With temporal compression only the changes from one frame to the next are encoded as often a large number of the pixels will be the same on a series of frames.

One of the most powerful techniques for compressing video is interframe compression. Interframe compression uses one or more earlier or later frames in a sequence to compress the current frame, while intraframe compression uses only the current frame, which is effectively image compression.

The most commonly used method works by comparing each frame in the video with the previous one. If the frame contains areas where nothing has moved, the system simply issues a short command that copies that part of the previous frame, bit-for-bit, into the next one. If sections of the frame move in a simple manner, the compressor emits a (slightly longer) command that tells the decompresser to shift, rotate, lighten, or darken the copy—a longer command, but still much shorter than intraframe compression.

MPEG-1 Video Compression Standard

The Moving Picture Experts Group (MPEG) was formed by the International Organization for Standards (ISO) to set standards for audio and video compression and transmission. Its first meeting was in May 1988, and by 2005, MPEG included approximately 350 members per meeting from various industries, universities, and research institutions. MPEG's has developed several sets of standards referred to as MPEG-1, MPEG-2, MPEG-3 and MPEG-4, and is continuing to work on other video compression standards.

MPEG-1 is an ISO/IEC (International Organization for Standardization/International Electrotechnical Commission) standard for medium quality and medium bit rate video and audio compression. It allows video to be compressed by the ratios in the range of 50:1 to 100:1, depending on image sequence type and desired quality. The MPEG-1 standard is one of many video file compression technique that use spatial redundancy and temporal redundancy to reduce the size of the digital video file with little noticeable loss from the originally uncompressed digital version. The MPEG-1 standard is still widely used even though it is more than 15 years old is still widely used. The preferred embodiment of the invention will use the MPEG-1 video compression standard to demonstrate the principles of the invention. However, it should be clearly understood that the principles disclosed in the invention could be used by any video compression technique that relies on temporal redundancies to achieve compression of video data. Thus, the invention is not restricted to just MPEG-1 or other MPEG compression standards. The invention may be applied using any compressed video file associated with a compression format that uses temporal redundancy to achieve compression of video data.

In MPEG-1, a video stream is a sequence of video frames. Each frame is a still image, and a video player decompresses an MPEG-1 bit stream and displays one frame after another to produce the motion video. When a motion video is compressed, MPEG-1 video compression removes both spatial redundancy within a video frame and temporal redundancy between video frames. The compression algorithms exploit several techniques to remove spatial redundancy but most importantly for this invention is its use of motion-compensation to remove temporal redundancy. Since the images in a video stream usually do not change much within small time intervals, and the idea of MPEG-1 motion-compensation is to encode a video frame based on other video frames temporally close to it.

A MPEG-1 compressed digital file is a sequence of three kinds of frames: an I-frame, a P-frame, and a B-frame. The I-frames are intra-coded, i.e. they can be reconstructed without any reference to other frames. The P-frames are forward predicted from the last I-frame or P-frame, i.e. it is impossible to reconstruct them without the data of another frame (I or P). The B-frames are both forward predicted and backward predicted from the last/next I-frame or P-frame, i.e. there are two other frames necessary to reconstruct them. P-frames and B-frames are referred to as inter-coded frames.

Whether a frame of video is coded as an I-frame, P-frame, or B-frame, the frame is processed as micro-blocks. A micro-block is a square array of 16×16 pixels, and is the unit for motion-compensated compression. If a video frame has a resolution of 320×240 pixels the MPEG-1 bit stream will reference this frame with respect to 20×15=300 macro-blocks.

An I-frame is encoded as a single image, with no reference to any past or future frames. The encoding scheme used is similar to JPEG compression. Each 8×8 block is encoded independently with one exception explained below. The block is first transformed from the spatial domain into a frequency domain using the DCT (Discrete Cosine Transform), which separates the signal into independent frequency bands. Most frequency information is in the upper left corner of the resulting 8×8 block. After this, the data is quantized. Quantization can be thought of as ignoring lower-order bits (though this process is slightly more complicated). Quantization is the only lossy part of the whole compression process other than subsampling. The resulting data is then run-length encoded in a zig-zag ordering to optimize compression. This zig-zag ordering produces longer runs of 0's by taking advantage of the fact that there should be little high-frequency information (more 0's as one zig-zags from the upper left corner towards the lower right corner of the 8×8 block). The afore-mentioned exception to independence is that the coefficient in the upper left corner of the block, called the DC coefficient, is encoded relative to the DC coefficient of the previous block (DCPM coding).

A P-frame is encoded relative to the past reference frame. A reference frame is a P- or I-frame. The past reference frame is the closest preceding reference frame. Each macro-block in a P-frame can be encoded either as an I-macro-block or as a P-macro-block. An I-macro-block is encoded just like a macro-block in an I-frame. A P-macro-block is encoded as a 16×16 area of the past reference frame, plus an error term. To specify the 16×16 area of the reference frame, a motion vector is included. A motion vector (0, 0) means that the 16×16 area is in the same position as the macro-block we are encoding. Other motion vectors are relative to that position. Motion vectors may include half-pixel values, in which case pixels are averaged. The error term is encoded using the DCT, quantization, and run-length encoding. A macro-block may also be skipped which is equivalent to a (0, 0) vector and an all-zero error term. The search for good motion vector (the one that gives small error term and good compression) is the heart of any MPEG-1 video encoder and it is the primary reason why encoders are slow.

A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macro-blocks that use both past and future reference frames, the two 16×16 areas are averaged.

The MPEG-1 bit stream for both P-frames (forward predicted), and B-frames (forward and backward predicted) have motion vectors explicitly or implicitly associated with each macro-block. A P-frame of the motion video file with a resolution of 320×240 may have as many as 300 motion vectors describing the movement of the macro-blocks from the most recent I-frame or P-frame. A B-frame of the motion video file will similarly have up to 300 motion vectors describing the movement of the macro-blacks from last/next I-frame or P-frame.

As an example, consider a single macro-block. A following P-frame shows the same triangle but at another position. Prediction means to supply a motion vector that determines how to move the macro-block from an I-frame to the P-frame. This motion vector is part of the MPEG stream and it is divided in a horizontal and a vertical part. These parts can be positive or negative. A positive value means motion to the right or motion downwards, respectively. A negative value means motion to the left or motion upwards, respectively. The parts of the motion vector are in the range of −64 . . . +63. So the referred area can be up to 64×64 pixels away.

An I-frame is intra-coded and cannot refer to another frame so it cannot have any motion vectors. However, the inter-coded P-frames and B-frames have motion vectors for each macro-block and are used by this invention to calculate for their respective frames the Characteristic 3Deeps Motion Vector necessary to calculate the optical densities of the lenses of the 3Deeps Filter Spectacles.

In accordance with an embodiment, data comprising a compressed image frame and temporal redundancy information is received. The image frame is decompressed. A plurality of bridge frames that are visually dissimilar to the image frame are generated. The image frame and the plurality of bridge frames are blended, generating a plurality of blended frames, and the blended frames are displayed.

Figure 31:
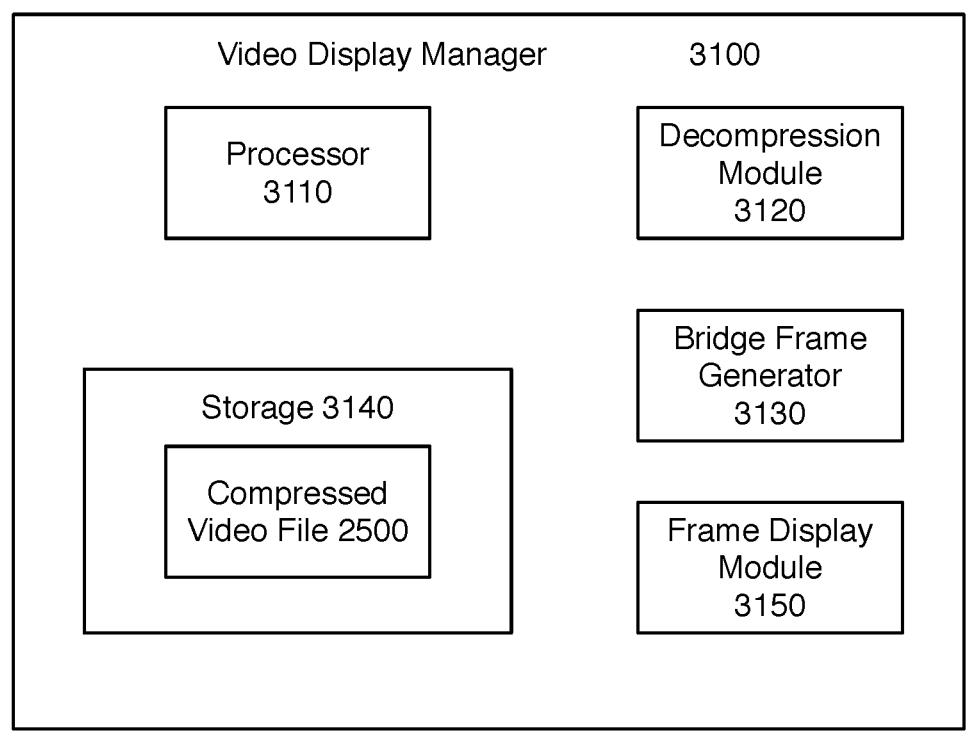
FIG. 31 shows components of a video display manager in accordance with an embodiment.

FIG. 31 shows a video display manager that may be used to implement certain embodiments in accordance with an embodiment. Video display manager 3100 comprises a processor 3110, a decompression module 3120, a bridge frame generator 3130, a frame display module 3150, and a storage 3140.

Figure 32:
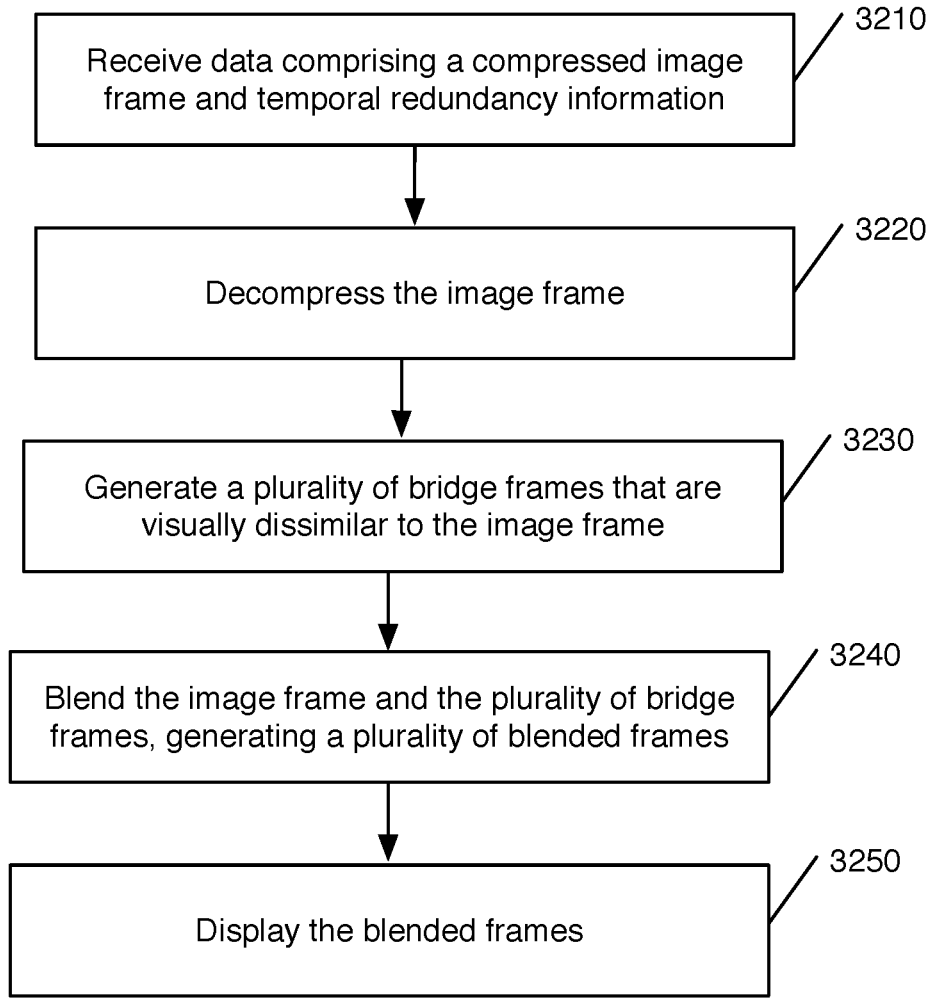
FIG. 32 is a flowchart of a method of decompressing and displaying one or more image frames in accordance with an embodiment.

FIG. 32 is a flowchart of a method of decompressing and displaying one or more image frames in accordance with an embodiment. In an illustrative embodiment, a compressed video file 2500 is stored in storage 3140. Compressed video file 2500 may be generated by video display manager 3100 or, alternatively, received from another device or via a network such as the Internet.

At step 3210, data comprising a compressed image frame and temporal redundancy information is received. In the illustrative embodiment, processor 3110 retrieves compressed video file 2500 from storage 3140.

At step 3220, the image frame is decompressed. Decompression module 3120 decompresses compressed video file 2500, generating a video image frame. FIG. 33 shows an image frame 3350 showing a man against a background of clouds and sky.

At step 3230, a plurality of bridge frames that are visually dissimilar to the image frame are generated. Bridge frame generator 3130 generates two or more bridge frames that are dissimilar from image frame 3350. FIGS. 34A and 34B show two bridge frames 3410 and 3420 that may be generated. In the illustrative embodiment, bridge frame 3410 has a first pattern and a bridge frame 3420 has a second pattern that is complementary to the first pattern of bridge frame 3410.

In other embodiments, bridge frames may be retrieved from a storage.

Figure 35A:
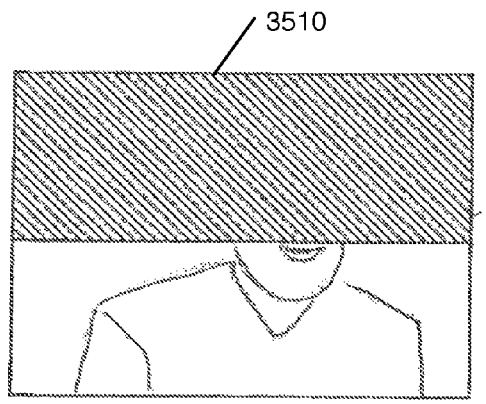
FIGS. 35A-35B show respective blended frames in accordance with an embodiment.
Figure 35B:
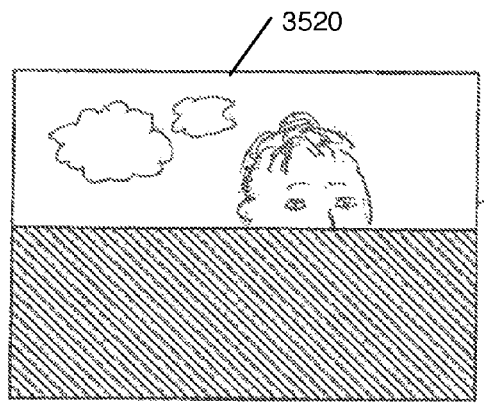

At step 3240, the image frame and the plurality of bridge frames are blended, generating a plurality of blended frames. In the illustrative embodiment, frame display module 3150 blends image frame 3350 and bridge frame 3410 to generate blended frame 3510, shown in FIG. 35A. Frame display module 3150 also blends image frame 3350 and bridge frame 3420 to generate blended frame 3520, shown in FIG. 35B.

Figure 35C:
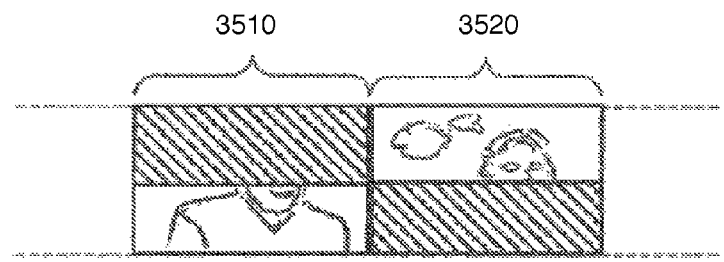
FIG. 35C shows a pattern comprising a plurality of blended frames in accordance with an embodiment.

At step 3250, the plurality of blended frames are displayed. Frame display module 3150 now displays blended frames 3510 and 3520 in a manner similar to that described above. For example, blended frames 3510 and 3520 may be displayed in accordance with a predetermined pattern, for example. In an embodiment illustrated in FIG. 35C, blended frames 3510, 3520 consecutively in a predetermined pattern.

In other embodiments, blended frames 3510 may be displayed in a pattern that includes a plurality of blended frames and image frame 3350, or in a pattern that includes other bridge frames.

Figure 35D:
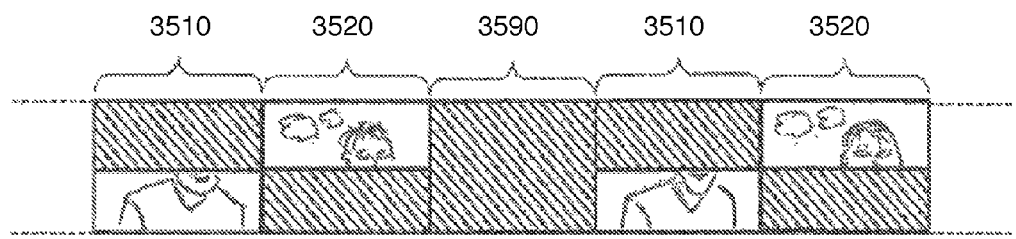
FIG. 35D shows a predetermined pattern that includes repetition of a second pattern that comprises a plurality of blended frames in accordance with an embodiment.

In accordance with another embodiment, a plurality of blended frames may be displayed in accordance with a predetermined pattern that includes a first pattern comprising the plurality of blended frames, and a second pattern that includes repetition of the first pattern. In an embodiment illustrated in FIG. 35D, blended frames 3510 and 3520 are displayed in a repeating pattern that includes blended frame 3510, blended frame 3520, and a bridge frame 3590.

In various embodiments, the method steps described herein, including the method steps described in FIG. 32, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 32, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 36:
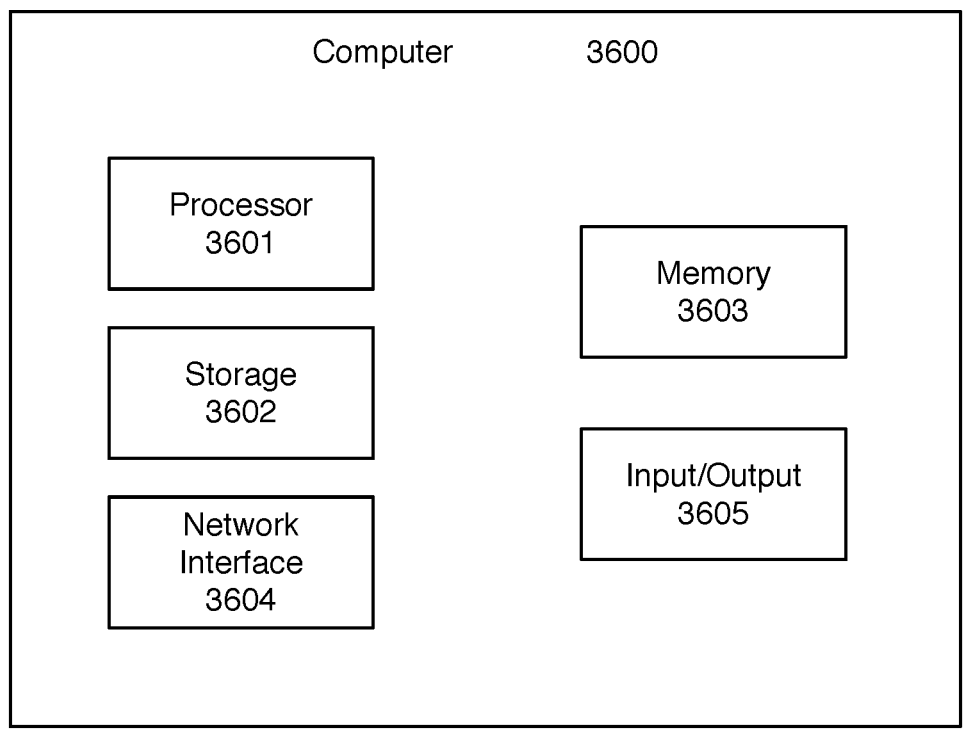
FIG. 36 is a high-level block diagram of an exemplary computer that may be used to implement certain embodiments.

A high-level block diagram of an exemplary computer that may be used to implement systems, apparatus and methods described herein is illustrated in FIG. 36. Computer 3600 includes a processor 3601 operatively coupled to a data storage device 3602 and a memory 3603. Processor 3601 controls the overall operation of computer 3600 by executing computer program instructions that define such operations. The computer program instructions may be stored in data storage device 3602, or other computer readable medium, and loaded into memory 3603 when execution of the computer program instructions is desired. Thus, the method steps of FIG. 32 can be defined by the computer program instructions stored in memory 3603 and/or data storage device 3602 and controlled by the processor 3601 executing the computer program instructions. For example, the computer program instructions can be implemented as computer executable code programmed by one skilled in the art to perform an algorithm defined by the method steps of FIG. 32. Accordingly, by executing the computer program instructions, the processor 3601 executes an algorithm defined by the method steps of FIG. 32. Computer 3600 also includes one or more network interfaces 3604 for communicating with other devices via a network. Computer 3600 also includes one or more input/output devices 3605 that enable user interaction with computer 3600 (e.g., display, keyboard, mouse, speakers, buttons, etc.).

Processor 3601 may include both general and special purpose microprocessors, and may be the sole processor or one of multiple processors of computer 3600. Processor 3601 may include one or more central processing units (CPUs), for example. Processor 3601, data storage device 3602, and/or memory 3603 may include, be supplemented by, or incorporated in, one or more application-specific integrated circuits (ASICs) and/or one or more field programmable gate arrays (FPGAs).

Data storage device 3602 and memory 3603 each include a tangible non-transitory computer readable storage medium. Data storage device 3602, and memory 3603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 3605 may include peripherals, such as a printer, scanner, display screen, etc. For example, input/output devices 1905 may include a display device such as a cathode ray tube (CRT) or liquid crystal display (LCD) monitor for displaying information to the user, a keyboard, and a pointing device such as a mouse or a trackball by which the user can provide input to computer 3600.

Any or all of the systems and apparatus discussed herein, including video display manager 3100, and components thereof, may be implemented using a computer such as computer 3600.

One skilled in the art will recognize that an implementation of an actual computer or computer system may have other structures and may contain other components as well, and that FIG. 36 is a high-level representation of some of the components of such a computer for illustrative purposes.

Further embodiments are now described. As is apparent from the foregoing, most systems for 3D stereoscopy are dual-image systems; that is the motion picture has a separate right-eye and left-eye image that are directed to the correct eye. Embodiments of the invention are single-image systems; that is the identical image is directed to both eyes of the viewer. All 3Deeps Filter Spectacles have the important advantage over traditional 3D viewing systems that two viewers sitting next to each other can both view the same movie, one in 3D wearing the 3Deeps Filter Spectacles, and the other in 2D not wearing the 3Deeps Filter Spectacles. Hence, we use the terminology introduced above: "instant image" and "lagging image". These images are different from "right-eye image" and "left-eye image", and should not be confused.

In the instant invention both eyes see the same identical image, but the difference in retinal reaction time causes the images to be transmitted to the brain at slightly different times. The image that is transmitted to the brain from the eye covered by the clear lens of the Continuous Adjustable 3Deeps Filter Spectacles is termed the instant image. The image that is transmitted to the brain from the eye that is covered by a neutral density filter lens of the Continuous Adjustable 3Deeps Filter Spectacles is termed the lagging image. The viewer's brain sees the instant image and lagging image as a single eye image that displays 3-D depth characteristics when lateral motion is present. More particularly, Continuous Adjustable 3Deeps Filter Spectacles use a dual optimization of the spectacle apparatus to achieve 3D that optimizes the Pulfrich illusion for the viewer.

A First Optimization

One embodiment of the invention teaches how to use a retinal reaction time curve to calculate an optimal optical density for use in setting the neutral density filter of the Continuous Adjustable 3Deeps Filter Spectacles. More specifically, three teaching methods are presented, including:

a. Computing an optical density for the neutral density filter so the difference in retinal reaction time between the instant image and the lagging image is 2½ inches (the average inter-ocular distance between the right and left eyes) and thereby imparting 3-D depth characteristics to the scene. This embodiment requires as input both direction and speed of motion between frames of a motion picture, and luminance.

b. Computing an optical density for the neutral density filter so the difference in retinal reaction time between the instant image and the lagging image is a constant value and thereby imparting 3-D depth characteristics to the scene. This embodiment only requires luminance as input.

c. Computing an optical density for the neutral density filters so the difference in retinal reaction time between the instant image and the lagging image corresponds to a fixed number of picture frames and thereby imparting 3-D depth characteristics to the scene. This embodiment only requires luminance as input.

Such methods are only exemplary and not exhaustive. Other methods of using the retinal reaction time curve to calculate the optical density of the neutral density filter of the Continuous Adjustable 3Deeps Filter Spectacles may be employed. Similar methods using factors other than direction and speed of motion between frames of a motion picture, and luminance of the frame of the motion picture may also be advantageously used. Each method optimizes to a specific feature and characteristic of Continuous Adjustable 3Deeps Filter Spectacles. The invention further encompasses the use of a photo-detector, such as a photodiode, on the spectacles as an alternate means of estimating luminance for Continuous Adjustable 3Deeps Filter Spectacles.

A Second Optimization

The invention further directs to showing how a controller uses the optimal optical density, and the operating characteristics of the electrochromic material used in the fabrication of the spectacles, to optimize the operation of the Continuous Adjustable 3Deeps Filter Spectacles. More specifically, the invention further directs to showing how the Operating Characteristic curve and the Transition Time curve of the electrochromic material are used to control the neutral density filter lens of the Continuous Adjustable 3Deeps Filter Spectacles.

Other Features

The invention further directs to showing how video format conversion chips, used for real-time image processing in High Definition LCD, Plasma, and Projection TV's, as well as Digital Cinema Projectors can be utilized in calculation of the optical density of the neutral optical filter lens of the Continuous Adjustable 3Deeps Filter Spectacles. While the calculation of the optical density of the neutral density filter may be done in software, it can advantageously be performed using electronic circuitry. The circuitry can (a) be included within the video format conversion chip, (b) be embedded in a separate chip that couples to a video format conversion chip on an IC board and connects directly to the Continuous Adjustable 3Deeps Filter Spectacles, or (c) be embedded in a separate chip that couple to another IC chip that connects to the spectacles.

Also, a general luminance reduction has been used in a dual image systems. No precise continuous luminance control has been disclosed. Furthermore, in such a dual image system embodiment, rather than use the optimal OD value for the Continuous Adjustable 3Deeps Filter Spectacles, the value is used to generate a second frame of a dual image 3D motion picture.

We use the terminology neutral filter (or neutral density filter) to mean a darkened, gray or colored transparent filter. In this invention a neutral filter reduces light by the approximately the same amount for all wavelengths over the visual spectrum. For a neutral density filter with optical density d the amount of optical power transmitted through the filter is given by $10^{-d}$. For reference, a neutral filter with an optical density of 0.3 allows transmission of about 50% of the light; an optical density of 0.6 allows transmission of about 25% of the light, and an optical density of 0.9 allows transmission of about 12.5% of the light.

We also use the term clear to refer to a filter that is much clearer than the neutral filter and seemingly does not block light. However, all filters block the transmission or reduce the passage of light to some extent. For instance, clear glass reduces light by about 1%. By clear then it should be understood we refer to a filter that reduces light less than the neutral density filter. That is all that is required to actuate the Pulfrich illusion.

Throughout the disclosure we use interchangeably the terms 3Deeps Filter Spectacles and Pulfrich Filter Spectacles'—both referring to the earlier spectacles of this invention that allow 2D movies to be viewed with the visual effect of 3 dimensions. The term Continuous Adjustable 3Deeps Filter Spectacles refers to the improved 3Deeps Filter Spectacles that use double optimization to solve problems inherent in earlier 3Deeps Filter Spectacles.

In the embodiments of the invention the direction of motion is used to determine which of the two viewing lenses is clear and which is darkened to a neutral density. If the motion on the screen is determined to be left-to-right then the left lens of the spectacles is clear and the right lens darkened. If the motion on the screen is determined to be right-to-left then the right lens of the spectacles is clear and the left lens darkened. If there is no motion in the scene then both lenses are set to clear.

We may also use the term action directed eye. When the motion on the screen is from left-to-right then the right eye that views the scene through the neutral density filter is the action directed eye. When the motion on the screen is from right-to-left then the left eye that views the scene through the neutral density filter is the action directed eye.

Pulfrich 3-Dimensional Illusion

Pulfrich was a physicist that recognized that an image that travels through a dark lens or filter takes longer to register with the brain than it does for an image that passes without interruption. The delay is not great—just milliseconds—but enough for a frame of video to arrive and register on the mind one frame later from an eye looking through a dark filter than from an unobstructed eye. Pulfrich spectacles then have one clear lens (or is absent a lens) that does not cause a delay, and one darkened lens that slightly delays the image that arrives to the other eye. In a motion picture viewed through Pulfrich lenses, for an object moving laterally across the screen, one eye sees the current frame and the other eye sees a previous frame.

The clear lens may block some light. Even clear glass blocks some light. What is important and necessary for the invention to show passages of a 2D motion picture in 3D is that the clear lens be clearer than the other darkened lens and not diminish as much light as the darkened lens. The invention will produce a 3D effect as long as the clear light diminishing lens diminishes less light than the darkened light diminishing lens.

As with normal two-eye parallel viewing, the disparity between the two images is perceived as depth information. The faster a screen-object moves in contrast to its background, the more separation there is between the instant image and the lagging image, and the closer or further the object appears according to the eye being intercepted by the dark filter (closer if on the side to which the object is moving). The fact that faster objects can appear closer than slower objects also coincides with the principles of motion parallax. Generally, however, the greater displacements frame to frame (and now eye to eye) result from degrees of closeness to the recording camera (proximity magnifies), so that Pulfrich viewing can deliver an approximately correct and familiar depth likeness. While the depth likeness is unquestionably 3-D, it may differ from the fixed constant of an individual's inter-ocular distance when observing the world directly. Few observers will notice this anymore than they are bothered by the spatial changes resulting from use of telephoto or wide-angle lens in filming scenes.

Motion pictures made for the Pulfrich method can be viewed without any special glasses—appearing as regular motion pictures minus the 3-D effect. Also, motion pictures made without regard for the Pulfrich effect, will still show the 3-D visual effect if lenses are worn and appropriately configured.

The limitation of the Pulfrich technique is that the 3-dimensional illusion works only for objects moving horizontally or laterally across the screen. Motion pictures made to take advantage of these glasses contain lots of horizontal tracking shots or lateral picture-subject motion to create the effect. The illusion does not work if the camera doesn't shift location while subject matter remains static, but vertical camera movement will create horizontal movement as the field of view expands or contracts. Pulfrich, who first described this illusion, was blind in one eye, and was never able to view the illusion, though he accurately predicted and described it.

The 3-dimensional visual effect is produced by the 3Deeps System regardless of whether the motion picture was shot on regular or digital film; regardless of whether the presentation media is film, digital film, VCR tape, or DVD, and; regardless of whether the motion picture is viewed in the movie theater, home TV, Cable TV, iPod or PDA, or on a computer monitor.

A basic example of the Pulfrich illusion can be seen by viewing either of two TV stations. The news headlines on the CNN Television network or the stock market quotations on CNBC scroll in from the right of the TV screen and across and off the screen to the left. The news or quotations appear in a small band across the bottom of the screen while the network show appears above the scrolling information. When either of these network stations is viewed through Pulfrich glasses, with the darkened lens covering the left eye and the clear lens covering the right eye, the scrolling information appears in vivid 3-dimensions appearing to be in front of the TV screen. If the lenses are reversed with the clear lens covering the left eye and the darkened lens covering the right eye, the scrolling information appears to the viewer as receded, and behind the TV screen.

Another example of the Pulfrich illusion can be seen in the movie The Terminator, starring Arnold Schwarzenegger. Any off-the-shelf copy of the movie—VCR tape, or DVD—can be viewed on a TV or PC playback display monitor as originally intended by the filmmaker. But, viewing scenes that include lateral motion from The Terminator, such as the scene when Sarah Connors enters a bar to call police (about 29 minutes into the movie) when viewed through Pulfrich glasses (left eye clear lens and right eye dark lens) shows the scene vividly in 3-dimensions, even though this visual effect was totally unanticipated by the director and cinematographer.

Another stunning example is the famous railroad yard scene from "Gone with the Wind", in which Scarlett O'Hara played by Vivien Leigh walks across the screen from the right as the camera slowly pulls back to show the uncountable wounded and dying confederate soldiers. When viewed through Pulfrich glasses (with left eye clear lens and right eye dark lens), the scene appears to the user in 3-dimensions, even thought it was totally unintended by the director and cinematographer. Interesting here is that the main movement of this scene was created by the camera lifting and receding and so expanding the view. Effective lateral motion resulting from such camera movement would in fact be to only one side of the screen, which the viewers will utilize to interpret the entire scene as in depth.

The Continuous Adjustable 3Deeps system will allow any movie, such as "Gone with the Wind" which was shot in 1939, to be viewed in part in 3-dimensions. And with the Continuous Adjustable 3Deeps system this new viewing experience does not require any additional effort on the part of the owners, producers, distributors, or projectionists of the motion picture—just that the viewer don the 3Deeps viewing glasses (also called 3Deeps viewing spectacles).

Note that the Pulfrich 3-D effect will operate when the left or right filtering does not correspond with the direction of foreground screen movement. The depth-impression created is unnatural, a confusion of sold and open space, of forward and rear elements. When confronted by such anomalous depth scenes, most minds will turn off, and not acknowledge the confusion. For normal appearing 3-D, mismatched image darkening and foreground direction must be avoided.

We have described the need to match horizontal direction of foreground screen-movement to Left or Right light-absorbing lens. This, however, is a rule that often has to be judiciously extended and even bent, because all screen-action appropriate to Pulfrich 3-D is not strictly horizontal; horizontal movements that angle up or down, that have a large or even dominant element of the vertical, may still be seen in depth. Even a single moving element in an otherwise static scene can be lifted into relief by way of an adroit application of a corresponding Pulfrich filter. There would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/ Right filter-match at odds with the filter-side that foreground-movement calls for. For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the rule is to be followed, but not mechanically; screen movement is often compound and complex, and an observant individual could arrange a Pulfrich timing for a movie with an alertness to such subtleties that did not limit decisions to recognition of foreground direction alone. As mentioned earlier, there would even be times, when the recording camera had moved either forward or backwards through space, when both Left and Right lenses would half-darken to either side of their centers, outer halves darkening moving forward (with picture elements moving out to both sides from picture-center) or both inner halves darkening when retreating backwards (with picture elements moving in towards center from each side).

One of the advantages of optical density Continuous Adjustable 3Deeps Filter Spectacles over the 3Deeps Filter Spectacles previously described is that they obviate the necessity of many of the heuristic rules that would govern the operation of the Continuous Adjustable 3Deeps Filter Spectacles. Heuristic rules were used to address the problems of 3Deeps Spectacles in rapidly transitioning the state of the lenses for the viewer. In previous co-pending 3Deeps applications, we had described the use of such heuristics.

For instance, in U.S. Pat. No. 7,405,801 "System and method for Pulfrich Filter Spectacles", heuristic embodiments for 3Deeps Filter Spectacle were described as follows: [Col 23, Line 45] "Other embodiment may have synchronization algorithms that utilize various heuristic rules in determining a synchronization event. For instance, if the viewer lenses responding to rapidly detected changing lateral motion, switch states too rapidly, this may cause undue discomfort to the viewer. Other embodiments may allow the user to override the synchronization signals placed in the motion picture, and require that any single state remain active for a minimum period of time. This may be important for people that are photosensitive—people who are sensitive to flickering or intermittent light stimulation. Photosensitivity is estimated to affect one in four thousand people, and can be triggered by the flicker from a television set. While photosensitive people may simply remove the Pulfrich Filter Spectacles, heuristic rules could be employed to reduce flicker and eliminate any additional photosensitivity from the Pulfrich Filter Spectacles. For instance, such a heuristic rules may implement logic in the synchronization decision rule that require that no change to a synchronization event can take place for a set number of seconds after the last synchronization event—i.e. a lens state must be active for a minimum length of time before a new state may be implemented."

The use of Continuous Adjusting 3Deeps Filter Spectacles as described herein eliminate the need for such heuristic rules since the lenses are now continually changing to conform to an optimal optical density.

The following technologies can be used in the present invention:

Substances that Change Color and Transparency

Objects that change color have been well known for a long time. Animate creatures such as cephalopods (squid) have long been known for their ability to change color seemingly at will, by expanding or retracting chromatophore cells in their body.

There are many different technologies that are used to cause physical materials to change their color and transparency. These may react to heat, light, ultraviolet light, or electronic means to change their state, which in turn affect how they reflect and refract light, or their properties of transparency, or translucency.

For instance, photochromatic lenses automatically darken in sunlight and lighten when indoors, and have been utilized in sunglasses for many years. Some may darken instantaneously, and others have lenses that take several different shades depending upon the intensity of the light presented.

Thermochromatic materials are heat activated, causing the color to change when the activation temperature is reached, and reverse the color change when the area begins to cool. These are used in such products as inks, and strip thermometers.

LEDs (Light Emitting Diodes) are electronic diodes that allow current to flow in one direction and not the other. LEDs have the unique "side effect" of producing light while electricity is flowing through them. Thus they have two states—when electricity flows through them they are on and emit light, or off when no electricity flows through them and they do not emit light.

Phosphors are emissive materials that are used especially in display technologies and that, when exposed to radiation, emits light. Any fluorescent color is really a phosphor. Fluorescent colors absorb invisible ultraviolet light and emit visible light at a characteristic color. In a CRT, phosphor coats the inside of the screen. When the electron beam strikes the phosphor, it makes the screen glow. In a black-and-white screen, there is one phosphor that glows white when struck. In a color screen, there are three phosphors arranged as dots or stripes that emit red, green and blue light. In color screens, there are also three electron beams to illuminate the three different colors together. There are thousands of different phosphors that have been formulated, and that are characterized by their emission color and the length of time emission lasts after they are excited.

Liquid crystals are composed of molecules that tend to be elongated and shaped like a cigar, although scientists have identified a variety of other, highly exotic shapes as well. Because of their elongated shape, under appropriate conditions the molecules can exhibit orientational order, such that all the axes line up in a particular direction. One feature of liquid crystals is that electric current affects them. A particular sort of nematic liquid crystal, called twisted nematics (TN), is naturally twisted. Applying an electric current to these liquid crystals will untwist them to varying degrees, depending on the current's voltage. These crystals react predictably to electric current in such a way as to control light passage.

Still another way to alter the amount of light that passes through a lens is with Polaroid lenses. Polaroids are materials that preferentially transmit light with polarization along one direction that is called the polarization axis of the polaroid. Passing unpolarized light through a polaroid produces transmitted light that is linearly polarized, and reduces the intensity of the light passing through it by about one-half. This reduction in light from a first polaroid does not depend on the filter orientation. Readily available optically active materials are cellophane, clear plastic tableware, and most dextrose sugars (e.g. Karo syrup). Materials that alter the polarization of light transmitted through them are said to be optically active.

If two polaroids are placed immediately adjacent to each other at right angles (crossed) no light is transmitted through the pair. If two similar polaroids immediately adjacent to each other are in complete alignment, then the second polaroid does not further reduce the intensity of light passing through the first lens. Additional reduction of light intensity passing through the first polaroid lens will occur if the two similar polaroids immediately adjacent to each other are in other then complete or right angle alignment. This can be beneficially used in other embodiments of the invention to more precisely control the intensity of light passing through the 3Deeps spectacles lenses.

Polaroids can be actively controlled by electronic currents, and are used in such products as LCD displays. For example digital watches often use LCD display for the display of time. In such products, there is a light source behind two layers of LCD materials. Electronic current is used to control the polarity of specific areas of the two layers. Any area of the screen for which the two polaroid layers are at right angles to each other will not pass any light—other areas will allow light to pass. In this manner, the alphanumeric information of LCD can be electronically controlled and displayed on an LCD display.

Another technology to control the intensity of light passing through the lenses includes directional filters such as the micro-louver.

In embodiment of this invention, we utilize electrochromics that change transparency when an electronic current is passed through them. In particular, we use a substance that is darkened (allowing some light to pass through) when current is applied across it, but is clearer and transparent and allows more light to pass unhindered when no current is applied to it. In other embodiments of the invention, other substances and technologies could be used that allow the lenses to change their color, or their properties of transparency or translucency.

Algorithms to Detect Movement in Motion Pictures

Early motion detectors were entirely analog in nature but completely suitable to monitor situations where no motion is to be expected, such as restricted areas in museums, and stores when they are closed for the evening. Recent advances in digital photography and computers have allowed new means to monitor such situations, and incorporate digital video systems that can passively record images at set time intervals (e.g. 15 frames per second), computer processors to process the image and detect motion, and cause appropriate action to be taken if motion is detected.

Many different algorithms have been developed for computer processing of images that can be used to determine the presence of lateral movement in a motion picture, as well as identifying the direction of lateral motion. In the future new algorithms will continue to be developed. Any algorithm that can process sequences of digital images, and detect motion and the direction of motion can be used in the invention.

Out of necessity, algorithms to detect movement in a motion picture have had to be developed. The problem is that movies for TV, cine, digital cameras, etc. use many different formats. To show these different formats with the highest quality possible in a home or movie theater venue requires that the problem of format conversion between the input format and the output screen format be deftly handled to optimize the quality of the viewing. Detailed descriptions of the problem and various digital image processing solutions can be found in the magazine articles Electronic Design Strategy News articles by Brian Dipert, "Video improvements obviate big bit streams", Mar. 15, 2001, pp 83-102 and Electronic Design Strategy News, article by Brian Dipert, "Video quality: a hands-on view, Jun. 7, 2001, pp 83-96". A simplified example will however help to explain the problem and the approaches take to a solution.

Consider an input signal to a TV which is 30 frames per second (analog TV) but that is being output and shown on a high-end digital LCD TV running at 120 frames per second. Showing a TV input signal of 30 fps at an output of 120 fps is an example of a format conversion problem. One simple way to address this problem of format conversion is to simply add 3 exact copies of each frame to the output stream. That works if there is no motion, but if a screen object exhibits any motion between frames then the 3 new frames have the moving object in the wrong place. If this solution is used, then the better and more expensive the digital TV, the worse this problem appears to the viewer. So digital TVs incorporate format conversion image processing, generally implemented as format-conversion chips that perform complex frame-to-frame image processing and track speed and direction of motion and then use that information to better construct the 3 new frames.

At least two different approaches are taken to detect and quantify motion between frames of a moving picture. They include edge-based algorithms and region-based algorithms. Any algorithm that quantifies motion between frames of a motion picture can be used with the algorithms of the preferred and alternate embodiments to set the optimal optical density of the neutral density filter of 3Deeps Filter Spectacles.

Edge-based algorithms have been used in digital cameras as part of the means to implement functions such as auto-focus. Edge-based algorithms utilize information that can be calculated from the discontinuities between adjoining pixels of the digitized image. For instance, consider a person standing against a light background. The edge pixels of the person can be clearly identified because of the sudden change in pixel value. Edge-based algorithms generally identify such intensity edges in the image, eliminate all other pixels (for instance by changing them from their recorded value to white), and then process the image based solely on the identified intensity edges.

The MELZONIC chip from Philips is one example of a region-based algorithm. The Philips MELZONIC chip uses a technique for motion estimation, which they call 3-D Recursive Search Block-Matching. By analyzing two successive TV fields to locate blocks of pixels in the second field that match blocks in the first, 3-D Recursive Search Block-Matching is able to assign a velocity vector to each block of pixels in the first field. These velocity vectors can then be used to interpolate the correct spatial position of each pixel block in a new field that is positioned temporally between the two original fields—i.e. to create new movement phases.

The Philips MELZONIC chip, or the methods, systems and apparatus in the previously described US patents of Iue (U.S. Pat. No. 5,717,415), Nagaya (U.S. Pat. No. 5,721,692), or De Haan (U.S. Pat. No. 6,385,245), or in other inventions or algorithms for motion object detection, may be incorporated in embodiments of the 3Deeps System as a means control the optical density of the neutral density filter of the 3Deeps Filter Spectacles.

One might think that alternating between the screen-flatness of a dialogue scene and the deep space of an action scene would disrupt the flow of a story. In fact, just as accompanying movie-music can be intermittent while entirely supporting a story development, dialogue is best attended to with the screen flat and action-spectacle is most effective given the dimension and enhanced clarity of depth. Usually a function of lighting specialists, it is always necessary to make objects and spaces on a flat screen appear distinct from each other; besides making a scene more convincing, 3-D separation of forms and of spatial volumes one from the other speeds up the "reading" of what are essentially spatial events. This is to say: flat can best enable concentration on dialogue; depth-dimension can most effectively deliver action scenes. Alternating between 2-D and 3-D awareness is something we even do, to a degree, in our experience of actuality, as a function of our changing concentration of attention; just as we hear things differently when we concentrate on listening. Then, too, making sense of movies is a thing we learn to do, as different from life-experience as a movie is with its sudden close-ups and change of angle and of scene, its flashbacks, et cetera. Movie viewing is a learned language, a form of thinking; the alternating of flat-screen information with depth-information will be as readily adapted to as any other real-world-impossibility accepted without question as natural to the screen.

Synchronization and Control

The preferred embodiment of the Continuous Adjustable 3Deeps system makes use of signals to synchronize the lens filters of the viewing spectacles to the lateral motion in the motion picture, and thus control the 3-dimensional visual effect for the viewer. The signals are developed in real-time, and does not require any alteration to the motion picture, or that any control information is placed in the motion picture. The information that is calculated is used to determine synchronization events that are used to control the state of darkening individually of the left and right lenses of the Continuous Adjustable 3Deeps system.

Motion pictures have benefited from other types of synchronization and control information that is placed within the frames of motion pictures. However, these are characteristically different than the synchronization and control used in this invention.

In many motion pictures, to alert the movie theater projectionist that it is time to change reels, movie producers would place visible control information, in the form of a white circle appearing in the upper right upper hand corner of successive frames of the movie. When the projectionist sees this information, they know that it is time to start a second projector that has the next reel of the movie, and thus maintain an uninterrupted motion picture presentation.

Another means of communicating control information in motion picture frames is with the clapper slate board that indicates the start of a new scene when filming a motion picture. When filming motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers (SMPTE) code, usually in large red light emitting diode numerals. The SMPTE code displayed is then used to electronically synchronize the video recording with a separate audio recording.

These types of synchronization and control information solve problems related to the synchronization of sound with filmed action during the production and editing of motion pictures, and related to changing reels of film during the presentation of motion pictures.

Overview

Figure 37:
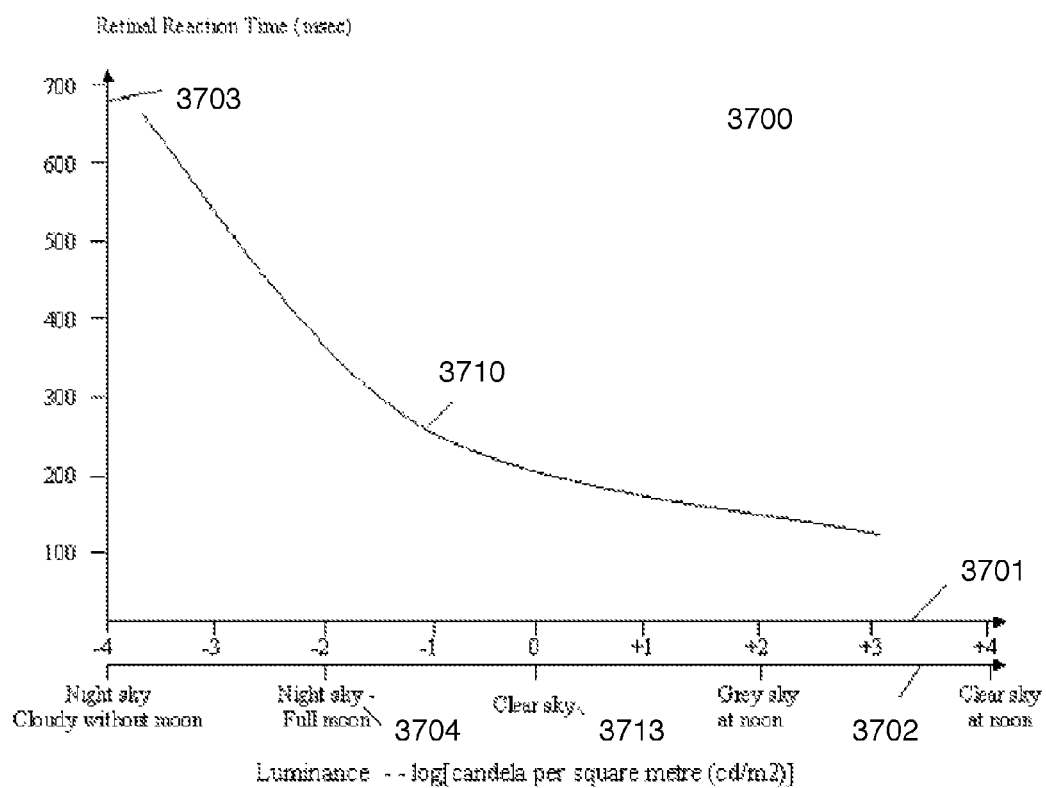
FIG. 37 shows a typical curve of retinal reaction time as a function of luminosity.

As described above, FIG. 1 is a perspective view of an embodiment of the Continuous Adjustable 3Deeps Filter Spectacles that are the ocular mechanism through which 2D movies may be viewed as 3D. FIG. 37 shows a typical curve of retinal reaction time as a function of luminosity. In FIG. 37 and FIG. 38A-38C, we will explain the working of the Pulfrich illusion that occurs when viewing with one eye through a filtered lens and the other eye unobstructed or through a clear or unfiltered lens. The image seen through the clear lens is termed the instant image and the image seen through the darker lens is termed the lagging image. While previous related co-pending applications have taught this well-known illusion, we re-explain it in terms of a general retinal reaction time curve. Fully understanding the retinal reaction time curve is key to understanding how the instant invention uses this relationship to select optimal values for the optical density of the neutral density filter.

As previously described, the terminology instant image and lagging image of the disclosed invention should not be confused with left-eye image and right-eye image of other 3D systems. Dual image systems have separate right-eye and left-eye images that are directed to the appropriate eye. The present invention is a single-image system so that the right-eye and the left-eye always view the identical image. The eye however transmits delayed images to the brain that are termed the instant image and the lagging image and are organized by the brain as the eye image. Thus, the present single-image invention works with any motion picture ever made, while most 3D systems must have specially prepared, produced, processed and displayed dual image motion pictures. Additionally, a viewer cannot watch a dual-image 3D system such as Anaglyph, IMAX or Polaroid, or shutter-glass system with Continuous Adjustable 3Deeps Filter Spectacles. Similarly a viewer cannot watch a regular movie with the special viewing spectacles used with dual-image 3D systems such as Anaglyph, IMAX or Polaroid, or shutter-glass and view the movie 3D.

Figure 39:
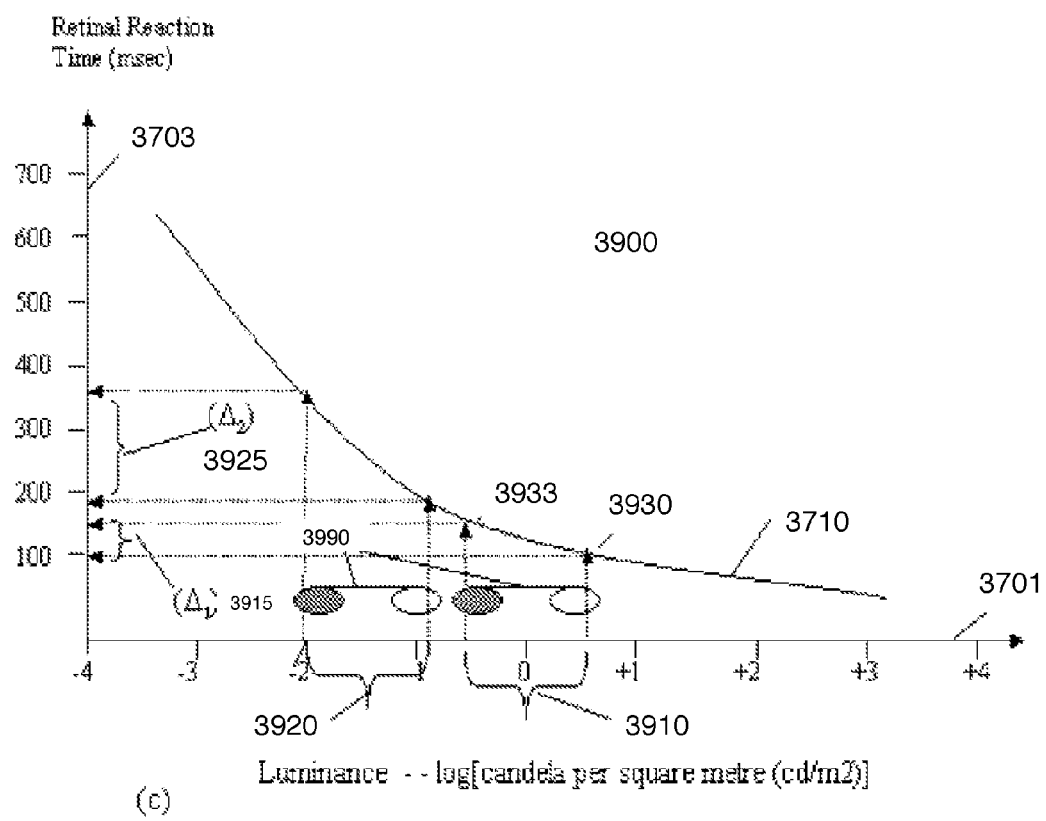
FIG. 39 uses the typical curve of retinal reaction time as a function of luminosity to explain the operation of cardboard Pulfrich Filter spectacles with fixed lenses.

In FIG. 39 we use the retinal reaction time curve to explain the working of cardboard Pulfrich spectacles. Cardboard Pulfrich Spectacles have been used for many years prior to the invention of 3Deeps Filter Spectacles (and are sometimes also called TV spectacles). We explain the shortcomings and problems of the cardboard spectacle approach. The current invention overcomes most of the problems and shortcomings of the cardboard spectacles.

Figure 40:
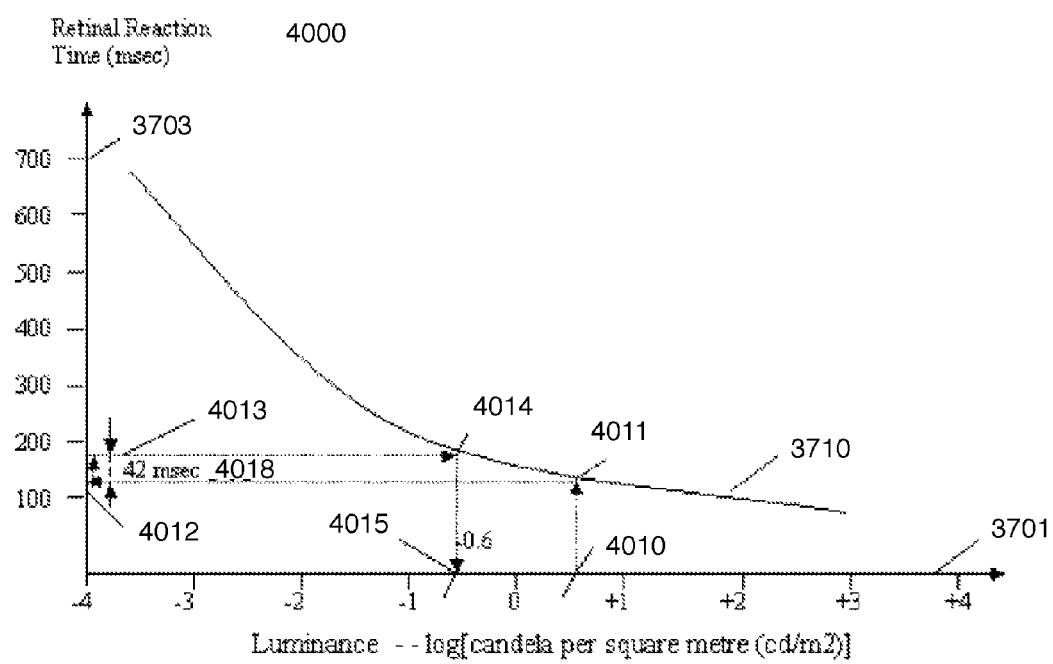
FIG. 40 uses the typical curve of retinal reaction time as a function of luminosity to demonstrate how to compute from a motion vector and luminosity the optimal optical density for the neutral density lens of the preferred embodiment of the Continuous Adjustable 3Deeps Filter Spectacles so that the difference in retinal reaction time between the viewer's eyes results in instant and lagging images that correspond to a separation on the display monitor of exactly 2½ inches.
Figure 42:
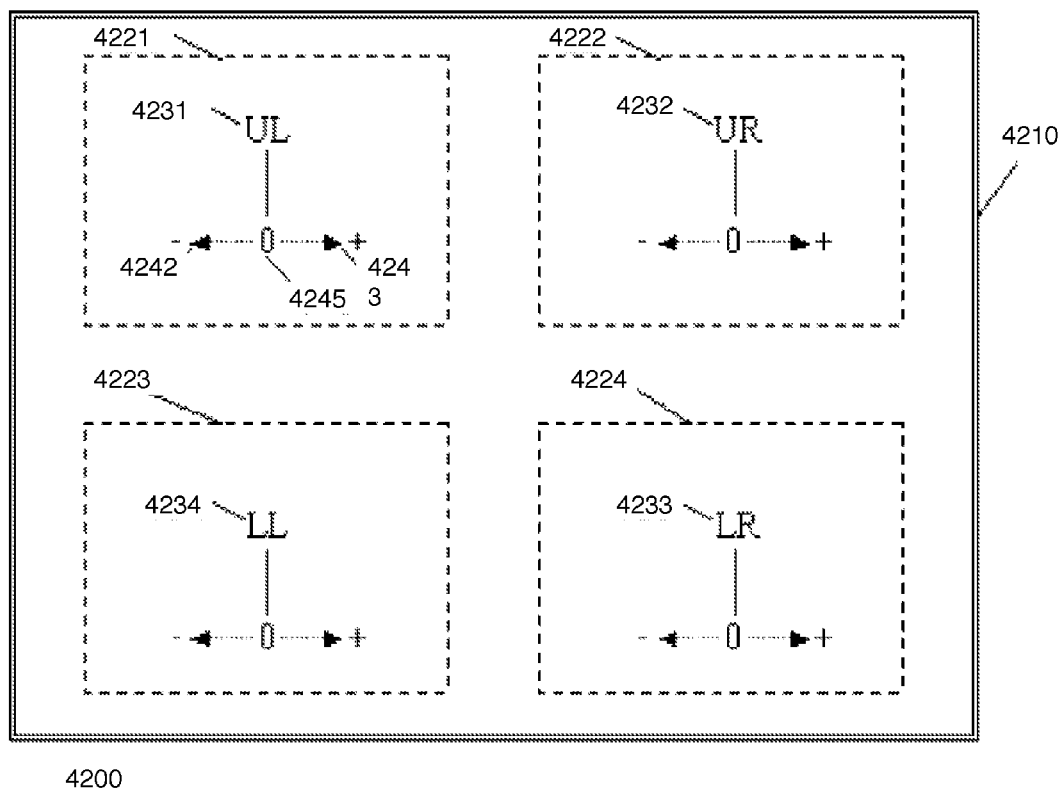
FIG. 42 is an illustration of an alternate algorithm to characterize lateral motion in a motion picture.

In FIG. 40 and FIG. 41 the retinal reaction time curve is used to explain how to calculate an optical density for the controllable neutral density filter that optimizes the Pulfrich illusion. This preferred embodiment requires as input measures the horizontal speed and direction of lateral motion, and a luminance or brightness measure. Since the average inter-ocular distance between a person's eyes is 2.5 inches, this method computes an optical density for the neutral density filter so the lagging image seen through the filtered eye lags the instant image seen through the unfiltered eye by the average inter-ocular distance of 2.5 inches. This method optimizes the depth perception of Continuous Adjusting 3Deeps Filter Spectacles, and overcomes the shortcomings and problems of the cardboard Pulfrich spectacles. FIG. 42 is an illustration of an alternate algorithm to characterize lateral motion in a motion picture.

Figure 43:
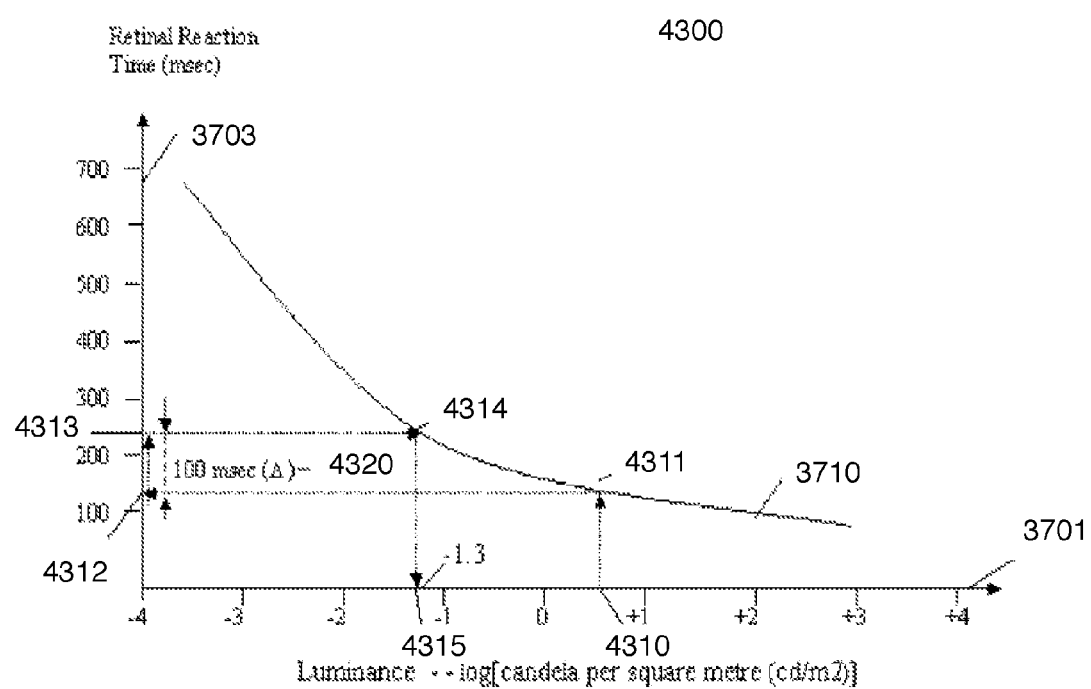
FIG. 43 uses the typical curve of retinal reaction time as a function of luminosity to demonstrate a first alternate embodiment for computing an optimal optical density for the neutral density lens of the Continuous Adjustable 3Deeps Filter Spectacles so that the difference in retinal reaction time between the viewer's eyes is a constant value.
Figure 44:
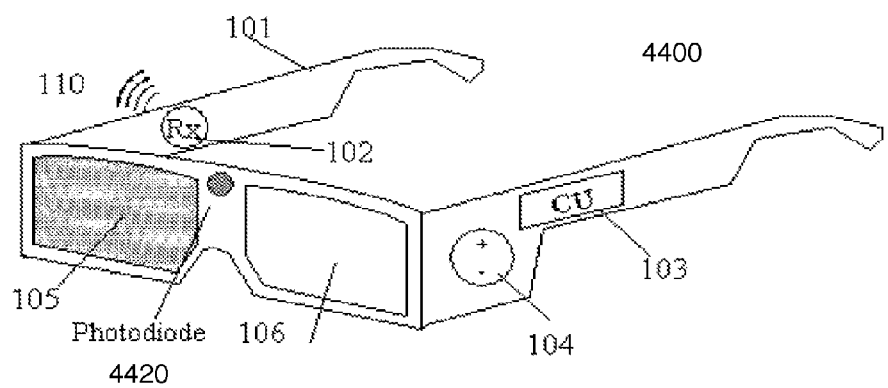
FIG. 44 shows Continuous Adjustable 3Deeps Filter Spectacles that include a photo-detector.

In FIG. 43 we use the retinal reaction time curve to show a first alternate method to calculate an optical density for the controllable neutral density filter. This method only requires that we know the direction of lateral motion and luminance value—but not the speed of motion. This approach sets the optical density of the neutral density lenses at a value so the difference in retinal reaction time is constant even as luminance changes. This method also overcomes shortcomings and problems of the cardboard Pulfrich spectacles. In FIG. 44 we show how this method operates when incorporated with a photo-detector that is included directly into the Continuous Adjusting 3Deeps Filter Spectacles.

Figure 45:
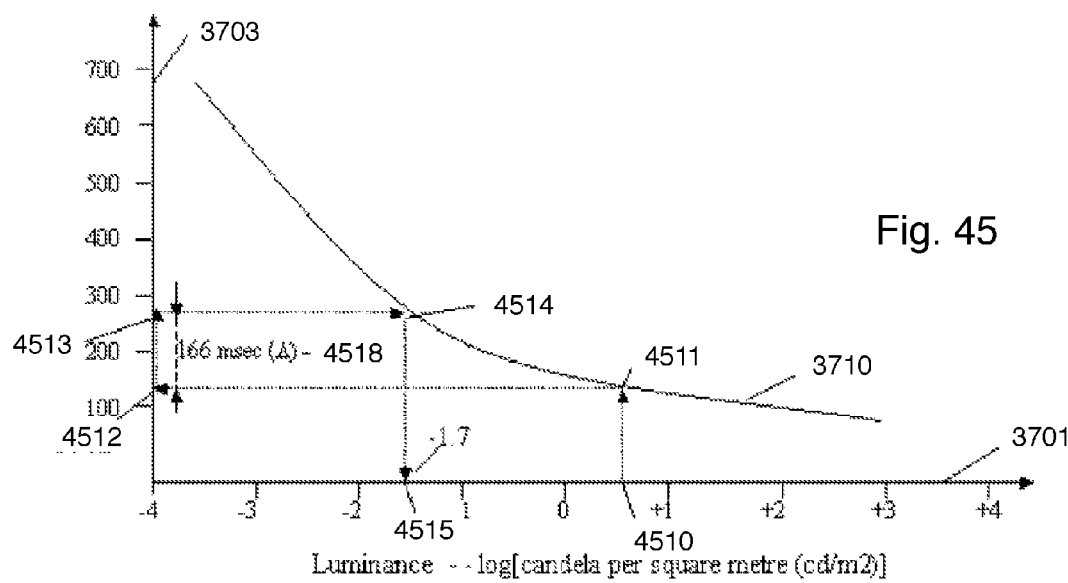
FIG. 45 uses the typical curve of retinal reaction time as a function of luminosity to demonstrate a second alternate embodiment for computing an optimal optical density for the neutral density lens of the Continuous Adjustable 3Deeps Filter Spectacles so that the difference in retinal reaction time between the viewer's eyes corresponds to a fixed number of frames of the motion picture.

In FIG. 45 we use the retinal reaction time curve to show a second alternate method to calculate an optical density for the controllable neutral density filter. This method only requires that we know the direction of lateral motion and luminance value—not the speed of motion—and using the retinal reaction time curve, selects values so the instant and lagging images are separated by a pre-specified number of frames of the motion picture. This method also overcomes the shortcomings and problems of the cardboard Pulfrich spectacles.

Figure 46:
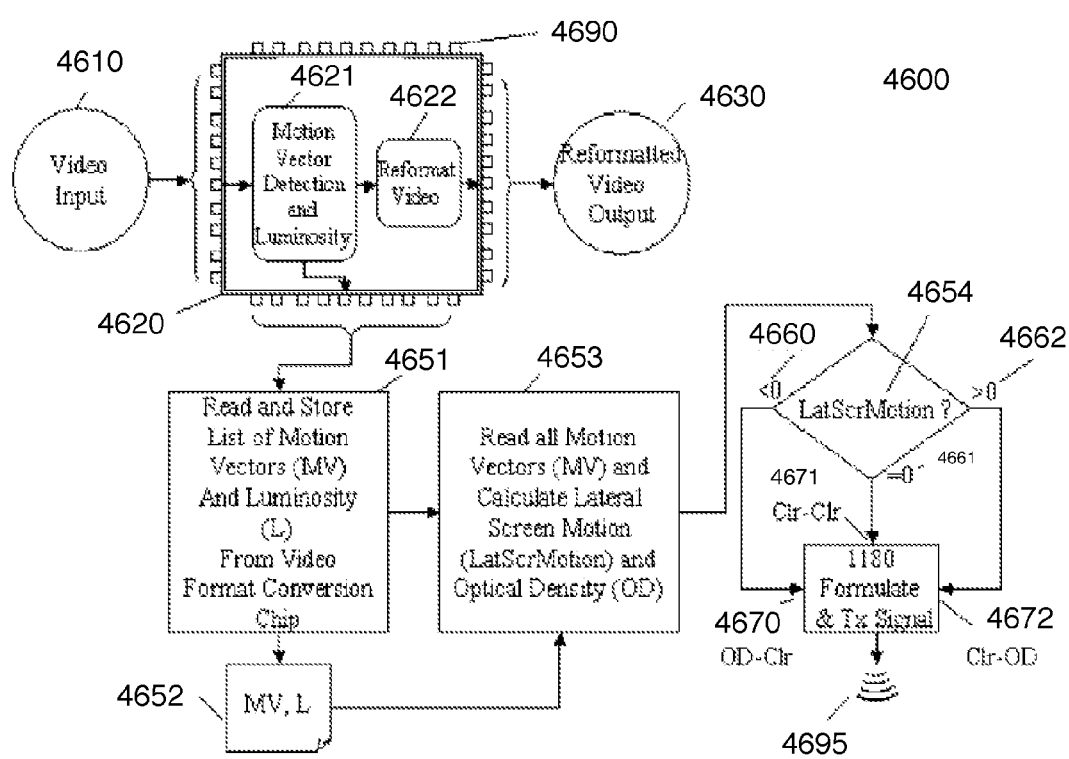
FIG. 46 is a flowchart showing the use of a format conversion semiconductor chip to compute the Continuous Adjustable 3Deeps Filter Spectacles synchronization information.
Figure 47:
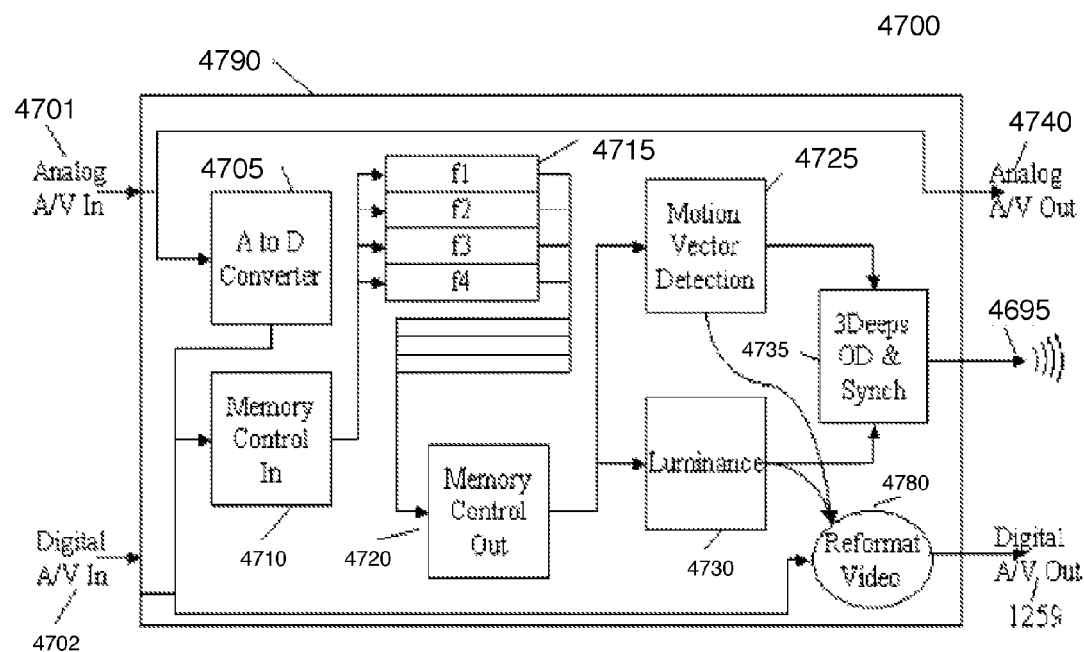
FIG. 47 is a block diagram showing the operation of the Video and 3Deeps processing used to calculate the optimal optical density of the neutral density filter in the preferred embodiment of the Continuous Adjustable 3Deeps Filter Spectacles.

The video industry has for many decades used Video Format Converters (semiconductor chips, and apparatus such as up-converters) to reformat movies for showing in different venues. FIG. 46 teaches how to incorporate methods of this invention with such video formatters. FIG. 46 is a flowchart of how to incorporate the methods of the invention with such a semi-conductor video format converter chips that is able to report out the detected motion vectors. In method of the invention may also be incorporated directly into the video format conversion chip to calculate control information for the Continuous Adjustable 3Deeps Filter Spectacles. FIG. 47 is a block diagram showing operation of a Video and 3Deeps processing used to calculate the optimal optical density of the neutral density filter in the preferred embodiment of the Continuous Adjustable 3Deeps Filter Spectacles.

Figures 48, 49:
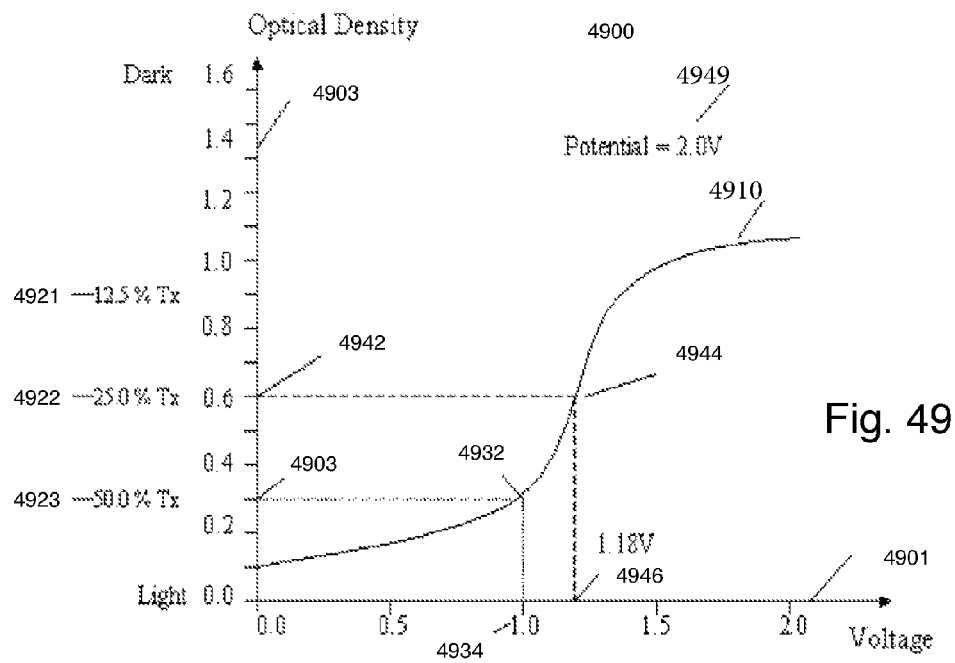
FIG. 48 is a table showing control information for the Continuous Adjustable 3Deeps Filter Spectacles.
FIG. 49 shows a typical operating characteristic curve for an electrochromic material with optical density as a function of voltage.

In FIG. 48-53 we focus on the operation of the Continuous Adjustable 3Deeps Filter Spectacles, and specifically the means by which we optimize the operation of the lenses of the spectacles to the characteristics of the material from which the lenses are fabricated. FIG. 48 is a table showing the control information provided to the Continuous Adjustable 3Deeps Filter Spectacles by the Video and 3Deeps Processing, and referring back to FIG. 3, a block diagram of the operation of the Continuous Adjustable 3Deeps Filter Spectacles is provided.

Figure 50:
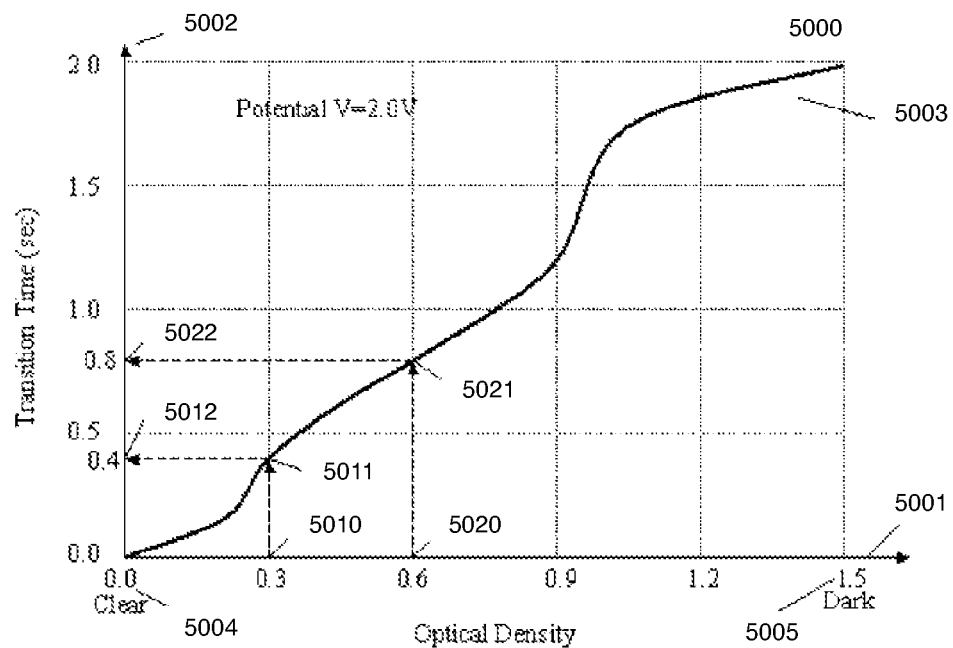
FIG. 50 is a first example of a transition time curve for an electrochromic material with transition time as a function of optical density.
Figure 51:
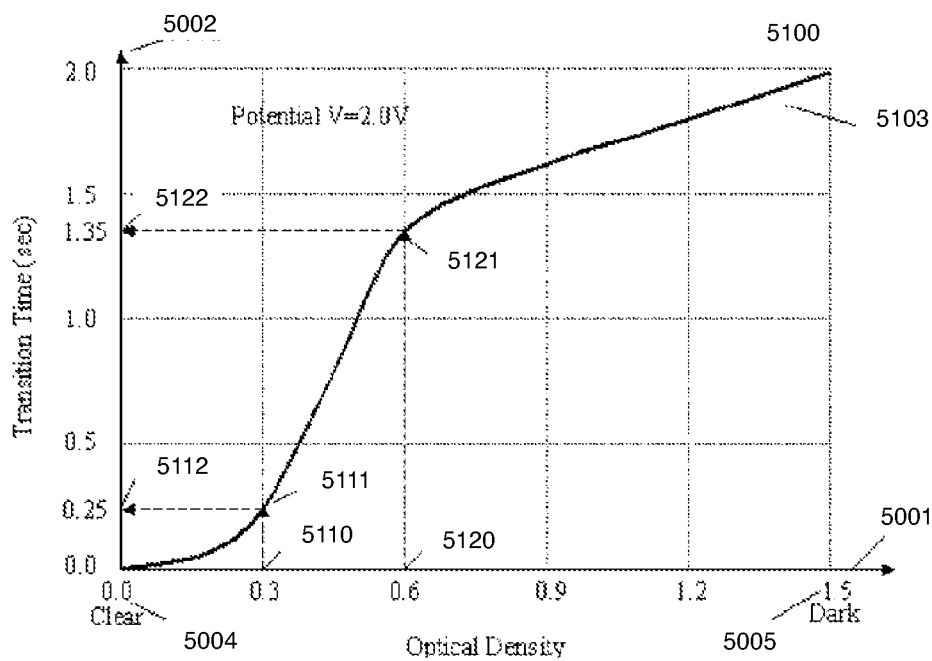
FIG. 51 is a second example of a transition time curve for an electrochromic material with transition time as a function of optical density.

For a typical electrochromic material FIG. 49 provides a typical Operating Characteristic curve (input Voltage and output optical density) for electrochromic material and shows how it is used by the 3Deeps Filter Spectacle to set the optical density of the neutral filter lens. FIG. 50 is a typical transition time curve for an electrochromic material with transition time as a function of optical density and for an electric potential that provides the most rapid change from a lower to higher optical density. FIG. 51 is a typical transition time curve for an electrochromic material with transition time as a function of optical density and for an electric potential that provides the most rapid change from a higher to a lower optical density.

Figure 52:
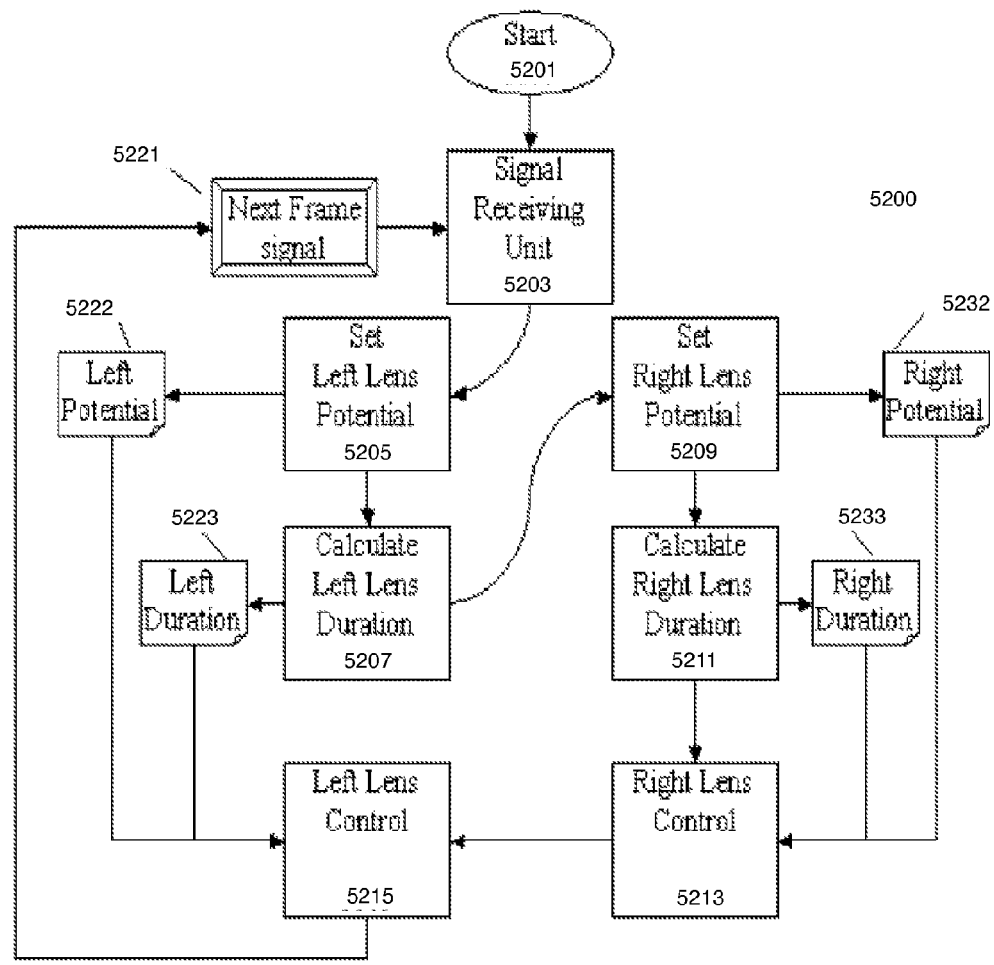
FIG. 52 is a block diagram showing the operation of the control unit of the Continuous Adjustable 3Deeps Filter Spectacles.
Figure 53:
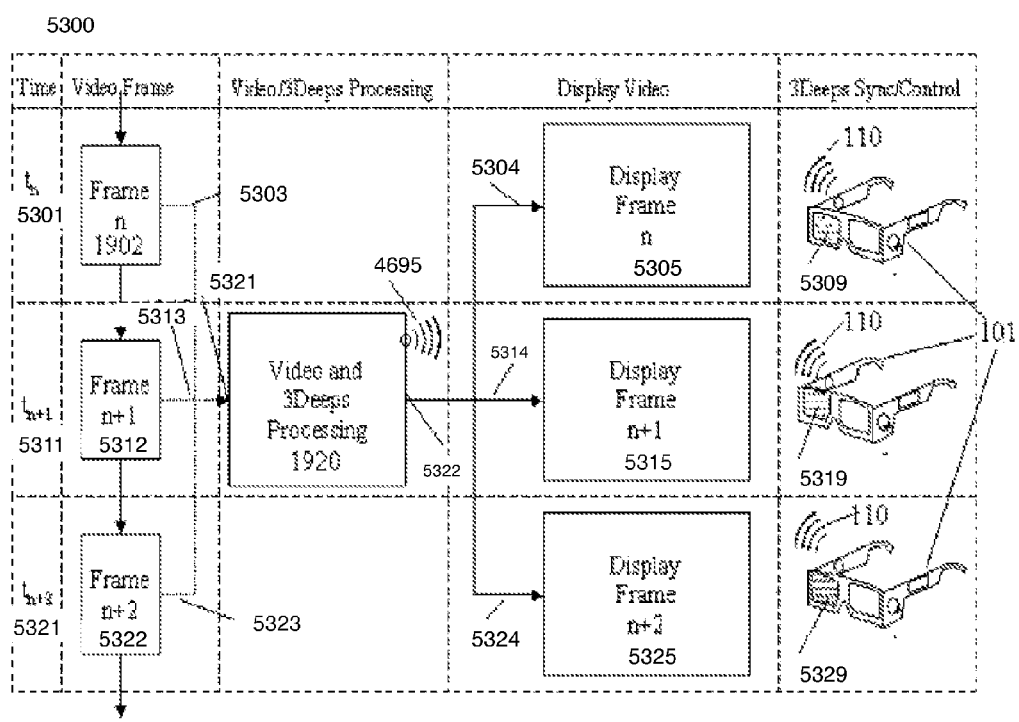
FIG. 53 is a block diagram showing the operation of a typical the Continuous Adjustable 3Deeps Filter Spectacles system.

FIG. 52 is a block diagram showing the operation of the control unit of the Continuous Adjustable 3Deeps Filter Spectacles, and describes how the operating characteristic curve of FIG. 49 and the transition time curves of FIG. 50 and FIG. 51 are used to optimize the operation of the lenses of the Continuous Adjustable 3Deeps Filter Spectacles. FIG. 53 shows the operation of an entire system—a typical Continuous Adjustable 3Deeps Filter Spectacles system—from input of the video frame, through Video and 3Deeps Processing to calculate the optimal optical density, the transmission and reception of the control information, and the operation of the Control Unit of the Continuous Adjustable 3Deeps Filter Spectacles.

Figure 54:
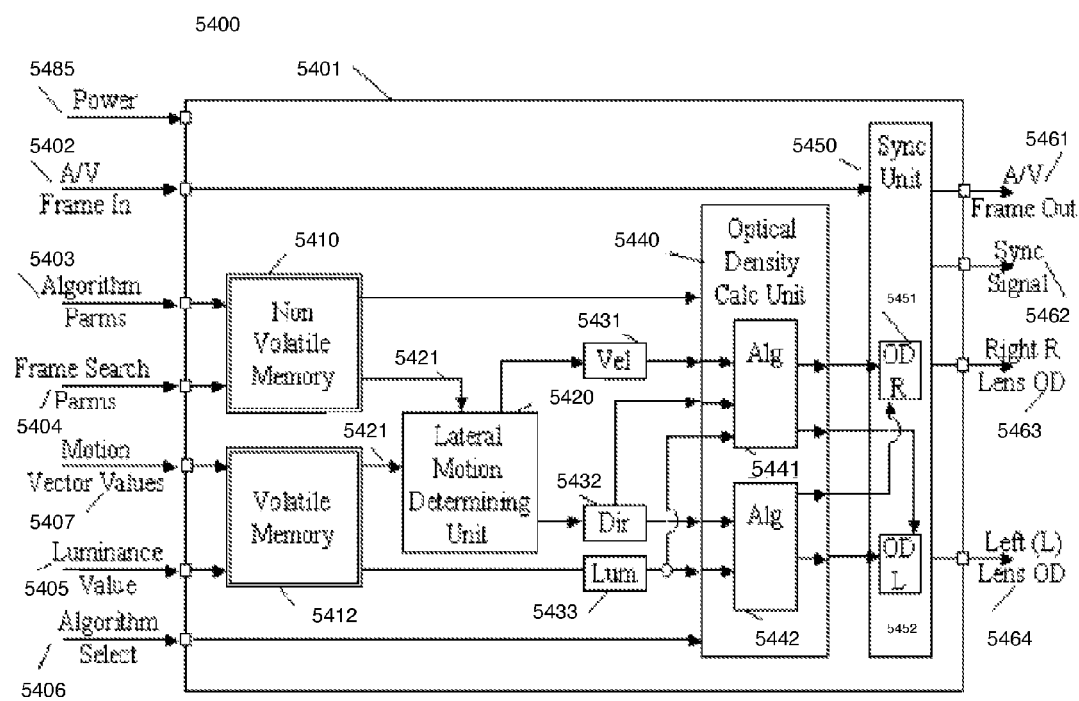
FIG. 54 is a block diagram for a preferred embodiment of an IC Chip generating optimum optical density signals for each individual lens of a Continuous Adjustable 3Deeps Filter Spectacle.
Figure 55:
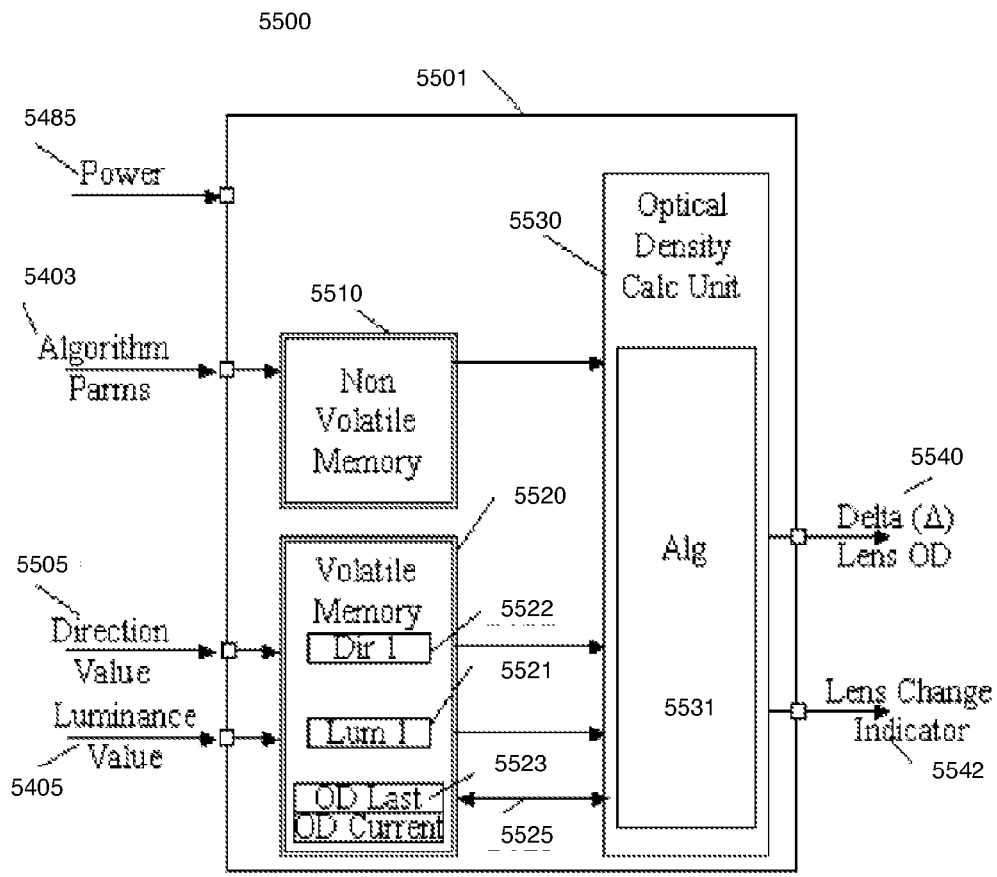
FIG. 55 is a block diagram of an alternate embodiment of an IC chip generating the change in optical density signals for each individual lens of a Continuous Adjustable 3Deeps Filter Spectacle.
Figure 56:
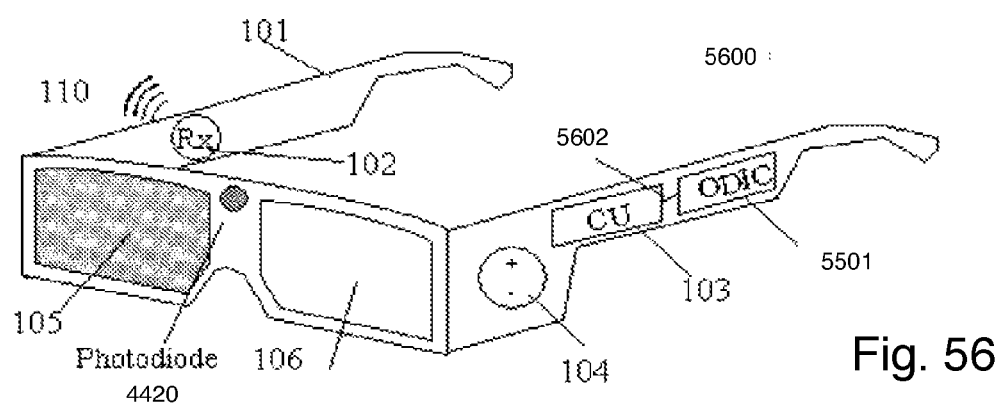
FIG. 56 shows Continuous Adjustable 3Deeps Filter Spectacles that include an IC chip generating the change in optical density signals for each individual lens of a Continuous Adjustable 3Deeps Filter Spectacle.

FIGS. 54-56 shows hardware implementations of algorithms that calculate an optical density for the controllable neutral density filters. FIG. 54 shows an IC implementation selectable for either the algorithm described in FIG. 40 and FIG. 41, or the algorithm described in FIG. 43. The chip may be coupled to a video format conversion chip for input, and for output to the Continuous Adjustable 3Deeps Filter Spectacles, or another chip that outputs to the spectacles. FIG. 55 shows an alternate IC chip embodiment using the algorithm of FIG. 43. In this embodiment only the change in optical density is transmitted to the Control Unit of the Continuous Adjustable 3Deeps Filter Spectacles. While this IC chip may be coupled to a video format conversion chip, FIG. 56 shows how it may be implemented and coupled to the Control Unit of the Continuous Adjustable 3Deeps Filter Spectacles.

Calculating the Optical Optimal Density of Continuous Adjustable 3Deeps Filter Spectacles FIG. 37 shows a typical retinal reaction time curve 3700. While each eye is stimulated by light continuously, there is a time delay till the information is triggered and transmitted to the brain. This time delay occurs when we view fix-eyed (as during movie viewing), and is called the "Retinal Reaction Time". The retinal reaction time is dependent on the amount of light (brightness) that falls on the eye. Luminance is measured in log [candela per square meter (dc/m.sup.2)] as has been presented in FIG. 37 on the abscissa scale 3701. (In studies of perception and psychophysics luminance is often measured in Trolands which is a unit of conventional retinal illuminance, but corrects the measurements of luminance values impinging on the human eye by scaling them by the effective pupil size.)

To aid the reader, we have included a second abscissa scale 3702 in FIG. 37 that translates Luminance into commonly understood terms. For instance a luminance reading of 0 approximates the amount of ambient light from a "clear sky" 3713. Other commonly understood values are also presented including a luminance reading of −2 that approximates the amount of ambient light from a "night sky with a full moon" 204.

The ordinate scale 3703 of the retinal reaction time curve shows in milliseconds the amount of time till the corresponding amount of light triggers and sends the information to the brain. For instance in a clear sky 3713 having a luminance measure of 0, the eye will trigger about every 200 msec and send the image to the brain. A night sky with a full moon 3704 has a luminance measure of −2 and the eye will trigger about every 325 msec and send the image to the brain.

While the retinal reaction mechanisms are independent for each eye, when both eyes are unobstructed the luminance value is the same and they trigger at about the same time. However, if one eye is shaded so the eyes have unequal retinal illuminance, then the two eyes will trigger at different speeds and different times. As explained above, the terminology we use is instant image for the image sent to the brain by an unshaded eye, and lagging image for that image sent to the brain by the shaded eye. Using filters with different optical density shading results in a difference in retinal reaction time. The difference in retinal reaction time between the two eyes is one factor in the commonly accepted explanation for the Pulfrich illusion.

The second factor is simultaneity. The brain will take the two eye images and put them together in a 'simultaneous' fashion to generate the image that we perceive. Thus in normal viewing, if both eyes see the same image without any filtered obstruction, the brain gets two approximately identical 'instant images'. These images only differ by the inter-ocular distance between the eyes (about 2½ inches), and the mind puts these two simultaneous images together to perceive depth. However, if one eye is shaded than the mind will perceive one instant image and one lagging image and put those together simultaneously to perceive depth. These two factors, retinal reaction time, and simultaneity are the two factors that explain Pulfrich illusion.

If the scene being viewed is static with no moving object, then the instant image of the unshaded eye and the lagging image of the shaded eye will still see the same image and the retinal reaction delay and simultaneity factors will not provide any depth information. Thus, the Pulfrich illusion cannot work in the absence of motion. But if the scene being viewed has horizontal motion (also called lateral motion) then the shaded eye will see an image that is lagging the instant image. In this case the lagging image caused by retinal reaction delay of the shaded eye, when juxtaposed with the instant image perceived by the unshaded eye will, through the mechanism of simultaneity, be reconciled by the brain as a perception of depth. This is the Pulfrich illusion. This will be diagrammatically explained in FIGS. 38A-38C.

Note from the typical retinal reaction time curve 3710 the potential of the Pulfrich illusion. Retinal reaction time from the illumination of light from a clear sky at noon (1/10th of a second) is approximately half as long as retinal reaction time from a clear sky (1/5th of a second). On a TV with a 100 Hz refresh rate that is 10 frames. The instant invention uses the retinal reaction time curve to select the optical density of the neutral shaded lens to optimize the Pulfrich illusion.

The retinal reaction time curve 3710 in FIG. 37 is a typical curve provided for teaching purposes and may be further refined in the future. The effect of luminance on retinal reaction time has been extensively studied as in "Simple Reaction Time As A Function Of Luminance", Alfred Lit, et al, in Perception & Psychophysics, 1971, Vol 10(6), p 397. The relationship will differ from person-to-person, and also exhibits variability within the same person as they age, or even exhibit intra-day variation due to factors such as eyestrain, etc. The retinal reaction time curve 3710 exhibits a reciprocal relationship with retinal illuminance, and also has a discontinuity at a retinal illumination of about −1 the threshold at which the cone sensors of the eye turn off and only rod sensors (that do not see color) are operational. For the teaching purposes of this disclosure however, the smooth retinal reaction time curve 3710 of FIG. 37 will be used.

FIG. 37 shows the general relationship 3710 between reaction time (in milliseconds) as a function of luminance. For either eye, the magnitude of the visual latent period is a reciprocal function of the prevailing level of retinal illumination. The figure shows a slow retinal reaction time at low luminance, with retinal reaction time progressively increasing as luminance levels increase. The relationship shown by this figure is used in various embodiments to calculate the optical density of the neutral filter. In the preferred embodiment, this relationship will be used to approximate normal stereoscopic vision by calculating the optical density of the neutral filter to using an average inter-ocular separation between the eyes (about 2½ inches).

Figures 38A, 38B, 38C:
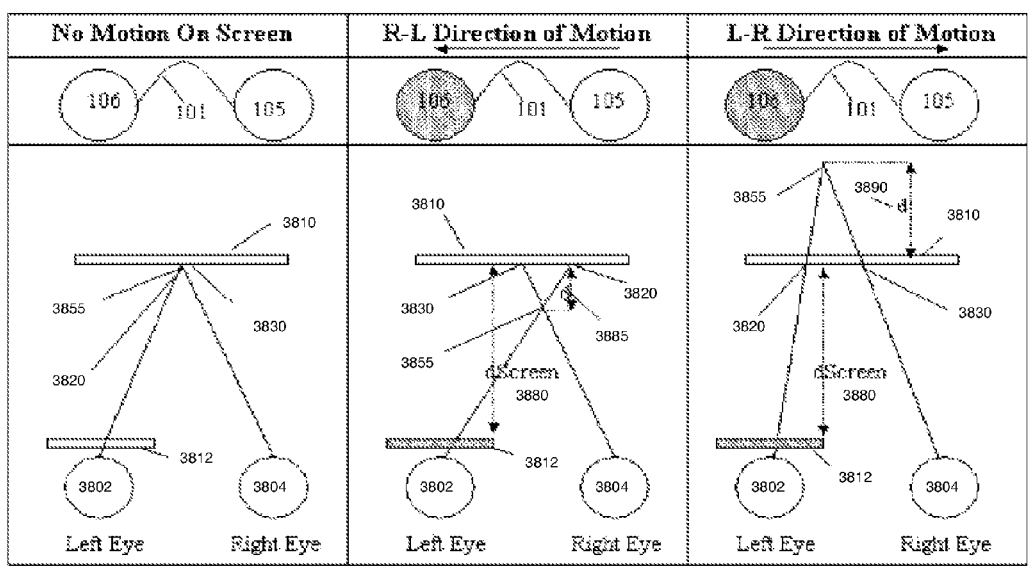
FIG. 38A shows the operation of the Pulfrich illusion when there is no horizontal foreground motion in the motion picture.
FIG. 38B shows the operation of the Pulfrich illusion when the motion picture exhibits horizontal foreground motion from the right to the left.
FIG. 38C shows the operation of the Pulfrich illusion when the motion picture exhibits horizontal foreground motion from the left to the right.

FIGS. 38A-38C show in more detail the geometry 3800 of how the Pulfrich illusion works. The geometry of the Pulfrich illusion has been well described as for instance in "The Magnitude Of The Pulfrich Stereo-Phenomenon As A Function Of Target Velocity", Alfred Lit, Journal of Experimental Psychology, Vol. 59, No 3, 1960. Placing a neutral density filter 3812 over one eye and allowing the other eye to view the motion picture unobstructed actuates the Pulfrich illusion. We again note that with the Pulfrich illusion both eyes view the same single image on a screen 3810. The difference in retinal reaction time allows the eyes to view a single image, but the mind is fooled into thinking it is seeing two different images (the lagged and instant images) when lateral motion is present. Simultaneity allows the mind to put the two images together to get a depth-perceived eye-target image with depth perception.

We stress that the Pulfrich illusion will not work if separate right-eye and left-eye images are presented to the viewer, as is the case with other dual image 3D viewing systems. 3Deeps is incompatible with any dual image 3D system.

FIG. 38A shows the geometry of a viewer wearing 3Deeps Filter Spectacle 101 in which the left eye 3802 has a shaded filter 3812 and the right eye 3804 is unobstructed. At the top of the figure is a schematic showing the spectacles 101 with the left lens shaded 106 and the right lens clear 105. In this figure there is no lateral motion in the motion picture. The right eye 3804 focuses on an object in the motion picture that we call the instant image 3830 in a 2D plane on the screen 3810. Even though the left eye 3802 views through a shaded filter lens 3812 causing a retinal delay, because there is no motion, the left eye 3802 sees a lagging image 3820 that is coincident with the instant image 3830, and the brain simultaneously interprets them as the eye target 3855 in a 2D plane on the screen. In this case no illusion of depth is provided by the Pulfrich illusion.

FIG. 38B shows the geometry of a viewer wearing Continuous Adjustable 3Deeps Filter Spectacle 101 in which the left eye 3802 has a shaded filter 3812, and the right eye 3804 is unobstructed. At the top of the figure is a schematic showing the spectacles 101 with the left lens shaded 106 and the right lens 105 clear. In this figure the direction of lateral motion on the screen is from right-to-left. The right eye 304 focuses on an object in the motion picture that we call the instant image 3830 in a 2D plane on the screen 310. Because the left eye 3802 views through a shaded lens 3812, the retinal delay causes the left eye 3802 to see the image lagging behind the instant image 3830 also called the lagging image 3820. The brain receives the instant image 3830 and the lagging image 3820 and places them together as an eye target 3855 with an illusion of depth in front of the 2D plane of the screen 3810.

In FIG. 38B the distance dScreen 3880 measures the distance between the viewer and the screen, and the distance d 3885 measures the perceived distance of the eye target 3855 away from the screen 3810. The distances d 3885 and dScreen 3880 can be used to provide a measure of the degree of the depth illusion. One measure of the 3D depth effect is d/dScreen as a percentage. For example if d 3885 is ½ foot, and dScreen 3880 is 10 feet, then d/dSceeen is ¹⁄₂₀ and the degree of depth perception is 5%.

With this configuration, if another object in the movie has a frame-to-frame lateral motion from right-to-left that is faster than the instant image than it will lag the instant image even more and appear to the viewer even closer than the eye image. If another object in the movie has a frame-to-frame lateral motion from right-to-left that is slower than the instant image than it will lag the instant image less and appear to the viewer further away than the eye image. This is in complete agreement with how the mind interprets motion parallax as a cue for depth perception.

FIG. 38C shows the geometry of a viewer wearing Continuous Adjustable 3Deeps Filter Spectacle 101 in which the left eye 3802 has a shaded filter 3812, and the right eye 3804 is unobstructed. At the top of the figure is a schematic showing the spectacle with the left lens 106 shaded and the right lens 105 clear. The only difference between FIG. 38C and FIG. 38B is that in this figure the direction of lateral motion on the screen is from left-to-right. The right eye still focuses on an object in the motion picture that we call the instant image 3830 in a 2D plane on the screen 3810 in the same place as in FIG. 38B. Because the left eye 3802 is shaded, the retinal delay causes the left eye 3802 to see the image lagging 3820 behind the instant image 3830. The brain receives the instant image 3830 and the lagging image 3820 and places them together as an eye target 3855 appearing in 3D behind the 2D plane of the screen 3810. The distance dScreen 3880 measures the distance between the viewer and the screen and is shown as the same distance as in FIG. 38B. The distance d 3890 is a negative number since it is behind the screen, and d/dScreen measures the degree of the depth illusion.

The geometry for a viewer wearing Continuous Adjustable 3Deeps Filter Spectacles in which the right eye has a shaded filter and the left eye has a clear filter is similar. If in FIG. 38B the filter had been shown filtering the right eye rather than the left eye, then the right eye would see a lagging image so that the eye image would appear behind the 2D plane of the screen. If in FIG. 3C the filter had been shown filtering the right eye rather than the left eye, then the right eye would see a lagging image so that the eye image would appear in front of the 2D plane of the screen.

In FIG. 39, curve 3900 uses the typical curve 3710 of retinal reaction time 3703 as a function of luminosity 3701 to explain the working of Cardboard Pulfrich Spectacles 3990 with fixed lenses. The standard cardboard Pulfrich spectacle 3990 comes with a clear lens (usually the left eye) and a neutral density lens of fixed optical density (usually covering the right eye). There is no provision to change the lens. The optical densities of the clear and neutral lens filters 3990 are fixed and the only variable is the retinal luminance. Different luminance will occur for instance depending upon the lighting of the viewing venue. One immediate problem is that because the gray filter lens is fixed in the frames and cannot be changed, all motion must be in a single direction—usually from left-to-right. To address this problem, movies viewed through cardboard Pulfrich filters 3990 have been limited to scenes that have either no motion or motion in only a single direction. This problem can be termed the direction of motion constraint.

A second problem is that for a given speed of lateral motion, as the luminosity changes, the amount of depth perception will change. This problem is demonstrated by looking at the retinal reaction curve 3710 in FIG. 39. It shows the difference in retinal reaction time c 3915 and $\Delta_2$ 3925 between the two eyes for two different values of ambient light (unaided eye). With bright ambient light the cardboard Pulfrich spectacles 3990 indicated on the figure by bracket 3910 produce a difference in retinal delay of Ai 3915. Luminance of the clear lens intersects 3930 the retinal reaction curve 3710 and the luminance through the neutral density filter intersects 3933 the retinal reaction curve 3710 to yield a difference 3915 in retinal reaction time of $\Delta_1$. Similarly if the luminance is darker then the difference 3925 in retinal reaction time is a value $\Delta_2$. Darker ambient light indicated on the figure by bracket 3920 produces a difference in retinal delay of $\Delta_2$ 3925 that is significantly greater than $\Delta_1$. This is a function of the relationship between luminance 3701 and retinal reaction time 3703. Increasing luminance results in an increase in the visual latency period. Note that with bright ambient light, the difference ($\Delta_1$) 3915 in retinal reaction time is smaller than the difference ($\Delta_2$) 3925 in retinal reaction time, so the depth illusion is greater in a darker room rather than a lighter room.

A related problem is that as speed of lateral motion changes but for a fixed luminosity, the amount of depth perception will also change. This is unnatural and another problem with cardboard Pulfrich spectacles 3990. A scene should maintain the same amount of depth perception independent of the speed of objects in the scene. To address these problems, movies produced for viewing through cardboard Pulfrich filter 3990 may try to maintain a constant luminosity and speed of motion. That is these problems severely constrain the content of the movie. This can be referred to as oscillating visualization of depth.

Also, since cardboard Pulfrich Spectacles 3990 only has one neutral density filter it is usually very dark resulting in more loss of light than is necessary to actuate the proper 3D depth illusion. This problem can be referred to as over-darkening.

Another problem is that the depth perception will change depending on the lighting of the venue in which the motion picture is shown. In darkened theaters, the perception of depth will be larger than when viewing the movie in a brightly lit home environment, since the difference in retinal delay is greater in a darkened environment than a well-lit environment. This may mean the 3D depth illusion will be attenuated in a dark movie theater and muted in a well-lit home theater. The implication is that the same movie, viewed through cardboard Pulfrich spectacles 3990, will view 3D depth differently depending on the lighting of the venue. This problem can be referred to as a venue-dependency.

One way to illustrate the problem with cardboard Pulfrich spectacles 3990 with a fixed neutral density filter is that as luminance changes the degree of depth perception is also constantly changing and will only rarely and per chance be at the level of normal stereoscopic vision. Note that in FIG. 39 the horizontal lines that give the readings on the retinal reaction time scale all have their arrows pointing towards the scale which is due to the fact that with cardboard Pulfrich spectacles 3990 there is no control over the retinal reaction rime for either eye, and no control for the difference in retinal reaction time between the eyes.

FIG. 40 and FIG. 41 use the retinal reaction time curve 3710 to show how to calculate an optical density for the controllable neutral density filter that optimizes the Pulfrich illusion. The approach that is described solves the problems with the cardboard Pulfrich spectacles 3990, including the direction of motion constraint, oscillating visualization of depth, over-darkening, and venue-dependency problems.

In this embodiment of the invention, the Continuous Adjusting 3Deeps Filter Spectacles are controlled to provide a neutral density filter that has an optical density so that the distance between the lagged image that is seen by the eye obstructed by the neutral filter, and the image seen by the unobstructed image, is 2½ inches. This distance, 2½ inches, is the average distance between a viewer's eyes—also called the inter-ocular distance. That is, the optical density of the neutral filter is chosen dependent on (1) speed of motion on the screen, (2) the luminance reaching the unobstructed eye, and (3) so that the delayed image from the filtered eye appears 2½ inches behind image from the unfiltered eye.

Consider the following—normal stereoscopic vision is obtained by viewing a 3-dimensional world from the vantage point of a left and right eye that are about 2½ inches apart (the average inter-ocular distance). Each eye sees the same image but from the slightly different vantage of eyes that are separated by approximately 2½ inches. To get an optimal 3Deeps stereoscopic depth illusion we turn this around. When viewing a motion picture on a TV or in a movie theater each eye is viewing the exact same image in a 2-dimensional plane of the screen. An optimal Pulfrich illusion will occur via the Pulfrich illusion when the difference in retinal reaction time results in instant and lagging images that appear 2½ inches apart.

This number, 2½ inches, is also used in other 3D viewing systems. Cameras for recording dual-image 3D systems that are viewed using anaglyph spectacles, shutter-glasses, IMAX, or Polaroid spectacles use cameras with lenses that are lashed together to have a separation of 2½ inches between the lenses that record same scene right-eye and 'left-eye images.

Geometrically, in normal stereoscopic vision the eyes, separated by the inter-ocular distance, triangulate on an object. In the preferred embodiment of the invention each eye sees instant and lagging images separated by the inter-ocular distance and the mind triangulates to get a stereoscopic eye image. In the two cases we have the same triangulation and geometry so the 3Deeps visualization is what the mind expects to see. The calculations for this preferred embodiment are shown in FIG. 40. This provides depth perception that is entirely natural.

In FIG. 40, curve 4000 uses the typical curve 3710 of retinal reaction time 3703 as a function of luminosity 3701 to demonstrate how to compute from a motion vector and luminosity the optimal optical density for the neutral density lens of the preferred embodiment of the Continuous Adjustable 3Deeps Filter Spectacles so that the difference in retinal reaction time between the viewer's eyes results in instant and lagging images correspond to a separation on the display monitor of exactly 2½ inches. The figure describes an algorithm $f_{PrefEmb}$(Luminance, LatScrMotion) that has luminance and a motion vector as input (negative value for right-to-left lateral motion and a positive value for left-to-right lateral motion. The algorithm $f_{PrefEmb}$(Luminance, LatScrMotion) is described in more detail in FIG. 41.

First we measure the ambient luminance or brightness 4010. This is the first input parameter. Luminance represents the amount of light that the unaided eye will see through the clear lens. Using the retinal reaction time curve 3710 we can establish the retinal reaction time delay. In our example we have an input luminance measure 4010 of 0.52 cd/m2, that from the retinal reaction time curve 3710 corresponds 4011 to a retinal reaction time delay 4012 of 120 msec. The second input parameter is the speed of lateral motion. For this example we assume a left-to-right lateral screen motion of 100 dots (pixels) per frame. That is the major object on the screen (for example a speeding car) is traveling across the screen from frame to frame at the speed of 100 dots per frame. We assume the motion picture is being viewed on a quality monitor with a pixel resolution of 100 dots per inch. This computes to taking 2½ frames to move 2½ inches across the screen. If the TV has a refresh rate of 60 Hz (60 frames per second) then it will take 2.5/60=¼₄ or approximately 42 msec for the screen object to traverse 2½ inches on the screen. That is, we want the retinal reaction time difference 4018 between the two eyes to be 42 milliseconds. Adding the 42 msec to 120 msec computes to 162 msec retinal reaction time 4013 to affect a 42 millisecond retinal reaction time difference 518 between the two eyes. Now going back to the intercept 4014 on the retinal reaction curve 3710 we see that we need to choose an optical density for the neutral density lens that will give us a luminance reading 4015 of about −0.6 on the luminance scale. If the direction of the lateral motion is from left-to-right, the right lens will take this optical density and the right lens will be clear.

The algorithm $f_{PrefEmb}$(Luminance, LatScrMotion) provides the computation of the optical density of the neutral density lens $f_{PrefEmb}$(Luminance, LatScrMotion) and more detail is provided in FIG. 41.

This is then the method by which we can compute the optical density of the neutral density lens that is optimal in that the 3D depth perception as viewed through the 3Deeps Filter Spectacles will be exactly the same as for normal human stereoscopic vision.

FIG. 41 provides some more detail of the steps of the algorithm 4100 but in tabular form. In Step 1 4110 the direction and speed of motion is calculated. The search for a moving object is limited to an upper bounded region 4111 and a lower bounded region 4112 of the movie. The upper bounded region 4111 is a surrogate for the image background and the lower bounded region 4112 a surrogate for the image foreground. The single most prominent moving object 4115 in the background 4111, and the single most prominent object 4116 in the foreground 4112 surrogate regions are tracked between frames of the motion picture and the horizontal component of the motion is calculated as direction (right-to left or left-to-right) and speed (in units of pixels per inch or dots per inch). A negative horizontal speed motion represents motion from right-to-left, and a positive horizontal speed motion represents motion from left-to-right. A reading of 0 for speed of motion means that there is no discernable foreground of background object in motion.

The method presented in Step 1 4110 to find the measure the motion in the frame of the moving picture is only exemplary and is over-simplified to teach the principle. Any algorithm that allows us to quantify the direction and speed of lateral motion in a motion picture frame can be used. The video industry has expended considerable resources on R&D to develop image processing algorithms used for video format conversion to track motion of objects between frames of a motion picture, and Step 1 would derive benefit from use of that body of research. Many of the video format conversion chips used in digital TVs, up-converters, and digital projectors track numerous moving objects from frame-to-frame to perform the best possible format conversion of object in motion. In alternate embodiments it would be beneficial to use a subset pr the entire set of motion vectors to calculate a single speed and direction of motion that characterizes motion in the moving picture.

In Step 2 4120, the background horizontal vector LatScrMotion$_{Top}$ 4115 is subtracted from the foreground horizontal vector LatScrMotion$_{Bot}$ 4116 to get an overall measure (LatScrMotion) of the instantaneous motion associated with the frame of the motion picture, and the value is stored.

In step 3 4130 the Luminance value is calculated and stored. In this teaching example the Luminance is estimated as the average brightness of all Pixels in the frame. Other embodiments may use other means to quantify luminance. In step 4 4140 the two input value, speed of lateral motion (LatScrMotion) and Luminance are used as input value in the algorithm described in FIG. 40 to get the value of the optical density for the neutral density lens—i.e. the value of $f_{PrefEmb}$(Luminance, LatScrMotion) from FIG. 40. A decision procedure 4150 is then used to get the optical density for each of the 3Deeps spectacle lenses. If the lateral screen motion (LatScrMotion) is zero (dpi) or near-zero (−10 dpi<LatScrMotion<10 dpi) then both lenses will be set to the ClearState optical density value (OD). If the lateral screen motion in a direction from right-to-left then set the left lens to the calculated value $f_{PrefEmb}$(Luminance, LatScrMotion) 4140 and the right lens to clear. If the lateral screen motion is in a direction from left-to-right then set the right lens to the calculated value $f_{PrefEmb}$(Luminance, LatScrMotion) 4140 and the left lens to clear.

This overcomes the problems with cardboard Pulfrich lenses 3990. Firstly, the 3Deeps Filter Spectacle lenses always take the correct state consonant with the direction of motion on the screen. Secondly, rather than the depth perception fluctuating as with cardboard Pulfrich filter 3990, the optical density of the neutral density lens fluctuates to provide the constant degree of depth perception that the mind expects from its everyday vision of reality. Third, the 3Deeps Filter Spectacle lenses do not over-darken but always take an optical value since they can conform to speed of motion and luminance. And finally, since luminance is accounted for, the motion picture will view the same regardless of whether viewed in a darkened movie theater, or a well-lit home theater environ.

Before describing alternate means to select the optical density for a filter to produce the Pulfrich illusion, it is useful to consider further how to determine the parameters that are used to calculate an optimal optical density for the neutral lens of the Pulfrich Filter Spectacles. The two parameters are (a) a motion vector that describes the speed and direction of lateral motion in the motion picture, and (b) luminance or brightness of the motion picture.

Motion Measures in a Motion Picture

In order to address de-interlacing and up-conversion format problems with motion picture recording, broadcast and display, various algorithms have been developed to determine the direction and speed of motion in a motion picture, and many of these algorithms have been implemented in software and hardware devices.

Consider an input signal to a TV which is 30 frames per second (for example as from analog TV) but that is being output and shown on a high-end digital LCD TV running at 120 frames per second. Showing a TV input signal of 30 fps at an output of 120 fps is an example of format conversion that is done by many different format conversion apparatus. One simple way to do this format conversion is for the chip to simply add 3 exact copies of each frame to the output stream. That works if there is no motion, but if a screen object exhibits any motion between frames then the 3 new frames have the moving object in the wrong place. The better and more expensive the digital TV, the worse this problem appears to the viewer. So the better format-conversion chips perform complex frame-to-frame image processing and track speed and direction of motion and then use that information to better construct the 3 new frames. But estimating speed and direction of motion between frames (which these devices already do) is also sufficient information to calculate the timing and optimal optical density for the neutral (shaded) density lens of the 3Deeps (which the devices do not do).

This is an oversimplified example of video format conversion, but that is useful for teaching purposes. State-of-the art format-conversion chips may also have functions to do some or all of the following—adaptive motion de-interlacing, edge smoothing, intelligent image scaling, black level extension, digital noise reduction, auto flesh-tone correction, as well as other complex image processing functions.

Many companies have already developed the image processing algorithms and implemented them in Integrated Chip circuitry. Philips described their semiconductor MELZONIC chip in the following way: "After exhaustive investigation and computer simulation, researchers at Philips developed a totally new technique for motion estimation which they have called '3-D Recursive Search Block-Matching'. By analyzing two successive TV fields to locate blocks of pixels in the second field that match blocks in the first, 3-D Recursive Search Block-Matching is able to assign a velocity vector to each block of pixels in the first field. These velocity vectors can then be used to interpolate the correct spatial position of each pixel block in a new field that is positioned temporally between the two original fields—i.e. to create new movement phases."

In U.S. Pat. No. 5,717,415, Iue describes "Motion Vector Detecting" by analysis of successive frames of a motion picture. The motion vectors are used to develop separate left-eye and right-eye images so that 2D movies may be viewed as 3D movies. There is no disclosure nor suggestion that the motion vectors be used in a single-image system with controllable Pulfrich spectacles.

In essence, digital TV and digital cinema rely upon various implementation of video format conversion, and make extensive use of motion adaptive algorithms implemented as hardware and software to detect and quantify motion between frames. They use such information to enhance the quality of the video output signal. All such hardware and software implementation that detect and quantify a motion vector can be used advantageously for Continuous Adjustable 3Deeps Filter Spectacles.

Luminance Measures in a Motion Picture

By luminance we mean brightness. However since the motion picture is viewed through 3Deeps spectacles, luminance of the screen picture may be calculated in many different ways. We could use the screen luminance of the motion picture, the ambient light of the room, or a measure of light arriving at the eye of the viewer.

For standard analog TV signals, every raster point on the TV screen has an attached luminance value as part of the TV signal. Screen luminance may be calculated as an average of all screen luminance values. Other means may be used to calculate a luminance measure of each screen frame for analog TVs. Similarly, different means may be used to calculate an overall luminance measure for digital TVs.

While luminance of the picture is one factor in setting the optical density of the neutral lens of the Pulfrich Filter Spectacles, ambient light of the room or theater in which the motion picture is viewed need also be considered. Many TVs already have built in luminance control. The Philips Electronics Ambilight technology used in their flat-panels is an RGB backlight that changes color based on the on-screen image. A filter is used to calculate the average color on the top, left and right border of the screen that is then sent to a micro controller that controls three separate banks of red, green and blue cold-cathodes.

Also, some TVs will sense ambient light and can use that information to adjust the brightness of the picture. In a bright room they will show a brighter picture while when they sense a darkened room they can present a more subdued picture. This is done in part to extend the life of the LCD and plasma screens that are used in digital TVs and projectors.

Recalling that the primary mechanism by which the Pulfrich illusion works is the difference in retinal reaction time triggered by a neutral lens covering one eye, the retinal illuminance is a more important factor than screen luminance in developing depth perspective via 3Deeps Filter Spectacles.

In FIG. 44, described later, we use a photodiode located on the Continuous Adjusting 3Deeps Filter Spectacles as a surrogate measure for retinal luminance. Each of the algorithmic embodiments shown in FIG. 40, FIG. 43, and FIG. 45 could preferably use luminance measures of the display venue or retinal illuminance rather than the luminance of the motion picture in their calculations. If we were using the algorithm of the preferred embodiment, speed and direction of motion would need to be transmitted to the 3Deeps Filter Spectacles that would then use luminance and the motion vector with the algorithm of the preferred embodiment to calculate and set the optical value of the neutral density lens of the 3Deeps Filter Spectacles.

FIG. 42 is an illustration of an alternate algorithm 4200 that can be used to characterize lateral motion in a motion picture. It estimates 4 motion vectors—an upper-right (UR) 4232 and upper-left (UL) 4231 motion vectors to estimate background lateral motion, and a lower-right (LR) 4233 and lower-left (LL) 4234 motion vectors to estimate foreground lateral motion. Each vector is estimated from its non-overlapping regions in the frame of the movie. In this sample algorithm the most prominent motion vector in the Upper Right 4222, Upper Left 4221, Lower Right 4224, and Lower Left 4223 regions are identified. Each of these 4 vectors can take any of 3 value; it may be moving either right-to-left (negative lateral speed motion 4242) or moving left-to-right (positive lateral speed motion 4243), or if there is no motion the lateral component of the vector has a value of 0 4245. That is there are 81 ($3^4$) possible combinations. Each of the 81 combinations might have separate and distinct computation in this alternate algorithm.

One of the 81 possible combinations has the UR 4232, UL 4231, LR 4233 and LL 4234 each having a value of 0. This is what would be expected when there is no motion on the screen as for instance during a close-up on a single character speaking. This case would be result in both lenses of the 3Deeps Filter Spectacles taking the same or clear state (ClearStateOD).

Another of the 81 possible combinations would have both the UR 4232 and LR 4233 vector showing right-to-left motion (negative values), and both the UL 4231 and LL 4234 showing left-to-right motion (positive values). This is what would be expected when the camera is receding and expanding a scene and the primary component of motion comes from the action of the camera panning. (This is exactly the scenario in the famous railroad yard scene from "Gone with the Wind", in which Scarlett O'Hara played by Vivien Leigh walks across the screen from the right as the camera slowly pulls back to show the uncountable wounded and dying confederate soldiers.) In this case the alternate algorithm would calculate the value UL+LL+UR+LR as the LatScrMotion 4120. If this value were negative then the algorithm 4150 would set the right lens to the ClearStateOD and the left lens to a darkened state in accordance with the value $f_{PrefEmb}$(Luminance, LatScrMotion) 4140. If this value were positive then the algorithm 4150 would set the left lens to the ClearStateOD and the right lens to a darkened state in accordance with this value $f_{PrefEmb}$(Luminance, LatScrMotion) 4140.

Each of the other 79 cases would similarly have appropriate calculations.

Each of the 2 algorithms presented for teaching use the notion of selecting the most prominent motion vector in a region. In these algorithms we define that as the longest edge in the search region that is exhibiting motion. Other definitions may be used. For instance, within a scene the algorithm may use this definition to first identify a prominent edge. The identified edge may then persist throughout other frames as long as it continues to appear in subsequent frames, even if that edge is no longer the longest edge in the region. Other algorithm may continue to track this edge through subsequent frames, even were it to move out of the search region.

While two algorithms have been used to characterize lateral motion in a motion picture from a set of motion vectors, other algorithms may be advantageously employed. Motion pictures are filmed so that the major action takes place in the center of the screen. Other algorithms to characterize lateral motion in a motion picture from a set of motion vectors may then search for the major vector of motion in the center of the screen and use motion vectors from the top of the screen (a surrogate for background) and motion vectors from the bottom of the screen (a surrogate for foreground) to estimate parallax in the frame of the motion picture. The major vector of motion and estimate of parallax can then be used to determine the optimal optical density of the neutral density filter. In another approach, an algorithm to characterize lateral motion in a motion picture would focus on the regions of the movie that are well lit. Cinematographers compose film, using light to focus attention and highlight the most important action in the scene. This may be useful in delimiting the portion of the frame of the motion picture to which an algorithm to characterize lateral motion in a motion picture frame is restricted. It should be appreciated that from the large number of motion vectors between frames of a motion picture, there are many different algorithms that can be advantageously used to quantify a motion vector that characterizes motion in a frame of a motion picture that is used to determine the optimal optical density of the neutral density filter.

A First Alternate Embodiment

Motion pictures are often viewed on small, personal devices such as an Apple iPod. Such devices have small screens and are held within arms reach for viewing. For such devices the preferred embodiment that optimizes the Optical Density of the neutral density lens to an average inter-ocular distance may be inappropriate. We provide other alternate embodiments, either of which is appropriate for small viewing devices, as well as for TV or movie theater viewing.

FIG. 43 shows the use of the retinal reaction time curve 3710 for a first alternate embodiment algorithm 4300 to calculate the optical density of the neutral density lens. The x-axis 3701 shows luminance, and the y-axis 3703 shows retinal reaction time. Observe that the amount of light produced by a motion picture is constantly changing. Some night scenes in a movie produce low light, and other scenes such on the open seas at noon are much brighter. In this first alternate embodiment, rather choose an optical density for the neutral filter so that there is a separation of 2½ inches between the instant and delayed image to the eye (as in the preferred embodiment), we may choose to fix the difference (Δ) 4320 between retinal reaction time of the eyes. Then as retinal illumination to the unfiltered eye changes, the optical density of the neutral filter is chosen to produce a constant difference in reaction time between the right and left eyes. It will be seen that this has some advantages.

In this example, assume as in FIG. 40 that the luminance 4310 is 0.54. As demonstrated in FIG. 40 that relates 4311 to a retinal reaction time 4312 for the unaided eye of 120 msec. For this example choose a fixed difference Δ 4320 between the retinal reaction time of the two eyes of 100 msec, which computes to a retinal reaction time 4313 for the filtered eye of 220 msec (120+100). Then going back to the intercept 4314 on the retinal reaction time curve 3710, we need to pick an optical density for the neutral density filter so the luminance 4315 to the eye is −1.3.

Similarly as the measured value of luminance changes, this algorithm can be used with new values of luminance to calculate a changing optical density for the neutral density filter. This algorithm only uses an estimate of retinal luminance as input. One benefit of this algorithm is that it only requires the luminance and direction of motion, but not the speed of lateral motion. Thus it is much less computationally intensive, but will provide Continuous Adjustable 3Deeps spectacles that take states conforming to the direction of motion and conforms to the value of luminance. It also affords a means by which the calculation of optical density for the neutral density filter can be implemented on the Continuous Adjustable 3Deeps Filter Spectacles, since luminance can be sensed by the spectacles. This may lessen the computational requirement for the Phenomenoscope described in U.S. patent application Ser. No. 11/372,723.

In FIG. 44, 4400 shows 3Deeps Filter Spectacles 4410 that include a photodiode 4420 on the frame of the Continuous Adjustable 3Deeps Filter Spectacles. A photodiode 4420 is a type of photodetector capable of converting light into either current or voltage, depending upon the mode of operation. The output of the photodiode 4420 provides a measure of the amount of light arriving at the frame of the Continuous Adjustable 3Deeps Filter Spectacles 4410, and is a good surrogate measure of retinal illuminance. This surrogate luminosity measure is input to a Lens Control Unit 103, also on the spectacles, and used with the algorithm described in the first alternate embodiment to calculate the optical density of the neutral density filter. In this example the direction of motion must still be determined and depending upon the direction of motion the Right Len 105 and the Left Lens 106 will take an optical density of either the ClearStateOD or the calculated neutral density optical density. If this value is determined by a control device external to the Continuous Adjustable 3Deeps Filter Spectacles then such information must be communicated to the Continuous Adjustable 3Deeps Filter Spectacles according to one of the various methods as described in co-pending patents and patent applications. If the Continuous Adjustable 3Deeps Filter Spectacles are the Phenomenoscope described in U.S. patent application Ser. No. 11/372,723, then the Continuous Adjustable 3Deeps Filter Spectacles themselves can determine if inter-frame motion is present, and if so in which direction.

A Second Alternate Embodiment

FIG. 45 uses the typical curve 3710 of retinal reaction time 3703 as a function of Luminance 3701 to demonstrate a second alternate embodiment 4500 for computing an optimal optical densities for the neutral density lens of the Continuous Alternating 3Deeps Filter Spectacles so that the difference (Δ) 4518 in retinal reaction time between the viewer's eyes corresponds to a fixed number of frames of the motion picture.

In this second alternate embodiment, rather choose an optical density for the neutral filter so that there is a separation of the average inter-ocular distance (2½ inches) between the instant and delayed image to the eye (as in the preferred embodiment), we may choose to have a difference (Δ) 4518 between retinal reaction time chosen so that the instant and lagging image are a fixed number of movie frames. It will be seen that this has some advantages.

In this example, assume as in FIG. 40 that the luminance 4510 is 0.54. This is at a point 4511 on the retinal reaction time curve 3710 of (0.54, 0.120). As demonstrated in FIG. 40 that relates to a retinal reaction time 4512 for the unaided eye of 120 msec. Assuming for this example a screen refresh rate of 60 Hz, a delay of 10 frames can be achieved by having a difference in retinal reaction time 4518 of 166 msec. (That is 10/60=⅙ second=166 msec). From a base of 120 msec that is 120+166=286 msec (4513). Taking that as the ordinate value, the retinal reaction time 3710 curve intercept is at a point 4514 on the retinal reaction curve 3710, and we need to select an optical density of the neutral density lens of −1.7 4515.

As the measured value of luminance changes, this algorithm can be used as the only input to calculate optical density for the neutral density filter. The benefit of this algorithm is that it also only requires the luminance and direction of motion, but not the speed of lateral motion. Thus it is much less computationally intensive, will provide Continuous Alternating 3Deeps Filter Spectacles that take states conforming to the direction of motion and conforms to the value of luminance. It also affords a means by which the calculation of optical density for the neutral density filter can be performed by the Continuous Alternating 3Deeps Filter Spectacles. This may greatly lessen the computational requirement for the Phenomenoscope described in U.S. patent application Ser. No. 11/372,723.

Video and 3Deeps Processing

Various algorithms have been described to determine the optimal density for the neutral density filter of the Continuous Alternating 3Deeps Filter Spectacles. Whether the calculations are performed by embedded dedicated hardware, or by software running on a CPU, the Video and 3Deeps processing of the preferred embodiment will have the following functions; (1) take as video input the frames of a motion picture, (2) perform video format conversions to address de-interlacing and up-converter conversion problems, (3) output the converted video, (4) calculate a motion vector, luminance, and optimal optical density, (5) and output the 3Deeps control information to the Continuous Alternating 3Deeps Filter Spectacles. FIG. 46 teaches how to incorporate methods of this invention with such video formatters. FIG. 47 is a block diagram showing operation of a Video and 3Deeps processing used to calculate the optimal optical density of the neutral density filter in the preferred embodiment of the Continuous Adjustable 3Deeps Filter Spectacles.

FIG. 46 is a flowchart 4600 showing the use of a format conversion semiconductor chip 4620 to compute the Continuous Adjustable 3Deeps Filter Spectacles synchronization information. Video Format conversion chips are used to convert a movie from one format such as interlaced 60 Hz to another format such as non-interlaced 120 Hz.

Across the top, the flowchart shows the video format conversion chip 4620 in its normal operation. To emphasize that the step is performed by a semiconductor chip, it is shown with a depiction of the pins 4690 of a semiconductor chip. As is typical with format conversion chip, it inputs frames (analog or digital) 4610 of the motion picture, and outputs suitably reformatted digital versions 4630 of the movie. Within the format conversion semiconductor chip 4620 image processing algorithms perform motion vector detection and quantify and extract the motion vector(s) and Luminosity values (4621) and use them to reformat the video (4622) for output.

The motion vector(s) (MV) and Luminosity value (L) are output by the format conversion IC and are read and stored 4651 by another processing unit that implements any of the previously described algorithms to calculate the optical density value of the neutral density frame. The output motion vector (MV) and luminosity (L) measures are stored 4652. They are then read by a computing device 4653, which incorporates any of the teaching algorithms herein described, or uses another algorithm to compute the LatScrMotion for each frame and output the value of the optical density of the neutral density filter. A decision rule 4654 will then determine the setting for the right and left lenses of the 3Deeps Filter Spectacles. If the LatScrMotion=0 (4661) then both lenses are set to a clear optical density (4671). If the LatScrMotion<0 (4660) then screen motion is from right-to-left and the left lens will be set to the corresponding darkened optical density and the right lens will have the clear optical density (4670). If the LatScrMotion>0 (4662) then screen motion is from left-to-right and the right lens will be set to the corresponding darkened optical density and the left lens will have the clear optical density (4672). The results are formulated 4680 into Continuous Alternating 3Deeps Filter Spectacle control information, and transmitted 4695 synchronously with the motion picture. The control information is described in FIG. 3. In one embodiment, the control information is transmitted wirelessly, but other embodiments may use wired means.

In another embodiment (not shown) the algorithm to compute the 3DeepsFilter Spectacle synchronization information is included entirely within the format conversion semiconductor rather than on a second computer processor. In this case the format conversion chip not only inputs frames (analog or digital) of the motion picture, and outputs suitably reformatted versions of the movie, but also calculates and reports out the 3Deeps Filter Spectacle synchronization information.

FIG. 47 is a block diagram 4700 showing more detail of the operation of the Video and 3Deeps processing module 4790 used to calculate the optimal optical density of the neutral density filter in the preferred embodiment of the Continuous Adjustable 3Deeps Filter Spectacles.

If the motion picture is analogue then it is input using the Analogue Audio/Video input 4701. The analogue is fed to an Analogue to Digital Converter 4705 module that converts it to digital format frame by frame. A Memory-Control-In module 4710 stores the digital frames in Memory 4715.

Each successive frame is stored in a different memory section denoted f1-f4. Other embodiments may have significantly more frame memory. The first frame of the motion picture would be stored in memory section f1, the second frame in f2, the third frame in f3, and the fourth frame stored in memory section f4. The frame memory will then roll over—with frame 5 stored in frame memory f1, frame 6 stored in f2, and so on. While this is happening in real-time other module of the Video and 3Deeps Processing module 4790 will also be accessing the frame memory, and performing the required calculations for each frame. Once the motion vector detection 4725, Luminance 4730, and 3Deeps OD and Synchronization 4735 calculations are performed, the associated motion picture frame stored in frame memory $f_i$ 4715 is no longer needed and can be overwritten by rolling over the storage location number in frame memory 4715.

The analogue 4701 is also directed unchanged to an analogue audio/video out module 4740. The analogue A/V out 4740 data is precisely the same as the Analogue A/V In 4701, without any format conversion. Other embodiments of the Video and 3Deeps Processing module 4790 may perform format conversion or reformatting of the analogue input signal before output of the analogue signal. Also, the output from the Analogue to Digital Converter is routed to the Digital Audio/Video Out module 4759. Before it is output at the Digital A/V Out 4759, it is processed by the Reformat Video module 4780 using as input the output from the Luminance 4730 and Motion Vector Detection 4725 modules. In this way the motion picture Analogue A/V 4701 is available for output both as the original Analogue A/V out 4740, and also in a reformatted digital A/V out 4759.

The Video and 3Deeps Processing module 4790 may also accept the motion picture in a digital format using module Digital A/V In 4702. In this case the Analogue to Digital converter 4705 is not used. The Digital A/V will be routed to the Digital A/V Out 4759 in the same way as previously described. That is before it is output at the Digital A/V Out 4759, it passes through Reformat Video module 4780 using as input the output from the Luminance 4730 and Motion Vector Detection 4725 modules.

The Digital A/V 4702 will also be processed by the Memory-Control-In module 4710, and stored in the digital frame memory 4715. The frames will be stored as previously described with successive frames stored in high labeled frame buffers, and rolling over when the highest frame numbered frame buffer has been reached.

Consider now the processing of a current frame. The Memory-Control-Out module 4720 will fetch the corresponding current frame from the frame memory 4715 and input it for processing to the Luminance calculation module 4730, and the Motion Vector Detection module 4725. The motion detection module 4725 will also reference the previous frame from frame memory 4715. In this simplified preferred embodiment, for teaching purposes, only two frames of the motion picture are used to estimate a lateral motion vector in the motion picture. In other embodiment many more frames may be used to estimate the lateral motion vector. Algorithms for the calculation of the lateral motion vector have been described in this and co-pending patent applications. Any of those algorithms may be used or other algorithms well known in the art, or that are already in use by format conversion chips. Whichever algorithm is used, it is implemented in the Motion Vector Detection module 4735. The calculation of Luminance is as described previously, and this algorithm is implemented in the Luminance module 4730. Alternate algorithms for the calculation of Luminance may be implemented in other embodiments.

The Luminance module 4730, and the motion vector detection module 4725 are also input to the 3Deeps Optical Density and Synchronization module 4735. For the preferred embodiment, and the current frame, the algorithm described in FIG. 40 and FIG. 41 is implemented in the 3Deeps Optical Density and Synchronization module 4725 that take as input the Motion Vector Detection 4725 and Luminance 4730 and calculate the optimal optical density for the motion-directed lens of the Continuous Alternating 3Deeps Viewing spectacles. If no lateral motion is detected then the output for the right lens is set to a digital value representing the clear state, and the output for the left lens is set to a digital value representing the clear state.

The control information calculated by the 3Deeps OD and synchronization module 4735 is further described in FIG. 48. If the motion vector is in the left to right direction then the output for the left lens is set to a digital value representing the clear state and the output for the right lens is set to a value representing the optimal optical density calculated by the algorithm in the module of the 3Deeps OD and synchronization module. If the motion vector is in the right to left direction then the output for the left lens is set to a digital value representing the optimal optical density calculated by the algorithm of the 3Deeps OD and synchronization module, and the right lens is set to a digital value representing the clear state. The control information is output and transmitted 4695 to the Continuous Alternating 3Deeps Filter Spectacles.

All output values are synchronized for the same frame. That is, when the Video and 3Deeps processing module 4790 outputs a frame of the motion picture on the Digital Audio/Video Out 4759, and the same frame on the Analogue Audio/Video out 4740, it will also output and transmit 4695 the Continuous Alternating 3Deeps Filter Spectacle control information for that same frame. In other embodiments, the Video and 3Deeps processing module 4790 may be embedded wholly or partially embedded in the circuitry of a video format conversion chip.

Optimal Control of the Continuous Adjustable 3Deeps Filter Spectacles

Optical Density Continuous Adjustable 3Deeps Filter Spectacles are advanced 3Deeps Filter Spectacles. They are characterized by the reception and utilization of control information that continually adjust the 3Deeps Filter Spectacles to the optimal optical density to maximize the Pulfrich illusion for viewing 2D motion video as 3D. But Digital TVs have refresh rates of up to 120 Hz, and many electrochromic materials are unable to change optical density that fast. Even were the materials able to change that fast, it may be desirable to continuously moderate the optical density of the Continuous Adjustable 3Deeps Filter Spectacles so there is a continuity and they do not change state too abruptly. The algorithms implemented in the Control Unit 103 of the Continuous Adjustable 3Deeps Filter Spectacles optimally handle the synchronization of the refresh rate of a movie to the viewing spectacles. Analogous to the way in which format conversion chips takes an input format and converts to an output format appropriate for the viewing monitor, Continuous Adjustable 3Deeps Filter Spectacles take the optimal optical density for the viewing spectacles and 'render' them to the viewing spectacles in a manner appropriate to the lens material from which they are fabricated.

In one embodiment of the Continuous Adjustable 3Deeps Filter Spectacles, control information for the spectacles lenses is updated in synchronization with each and every frame of the motion picture. The Control Unit (described in FIG. 52) of the Continuous Adjustable 3Deeps Filter Spectacles implements algorithms that utilize this information to optimize 3D viewing, and provides significant advantage over earlier, but less active 3Deeps Filter Spectacles. One important advantage is that different Continuous Adjustable 3Deeps Filter Spectacles made from different electro-optical lenses can each receive the same control information and but still each operate in an optimal manner appropriate to the lens material from which they are fabricated. In typical operation, the Continuous Alternating 3Deeps Filter Spectacles may receive the new control and synchronization states for the lenses even before they have finished transitioning to a previous state.

While Continuous Adjustable 3Deeps Filter Spectacles may synchronize with every frame of the movie, as do shutter glasses, they are totally different from the operation of shutter glasses. Shutter-glass is a dual image system that synchronizes to the left and right eye frame images. While the preferred embodiment of Continuous Adjustable 3Deeps Filter Spectacles synchronize to every single frame of the motion picture, they provide a continuously changing optical density with transmission of light controlled for each eye. Shutter-glass systems always have a light-intercepted state—dependent on whether the image is a right eye or left eye image, and in which no transmission of light is allowed through the lens. In contrast, Continuous Adjustable 3Deeps Filter Spectacles require that there always be transmission of light through both lenses, but are continually adjusting the transmissivity of the lenses synchronized to motion in the movie. A movie made for shutter-glasses cannot be viewed with Optical Density Continuing Adjustable 3Deeps Filter Spectacles, and shutter-glasses cannot be used for any movie that can be viewed in 3D using Optical Density Continuing Adjustable 3Deeps Filter Spectacles.

FIG. 48 is a table 4800 showing control information for the Continuous Adjustable 3Deeps Filter Spectacles. The control information is organized by frame 4820 of the motion picture—that is control information is transmitted synchronous with the output frames of the motion picture. If the movie is input at 60 Hz but output to the screen monitor after format conversion at 100 Hz, then the Continuous Adjustable 3Deeps Filter Spectacle control information will be synchronized to the output frame rate of 100 Hz. For each frame 4820 the frame number 4801, optical density of the Left Lens 4803, optical density of the right lens 4805, scalar value of the motion vector 4807, direction of the motion vector 4809 ('−' for right-to-left lateral motion, '+' for left-to-right lateral motion, or '0' for not motion), and Luminance 4811 are provided.

The control information requires very low bandwidth. If the information is transmitted in character format with 9 characters for the frame number 4801, 5 characters each for the left lens OD 4803, right lens OD 4805, Motion Vector 4807, Luminance 4811, and 1 character for the direction 4809, that is a total of 30 characters for each frame. For a fast output format at 120 Hz that is still a low-bandwidth of 3600 characters per second easily handled by inexpensive off-the-shelf digital Transmit/Receive (Tx/Rx) chip pairs.

This control information is sufficient for all the different embodiments of Continuous Adjustable 3Deeps Filter Spectacles. In the preferred embodiment the control unit 103 on the Continuous Adjustable 3Deeps Filter Spectacles 100 will receive the control information 4800 but only use the subset of the information that is required. In the preferred embodiment of the Continuous Adjustable 3Deeps Filter Spectacles, the only control information that is required is the Left Len OD 4803 and Right Lens OD 4805.

In another embodiment, a photodiode 4420 on the frames of the Continuous Adjustable 3Deeps Filter Spectacles may be used to provide the Luminance calculation to the algorithm of the first alternate embodiment described in FIG. 43 implemented in the Control Unit 103. In this case, the Optical Densities calculated and transmitted by the Video and 3Deeps Processing Module are not used, but must be re-calculated by the Control Unit 103 of the Continuous Adjustable 3Deeps Filter Spectacles. Using the algorithm of the first alternate embodiment running on the Control Unit 103, the direction of motion 4809 for each frame will be input along with the luminance measure from the photodiode 4420 to provide control of the right 105 and left 106 lenses of the Continuous Adjustable 3Deeps Filter Spectacles 101. Similarly, other embodiments may use different subsets of the control information 4800 to control the Continuous Adjustable 3Deeps Filter Spectacles 101. An advantage of Continuous Adjustable 3Deeps Filter Spectacles is that if two viewers are sitting side-by-side, one with spectacles that incorporate in the control unit 103 the algorithm of the preferred embodiment (FIG. 40 and FIG. 41), and the second viewer with spectacles that incorporate in the control unit 103 the algorithm of the first alternate embodiment (FIG. 43), both will view the movie optimally for their respective spectacles.

Recall from FIG. 3 that all circuits on the Continuous Adjustable 3Deeps Filter Spectacles 101 are powered by the battery 104, including the Control Unit 103, Signal Receiving Unit 102, the Left Lens 106, and the Right Lens 105. The control information 110 previously described in FIG. 48 is received by the Signal Receiving Unit 102 and to the Control Unit 103. The control unit 103 implements an algorithm that is specific for the lens materials used in the fabrication of the right lens 105 and the left lens 106 of the Continuous Adjustable 3Deeps Filter Spectacles, and controls the left lens 106 with a control circuit 303, and the right lens with a control circuit 305.

This approach has great advantages. The control information 110 is spectacle-agnostic; i.e. all spectacles receive the same transmitted control information. The control unit 103 on the spectacles performs a final view-spectacle-specific optimization, translating the control information into control signals specific to the lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles.

Electro-Optical Lenses

Some embodiments of the Optical Density Continuing Adjustable 3Deeps Filter Spectacles use electrochromic lenses. Electrochromism is the phenomenon displayed by some chemicals of reversibly changing color when an electric potential is applied. There are many different families of chemicals that exhibit such properties including but not limited to polyaniline, viologens, polyoxotungstates's and tungsten oxide. Within each family, different mixtures of chemicals produce different properties that affect the color, transmissivity, and transition time. For instance Some electrochromics may only affect ultraviolet light—not visible light—appearing as a clear plastic to an observer since they do not affect visible light. Electrochromics have been the object of study for several decades, and have found their chief use in smart windows where they can reliably control the amount of light and heat allowed to pass through windows, and has also been used in the automobile industry to automatically tint rear-view mirrors in various lighting conditions.

The operating characteristics of each formulation of an electrochromic material will be different. Some electrochromic materials may take several seconds to change state from one optical density to another—others may be near instantaneous. For many electrochromic materials the color change is persistent and electric potential need only be applied to effect a change. For such persistent electro-optical materials, only an electronic on-off pulse is needed, while non-persistent materials require the application of a continuing electronic potential. Other materials may attain state under the presence of electric potential, but then slowly leak potential and change back. These materials may require a maintenance potential to maintain state but one that is different from that to attain the optical density state.

One embodiment of the Continuing Adjustable 3Deeps Filter Spectacles can be fabricated from a persistent electrochromic material. For some electrochromic materials, the transition time moving from a lighter to a darker optical density (FIG. 50) is different from that of the transition time moving from a darker to a lighter optical density (FIG. 51). While electrochromic material can be used in the preferred embodiment of the optical density Continuous Adjustable 3Deeps Filter Spectacles, any electro-optical materials that change optical density in response to an applied potential may be used. This includes but is not limited to LCDs or SPDs (Suspended Particle Devices). SPDs are a different material with almost instantaneous response but need a much higher potential to change state faster opto-electrical material. In selecting the lens material, one should seek materials with shorter transition time. The optical transmission time of the lens material should be taken into account in optimizing the operation of the Continuing Adjustable 3Deeps Filter Spectacles with lenses in electrochromic or electro-optical formulations. In the future, new electro-optical materials will be discovered and may be advantageously used in the practice of this invention.

FIG. 49 4900 shows a typical operating characteristic curve 4910 of an electrochromic material with output optical density 4903 (y-axis) as a function of voltage 4901 (x-axis). An optical density of 0.3 corresponds to about 50% transmission of light (4923). An optical density of 0.6 corresponds to about 25% transmission of light (4922). And an optical density of 0.9 corresponds to about 12.5% transmission of light (4921). To get a specific desired optical density, one only need apply the correct voltage across the material. In this example, were the lenses of the 3Deeps Filter Spectacles made from such electrochromic material then if the desired optical density were 50% transmission of light 4923, the 3Deeps Filter Spectacle controller would cause 1 Volt 4934 to be applied across the electrochromic lenses. One volt 4934 intersect 4932 the operating characteristic curve 4910 resulting in an optical density of 0.3 (4903) that corresponds with 50% transmission of light 4923. FIG. 49 is a typical operating characteristic curve. Depending on the chemical formulation of the material the operating characteristic curves may differ.

Other embodiments may use more than one layer of material where each material can respond to controlling signals. For instance, one layer may impinge light over a restricted range of visible light and another layer may impinge light over a different range of visible light.

The operating characteristic curve of FIG. 49 will provide sufficient control if the electrochromic lenses change state near instantaneously. But, many electrochromic materials do not respond instantaneously to an applied potential and take a finite time to transition to the desired optical density state. Continuous Adjustable 3Deeps Filter Spectacles need also account for the transition time of the material from which the lenses are fabricated.

FIG. 50 shows 5000 a typical transition time curve 5003 for an electrochromic material with transition time as a function of optical density when a potential of 2.0V is applied to the electrochromic material. It is for a slow electrochromic material with transition time 5002 as a function of optical density 5001. This hypothetical electrochromic material has a 'lightest' state with an optical density of 0.0, or clear, 5004 and its darkest state 5005 is an optical density of 1.5 or dark. The material can take any optical density between 0.0 and 1.5 by the application of 2V for the proper length of time. If the material has an optical density of 0.0 or clear 5004, and 2V potential is applied to the material, it will take 2 seconds for the material to change state and darken to a optical density of 1.5 (dark) 5005. This is shown on the transition time curve 5003.

As an example, if the material has an optical density of 0.3, and the control signal 110 received on the frames receiving unit 102 indicates that the subject lens should change to an optical density of 0.6, then the transition time curve 5003 would be implemented by the control unit 103 to apply 2V potential to the lens for 0.4 seconds. An optical density 0.3 1610 intercepts the transition time curve 5003, at a point 5011 on the curve corresponding to 0.4 seconds 5012. An optical density 0.6 5020 intercepts the transition time curve 5003, at a point 5021 on the curve corresponding to 0.8 seconds 5022. The absolute value of the difference abs(0.8−0.4)=0.4 seconds then is the length of time that 2V potential needs to be applied to the lens to change its optical density from 0.3 5010 to 0.6 5020. After that length of time has elapsed no potential is applied since the electrochromic will 'latch' in the new state.

This is an example of how an algorithm implemented in the Control Unit 103 of the Continuous Adjustable 3Deeps Filter Spectacles would use the transition time curve 5003 to control the right lens 105 and the left lens 106. To transition a lens from and optical density of 0.3 to an optical density of 0.6 the Control Unit would apply 2V potential to the lens for 400 msec.

This is a simplified example for illustrative and teaching purposes. Other electrochromic materials may have other operating characteristics that have characteristic exponential, negative exponential, or logistic (s-shaped) relationships. In this example, 2V potential is used to move between states. It is used under the assumptions that (a) for this electrochromic formulation the higher the electronic potential the more rapid will be the change from a lighter to a darker optical density, and (b) change of state from a lighter to a darker optical density is to be optimized. Other materials may require different potentials to be applied to move from between states. In any of these cases, the principle of operation is identical and the Control Unit 103 on the frames of the lenses uses the operating characteristics of the material used in the right 105 and left 106 lenses to determine the potential and the length of time the potential is to be applied to transition between lens control states.

In the example above, it took 400 msec (0.4 sec) for the Continuous Adjustable 3Deeps Filter Spectacles to change from an optical density of 0.3 and optical density of 0.6. That is in the length of time it will take to change optical density, 48 frames of video will have been shown. The lenses are operating much slower than a digital TV with a refresh rate of 120 Hz (8.3 msec). This apparent problem is actually an advantage. In this example, at each frame of video (every 8.3 msec), the Continuous Adjustable 3Deeps Filter Spectacles are receiving new control values. These advanced 3Deeps spectacles are then continuously moving to their optimum value, and this has real advantages for 2D/3D viewing.

First, note that within a scene, motion will exhibit consistency, and the target optical density will likely will not change very much. Consider a car speeding across through the scene; the luminosity and the speed and direction of motion will stay at about the same value, so the control and synchronization information for the lenses will be about the same. In this example, while it will take 4 tenths of a second for the lenses to reach their target OD, and there will be 48 3Deeps lens control values, corresponding and synchronized to the intervening 48 frame of video, they will likely target about the same lens OD. Once the target is reached, successive lens setting will be similar and thus the lenses will quickly respond and conform to such values—often within the 8.3 msec between successive frames of video. The lenses are then continuously moving towards the optimal value, and that has distinct viewing advantages over lenses that appear to instantaneously and abruptly change OD value at each frame. Also, since the Control Unit of the Continuous Adjustable 3Deeps Filter Spectacles transforms the control signals for the specific lenses, the control signals will not contain any 3Deeps spectacle specific information. Thus, 2 people watching the same Sunday afternoon football game, but each wearing Continuous Adjustable 3Deeps Filter Spectacles (for instance made by different vendors, or different models from the same vendor) that differ only by the operating characteristics of the electrochromic material, will each have optimal viewing from their specific 3Deeps spectacles.

In other embodiments the transmitted control and synchronization information may be other than for every frame. This might be the case with a different vendor TV. In this case no changes are necessary to the Continuous Adjustable 3Deeps Filter Spectacles, and they will continue to operate optimally for the combination of received control signals and electrochromic materials. Consider again our 2 hypothetical viewers above. Were they at half-time to move to another viewing venue, with a digital TV that has a refresh rate of 60 Hz and that only transmits 3Deeps Filter Spectacle control information every other frame (30 times a second), they would each still have optimal viewing for their specific 3Deeps spectacles.

FIG. 49 shows an alternate means to transition from an optical density of 0.3 to an optical density of 0.6 is to apply a potential of 1.18V. The target optical density 0.6 4942 intersects the operating characteristic curve 4944 of the electrochromic material at a voltage of 1.18V 4946. So applying a voltage of 1.18 Volts will transition the lens from an optical density of 0.3 to an optical density of 0.6. The transition time curve for a voltage of 1.18V is not shown, but would be used similarly to the transition time curve of FIG. 50 (that is for an applied potential of 2.0V) to determine the length of time that 1.18V is to be applied to the lens. In general, any potential greater than 1.18V and less than 2.0V will be applied for the proper transition time will serve to change the state of the lenses.

In one embodiment, to transition the lenses from an optical density of 0.3 to 0.6 we use the transition time curve for an applied potential of 2.0V, since we have assumed a lens material with the characteristic that the higher the applied potential the more rapid is the transition time. In the preferred embodiment, we seek to maximize transition time. Other embodiments may maximize other characteristics of the electro-optical material.

FIG. 51 shows 5100 a typical transition time curve 5103 for an electrochromic material with transition time as a function of optical density when a negative potential of −2.0V is applied to the electrochromic material (draining the lens material of potential). It is for a 'slow' electrochromic material with transition time 5002 as a function of optical density 5001. This hypothetical electrochromic material has a 'lightest' state with an optical density of 0.0, or clear, 5004 and its darkest state 5005 is an optical density of 1.5 or dark. The material can take any optical density between 0.0 and 1.5 by the application of −2V for the proper length of time. If the material has an optical density of 2.0 or dark 5006, and −2V potential is applied to the material, it will take 2 seconds for the material to change state and lighten to an optical density of 0 (dark) 5004. This is shown on the transition time curve 5103.

As an example, if the material has an optical density of 0.6, and the control signal 110 received on the frames receiving unit 102 indicates that the subject lens should change to an optical density of 0.3, then the transition time curve 5103 would be implemented by the control unit 103 to apply −2V potential to the lens for 1.1 seconds. An optical density 0.6 5120 intercepts the transition time curve 5103, at a point 5121 on the curve corresponding to 1.35 seconds 5122. An optical density 0.3 5110 intercepts the transition time curve 5103, at a point 5111 on the curve corresponding to 0.25 seconds 5112. The absolute value of the difference abs(1.35−0.25)=1.1 seconds then is the length of time that −2V potential needs to be applied to the lens to change its optical density from 0.6 5120 to 0.3 5110. After that length of time has elapsed no potential is applied since the electrochromic will latch in the new state.

This is an example of how an algorithm implemented in the Control Unit 103 of the Continuous Adjustable 3Deeps Filter Spectacles would use the transition time curve 5103 to control the right lens 105 and the left lens 106. To transition a lens from and optical density of 0.36 to an optical density of 0.3 the Control unit would apply −2V potential to the lens for 1.1 seconds.

In the general case, the relationship between optical density (x-axis) and transition time (y-axis) for any specific formulation of electro-optical material may be represented functionally by a response surface as y=f(x,v). The first derivative df(x,v)/dy provides the transition time rate for any value of voltage V. To get the transition time for the material to change state and move from optical density $OD_1$ to $OD_2$ by the application of a potential v to the material, the control unit 103 would evaluate to the integral:

Min(response time)=min$\iint$df(x,v)dxdv over the range $OD_1$ to $OD_2$, and for all {v: −2v<v<+2}.

The representation of such response surfaces, and the evaluation of integrals by numerical or analytical methods are well known in the art, and any method may be used. In the preferred embodiment the optimization is done to minimize the response time. However other embodiments may optimize on other characteristics of the material. For instance, the use of the maximum and minimum voltage to change state may have a detrimental effect on the life of the lenses. In such cases, boundary conditions may limit the range of voltage to values that have a lesser impact on lens life. For other materials in which battery life may depend upon the applied transition voltage it may make sense to optimize to get longer battery life. While the preferred embodiment optimizes to minimize response time for the lenses to change state, other embodiments may use the same principles to optimize on other characteristics of the electro-optical material from which the lenses are fabricated. In any embodiments however, a dual approach is used in which first the optimal optical densities are calculated, and then the Control Unit 103 of the Continuous Adjustable 3Deeps Filter Spectacles 101 optimize those values to a characteristic(s) of material from which the lenses are fabricated in order to control the spectacle lenses.

FIG. 52 is a block diagram 5200 showing the operation of the Control Unit 103 for the preferred embodiment of the Continuous Adjustable 3Deeps Filter Spectacles 101. The preferred embodiment uses electrochromic lenses that; (a) latch to state once the desired optical density is reached, (b) have an operating characteristic curve as shown in FIG. 49, (c) have a transition time curve as shown in FIG. 50 for an applied potential of 2.0V that provides the lenses with the most rapid change from a lower to a higher optical density, and (d) have a the transition time curve as shown in FIG. 51 for an applied potential of −2.0V that provides the lenses with the most rapid change from a higher to a lower optical density.

When the control unit is started 5201 it transitions to a Signal Receiving Unit Module 5203 and inputs the Next Frame Signal 5221. This will have the Control Information 1300 for a single frame n 4820 and will include the frame number 4801, optical density of the Left Lens 4803, optical density of the right lens 4805, scalar value of the motion vector 4807, direction of the motion vector 4809, and Luminance 4811. After the information is received it is passed to the processing for the Left Lens. First the Left Lens Potential is assigned in the Set Left Lens Potential Module 5205. In one embodiment we will use either a +2V potential if the change for the left lens is from a lower to higher optical density, or −2V if the change is from a higher to a lower optical density. The value is stored as the Left Potential 5222. Then in the Calculate Left Lens Duration module 5207, we use the value of the optical density of the Left Lens 4803 from the prior frame (n−1) and the value of the optical density of the Left Lens for the current frame, and the appropriate transmission time curve to calculate and store the value of the Left Duration 5223. If the change for the left lens is from a lower to higher optical density then we use the Transmission Time curve 5000 described in FIG. 50, and if the change for the left lens is from higher to a lower optical density then we use the Transmission Time curve 5100 described in FIG. 51.

The Control Unit 103 then transitions to processing for the Right Lens. First the Right Len potential is calculated. The Right Lens Potential is assigned in the Set Right Lens Potential Module 5209. In one embodiment we will use either a +2V potential if the change for the left lens is from a lower to higher optical density, or −2V if the change is from a higher to a lower optical density. The value is stored as the Right Potential 5232. Then in the Calculate Right Lens Duration module 5211, we use the value of the optical density of the Right Lens 4805 from the prior frame (n−1) and the value of the optical density of the Right Lens for the current frame, and the appropriate transmission time curve to calculate and store the value of the Right Duration 5233. If the change for the left lens is from a lower to higher optical density then we use the Transmission Time curve 5000 described in FIG. 50, and if the change for the left lens is from higher to a lower optical density then we use the Transmission Time curve 5100 described in FIG. 51.

The Control Unit 103 then transitions to the Right Lens Control 5213 and causes the circuitry to provide the Right Potential 5232 to the right lens 105 for a duration equal to the value of Right Duration 5233. The Control Unit 103 then transitions to the Left Lens Control 5215 and causes the circuitry to provide the Left Potential 5222 to the left lens 106 for a duration equal to the value of Left Duration 5223. The Control Unit then transitions reads the Next Frame Signal 5221 and performs the same processing for frame n+1 that it performed for frame n.

FIG. 53 is a block diagram 5300 showing the operation of a typical the Continuous Adjustable 3Deeps Filter Spectacles system. This is the complete system. It follows the operation of the 2D/3D 3Deeps viewing systems through three consecutive frames of video and shows the processing Video and 3Deeps Processing, display of the motion picture in synchronization with transmission of the Control Information for the Continuous Adjustable 3Deeps Filter Spectacles, and reception and control of lenses.

The first column is labeled Time' and shows three consecutive frames of video at time $t_n$ 5301, $t_{n+1}$ 5311, and $t_{n+2}$ 5321. As an example, if the video is being shown at 60 Frame per second then the time between each frame (e.g. $t_{n+1}-t_n$) is 16.667 msec. First consider the processing of the frame n 5303 at time $t_n$ 5301. The Video Frame 5302 is read 5303 by the Video and 3Deeps Processing module 5320. The Video processing format conversion is output 5304 and displayed as Display Frame 5305. In this teaching example, the Video/3Deeps Processing consists only of de-interlacing so no new frames are created in the Display Video output stream. If the Video/3Deeps Processing module also performed up-conversion (or down-conversion) then the number of output frames would increase (decrease). The Video and 3Deeps Processing module has been previously described in FIG. 46 and FIG. 47. The Video/3Deeps Processing also calculates the Control Information 4800 described in FIG. 48. The control information is transmitted 4695 synchronous with the output display frames 5305. The Continuous Adjustable 3Deeps Filter Spectacles 101 receive the signal 110 and the Control Unit 103 implements the electrochromic specific algorithm to optimally control the Continuous Adjusting 3Deeps Filter Spectacles and generate the signal synchronous with motion picture to set the dark optical density of the right lens 5309 and the left lens to clear. The operation of the Control Unit 103 has been described in FIGS. 3, 49, 50, 51, and 52.

Similarly is the processing of the next frame n+1 5312 at time $t_{n+1}$ 5311. The Video Frame 5312 is read 5313 by the Video and 3Deeps Processing module 5320. The Video processing format conversion is output 5314 and displayed as Display Frame 5315. The Video/3Deeps Processing calculates the Control Information 4800 described in FIG. 48. The control information is transmitted 4695 synchronous with the output display frames 5315. The Continuous Adjustable 3Deeps Filter Spectacles 101 receive the signal 110 and generate the signal to set the dark optical density of the right lens 5319 and the left lens to clear. In this example the right lens 5319 associated with frame n+1 is a darker optical density than the right lens 5309 that is associated with frame n.

Similarly is the processing of the next frame n+2 5322 at time $t_{n+2}$ 5321. The Video Frame 5322 is read 5323 by the Video and 3Deeps Processing module 5320. The Video processing format conversion is output 5324 and displayed as Display Frame 5325. The Video/3Deeps Processing calculates the Control Information 4800 described in FIG. 48. The control information is transmitted 4695 synchronous with the output display frames 5325. The Continuous Adjustable 3Deeps Filter Spectacles 101 receive the signal 110 and generate the signal to set the dark optical density of the right lens 5329 and the left lens to clear. In this example the right lens 5329 associated with frame n+2 is an even darker optical density than the right lens 5319 that is associated with frame n+1.

FIG. 54 5400 is a block diagram 5401 for a preferred embodiment of an IC Chip generating optimum optical density signals for each individual lens of a Continuous Adjustable 3Deeps Filter Spectacle 101. One embodiment of the chip is a self-contained optical density calculator that calculates and outputs the OD density values for the Right 5463 and Left lenses 5464 of Continuous Adjustable 3Deeps Filter Spectacles synchronized 5462 to the A/V 5461 of the motion picture. The chip 5401 performs the calculations selectively based on the optimal OD algorithms described in FIG. 40 and FIG. 41, or selectively based on the optimal OD algorithm described in FIG. 43. The chip has configurable Frame Search parameters (parms) 5404 used to identify and determine the single motion vector (direction 5432 and velocity 5431) that characterizes lateral motion in the frame of the motion picture as described in FIG. 41. Additionally, the preferred embodiment of the chip 5401 is configurable with parameters necessary for the algorithmic calculations 5403 such as the pixel resolution of the viewing screen.

Power 5485 is provided to the IC chip 5401. The chip has an input port for the A/V Frame-In 5402 for the current frame of the motion picture coupled to the output port of a frame register. The input frame signal 5402 is passed unchanged through the chip 5401, and output on the A/V Frame-Out 5461 synchronized 5462 with the calculated output values of the Right Lens OD 5463 and the Left Lens OD 5464 of Continuous Adjustable 3Deeps Filter Spectacles 101.

The chip has an input port 5407 to receive the Motion Vector Values of the current frame coupled to the output of a motion vector estimation module. As previously related, Video format conversion chips calculate motion vector values to compensate for motion when de-interlacing and up-converting video, and the subject IC chip 5401 will often be coupled to such a format conversion chip. The chip 5401 also has an input port to receive the luminance values 5405 coupled to the output of a luminance determination module possibly as calculated by a video format conversion chip. The Motion Vector values 5407 and Luminance values 5405 are stored in Volatile memory 5412 contained on the chip. Other embodiments of the chip 5401 may use off-chip memory for storage of these values.

The preferred embodiment of the chip 5401 has non-volatile memory 5410 to store the Frame Search parameters 5404 of the algorithm implemented in the Lateral Motion Determining Unit 5420. The Frame Search parameters 5404 have been previously described in FIG. 40 and FIG. 41, and are the regions of the current frame of the motion picture that delimits the search for lateral motion vector that characterizes motion in the frame of the motion picture. The parameters include the boundaries of the upper bounded region that is a surrogate for the background in the frame of the movie and the lower bounded region that is a surrogate for the foreground of the frame of movie. The input port for the Frame Search parameters 5404 provides a means to input the Frame Search parameters, and the input includes a binary switch to control whether the chip will input, store and use new values for the Frame Search parameters or use the already stored values. In normal usage it would be unusual for the Frame Search parameters 5404 to be changed within any single presentation.

Also stored in the non-volatile memory 5410 are the parameters necessary to compute the Optical Density Calculations. This includes (a) the threshold values for determining whether lateral motion is present or not (e.g. the −10 dpi and 10 dpi values 4150 of FIG. 41), (b) refresh rate of the viewing monitor (e.g. 60 Hz of FIG. 40), and (c) the pixel resolution of the viewing monitor (e.g. 100 dpi of FIG. 40). The input port for the algorithm parameters 5403 provides a means to input the algorithm parameters and includes a binary switch to control whether the chip will input, store and use new values for the algorithm or use the already stored values. In normal usage the algorithm parameters primarily characterize the viewing display (e.g. TV screen) and once set will rarely change.

The Algorithm Select 5406 input allows the chip 5401 to configure itself to use either the circuitry that performs the calculation described in FIG. 40 and FIG. 41 5441, or in FIG. 43 5442. The algorithm described in FIG. 40 and FIG. 41 requires as input the direction and velocity of lateral motion in the motion picture and the luminance in the frame of the motion picture, while the algorithm described in FIG. 43 requires as input only the direction and luminance of the frame of the motion picture, but not the velocity. In other embodiment the Algorithm Select 5406 input may be stored in the non-volatile memory 5410 and then only changed as necessary.

The operation of the units of circuitry on the chip 5401 using these input values follows. The A/V Frame 5402 is input to the chip so that the Right 5463 and Left OD 5464 values calculated and output with the frame may be synchronized 2062 with the A/V output 5461. No calculations or reformatting is performed on the A/V signal.

The Lateral Motion Determining Unit 5420 has circuitry to implement the previously described algorithm to determine the single most prominent moving object in the background region of the frame and the single most prominent object in the foreground region of the frame and then process these identified values to calculate the direction and velocity that characterizes lateral motion in the frame. Input to the Lateral Motion Determining Unit 2020 is the Frame Search Parameters 5404 stored in the non-volatile memory 5410, and the Motion Vector Values 5407 stored in volatile memory 5412. The output is the calculated Velocity (Vel in dpi units) 5431 and the direction of motion 5432 (die negative for right-to-left motion and positive for left-to-right motion). These values may be stored in volatile memory in some embodiments.

The Optical Density Calc Unit 5440 implements the Optical Density Calculation to determine the setting of the lenses of the Continuous Adjustable 3Deeps Filter Spectacles 101. In one embodiment both of the algorithms described in FIG. 40 and FIG. 41 5441, and in FIG. 43 5442 are implemented within the unit's circuitry. The Algorithm Select input port 5406 determines which of the calculation circuits is used. If the Algorithm described in FIG. 40 and FIG. 41 5441 is used, then the values of Velocity 5431 (Vel) and Direction 5432 (Dir) of lateral motion are read from the output of the Lateral Motion Determining circuitry 5420. Also, the Luminance (Lum) 5433 value stored in volatile memory 5412 is read, along with the Algorithm parameters 5403 stored in Non Volatile memory 5410. With these input values the Optical Density Calc Unit 5440 circuitry calculates the optimal optical values for the Right lens (OD R) 5451 and Left Len (OD L) 5452 and passes them to the Sync Unit 5450. If the Algorithm described in FIG. 43 5442 is used then the values of Direction 5432 (Dir) of the lateral motion is read from the output of the Lateral Motion Determining circuitry 5420, the Luminance 5433 (Lum) value stored in volatile memory 5412 and the Algorithm parameters 5403 stored in non-volatile memory 5410. With these input values the Optical Density Calc Unit 5440 circuitry calculates the optimal optical values for the Right Lens (OD R) 5451 and the Left Len (OD L) 5452 and passes them to the Sync Unit 5450.

The Sync Unit 5450 synchronizes the output of the Video Frame 5461 with the output of the calculated values of the Right Lens OD 5463, and the Left Lens OD 5464. Along with a sync signal 5462, the unit also outputs the frame on the A/V Frame-Out 5461, and the calculated values of the Optical Density for the right lens (Right Lens OD) 5463 and the left lens (Left Lens OD 5464).

While the Optical Density Calc Unit 5440 has circuitry to implement the Optical Density algorithms described in accompanying FIG. 40 and FIG. 41 5441, and FIG. 43 5442, other embodiments may include other algorithms to calculate the optical density of the Right 5463 and Left lenses 5464 of the Continuous Adjustable 3Deeps Filter Spectacle 101.

Also, while the Lateral Motion Determining Unit 5420 only uses the Algorithm described in FIG. 40 and FIG. 41 to characterize the lateral motion (direction and speed) in a frame of a motion picture, other embodiments may alternatively use algorithms such as that described in FIG. 42 to characterize the lateral motion in a frame of a motion picture.

The IC chip 5401 has separate outputs for the optimal Left Len OD 5463 and Right Len OD 5464. Rather than use these values to control Continuous Alternating 3Deeps Filter Spectacles, the values can alternatively be used to determine the frames of a dual image 3D viewing systems as is also described below.

One embodiment of the chip has Input 5402 and Output 5461 ports for the A/V frame of the movie and the chip is able to synchronize 5462 the output frame with the output of the calculated value of the Right 5463 and Left Len 5464 optical densities. Other embodiments may use other means to synchronize the Continuous Adjustable 3Deeps Filter Spectacles 101 to the frame of the motion picture without input of the picture frame A/V Frame In 5402.

While FIG. 54 shows the Calculation of the Optimum Optical Density Signals for Each Individual Lens Of A Continuous Adjustable 3Deeps Filter Spectacles 101 embodied as a chip coupled with other chips such as video format conversion chips, the circuitry could have been included within the circuitry of such a chip. Also the circuitry of FIG. 54 may connect to other IC chips on an IC board.

FIG. 55 5500 is a block diagram 5501 of an alternate embodiment of an IC chip 5501 generating the change in optical density signals 5540 for each individual lens of a Continuous Adjustable 3Deeps Filter Spectacle 101. This alternate embodiment of an IC chip 5501 implements the optical density calculation algorithm of FIG. 43 5531, and has the benefits that (1) it only requires direction and not speed of lateral motion, and (2) it can be implemented directly on the a Continuous Adjustable 3Deeps Filter Spectacle 101 using a photodiode 4420 to provide a measure of luminance. Power 5485 is provided to the IC chip 5501. Since the algorithm of FIG. 43 requires the refresh rate and pixel resolution of the viewing monitor, these values are provided through the circuitry of the Algorithm Parms 5403 and stored in non-volatile memory 5510. Once updated, there is no necessity to refresh the values until there is a change of viewing monitor. A chip on the projection or viewing device such as a video format chip calculates and provides the Direction Values 5505, and the Luminance Values 5405. Note that the speed of lateral motion is not required for the algorithm described in FIG. 43, and is not input.

The Direction Value 5505, and the Luminance Values 5405 are read and stored in volatile memory 5520. In this embodiment, rather than calculate and output values for the Left Lens OD and the Right Lens OD, only a single Delta Difference value 5540 is calculated and output. This will allow the alternate embodiment chip to have fewer output legs and thus a smaller package with lessened power requirements. To indicate whether the Delta change is to be applied to the Left lens, or the Right Lens, a Lens Change Indicator 5542 is also output. If the Value of the Lens Change Indicator is 0 then both lenses are set back to a default clear state. If the Value of the Lens change Indicator is 1 then only the Left Lens is affected and it is set from its last state ($OD_{Last}$) to a new state ($OD_{current}$) by adding the Delta Lens Change value 5540 (a value of $OD_{current}-OD_{Last}$) to the last value of the Left Lens ($OD_{Last}$). If the Value of the Lens change Indicator is 2 then only the Right Lens is affected and it is set from its last state ($OD_{Last}$) to a new state ($OD_{current}$) by adding the Delta Lens Change value 5540 (a value of $OD_{current}-OD_{Last}$) to the last value of the Right Lens ($OD_{Last}$).

The Value of Delta Change Lens OD 5540 and the Lens Change Indicator 5542 are calculated by the Optical Density Calc Unit 5530 that implements the Algorithm of FIG. 43 5531. It reads the algorithm parameters 5403 stored in non-volatile Memory 5510, the Direction Value 5505 stored in volatile memory 5522, and the Luminance Value 5405 stored volatile memory 5521. The Unit 5530 performs the calculations and stores the Calculated OD values in volatile memory as OD Current 5523, keeping track of the last calculated OD values. The Unit 5530 output the Delta Len OD 5540 and the Lens Change Indicator 5542 as previously described.

FIG. 56 5600 shows Continuous Adjustable 3Deeps Filter Spectacles 101 that include an IC chip 5501 generating the change in optical density signals for each individual lens of a Continuous Adjustable 3Deeps Filter Spectacle. It shows the same perspective view of Continuous Alternating 3Deeps Filter Spectacles 101 shown in FIG. 44, but with the addition of the IC Chip 5501 of FIG. 55 and a connector 5502 between the IC Chip 5501 and the Control Unit 103. The receiver 102 labeled Rx is coupled to the IC chip 5501. The receiver 102 outputs the Algorithm parameters 5403, and the direction value 5505 to the IC chip 5501 that performs the calculations and outputs the Delta change (Δ Lens OD) 5540 to the IC chip 5501 (labeled ODIC), along with a Lens Change Indicator 5542 as to whether it is the Right Lens 105 or the Left Lens 106 of the Continuous Alternating 3Deeps Filter Spectacles 101 that is to be change to a new state. The Control Unit 103 and the IC Chip 5501 are connected 5602, that is used to output the calculations from the IC chip 5501 to the Control Unit 103. The IC chip 5501 performs the calculations as described in FIG. 55. The advantage of this embodiment, as previously indicated, is that the Luminous Reading from the Photodiode, can be used for the calculations, and since the photodiode 4420 is on the frame of the spectacles, it will have the best surrogate value for luminance reaching the frames of the spectacles.

Other Embodiments

Other embodiments may develop other means to optimally set the transmissivity of the neutral density filter lens. For instance for special venues it may be desirable to have lenses that optimize the darker and lighter filters for different light wavelengths.

Also, other factors, not part of the retinal reaction curve may be considered to compute an optimal value of the neutral density filter. In the teaching example of the preferred embodiment, luminance is the only factor determining the retinal reaction time. However, research has found other less important factors that affect retinal reaction time including, but not limited to, prolonged readiness, certain common drugs, temperature, and sleep conditions. Knowledge of factors may be advantageously used. Alternately, the Continuous Adjustable 3Deeps Filter Spectacles may have controls allowing customization of values used by the algorithms such as thresholds, parameters of the retinal reaction curve, etc, so that the Continuous Adjustable 3Deeps Filter Spectacles may be customized to individual use.

While one above-described embodiment uses a fixed distance of 2½ inches to lag the delayed image, other embodiments may preferably use other fixed distances. Specifically and advantageously some alternate embodiments may also use the distance between the viewer and the viewing device—that is a preferred distance from the screen. Rather than the exact distance, surrogate distances may be employed. For instance for viewing with an IPOD like personal movie device a distance of about 1 foot may be used. When Continuous Adjustable 3Deeps Filter spectacles are used with a personal computer or a personal DVD player, a distance of 1½ feet between the viewer and display screen may be assumed. When viewing on a large-screen digital or projection TV, a distance based on the size of the display monitor may be used. In a movie theater venue the distance may be set to 50 feet.

The above-described embodiments are for teaching purposes. Other more sophisticated algorithms may be used to calculate the setting of the filter lens. These algorithms may not only have speed of motion, direction or motion, and luminance as input parameters, but may also allow for input of other values, or for the setting of constants such as inter-ocular distance, in their calculations.

Continuous Adjustable 3Deeps Filter Spectacles can benefit from the inclusion of controls that would allow the viewer to customize the specs to individual differences. For instance, while the average inter-ocular distance is 2.5 inches, there is a lot of variation between individuals in this value. Alternate embodiments of Continuous Adjustable 3Deeps Filter Spectacles can beneficially account for individual differences by allowing customized control for this value, either through a physical thumbwheel type setting, or input parameters to the 3Deeps Filter Spectacles controller. For instance, there may be a 3-position manually controlled switch that allows the viewer to change the inter-ocular distance used in the lens calculations to 2¼ inches (small), 2½ inches (average), or 2¾ inches (large). In other embodiments, a computer connects to a master computing appliance to set the Continuous Adjustable 3Deeps Filter Spectacle customization parameters.

In another alternate embodiment, it has been shown that the degree of the depth effect of the Pulfrich illusion is due to the difference in retinal reaction time between the two eyes. That means that there are innumerable settings of the Continuous Adjustable 3Deeps Filter Spectacle lenses that will provide the same depth illusion. For instance FIG. 40 shows an optimal setting of the lenses has one lens clear with a retinal reaction time of 120 msec (input luminance of 0.52) and the neutral lens is chosen with an optical density producing a luminance of −0.6 so the difference in retinal reaction time is 42 msec or 162 msec. Another setting with the same depth perception is if the 0.42 msec retinal reaction time difference is from one lens that is darkened so that the eye receive a luminance of 0.0 corresponding to a retinal reaction time of 150 msec and the other eye has a retinal reaction time of 192 msec (150+42=192 msec), that corresponds to a lens with optical density so the eye receives −0.95 on the luminance scale. The first case is optimal in that we have a clear and dark lens and the eyes receive the maximum amount of light for the desired depth effect. In the second case both lenses obstruct light, though the clear lens obstructs less light than the darker lens. In some instances however, this approach may be beneficial, as for example, to better control the response time of the lenses.

While some electro-optical materials change state seemingly instantaneously (e.g. LCD materials), other materials may have a slow response time. In these cases the Continuous Adjustable 3Deeps Filter Spectacles may be more responsive by taking lens states that have the desired difference in retinal illumination for the two eyes, but may use a gray clear state that is lighter than the darker lens in order to achieve a threshold responsiveness when the lenses change state. That is, if achieving the clearest state takes too long, it may be preferable to have more responsive Continuous Adjustable 3Deeps Filter Spectacles with a clear lens that obstructs some light, and a dark lens chosen to provide the desired difference in retinal reaction time.

In another embodiment, rather than fix the distance d between an object in different frames on the screen, it may be desirable to choose an optical density so the degree of depth illusion remains a constant throughout all frames of the movie that exhibit motion.

In another embodiment, the motion vectors of multiple objects are used to provide an estimate of parallax that is then used to select criteria for the optimization of the optical density of the neutral density lens.

In other embodiments, the viewer may control the degree of darkening allowed. For instance, rather slow movement from left-to-right may require that the neutral density filter be considerably darkened. For some viewers this may be problematical or undesirable and for such viewers allowing them a degree of control over the darkening of the lenses is reasonable. One such control would allow the user to specify an upper limit on the degree of darkening allowed, with exemplary options allowing 5 settings corresponding to a maximum darkening of 50%, 60%, 70%, 80% and 90%.

Any of the algorithmic embodiments may also include the judicious use of heuristics to achieve a best 3D presentation for the viewer. For instance, in a darkened theater and with a dark scene exhibiting motion, the optimal setting for the neutral density lens may take a value that is deemed either too dark for the best 3D presentation for the viewer. Or, the optimal setting for the neutral density lens may take a value that is deemed to take too long to transition to such a dark state for the best 3D presentation. In either of these cases threshold values may be incorporated to override the optimal settings so that the neutral density filter cannot take values outside a specific range. These are exemplary and other heuristics may be incorporated for beneficial purposes.

Heuristics may also be required to address other issues. For instance, it has been observed that the Pulfrich illusion will turn off when lateral motion is too fast. This phenomenon is not entirely understood, but to address it a heuristic rule may be used in any of the algorithms that determine the optical density of the neutral density filter so that when the lateral motion is too fast the Continuous Adjustable 3Deeps Filter Spectacles take their clear-clear state. This is exemplary and other heuristics may be incorporated for beneficial purposes. We note that cinematographers have long recognized that action that is too fast does not record well, and so movies generally will not exhibit this problem.

Some embodiments provide an example for when such heuristics may be used. The goal of such embodiments is to provide constant depth perception that is normal in the sense that it is in accordance with an individual's normal interocular distance. As previously described this is achieved by optimally controlling the optical density of the neutral density filter.

However, if the viewer is in a darkened venue, viewing a darkened movie and/or lateral screen motion is too slow, it may not be possible to maintain this constant depth perception and heuristic rules may be used to slowly degrade the degree of depth perceived. As noted before, few observers will notice this anymore than they are bothered by the spatial changes resulting from use of telephoto or wide-angle lens in filming scenes.

In still another embodiment, the algorithm to calculate the optical density to optimize the single image 3Deeps Filter Spectacles may be advantageously used in a dual image system. Dual image systems require two images (or frames) for each frame of a traditional movie. One of the two images is a left eye image and the other is a right eye image. Dual image systems have twice as many frames of video as in a single image system, require special format, projectors, and except in the case of lenticular viewing screens, special viewing devices.

Using the preferred embodiment of this invention, based on luminosity and direction and speed of motion, we have described how to determine the optimal optical density of a neutral density filter. Rather than use this calculation to control and synchronize Continuous Adjustable 3Deeps Filter Spectacles, we can use the value to generate a second frame of video for a dual image systems. For clarity the result of the calculation is referred to as OD-optimal and has a value that provides the optimal optical density of the neutral density filter of the Continuous Adjustable 3Deeps Filter Spectacles.

In this dual image system embodiment, rather than use the OD-optimal value for the Continuous Adjustable 3Deeps Filter Spectacles, the result is used to generate a second frame of a dual image 3D motion picture. If the result of the algorithm is that there is no lateral movement in the single frame of the motion picture, then the frame image is duplicated resulting in two frame images, and the frame images is then used as both the right eye image and the left eye image. If the result of the algorithm is that the direction of lateral motion is left to right, then the second frame will be duplicated but with the added shading of OD-optimal. The duplicated shaded image will be used as the right eye image, and the unchanged frame used as the left eye image. If the result of the algorithm is that the direction of lateral motion is right to left, then the second frame will be duplicated but with the added shading of OD-optimal. The duplicated shaded image will be used as the left eye image, and the unchanged frame used as the right eye image.

Since this alternate embodiment is for a dual image system, the right eye image and the left eye image must be directed to the appropriate eye, and this can be done using any of the dual image viewing systems including shutter glasses, head mounted displays, Polaroid or lenticular screens. Since this embodiment is for a dual image system it cannot be used if the viewer is wearing Continuous Adjustable 3Deeps Filter spectacles.

Some 3D viewing systems have darkened lenses and so the calculation of OD-optimal will be slightly different for such systems. While lenticular and head mounted displays will work as previously described, shutter glass and polaroid 3D viewing systems have darkened lenses, and this additional reduction in luminosity must be accounted for in the input to the algorithm.

In still another embodiment, 3D Viewing spectacles are manufactured that may be switched between electronic (1) single image Continuous Alternating 3Deeps Viewing Spectacles, and (2) dual image viewing spectacles. As an example consider an anaglyph dual image system, and two electrochromic materials, one that is either clear or darkens to red, and another that is either clear or darkens to blue. Such materials can be used to build electronically operated anaglyph spectacles. If the Continuous Alternating 3Deeps Viewing Spectacles are manufactured with a second layer of such color changing electrochromic materials then the spectacles may be switched to operate as either Continuous Alternating 3Deeps Viewing Spectacles or anaglyph 3D viewing spectacles. In yet another embodiment, a connector for earphones is included on the Continuous Alternating 3Deeps Viewing Spectacles allowing an audio signal to be played through earphones.

Embodiments of the invention may implement the Video and 3Deeps Processing directly on a video format conversion semiconductor chip. Alternatively the output from such a video format conversion semiconductor may be used as input to a semiconductor chip dedicated to the Video and 3Deeps Processing. Also the dual image alternate embodiment can similarly use the video image processing of a video conversion chip described in such embodiments to generate the value OD-optimal to generate the second image for this dual image embodiment, and assign the image to the correct eye.

In accordance with another embodiment, a method of displaying one or more frames of a video is provided. Data representing an image frame is obtained. A plurality of bridge frames that are visually dissimilar to the image frame are generated. The image frame and the plurality of bridge frames are blended, generating a plurality of blended frames, and the plurality of blended frames are displayed. In one embodiment, the plurality of bridge frames are also different from each other.

Figure 57:
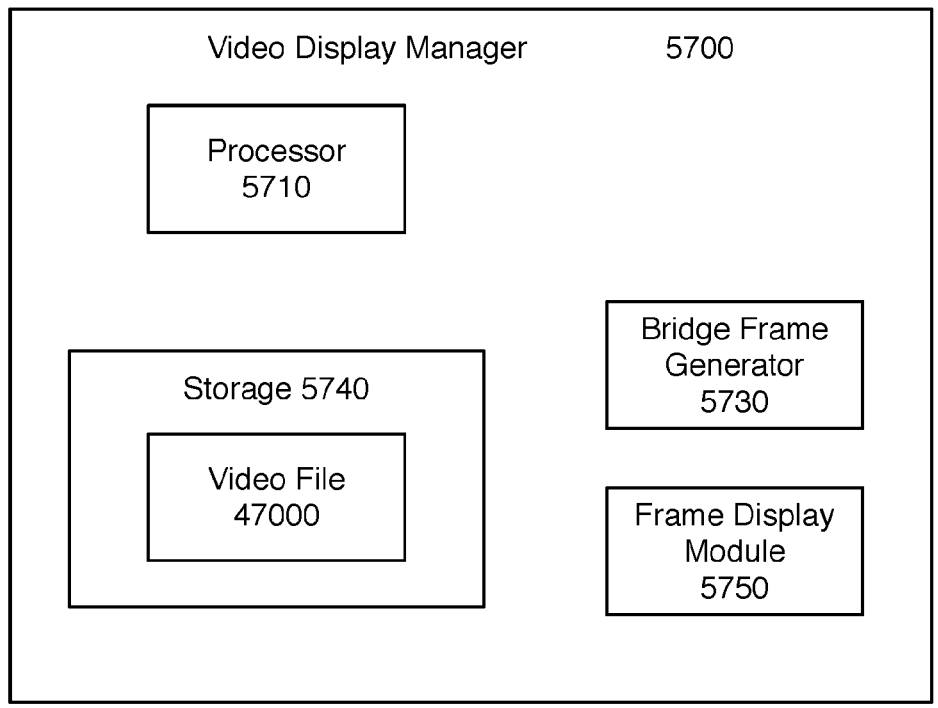
FIG. 57 shows components of a video display manager in accordance with an embodiment.

FIG. 57 shows a video display manager that may be used to implement certain embodiments in accordance with an embodiment. Video display manager 5700 comprises a processor 5710, a bridge frame generator 5730, a frame display module 5750, and a storage 5740.

Figure 58:
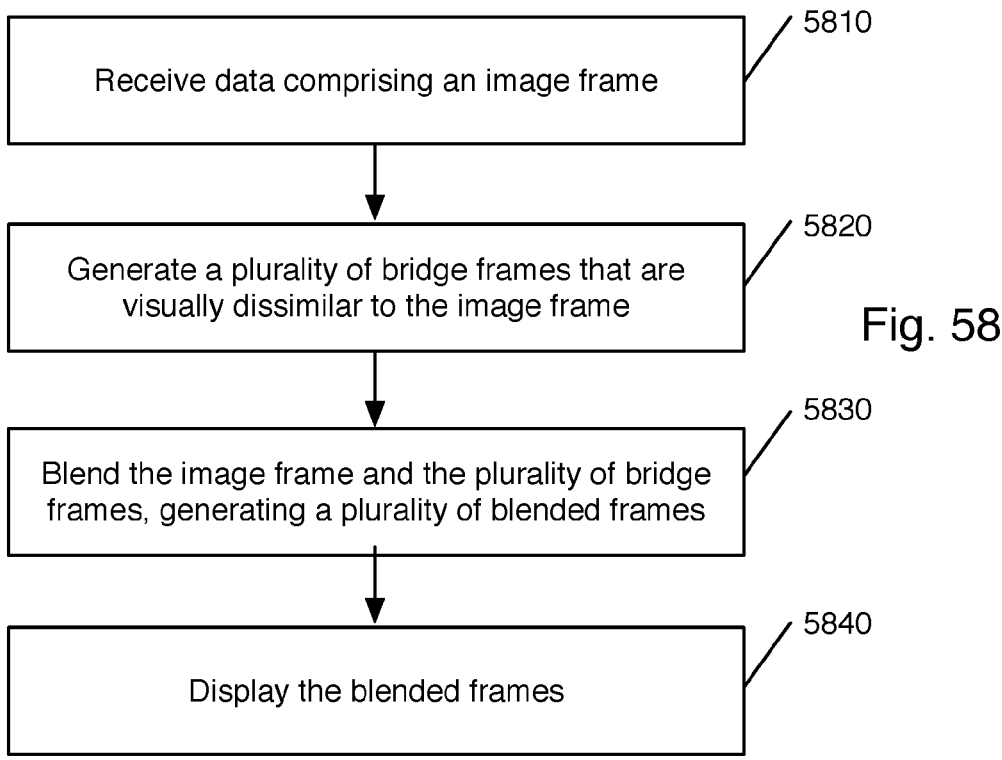
FIG. 58 is a flowchart of a method of displaying one or more image frames in accordance with an embodiment.

FIG. 58 is a flowchart of a method of displaying one or more image frames in accordance with an embodiment. In an illustrative embodiment, a video file 47000 is stored in storage 5740. Video file 47000 may be generated by video display manager 5700 or, alternatively, received from another device or via a network such as the Internet.

At step 5810, data comprising an image frame is received. In the illustrative embodiment, processor 5710 retrieves video file 47000 from storage 5740. FIG. 33 shows an image frame 3350 showing a man against a background of clouds and sky.

At step 5820, a plurality of bridge frames that are visually dissimilar to the image frame are generated. Bridge frame generator 5730 generates two or more bridge frames that are dissimilar from image frame 3350. In one embodiment, the two bridge frames are also different from each other. FIGS. 34A and 34B show two bridge frames 3410 and 3420 that may be generated. In the illustrative embodiment, bridge frame 3410 has a first pattern and a bridge frame 3420 has a second pattern that is different from and complementary to the first pattern of bridge frame 3410. In other embodiments, bridge frames may be retrieved from a storage.

At step 5830, the image frame and the plurality of bridge frames are blended, generating a plurality of blended frames. In the illustrative embodiment, frame display module 5750 blends image frame 3350 and bridge frame 3410 to generate blended frame 3510, shown in FIG. 35A. Frame display module 5750 also blends image frame 3350 and bridge frame 3420 to generate blended frame 3520, shown in FIG. 35B.

At step 5840, the plurality of blended frames are displayed. Frame display module 5750 now displays blended frames 3510 and 3520 in a manner similar to that described above. For example, blended frames 3510 and 3520 may be displayed in accordance with a predetermined pattern, for example. In an embodiment illustrated in FIG. 35C, blended frames 3510, 3520 are displayed consecutively in a predetermined pattern.

In other embodiments, blended frames 3510 may be displayed in a pattern that includes a plurality of blended frames and image frame 3350, or in a pattern that includes other bridge frames.

In accordance with another embodiment, a plurality of blended frames may be displayed in accordance with a predetermined pattern that includes a first pattern comprising the plurality of blended frames, and a second pattern that includes repetition of the first pattern. In an embodiment illustrated in FIG. 35D, blended frames 3510 and 3520 are displayed in a repeating pattern that includes blended frame 3510, blended frame 3520, and a bridge frame 3590.

Figure 59A:
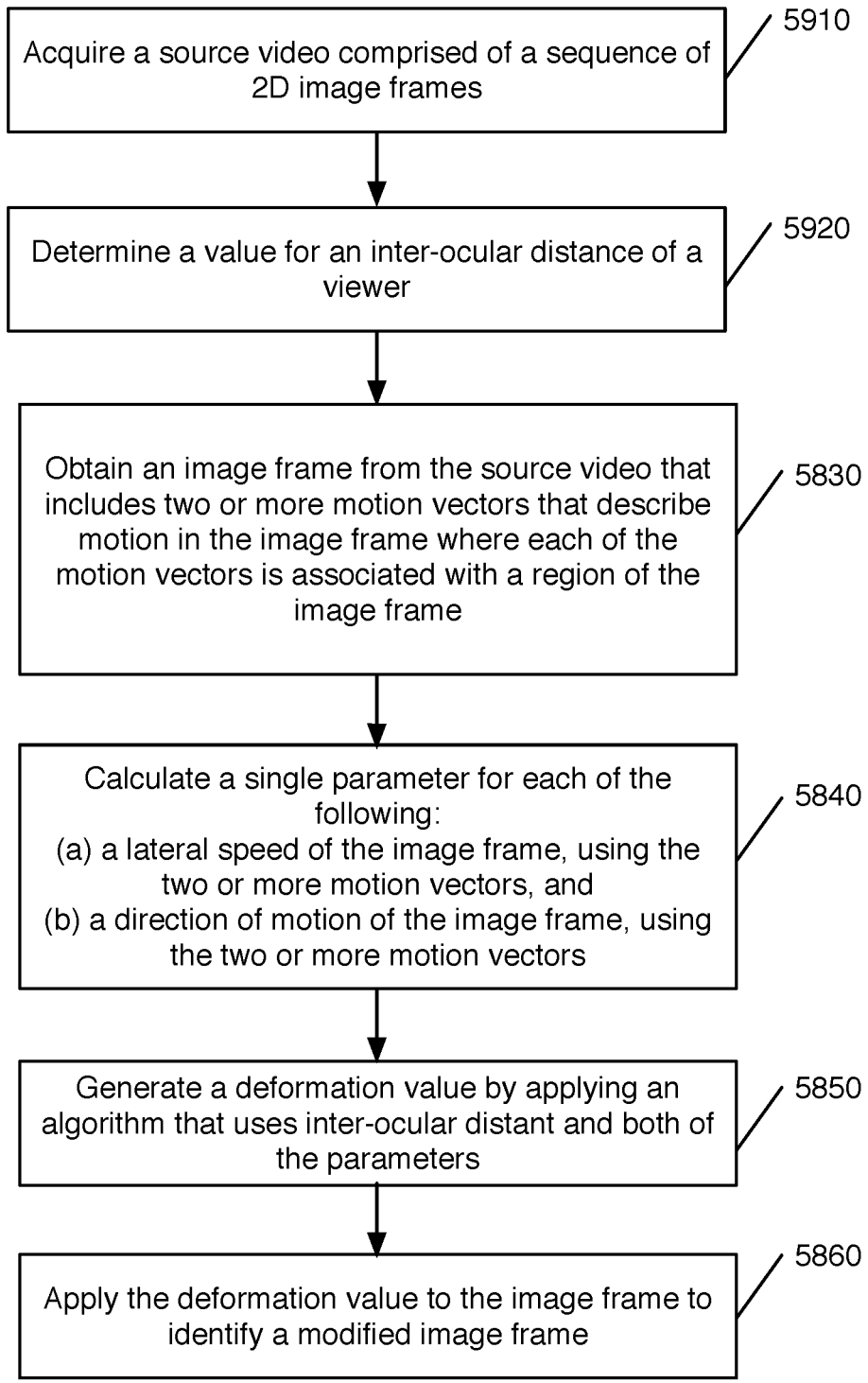
FIGS. 59A-59B comprise a flowchart of a method of generating modified video in accordance with an embodiment.
Figure 59B:
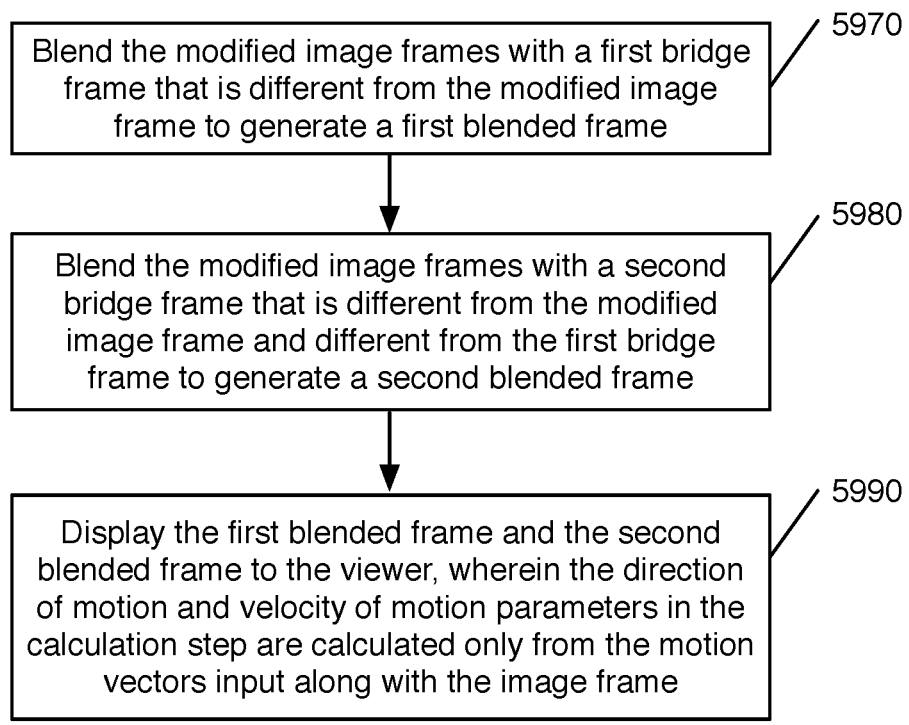

Systems and methods described herein may be used advantageously to provide particular benefits. For example, in accordance with one embodiment, a method for generating modified video is provided. FIGS. 59A-59B comprise a flowchart of a method in accordance with an embodiment. At step 5910, a source video comprising a sequence of 2D image frames is acquired. At step 5920, a value for an inter-ocular distance of a viewer is determined. At step 5930, an image frame is obtained from the source video that includes two or more motion vectors that describe motion in the image frame where each of the motion vectors is associated with a region of the image frame. At step 5940, a single parameter is calculated for each of the following: a lateral speed of the image frame, using the two or more motion vectors, and a direction of motion of the image frame, using the two or more motion vectors. At step 5950, a deformation value is generated by applying an algorithm that uses the inter-ocular distance and both of the parameters. At step 5960, the deformation value is applied to the image frame to identify a modified image frame. At step 5970, the modified image frame is blended with a first bridge frame that is different from the modified image frame to generate a first blended frame. At step 5980, the modified image frame is blended with a second bridge frame that is different from the modified image frame and different from the first bridge frame to generate a second blended frame. At step 5990, the first blended frame and the second blended frame are displayed to the viewer. The direction of motion and velocity of motion parameters in the calculation step are calculated only from the motion vectors input along with the image frame.

In one embodiment, the viewer views the modified video through spectacles.

In another embodiment, the spectacles have a left and right lens, and each of the left and right lens has a darkened state. In another embodiment, each of the left and right lenses has a darkened state and a light state, the state of the left lens being independent of the state of the right lens.

In another embodiment, the spectacles further comprise a battery, a control unit and a signal receiving unit. The control unit is adapted to control the state of the each of the lenses independently.

In another embodiment, the left and right lenses comprise one or more electro-optical materials.

In accordance with another embodiment, a method for generating modified video is provided. A source video comprising a sequence of 2D image frames is acquired. A value for an inter-ocular distance of a viewer and factors for a display resolution and a video frame speed are determined. An image frame is obtained from the source video that includes two or more motion vectors that describe motion in the image frame where each of the motion vectors is associated with a region of the image frame. A single parameter is calculated for each of the following: a lateral speed of the image frame, using the two or more motion vectors, and a direction of motion of the image frame, using the two or more motion vectors. A deformation value is generated by applying an algorithm that uses the inter-ocular distance, both of the factors, and both of the parameters, and the deformation value is applied to the image frame to identify a first modified image frame, the first modified image frame being different from any of the sequence of 2D image frames. A second modified image frame is identified based on the first modified image frame, and the second modified image frame is displayed to the viewer. The direction of motion and velocity of motion parameters in the calculation step are calculated only from the motion vectors input along with the image frame.

In accordance with another embodiment, a system comprises at least one processor for generating modified video, the processor adapted to acquire a source video comprising a sequence of 2D image frames, determine a value for an inter-ocular distance of a viewer, obtain an image frame from the source video that includes two or more motion vectors that describe motion in the image frame where each of the motion vectors is associated with a region of the image frame, and calculate a single parameter for each of the following: a lateral speed of the image frame, using the two or more motion vectors, and a direction of motion of the image frame, using the two or more motion vectors. The at least one processor is further adapted to generate a deformation value by applying an algorithm that uses the inter-ocular distance and both of the parameters, apply the deformation value to the image frame to identify a modified image frame, blend the modified image frame with a first bridge frame that is different from the modified image frame to generate a first blended frame, blend the modified image frame with a second bridge frame that is different from the modified image frame and different from the first bridge frame to generate a second blended frame, and display the first blended frame and the second blended frame to a viewer. The direction of motion and velocity of motion parameters in the calculation step are calculated only from the motion vectors input along with the image frame. The system also includes spectacles for viewing the modified video, the spectacles comprising a left and right lens, each of the lenses having a dark state and a light state, and a control unit adapted to control the state of the each of the lenses independently.

In accordance with another embodiment, a method of displaying video content to a viewer, comprises: obtaining source video content comprised of 2D frames of video; transmitting the source video to a receiver; analyzing the 2D frames of the source video content to measure parameters for direction of motion, velocity of motion and luminance; calculating a deformation value using an algorithm that uses at least two of the measured parameters in combination with values for display resolution and video frame speed; processing the source video content using the deformation value; and displaying the processed video content to a viewer. The method may include, wherein the direction of motion and velocity of motion parameters in the analysis step are calculated only from motion vectors in the source video content. The method may include, wherein the luminance parameter in the analysis step is calculated only from luminance values in the source video content. The method may include, wherein the processed video content in the displaying step is presented to a viewer through spectacles.

In accordance with another embodiment, a system for displaying modified video content to a viewer, comprises: a receiver which receives a 2D video signal comprised of 2D frames; a video signal processor which processes the 2D video signal; and a display unit which displays the processed video signal to a user; wherein the processing step comprises using an algorithm to calculate parameters for direction of motion, velocity of motion and luminance for the 2D frames in said 2D video signal; calculating a deformation value using at least two of said calculated parameters in combination with values for display resolution and video frame speed; and modifying the 2D video signal using the deformation value.

In accordance with another embodiment, a method of displaying video content to a viewer, comprises: obtaining a source video signal comprised of 2D frames; analyzing 2D frames from said source video signal to measure direction of motion, velocity of motion and luminance parameters; calculating a deformation value using an algorithm that includes at least two of said measured parameters in combination with values for display resolution and video frame speed; processing the video source signal using the deformation value; and displaying the processed video signal to a viewer. A method according to item 6, wherein the direction of motion and velocity of motion parameters in the analysis step are calculated only from motion vectors in the source video content. The method may include, wherein the luminance parameter in the analysis step is calculated only from luminance values in the source video content. The method may include, wherein in the processed video content in the displaying step is presented to a viewer through spectacles.

In accordance with another embodiment, a display apparatus comprises: a receiver which receives a source video signal comprised of 2D frames; a video signal processor which processes the source video signal; and a display unit which displays the processed video signal to a user; wherein said processing step comprises analyzing 2D frames from the video signal to measure direction of motion, velocity of motion and luminance parameters; and calculating a deformation value using an algorithm that includes at least two of the measured parameters in combination with values for display resolution and video frame speed.

In accordance with another embodiment, a method for generating modified video, comprises: acquiring a source video comprised of a sequence of 2D frames; calculating parameters for direction of motion, velocity of motion and luminance of the source video; determining factors for display resolution and video frame speed; generating a deformation value by applying an algorithm that uses at least two of the parameters and both of the factors; applying the deformation value to the source video to produce a modified video; and displaying the modified video to a viewer. The method may include, wherein the direction of motion and velocity of motion parameters in the calculation step are calculated only from motion vectors in said source video. The method may include, wherein the luminance parameter in the calculation step is calculated only from luminance values in the source video. The method may include, wherein in the modified video in the displaying step is presented to a viewer through spectacles.

In accordance with another embodiment, an apparatus which transforms a 2D source video signal, comprises: a video processing means for performing the transformation on the 2D source video signal; and a display means for displaying the transformed video to a viewer; wherein the transformation comprises analyzing the source video signal to generate parameters for direction of motion, velocity of motion and luminance; calculating a deformation value using an algorithm that includes at least two of the parameters in combination with factors for both display resolution and video frame speed; modifying the source video signal using the deformation value; and outputting the transformed video to the display means.

In accordance with another embodiment, a method for generating modified video is provided. A source video comprising a sequence of 2D image frames is acquired, a value for an inter-ocular distance of a viewer is determined, and an image frame is obtained from the source video that includes two or more motion vectors that describe motion in the image frame where each of the motion vectors is associated with a region of the image frame. A single parameter is calculated for each of the following: a lateral speed of the image frame, using the two or more motion vectors, and a direction of motion of the image frame, using the two or more motion vectors. A deformation value is generated by applying an algorithm that uses the inter-ocular distance and both of the parameters, and the deformation value is applied to the image frame to identify a modified image frame. The modified image frame is blended with a first bridge frame that is different from the modified image frame to generate a first blended frame, and the modified image frame is blended with a second bridge frame that is different from the modified image frame and different from the first bridge frame to generate a second blended frame. The first blended frame and the second blended frame are displayed to a viewer. The direction of motion and velocity of motion parameters in the calculation step are calculated only from the motion vectors input along with the image frame.

In various embodiments, the method steps described herein, including the method steps described in FIG. 58, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 58, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram of an exemplary computer that may be used to implement systems, apparatus and methods described herein is illustrated in FIG. 36. Computer 3600 includes a processor 3601 operatively coupled to a data storage device 3602 and a memory 3603. Processor 3601 controls the overall operation of computer 3600 by executing computer program instructions that define such operations. The computer program instructions may be stored in data storage device 3602, or other computer readable medium, and loaded into memory 3603 when execution of the computer program instructions is desired. Thus, the method steps of FIG. 58 can be defined by the computer program instructions stored in memory 3603 and/or data storage device 3602 and controlled by the processor 3601 executing the computer program instructions. For example, the computer program instructions can be implemented as computer executable code programmed by one skilled in the art to perform an algorithm defined by the method steps of FIG. 58. Accordingly, by executing the computer program instructions, the processor 3601 executes an algorithm defined by the method steps of FIG. 58. Computer 3600 also includes one or more network interfaces 3604 for communicating with other devices via a network. Computer 3600 also includes one or more input/output devices 3605 that enable user interaction with computer 3600 (e.g., display, keyboard, mouse, speakers, buttons, etc.).

Any or all of the systems and apparatus discussed herein, including video display manager 5700, and components thereof, may be implemented using a computer such as computer 3600.

One skilled in the art will recognize that an implementation of an actual computer or computer system may have other structures and may contain other components as well, and that FIG. 36 is a high-level representation of some of the components of such a computer for illustrative purposes.

While preferred and alternate embodiments of the invention have been described and illustrated, it should be apparent that many modifications to the embodiments and implementations of the invention could be made without departing from the spirit or scope of the invention. In various embodiments, methods, apparatus and systems are provided as described below.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus comprising:
   a storage adapted to:
      store one or more image frames;
   a processor adapted to:
      obtain a first image frame and a second image frame from a first video stream;
      generate a first modified image frame by expanding the first image frame, wherein the first modified image frame is different from the first image frame;
      generate a second modified image frame by expanding the second image frame, wherein the second modified image frame is different from the second image frame;
      generate a bridge frame, wherein the bridge frame is a solid color, wherein the bridge frame is different from the first image frame and different from the second image frame;
      display the first modified image frame;
      display the bridge frame; and
      display the second modified image frame.

2. The apparatus of claim 1, wherein the bridge frame is black.

3. An apparatus comprising:
   a storage adapted to:
      store one or more image frames;
   a processor adapted to:
      obtain a first image frame and a second image frame from a first video stream;
      generate a first modified image frame by shrinking the first image frame, removing a portion of the first image frame, wherein the first modified image frame is different from the first image frame;
      generate a second modified image frame by shrinking the second image frame, removing a portion of the second image frame, wherein the second modified image frame is different from the second image frame;
      generate a bridge frame, wherein the bridge frame is a solid color, wherein the bridge frame is different from the first image frame and different from the second image frame;
      display the first modified image frame;
      display the bridge frame; and
      display the second modified image frame.

4. The apparatus of claim 3, wherein the bridge frame is black.

5. An apparatus comprising:
   a storage adapted to:
      store one or more image frames;
   a processor adapted to:
      obtain a first image frame and a second image frame from a first video stream;
      generate a first modified image frame by removing a portion of the first image frame, wherein the first modified image frame is different from the first image frame;
      generate a second modified image frame by removing a portion of the second image frame, wherein the second modified image frame is different from the second image frame;
      generate a bridge frame, wherein the bridge frame is a solid color, wherein the bridge frame is different from the first image frame and different from the second image frame;
      display the first modified image frame;
      display the bridge frame; and
      display the second modified image frame.

6. The apparatus of claim 5, wherein the bridge frame is black.

7. An apparatus comprising:
   a storage adapted to:
      store one or more image frames;
   a processor adapted to:
      obtain a first image frame and a second image frame from a first video stream;
      generate a first modified image frame by stitching together the first image frame with a third image frame, wherein the first modified image frame is different from the first image frame;
      generate a second modified image frame by stitching together the second image frame with a fourth image frame, wherein the second modified image frame is different from the second image frame;
      generate a bridge frame, wherein the bridge frame is a solid color, wherein the bridge frame is different from the first image frame and different from the second image frame;
      display the first modified image frame;
      display the bridge frame; and
      display the second modified image frame.

8. The apparatus of claim 7, wherein the bridge frame is black.

9. An apparatus comprising:
   a storage adapted to:
      store one or more image frames;
   a processor adapted to:
      obtain a first image frame and a second image frame from a first video stream;
      generate a first modified image frame by inserting a selected image into the first image frame, wherein the first modified image frame is different from the first image frame;
      generate a second modified image frame by inserting a selected image into the second image frame, wherein the second modified image frame is different from the second image frame;

generate a bridge frame, wherein the bridge frame is a solid color, wherein the bridge frame is different from the first image frame and different from the second image frame;
display the first modified image frame;
display the bridge frame; and
display the second modified image frame.

10. The apparatus of claim 9, wherein the bridge frame is black.

11. An apparatus comprising:
a storage adapted to:
  store one or more image frames;
a processor adapted to:
  obtain a first image frame and a second image frame from a first video stream;
  generate a first modified image frame by reshaping the first image frame, wherein the first modified image frame is different from the first image frame;
  generate a second modified image frame by reshaping the second image frame, wherein the second modified image frame is different from the second image frame;
  generate a bridge frame, wherein the bridge frame is a solid color, wherein the bridge frame is different from the first image frame and different from the second image frame;
  display the first modified image frame;
  display the bridge frame; and
  display the second modified image frame.

12. The apparatus of claim 11, wherein the bridge frame is black.

* * * * *